United States Patent [19]

Campana, Jr.

[11] Patent Number: 5,717,725
[45] Date of Patent: Feb. 10, 1998

[54] SYSTEM FOR WIRELESS TRANSMISSION AND RECEIVING OF INFORMATION THROUGH A COMPUTER BUS INTERFACE AND METHOD OF OPERATION

[75] Inventor: Thomas J. Campana, Jr., Chicago, Ill.

[73] Assignee: NTP Incorporated, Annandale, Va.

[21] Appl. No.: 391,555

[22] Filed: Feb. 21, 1995

Related U.S. Application Data

[63] Continuation-in-part of Ser. No. 386,060, Feb. 7, 1995, and Ser. No. 385,312, Feb. 7, 1995, and Ser. No. 385,143, Feb. 7, 1995, each is a continuation-in-part of Ser. No.112,256, Aug. 26, 1993, Pat. No. 5,446,759, which is a continuation-in-part of Ser. No. 850,275, Mar. 12, 1992, abandoned, Ser. No. 850,276, Mar. 12, 1992, abandoned, and Ser. No. 850,487, Mar. 12, 1992, abandoned.

[51] Int. Cl.$^6$ .............................. H04B 7/10; H04L 1/02
[52] U.S. Cl. .................. 375/347; 370/100.1; 455/52.1
[58] Field of Search .................. 375/347; 370/100.1, 370/105.1; 455/52.1, 52.2, 52.3, 278.1, 296, 132, 65, 101, 272, 273

[56] References Cited

U.S. PATENT DOCUMENTS

| | | | |
|---|---|---|---|
| 3,195,048 | 7/1965 | Adams et al. | 455/101 |
| 3,526,837 | 9/1970 | Zegers et al. | 325/41 |
| 3,761,891 | 9/1973 | Markwitz | 340/146.1 |
| 3,786,415 | 1/1974 | Phillips et al. | 340/146.1 |
| 3,842,352 | 10/1974 | Cote | 455/52.1 |

(List continued on next page.)

OTHER PUBLICATIONS

The Book of the CCIR Radiopaging Code No. 1, Radiopaging Standards Group 1958 IEEE©, p. 17, unnumbered page entitled The Application of CCIR Radiopaging Code No. 1, reprinted from 35th IEEE Technology Conference, Boulder, Colorado, May 21–23, 1985.

(List continued on next page.)

Primary Examiner—Stephen Chin
Assistant Examiner—Mohammad Ghayour
Attorney, Agent, or Firm—Antonelli, Terry, Stout & Kraus, LLP

[57] ABSTRACT

A system and method is disclosed for transmission of information which is subject to fading by using a RF carrier modulated with a subcarrier modulated with the information. The system has a bus interface which communicates with a digital signal processor which controls the transmitting and receiving circuitry functions. The bus interface is for connection to a computer bus which is connected to a computer which originates information to be transmitted by transmitting circuitry and which receives information from receiving circuitry. The digital signal processor provides first and second encoded information streams each comprising the information to be transmitted with the second stream being delayed by a time delay interval with respect to the first stream which is equal to or greater than the fading interval. The first and second encoded information streams modulate cycles of the subcarrier to produce first and second parallel information streams which are time offset by the time delay interval. The receiving circuitry has a detector for detecting transmitted first and second parallel information streams with the second parallel information stream being delayed from the first parallel information stream by the time delay interval. The digital signal processor determines if faded information is present in the frames of the detected first and second parallel information streams by processing the error correction code therein to determine if a number of bit errors are present which exceed the bit error correction capacity of the error correction code. The digital signal processor places an error marker within the detected first and second parallel information streams to mark each faded information unit and controls replacement of each error marker within at least one of the first and second parallel information streams with replacement data bits within a frame in one of the first and second parallel information streams which were time offset at transmission by the time delay interval to produce error free wirelessly transmitted information.

181 Claims, 55 Drawing Sheets

U.S. PATENT DOCUMENTS

| | | | |
|---|---|---|---|
| 3,860,907 | 1/1975 | Marshall | 340/146.1 |
| 3,873,920 | 3/1975 | Apple, Jr. et al. | 325/41 |
| 4,271,525 | 6/1981 | Watanabe | 375/14 |
| 4,272,434 | 6/1981 | Le Polozec et al. | 375/100 |
| 4,286,334 | 8/1981 | Gammel et al. | 375/40 |
| 4,298,984 | 11/1981 | Baker | 375/40 |
| 4,485,357 | 11/1984 | Voorman | 332/17 |
| 4,517,562 | 5/1985 | Martinez | 370/11 |
| 4,641,318 | 2/1987 | Addeo | 375/18 |
| 4,680,766 | 7/1987 | Wilkinson | 371/47 |
| 4,686,690 | 8/1987 | Sato | 375/114 |
| 4,694,473 | 9/1987 | Etoh | 375/116 |
| 4,715,048 | 12/1987 | Masamura | 375/100 |
| 4,849,990 | 7/1989 | Ikegami et al. | 375/40 |
| 4,858,235 | 8/1989 | Matsuda | 371/38 |
| 4,885,749 | 12/1989 | Golden | 371/32 |
| 4,967,413 | 10/1990 | Otani | 370/37.7 |
| 5,031,193 | 7/1991 | Atkinson et al. | 375/100 |
| 5,159,331 | 10/1992 | Park et al. | 340/825.4 |
| 5,228,026 | 7/1993 | Albrow et al. | 370/29 |
| 5,446,759 | 8/1995 | Campana, Jr. | 375/267 |

OTHER PUBLICATIONS

Paging Systems European Radio Message System (ERMES) Part 5—Receiver conformance Specification 1990, p. 11.

Paging Systems European Radio Message System (ERMES) Part 1—General Aspects 1990, p. 40.

Western Electric Technical Digest No. 8 of Oct. 1967 entitled "Time Diversity Transmission System" by W.R.G. Duane.

Spragins et al, "Telecommunications Protocols and Design", Feb. 1991, pp. 263–279.

*Modern Dictionary of Electronics*, Sixth Edition 1984, p. 281.

Spragins et al., "Telecommunications Protocols and Design" Feb. 1991, pp. 263–279.

Western Electric Technical Digest No. 8, of Oct. 1967 entitled "Time Diversity Transmission System" by W.R.G. Duane.

*Modern Dictionary of Electronics*, Sixth Edition 1984, p. 281.

FIG. 3
(PRIOR ART)

50 SEVEN DIGIT NUMERIC PAGE - POCSAG TRANSMISSION
(11 TO18 PAGES PER BATCH.)

1ST BATCH

| | | | | | | PAGE TOTAL | ACTUAL DATA TIME | AIR-TIME TOTAL | % EFF. |
|---|---|---|---|---|---|---|---|---|---|
| 1ST FRAME GROUP | 1 | 3 | 5 | 7 | | 4 | 1.8555 | 2.1875 | 84.8 |
| 2ND FRAME GROUP | 2 | 4 | 6 | 8 | | 3.5 | .5845 | 1.0625 | 55.0 |
| 3RD FRAME GROUP | 8B | 3 | 5 | 7 | | 3.5 | .5845 | 1.0625 | 55.0 |

2ND BATCH

| | | | | | | | | | |
|---|---|---|---|---|---|---|---|---|---|
| 1ST FRAME GROUP | 1 | 4 | 6 | 8 | | 3.5 | 1.8375 | 2.1875 | 84.0 |
| 2ND FRAME GROUP | 8B | 3 | 5 | 7 | | 3.5 | .5845 | 1.0625 | 55.0 |
| 3RD FRAME GROUP | 2 | 4 | 6 | 8 | | 3.5 | .5845 | 1.0625 | 55.0 |
| 4TH FRAME GROUP | 8B | 3 | 5 | 7 | | 3.5 | .5845 | 1.0625 | 55.0 |

3RD BATCH

| | | | | | | | | | |
|---|---|---|---|---|---|---|---|---|---|
| 1ST FRAME GROUP | 1 | 3 | 5 | 7 | | 4 | 1.8555 | 2.1875 | 84.8 |
| 2ND FRAME GROUP | 2 | 4 | 6 | 8 | | 3.5 | .5845 | 1.0625 | 55.0 |
| 3RD FRAME GROUP | 8B | 3 | 5 | 7 | | 3.5 | .5845 | 1.0625 | 55.0 |
| 4TH FRAME GROUP | 2 | 4 | 6 | 8 | | 3.5 | .5845 | 1.0625 | 55.0 |
| 5TH FRAME GROUP | 8B | 3 | 5 | 7 | | 3.5 | .5845 | 1.0625 | 55.0 |

4TH BATCH (REMOVES EXCESS BALANCE OF)

| | | | | | | | | | |
|---|---|---|---|---|---|---|---|---|---|
| 1ST FRAME GROUP | 1 | 4 | | | | 2 | 1.5375 | 2.1875 | 70.2 |
| 2ND FRAME GROUP | 2 | | | | | 1 | .192 | 1.0625 | 18.0 |
| 3RD FRAME GROUP | 1 | | | | | 1 | .192 | 1.0625 | 18.0 |
| 4TH FRAME GROUP | 1 | | | | | 1 | .192 | 1.0625 | 18.0 |
| 5TH FRAME GROUP | 1 | | | | | 1 | .192 | 1.0625 | 18.0 |
| 6TH FRAME GROUP | 1 | | | | | 1 | .192 | 1.0625 | 18.0 |
| | | | | | | 50 | 13.306 SEC. | 23.625 SEC. | 56.3% |

THE BALANCE OF THE PAGE SENT TO A PAGER IN

NOTE: 8B REPRESENTS THE BALANCE OF THE PAGE SENT TO A PAGER IN FRAME 8 IN THE PREVIOUS FRAME GROUP.

FIG. 4A
(PRIOR ART)

PROBABILITY OF MSG LOSS @ (512)

| MPH | 150 | 450 | 900 | 1200 | BAUD 2200 |
|---|---|---|---|---|---|
| 10 | 7.16% | 8.38% | 4.22% | 2.23% | 0.18% |
| 20 | 8.89% | 4.22% | 0.52% | 0.11% | 0.00% |
| 30 | 8.38% | 1.58% | 0.05% | 0.00% | 0.00% |
| 40 | 7.05% | 0.52% | 0.00% | 0.00% | 0.00% |
| 50 | 5.57% | 0.16% | 0.00% | 0.00% | 0.00% |
| 60 | 4.22% | 0.05% | 0.00% | 0.00% | 0.00% |

PROBABILITY OF MSG LOSS @ (1200)

| MPH | 150 | 450 | 900 | 1200 | BAUD 2200 |
|---|---|---|---|---|---|
| 10 | 4.74% | 9.31% | 10.20% | 9.18% | 4.57% |
| 20 | 7.65% | 10.20% | 6.30% | 3.83% | 0.50% |
| 30 | 9.31% | 8.49% | 2.91% | 1.18% | 0.04% |
| 40 | 10.13% | 6.30% | 1.18% | 0.32% | 0.00% |
| 50 | 10.36% | 4.38% | 0.45% | 0.08% | 0.00% |
| 60 | 10.20% | 2.91% | 0.16% | 0.02% | 0.00% |

PROBABILITY OF MSG LOSS @ (2400)

| MPH | 150 | 450 | 900 | 1200 | BAUD 2200 |
|---|---|---|---|---|---|
| 10 | 2.65% | 6.38% | 9.31% | 10.13% | 9.58% |
| 20 | 4.74% | 9.31% | 10.19% | 9.17% | 4.56% |
| 30 | 6.38% | 10.30% | 8.49% | 6.30% | 1.61% |
| 40 | 7.65% | 10.19% | 6.30% | 3.83% | 0.50% |
| 50 | 8.61% | 9.49% | 4.37% | 2.18% | 0.15% |
| 60 | 9.31% | 8.49% | 2.91% | 1.18% | 0.04% |

FIG. 4B
(PRIOR ART)

PROBABILITY OF MSG LOSS @ (512)

| MPH | 150 | 450 | 900 | 1200 | BAUD 2200 |
|---|---|---|---|---|---|
| 10 | 4.10% | 3.20% | 0.85% | 0.29% | 0.01% |
| 20 | 4.17% | 0.85% | 0.03% | 0.00% | 0.00% |
| 30 | 3.20% | 0.17% | 0.00% | 0.00% | 0.00% |
| 40 | 2.18% | 0.03% | 0.00% | 0.00% | 0.00% |
| 50 | 1.39% | 0.00% | 0.00% | 0.00% | 0.00% |
| 60 | 0.85% | 0.00% | 0.00% | 0.00% | 0.00% |

PROBABILITY OF MSG LOSS @ (1200)

| MPH | 150 | 450 | 900 | 1200 | BAUD 2200 |
|---|---|---|---|---|---|
| 10 | 3.04% | 5.07% | 4.28% | 3.23% | 0.88% |
| 20 | 4.52% | 4.28% | 1.54% | 0.65% | 0.03% |
| 30 | 5.07% | 2.73% | 0.41% | 0.10% | 0.00% |
| 40 | 5.06% | 1.54% | 0.10% | 0.01% | 0.00% |
| 50 | 4.75% | 0.81% | 0.02% | 0.00% | 0.00% |
| 60 | 4.28% | 0.41% | 0.00% | 0.00% | 0.00% |

PROBABILITY OF MSG LOSS @ (2400)

| MPH | 150 | 450 | 900 | 1200 | BAUD 2200 |
|---|---|---|---|---|---|
| 10 | 1.77% | 3.93% | 5.06% | 5.06% | 3.58% |
| 20 | 3.04% | 5.06% | 4.28% | 3.23% | 0.88% |
| 30 | 3.93% | 4.93% | 2.73% | 1.54% | 0.16% |
| 40 | 4.52% | 4.28% | 1.54% | 0.65% | 0.03% |
| 50 | 4.88% | 3.49% | 0.81% | 0.26% | 0.00% |
| 60 | 5.06% | 2.73% | 0.41% | 0.10% | 0.00% |

FIG. 4C
(PRIOR ART)

PROBABILITY OF MSG LOSS @ (512)

| MPH | 150 | 450 | 900 | 1200 | BAUD 2200. |
|---|---|---|---|---|---|
| 10 | 39.99% | 45.22% | 25.65% | 14.38% | 1.26% |
| 20 | 47.28% | 25.65% | 3.53% | 0.74% | 0.00% |
| 30 | 45.22% | 10.37% | 0.33% | 0.03% | 0.00% |
| 40 | 39.52% | 3.53% | 0.03% | 0.00% | 0.00% |
| 50 | 32.57% | 1.10% | 0.00% | 0.00% | 0.00% |
| 60 | 25.65% | 0.33% | 0.00% | 0.00% | 0.00% |

PROBABILITY OF MSG LOSS @ (1200)

| MPH | 150 | 450 | 900 | 1200 | BAUD 2200 |
|---|---|---|---|---|---|
| 10 | 28.36% | 48.92% | 52.24% | 48.39% | 27.47% |
| 20 | 42.11% | 52.24% | 36.05% | 23.56% | 3.40% |
| 30 | 48.92% | 45.64% | 18.36% | 7.86% | 0.28% |
| 40 | 51.99% | 36.05% | 7.86% | 2.19% | 0.02% |
| 50 | 52.84% | 26.46% | 3.05% | 0.56% | 0.00% |
| 60 | 52.24% | 18.36% | 1.12% | 0.14% | 0.00% |

PROBABILITY OF MSG LOSS @ (2400)

| MPH | 150 | 450 | 900 | 1200 | BAUD 2200 |
|---|---|---|---|---|---|
| 10 | 16.80% | 36.38% | 48.86% | 51.93% | 49.90% |
| 20 | 28.33% | 48.86% | 52.18% | 48.32% | 27.42% |
| 30 | 36.38% | 52.57% | 45.58% | 35.99% | 10.55% |
| 40 | 42.06% | 52.18% | 35.99% | 23.51% | 3.39% |
| 50 | 46.07% | 49.53% | 26.41% | 14.01% | 0.99% |
| 60 | 48.86% | 45.58% | 18.32% | 7.84% | 0.28% |

FIG. 4E
(PRIOR ART)

PROBABILITY OF MSG LOSS @ (512) BAUD

| MPH | 150 | 450 | 900 | 1200 | 2200 |
|---|---|---|---|---|---|
| 10 | 52.00% | 57.89% | 34.68% | 19.99% | 1.80% |
| 20 | 60.15% | 34.68% | 5.03% | 1.06% | 0.00% |
| 30 | 57.89% | 14.55% | 0.47% | 0.04% | 0.00% |
| 40 | 51.46% | 5.03% | 0.04% | 0.00% | 0.00% |
| 50 | 43.23% | 1.58% | 0.00% | 0.00% | 0.00% |
| 60 | 34.68% | 0.47% | 0.00% | 0.00% | 0.00% |

PROBABILITY OF MSG LOSS @ (1200) BAUD

| MPH | 150 | 450 | 900 | 1200 | 2200 |
|---|---|---|---|---|---|
| 10 | 38.10% | 61.94% | 65.45% | 61.37% | 36.99% |
| 20 | 54.44% | 65.45% | 47.43% | 32.05% | 4.85% |
| 30 | 61.94% | 58.39% | 25.31% | 11.10% | 0.40% |
| 40 | 65.19% | 47.43% | 11.10% | 3.14% | 0.03% |
| 50 | 66.07% | 35.73% | 4.35% | 0.81% | 0.00% |
| 60 | 65.45% | 25.31% | 1.60% | 0.20% | 0.00% |

PROBABILITY OF MSG LOSS @ (2400) BAUD

| MPH | 150 | 450 | 900 | 1200 | 2200 |
|---|---|---|---|---|---|
| 10 | 23.28% | 47.86% | 61.94% | 65.19% | 63.04% |
| 20 | 38.10% | 61.94% | 65.44% | 61.36% | 36.97% |
| 30 | 47.86% | 65.85% | 58.37% | 47.41% | 14.83% |
| 40 | 54.43% | 65.44% | 47.41% | 32.03% | 4.84% |
| 50 | 58.90% | 62.65% | 35.71% | 19.54% | 1.43% |
| 60 | 61.94% | 58.37% | 25.29% | 11.09% | 0.40% |

FIG. 4F
(PRIOR ART)

PROBABILITY OF MSG LOSS @ (512)

| MPH | 150 | 450 | 900 | 1200 | BAUD 2200 |
|---|---|---|---|---|---|
| 10 | 33.87% | 27.47% | 8.11% | 2.88% | 0.06% |
| 20 | 34.35% | 8.11% | 0.29% | 0.03% | 0.00% |
| 30 | 27.47% | 1.66% | 0.01% | 0.00% | 0.00% |
| 40 | 19.57% | 0.29% | 0.00% | 0.00% | 0.00% |
| 50 | 12.94% | 0.05% | 0.00% | 0.00% | 0.00% |
| 60 | 8.11% | 0.01% | 0.00% | 0.00% | 0.00% |

PROBABILITY OF MSG LOSS @ (1200)

| MPH | 150 | 450 | 900 | 1200 | BAUD 2200 |
|---|---|---|---|---|---|
| 10 | 26.26% | 40.16% | 35.12% | 27.68% | 8.33% |
| 20 | 36.67% | 35.12% | 14.23% | 6.26% | 0.25% |
| 30 | 40.16% | 23.91% | 4.00% | 0.96% | 0.01% |
| 40 | 40.15% | 14.23% | 0.96% | 0.13% | 0.00% |
| 50 | 38.18% | 7.76% | 0.21% | 0.02% | 0.00% |
| 60 | 35.12% | 4.00% | 0.05% | 0.00% | 0.00% |

PROBABILITY OF MSG LOSS @ (2400)

| MPH | 150 | 450 | 900 | 1200 | BAUD 2200 |
|---|---|---|---|---|---|
| 10 | 16.13% | 32.68% | 40.16% | 40.14% | 30.22% |
| 20 | 26.26% | 40.16% | 35.11% | 27.67% | 8.32% |
| 30 | 32.68% | 39.33% | 23.90% | 14.22% | 1.56% |
| 40 | 36.66% | 35.11% | 14.22% | 6.25% | 0.25% |
| 50 | 39.00% | 29.58% | 7.75% | 2.51% | 0.04% |
| 60 | 40.16% | 23.90% | 4.00% | 0.96% | 0.01% |

FIG. 4G
(PRIOR ART)

PROBABILITY OF MSG LOSS @ (512)

| MPH | 150 | 450 | 900 | 1200 | BAUD 2200 |
|---|---|---|---|---|---|
| 10 | 84.05% | 88.50% | 65.53% | 42.76% | 4.44% |
| 20 | 89.98% | 65.53% | 12.11% | 2.62% | 0.01% |
| 30 | 88.50% | 32.52% | 1.17% | 0.09% | 0.00% |
| 40 | 83.60% | 12.11% | 0.09% | 0.00% | 0.00% |
| 50 | 75.74% | 3.90% | 0.01% | 0.00% | 0.00% |
| 60 | 65.53% | 1.17% | 0.00% | 0.00% | 0.00% |

PROBABILITY OF MSG LOSS @ (1200)

| MPH | 150 | 450 | 900 | 1200 | BAUD 2200 |
|---|---|---|---|---|---|
| 10 | 69.87% | 91.07% | 92.99% | 90.73% | 68.50% |
| 20 | 86.00% | 92.99% | 79.97% | 61.95% | 11.69% |
| 30 | 91.07% | 88.84% | 51.79% | 25.50% | 1.00% |
| 40 | 92.86% | 79.97% | 25.50% | 7.66% | 0.07% |
| 50 | 93.30% | 66.90% | 10.53% | 2.00% | 0.00% |
| 60 | 92.99% | 51.79% | 3.96% | 0.49% | 0.00% |

PROBABILITY OF MSG LOSS @ (2400)

| MPH | 150 | 450 | 900 | 1200 | BAUD 2200 |
|---|---|---|---|---|---|
| 10 | 48.44% | 80.37% | 91.06% | 92.85% | 91.70% |
| 20 | 69.85% | 91.06% | 92.98% | 90.72% | 68.46% |
| 30 | 80.37% | 93.19% | 88.82% | 79.94% | 33.06% |
| 40 | 85.98% | 92.98% | 79.94% | 61.90% | 11.67% |
| 50 | 89.17% | 91.47% | 66.86% | 41.93% | 3.53% |
| 60 | 91.06% | 88.82% | 51.75% | 25.46% | 1.00% |

FIG. 4H
(PRIOR ART)

PROBABILITY OF MSG LOSS @ (512)

| MPH | 150 | 450 | 900 | 1200 | BAUD 2200 |
|---|---|---|---|---|---|
| 10 | 64.46% | 55.21% | 19.07% | 7.04% | 0.15% |
| 20 | 65.09% | 19.07% | 0.73% | 0.07% | 0.00% |
| 30 | 55.21% | 4.09% | 0.02% | 0.00% | 0.00% |
| 40 | 42.01% | 0.73% | 0.00% | 0.00% | 0.00% |
| 50 | 29.28% | 0.12% | 0.00% | 0.00% | 0.00% |
| 60 | 19.07% | 0.02% | 0.00% | 0.00% | 0.00% |

PROBABILITY OF MSG LOSS @ (1200)

| MPH | 150 | 450 | 900 | 1200 | BAUD 2200 |
|---|---|---|---|---|---|
| 10 | 53.33% | 72.32% | 66.11% | 55.54% | 19.55% |
| 20 | 68.09% | 66.11% | 31.88% | 14.92% | 0.63% |
| 30 | 72.32% | 49.52% | 9.71% | 2.39% | 0.01% |
| 40 | 72.30% | 31.88% | 2.39% | 0.32% | 0.00% |
| 50 | 69.97% | 18.30% | 0.53% | 0.04% | 0.00% |
| 60 | 66.11% | 9.71% | 0.11% | 0.00% | 0.00% |

PROBABILITY OF MSG LOSS @ (2400)

| MPH | 150 | 450 | 900 | 1200 | BAUD 2200 |
|---|---|---|---|---|---|
| 10 | 35.59% | 62.81% | 72.30% | 72.28% | 59.33% |
| 20 | 53.31% | 72.30% | 66.08% | 55.50% | 19.52% |
| 30 | 62.81% | 71.33% | 49.48% | 31.84% | 3.86% |
| 40 | 68.07% | 66.08% | 31.84% | 14.90% | 0.63% |
| 50 | 70.93% | 58.39% | 18.27% | 6.17% | 0.10% |
| 60 | 72.30% | 49.48% | 9.69% | 2.38% | 0.01% |

FIG. 41 (PRIOR ART)

PROBABILITY OF MSG LOSS @ (512)

| MPH | 150 | 450 | 900 | 1200 | BAUD 2200 |
|---|---|---|---|---|---|
| 10 | 98.12% | 99.08% | 90.04% | 70.12% | 9.36% |
| 20 | 99.31% | 90.04% | 24.39% | 5.59% | 0.02% |
| 30 | 99.08% | 57.33% | 2.51% | 0.21% | 0.00% |
| 40 | 98.00% | 24.39% | 0.21% | 0.01% | 0.00% |
| 50 | 95.34% | 8.24% | 0.02% | 0.00% | 0.00% |
| 60 | 90.04% | 2.51% | 0.00% | 0.00% | 0.00% |

PROBABILITY OF MSG LOSS @ (1200)

| MPH | 150 | 450 | 900 | 1200 | BAUD 2200 |
|---|---|---|---|---|---|
| 10 | 88.69% | 98.76% | 99.20% | 98.67% | 87.74% |
| 20 | 97.19% | 99.20% | 94.62% | 82.72% | 20.22% |
| 30 | 98.76% | 98.14% | 73.44% | 41.42% | 1.81% |
| 40 | 99.17% | 94.62% | 41.42% | 13.48% | 0.13% |
| 50 | 99.26% | 86.59% | 18.31% | 3.61% | 0.01% |
| 60 | 99.20% | 73.44% | 7.08% | 0.89% | 0.00% |

PROBABILITY OF MSG LOSS @ (2400)

| MPH | 150 | 450 | 900 | 1200 | BAUD 2200 |
|---|---|---|---|---|---|
| 10 | 69.92% | 94.78% | 98.75% | 99.16% | 98.90% |
| 20 | 88.64% | 98.75% | 99.19% | 98.66% | 87.67% |
| 30 | 94.78% | 99.23% | 98.12% | 94.57% | 51.71% |
| 40 | 97.17% | 99.19% | 94.57% | 82.63% | 20.15% |
| 50 | 98.23% | 98.85% | 86.51% | 62.69% | 6.31% |
| 60 | 98.75% | 98.12% | 73.34% | 41.32% | 1.80% |

FIG. 4J
(PRIOR ART)

PROBABILITY OF MSG LOSS @ (512)

| MPH | 150 | 450 | 900 | 1200 | BAUD 2200 |
|---|---|---|---|---|---|
| 10 | 89.35% | 82.43% | 36.74% | 14.62% | 0.32% |
| 20 | 89.76% | 36.74% | 1.58% | 0.14% | 0.00% |
| 30 | 82.43% | 8.65% | 0.04% | 0.00% | 0.00% |
| 40 | 69.26% | 1.58% | 0.00% | 0.00% | 0.00% |
| 50 | 52.77% | 0.26% | 0.00% | 0.00% | 0.00% |
| 60 | 36.74% | 0.04% | 0.00% | 0.00% | 0.00% |

PROBABILITY OF MSG LOSS @ (1200)

| MPH | 150 | 450 | 900 | 1200 | BAUD 2200 |
|---|---|---|---|---|---|
| 10 | 74.96% | 90.31% | 86.00% | 77.07% | 32.65% |
| 20 | 87.45% | 86.00% | 50.21% | 25.44% | 1.15% |
| 30 | 90.31% | 71.12% | 16.94% | 4.29% | 0.03% |
| 40 | 90.30% | 50.21% | 4.29% | 0.58% | 0.00% |
| 50 | 88.76% | 30.73% | 0.97% | 0.07% | 0.00% |
| 60 | 86.00% | 16.94% | 0.21% | 0.01% | 0.00% |

PROBABILITY OF MSG LOSS @ (2400)

| MPH | 150 | 450 | 900 | 1200 | BAUD 2200 |
|---|---|---|---|---|---|
| 10 | 54.97% | 83.37% | 90.25% | 90.24% | 80.44% |
| 20 | 74.88% | 90.25% | 85.93% | 76.98% | 32.56% |
| 30 | 83.37% | 89.63% | 71.02% | 50.11% | 6.89% |
| 40 | 87.39% | 85.93% | 50.11% | 25.37% | 1.14% |
| 50 | 89.37% | 79.62% | 30.65% | 10.90% | 0.17% |
| 60 | 90.25% | 71.02% | 16.88% | 4.28% | 0.03% |

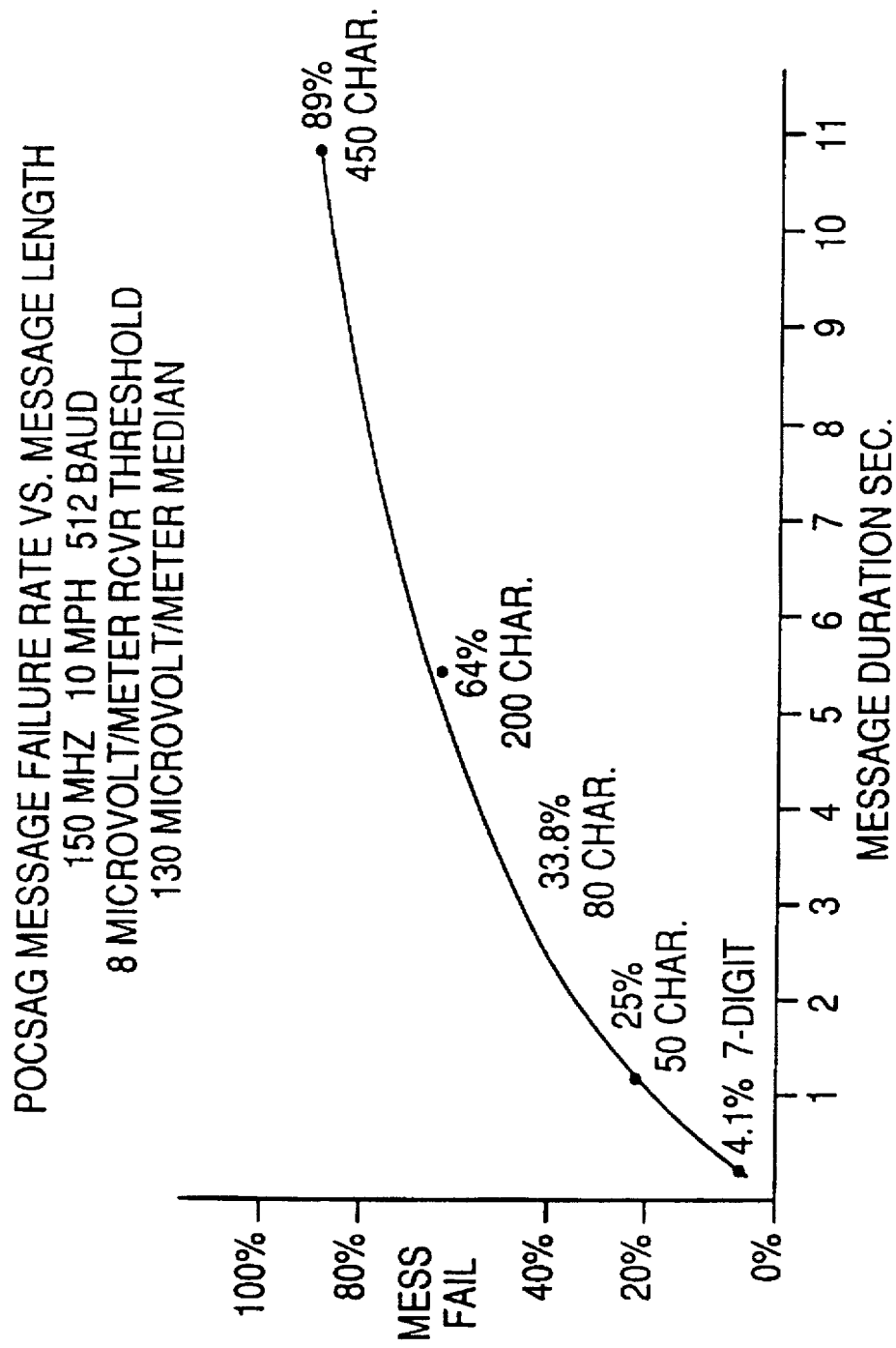

FIG. 10A

PROBABILITY OF MSG LOSS @ (512)

| MPH | 150 | 450 | 900 | 1200 | BAUD 2200 |
|---|---|---|---|---|---|
| 10 | 4.75% | 0.01% | 0.00% | 0.00% | 0.00% |
| 20 | 0.18% | 0.00% | 0.00% | 0.00% | 0.00% |
| 30 | 0.01% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

PROBABILITY OF MSG LOSS @ (1200)

| MPH | 150 | 450 | 900 | 1200 | BAUD 2200 |
|---|---|---|---|---|---|
| 10 | 2.05% | 0.00% | 0.00% | 0.00% | 0.00% |
| 20 | 0.08% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

PROBABILITY OF MSG LOSS @ (2400)

| MPH | 150 | 450 | 900 | 1200 | BAUD 2200 |
|---|---|---|---|---|---|
| 10 | 1.03% | 0.00% | 0.00% | 0.00% | 0.00% |
| 20 | 0.04% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

FIG. 10B

PROBABILITY OF MSG LOSS @ (512)

| MPH | 150 | 450 | 900 | 1200 | 2200 BAUD |
|---|---|---|---|---|---|
| 10 | 0.57% | 0.00% | 0.00% | 0.00% | 0.00% |
| 20 | 0.00% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

PROBABILITY OF MSG LOSS @ (1200)

| MPH | 150 | 450 | 900 | 1200 | 2200 BAUD |
|---|---|---|---|---|---|
| 10 | 0.24% | 0.00% | 0.00% | 0.00% | 0.00% |
| 20 | 0.00% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

PROBABILITY OF MSG LOSS @ (2400)

| MPH | 150 | 450 | 900 | 1200 | 2200 BAUD |
|---|---|---|---|---|---|
| 10 | 0.12% | 0.00% | 0.00% | 0.00% | 0.00% |
| 20 | 0.00% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

FIG. 10C

PROBABILITY OF MSG LOSS @ (512)

| MPH | 150 | 450 | 900 | 1200 | BAUD 2200 |
|---|---|---|---|---|---|
| 10 | 0.09% | 0.00% | 0.00% | 0.00% | 0.00% |
| 20 | 0.00% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

PROBABILITY OF MSG LOSS @ (1200)

| MPH | 150 | 450 | 900 | 1200 | BAUD 2200 |
|---|---|---|---|---|---|
| 10 | 0.04% | 0.00% | 0.00% | 0.00% | 0.00% |
| 20 | 0.00% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

PROBABILITY OF MSG LOSS @ (2400)

| MPH | 150 | 450 | 900 | 1200 | BAUD 2200 |
|---|---|---|---|---|---|
| 10 | 0.02% | 0.00% | 0.00% | 0.00% | 0.00% |
| 20 | 0.00% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

FIG. 10D

PROBABILITY OF MSG LOSS @ (512) BAUD

| MPH | 150 | 450 | 900 | 1200 | 2200 |
|---|---|---|---|---|---|
| 10 | 0.00% | 0.00% | 0.00% | 0.00% | 0.00% |
| 20 | 0.00% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

PROBABILITY OF MSG LOSS @ (1200) BAUD

| MPH | 150 | 450 | 900 | 1200 | 2200 |
|---|---|---|---|---|---|
| 10 | 0.00% | 0.00% | 0.00% | 0.00% | 0.00% |
| 20 | 0.00% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

PROBABILITY OF MSG LOSS @ (2400) BAUD

| MPH | 150 | 450 | 900 | 1200 | 2200 |
|---|---|---|---|---|---|
| 10 | 0.00% | 0.00% | 0.00% | 0.00% | 0.00% |
| 20 | 0.00% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

FIG. 10E

PROBABILITY OF MSG LOSS @ (512) BAUD

| MPH | 150 | 450 | 900 | 1200 | 2200 |
|---|---|---|---|---|---|
| 10 | 35.59% | 0.50% | 0.00% | 0.00% | 0.00% |
| 20 | 5.30% | 0.00% | 0.00% | 0.00% | 0.00% |
| 30 | 0.50% | 0.00% | 0.00% | 0.00% | 0.00% |
| 40 | 0.04% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

PROBABILITY OF MSG LOSS @ (1200) BAUD

| MPH | 150 | 450 | 900 | 1200 | 2200 |
|---|---|---|---|---|---|
| 10 | 17.09% | 0.22% | 0.00% | 0.00% | 0.00% |
| 20 | 2.29% | 0.00% | 0.00% | 0.00% | 0.00% |
| 30 | 0.22% | 0.00% | 0.00% | 0.00% | 0.00% |
| 40 | 0.02% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

PROBABILITY OF MSG LOSS @ (2400) BAUD

| MPH | 150 | 450 | 900 | 1200 | 2200 |
|---|---|---|---|---|---|
| 10 | 8.94% | 0.11% | 0.00% | 0.00% | 0.00% |
| 20 | 1.15% | 0.00% | 0.00% | 0.00% | 0.00% |
| 30 | 0.11% | 0.00% | 0.00% | 0.00% | 0.00% |
| 40 | 0.01% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

FIG. 10F

PROBABILITY OF MSG LOSS @ (512) BAUD

| MPH | 150 | 450 | 900 | 1200 | 2200 |
|---|---|---|---|---|---|
| 10 | 10.37% | 0.01% | 0.00% | 0.00% | 0.00% |
| 20 | 0.34% | 0.00% | 0.00% | 0.00% | 0.00% |
| 30 | 0.01% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

PROBABILITY OF MSG LOSS @ (1200) BAUD

| MPH | 150 | 450 | 900 | 1200 | 2200 |
|---|---|---|---|---|---|
| 10 | 4.56% | 0.00% | 0.00% | 0.00% | 0.00% |
| 20 | 0.14% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

PROBABILITY OF MSG LOSS @ (2400) BAUD

| MPH | 150 | 450 | 900 | 1200 | 2200 |
|---|---|---|---|---|---|
| 10 | 2.30% | 0.00% | 0.00% | 0.00% | 0.00% |
| 20 | 0.07% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

FIG. 10G

PROBABILITY OF MSG LOSS @ (512)

| MPH | 150 | 450 | 900 | 1200 | 2200 | BAUD |
|---|---|---|---|---|---|---|
| 10 | 2.69% | 0.00% | 0.00% | 0.00% | 0.00% | |
| 20 | 0.02% | 0.00% | 0.00% | 0.00% | 0.00% | |
| 30 | 0.00% | 0.00% | 0.00% | 0.00% | 0.00% | |
| 40 | 0.00% | 0.00% | 0.00% | 0.00% | 0.00% | |
| 50 | 0.00% | 0.00% | 0.00% | 0.00% | 0.00% | |
| 60 | 0.00% | 0.00% | 0.00% | 0.00% | 0.00% | |

PROBABILITY OF MSG LOSS @ (1200)

| MPH | 150 | 450 | 900 | 1200 | 2200 | BAUD |
|---|---|---|---|---|---|---|
| 10 | 1.15% | 0.00% | 0.00% | 0.00% | 0.00% | |
| 20 | 0.01% | 0.00% | 0.00% | 0.00% | 0.00% | |
| 30 | 0.00% | 0.00% | 0.00% | 0.00% | 0.00% | |
| 40 | 0.00% | 0.00% | 0.00% | 0.00% | 0.00% | |
| 50 | 0.00% | 0.00% | 0.00% | 0.00% | 0.00% | |
| 60 | 0.00% | 0.00% | 0.00% | 0.00% | 0.00% | |

PROBABILITY OF MSG LOSS @ (2400)

| MPH | 150 | 450 | 900 | 1200 | 2200 | BAUD |
|---|---|---|---|---|---|---|
| 10 | 0.58% | 0.00% | 0.00% | 0.00% | 0.00% | |
| 20 | 0.00% | 0.00% | 0.00% | 0.00% | 0.00% | |
| 30 | 0.00% | 0.00% | 0.00% | 0.00% | 0.00% | |
| 40 | 0.00% | 0.00% | 0.00% | 0.00% | 0.00% | |
| 50 | 0.00% | 0.00% | 0.00% | 0.00% | 0.00% | |
| 60 | 0.00% | 0.00% | 0.00% | 0.00% | 0.00% | |

FIG. 10H

PROBABILITY OF MSG LOSS @ (512) BAUD

| MPH | 150 | 450 | 900 | 1200 | 2200 |
|---|---|---|---|---|---|
| 10 | 0.68% | 0.00% | 0.00% | 0.00% | 0.00% |
| 20 | 0.00% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

PROBABILITY OF MSG LOSS @ (1200) BAUD

| MPH | 150 | 450 | 900 | 1200 | 2200 |
|---|---|---|---|---|---|
| 10 | 0.29% | 0.00% | 0.00% | 0.00% | 0.00% |
| 20 | 0.00% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

PROBABILITY OF MSG LOSS @ (2400) BAUD

| MPH | 150 | 450 | 900 | 1200 | 2200 |
|---|---|---|---|---|---|
| 10 | 0.14% | 0.00% | 0.00% | 0.00% | 0.00% |
| 20 | 0.00% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

FIG. 101

PROBABILITY OF MSG LOSS @ (512)

| MPH | 150 | 450 | 900 | 1200 | BAUD 2200 |
|---|---|---|---|---|---|
| 10 | 0.17% | 0.00% | 0.00% | 0.00% | 0.00% |
| 20 | 0.00% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

PROBABILITY OF MSG LOSS @ (1200)

| MPH | 150 | 450 | 900 | 1200 | BAUD 2200 |
|---|---|---|---|---|---|
| 10 | 0.07% | 0.00% | 0.00% | 0.00% | 0.00% |
| 20 | 0.00% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

PROBABILITY OF MSG LOSS @ (2400)

| MPH | 150 | 450 | 900 | 1200 | BAUD 2200 |
|---|---|---|---|---|---|
| 10 | 0.04% | 0.00% | 0.00% | 0.00% | 0.00% |
| 20 | 0.00% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

FIG. 10J

PROBABILITY OF MSG LOSS @ (512)

| MPH | 150 | 450 | 900 | 1200 | BAUD 2200 |
|---|---|---|---|---|---|
| 10 | 0.04% | 0.00% | 0.00% | 0.00% | 0.00% |
| 20 | 0.00% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

PROBABILITY OF MSG LOSS @ (1200)

| MPH | 150 | 450 | 900 | 1200 | BAUD 2200 |
|---|---|---|---|---|---|
| 10 | 0.02% | 0.00% | 0.00% | 0.00% | 0.00% |
| 20 | 0.00% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

PROBABILITY OF MSG LOSS @ (2400)

| MPH | 150 | 450 | 900 | 1200 | BAUD 2200 |
|---|---|---|---|---|---|
| 10 | 0.01% | 0.00% | 0.00% | 0.00% | 0.00% |
| 20 | 0.00% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

FIG. 10K

PROBABILITY OF MSG LOSS @ (512) BAUD

| MPH | 150 | 450 | 900 | 1200 | 2200 |
|---|---|---|---|---|---|
| 10 | 0.01% | 0.00% | 0.00% | 0.00% | 0.00% |
| 20 | 0.00% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

PROBABILITY OF MSG LOSS @ (1200) BAUD

| MPH | 150 | 450 | 900 | 1200 | 2200 |
|---|---|---|---|---|---|
| 10 | 0.00% | 0.00% | 0.00% | 0.00% | 0.00% |
| 20 | 0.00% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

PROBABILITY OF MSG LOSS @ (2400) BAUD

| MPH | 150 | 450 | 900 | 1200 | 2200 |
|---|---|---|---|---|---|
| 10 | 0.00% | 0.00% | 0.00% | 0.00% | 0.00% |
| 20 | 0.00% | 0.00% | 0.00% | 0.00% | 0.00% |
| 30 | 0.00% | 0.00% | 0.00% | 0.00% | 0.00% |
| 40 | 0.00% | 0.00% | 0.00% | 0.00% | 0.00% |
| 50 | 0.00% | 0.00% | 0.00% | 0.00% | 0.00% |
| 60 | 0.00% | 0.00% | 0.00% | 0.00% | 0.00% |

1200 BAUD WAVEFORM (1666 MICROSECONDS)

1 = 0000    9 = 1000
2 = 0001   10 = 1001
3 = 0010   11 = 1010
4 = 0011   12 = 1011
5 = 0100   13 = 1100
6 = 0101   14 = 1101
7 = 0110   15 = 1110
8 = 0111   16 = 1111

FIG. 12
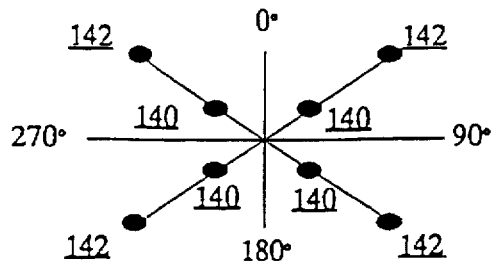
FIG. 15
| | | |
|---|---|---|
| 1. SYSTEM FREQUENCY (MHZ) | 454 | (ENTRY) |
| 2. SYSTEM CONFIG. (ALG. OR DIG.) | DIG. | (ENTRY) |
| 3. SYSTEM DATA RATE (BAUD) | 2400 | (ENTRY) |
| 4. DATA STREAM DELAY (MS) | 400 | (DISPLAY) |
| 5. OPTIMIZATION DELAY (MS) | 0 | (ENTRY) |
| 6. TRANSMIT KEY-UP DELAY (MS) | 1200 | (ENTRY) |
| 7. ARBITRATION TYPE (SEE MANUAL) | A7 | (ENTRY) |
| 8. ARBITRATION TIME (SECONDS) | 300 | (ENTRY) |
FIG. 16

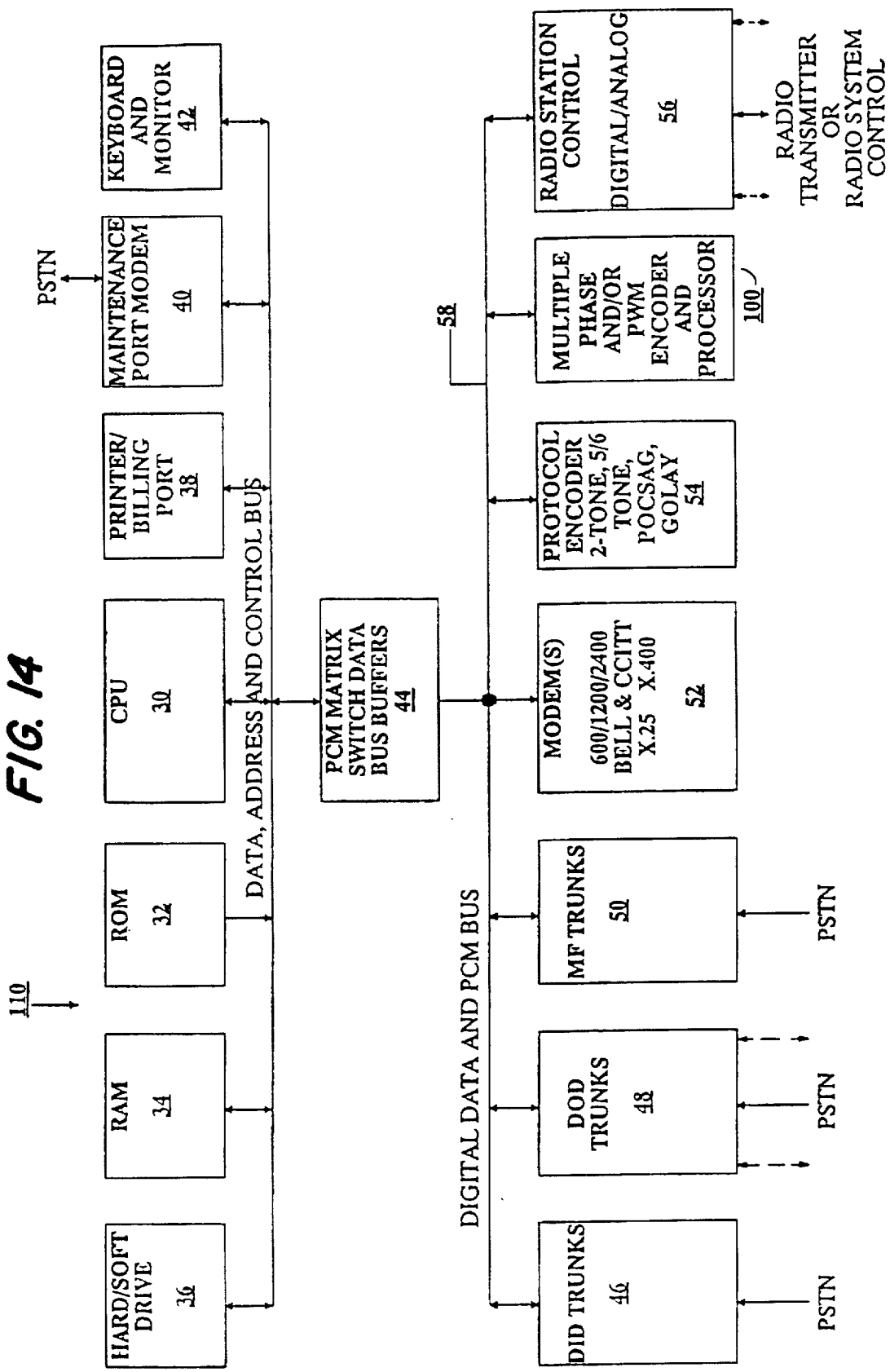

FIG. 17

| SYNC | TIME | ID | COM | MESSAGE | EOF |
|------|------|----|----|---------|-----|

| SYNC | TIME | ID | COM | MESSAGE | EOF |
|------|------|----|----|---------|-----|

D7 — D4

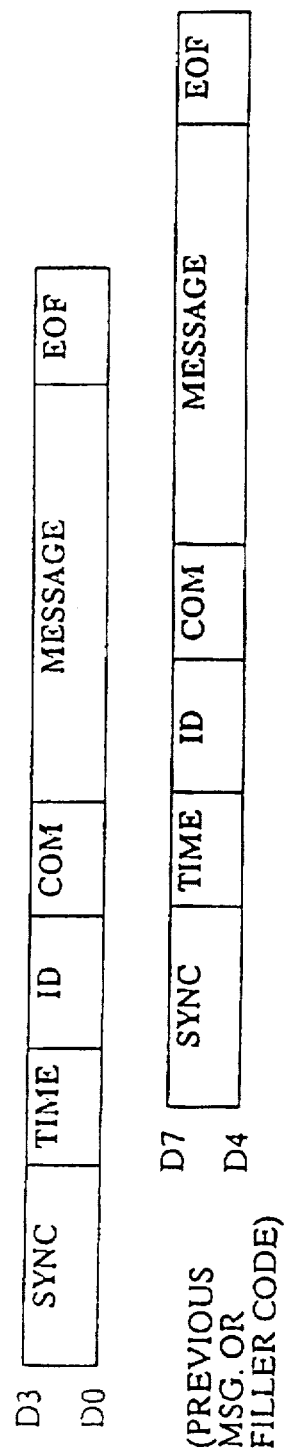
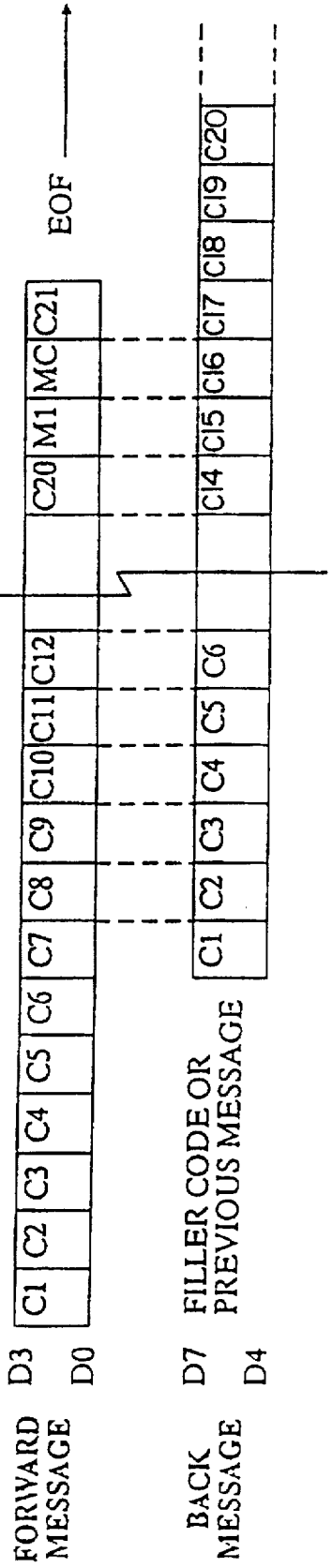

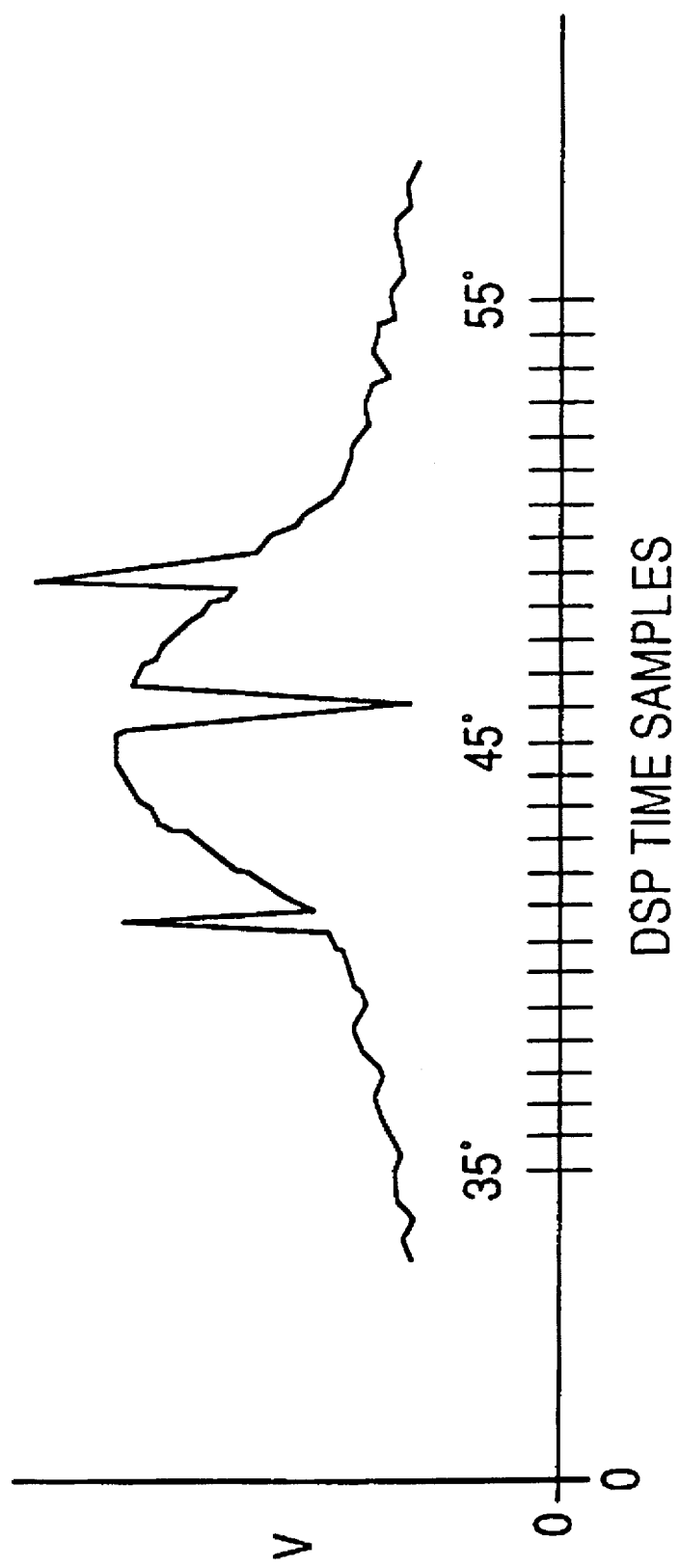

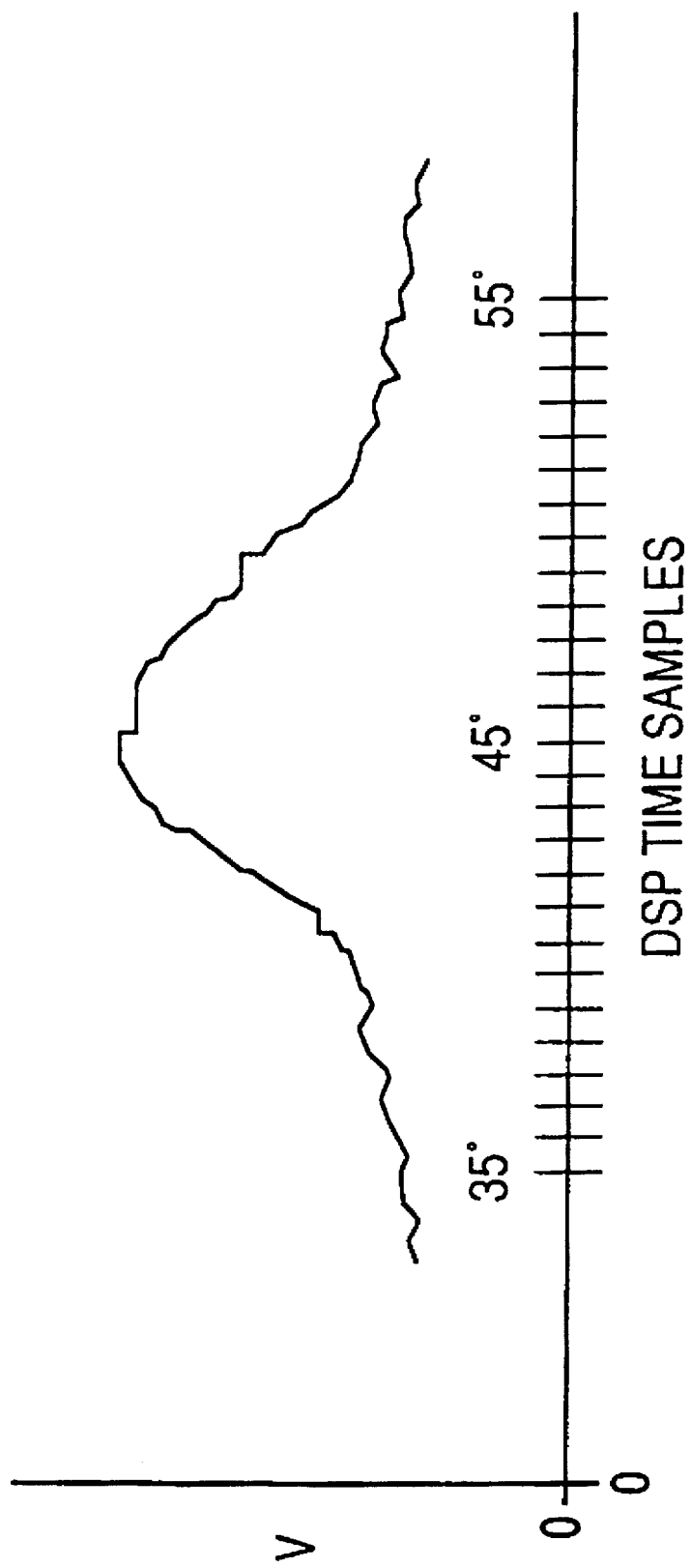

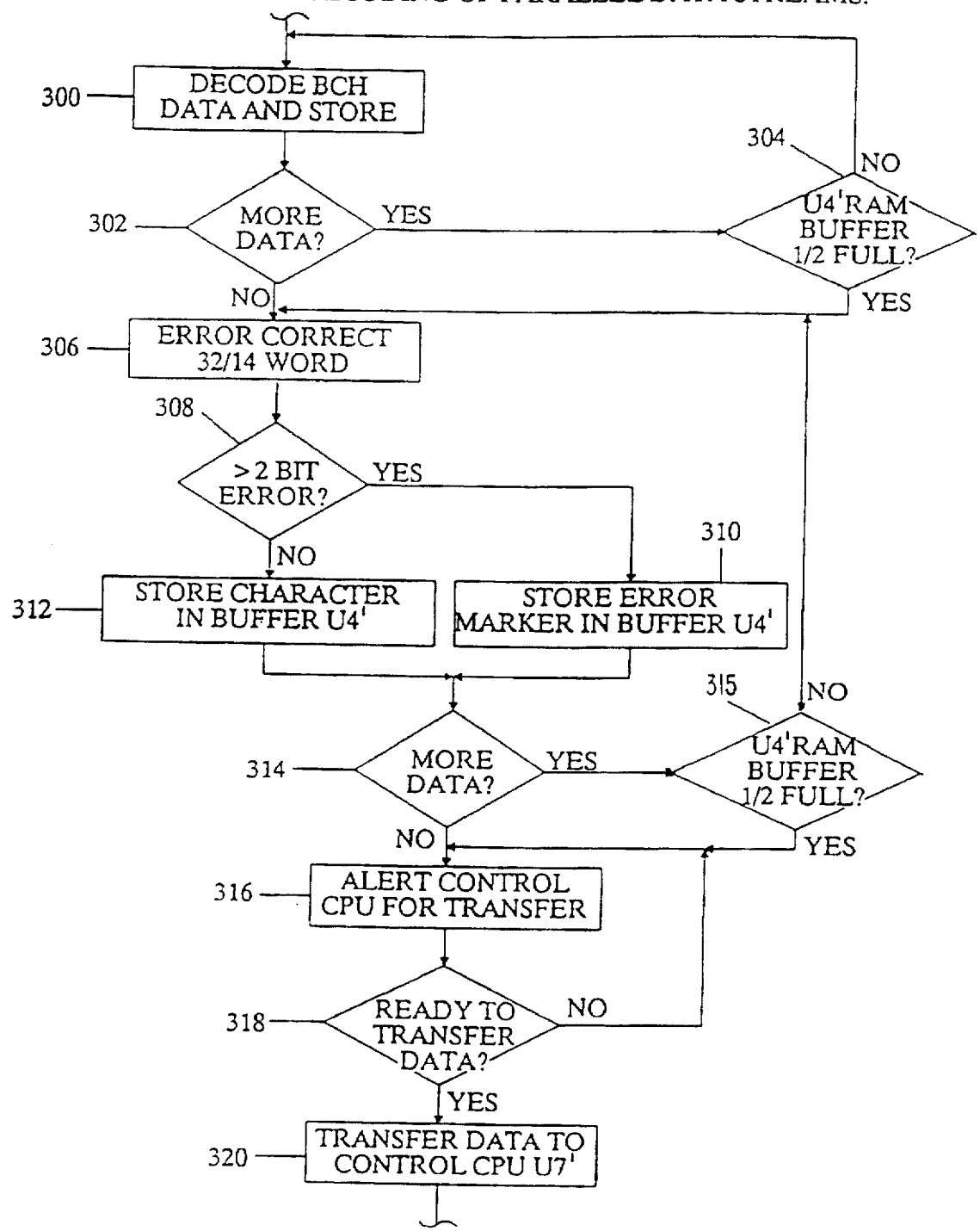

SYSTEM FOR WIRELESS TRANSMISSION AND RECEIVING OF INFORMATION THROUGH A COMPUTER BUS INTERFACE AND METHOD OF OPERATION

CROSS-REFERENCE TO RELATED APPLICATIONS

This application is a Continuation-In-Part of U.S. patent application Ser. No. 08/386,060, filed Feb. 7, 1995, entitled "System for Wireless Serial Transmission of Encoded Information", U.S. patent application Ser. No. 08/385,312, filed Feb. 7, 1995, entitled "Receiving Circuitry for Receiving Serially Transmitted Encoded Information", and U.S. patent application Ser. No. 08/385,143, filed Feb. 7, 1995, entitled "Transmitting Circuitry for Serial Transmission of Encoded Information" all filed on Feb. 7, 1995, which applications are Continuations-in-Part of U.S. application Ser. No. 08/112,256 now U.S. Pat. No. 5,446,759, filed Aug. 26, 1993, entitled "Information Transmission System and Method of Operation"; which is a Continuation-In-Part of U.S. application Ser. No. 07/850,275, filed Mar. 12, 1992, entitled "Low Power Information Transmission System Having High Information Transmission and Low Error Rates and Method of Operation" (now abandoned); Ser. No. 07/850,276, filed Mar. 12, 1992, entitled "High Speed, Low Power and Low Error Information Receiver and Method of Operation" (now abandoned); and Ser. No. 07/850,487, filed Mar. 12, 1992, entitled "Low Power Information Transmission and Receiving System Having High Information and Low Error Rates and Method of Operation" (now abandoned), which applications are incorporated herein by reference in their entirety.

TECHNICAL FIELD

The present invention relates to a method of one and two-way wireless information transmission having a high rate of information transmission, a low error rate of transmission and transmission with low radiated power, transmitting circuitry for encoding and transmitting the information, receiving circuitry for receiving and decoding the information, a receiver and transceiver using the receiving circuitry, a transceiver using the transmitting circuitry, and a system including the transmitting and receiving circuitry.

BACKGROUND ART

A. One-Way Wireless Transmission

There is a movement in the wireless industry towards providing more than simple numeric telephone number messages. These alphanumeric messages are typically originated from personal and office computers and sent to the wireless transmitting system via a telephone network. These messages are received by the messaging system controller (paging terminal) and processed for transmission via a radio transmitting system.

E-mail services have gained tremendous popularity and it is predicted that the current more than 17 million electronic mail (E-mail) subscribers will grow to 53 million by 1995. The average E-mail message is approximately 450 characters in length and 5 to 8 messages are sent each working day.

Personal computers have become far more compact in size permitting them to "move" with the person verses remaining in a fixed location. It is predicted that within the next few years, the majority of the personal computers will be less than 8 pounds in weight making them extremely convenient as a "portable office". This will make wireless communications a media of choice to accommodate portable office computers to receive information services and E-mail messages.

This places an extreme burden on the existing radio infrastructure that is allocated for messaging services. Currently, most metro area paging systems operating in the 150 and 450 MHz. radio bands are operating at or near full capacity accommodating current numeric paging subscribers. There is not adequate reserve air time available to accommodate alphanumeric information and E-mail services.

Nine hundred MHz. authorizations are currently available for local and regional paging implementation. However, at the current protocol speeds and the projected growth rates, the national channels will undoubtedly reach saturation within the next few years. Currently, one or more of the 900 MHz. nationwide paging channels are close to such a saturation. There is a pressing need to increase the air time efficiency of these radio paging systems.

Furthermore, U.S. Pat. Nos. 4,849,750, 4,851,830, 4,853,688, 4,857,915, 4,866,431, 4,868,562, 4,868,558, 4,868,860, 4,870,410, 4,875,039, 4,876,538, 4,878,051, 4,881,073, 4,928,100, 4,935,732, 4,978,944, 5,012,235, 5,039,984, 5,047,764, 5,045,850, 5,052,049, 5,077,834 and 5,121,115 disclose a frequency agile information transmission network and frequency agile data receivers. The above-referenced patents are incorporated herein by reference in their entirety.

U.S. patent application Ser. No. 07/702,939, now U.S. Pat. No. 5,436,960, filed May 20, 1991, entitled "Electronic Mail System with RF Communications to Mobile Processors"; U.S. Ser. No. 702,319, filed May 20, 1991, entitled "Electronic Mail System With RF Communications to Mobile Processors Originating From Outside of the Electronic Mail System" (now abandoned), U.S. Ser. No. 08/247,466, now U.S. Pat. No. 5,438,611 filed May 23, 1994, entitled "Electronic Mail System With RF Communications to Mobile Processors Originating From Outside of the Electronic Mail System and Method of Operation Thereof"; and U.S. Ser. No. 702,938, now U.S. Pat. No. 5,479,472 filed May 20, 1991, entitled "System for Interconnecting Electronic Mail Systems by RF Communications," disclose a system for linking an electronic mail system to portable computers using one-way wireless transmissions which may use the network and receivers disclosed in the aforementioned patents. These applications are incorporated herein by reference in their entirety.

Collectively, the above improvements utilizing the existing 150 and 450 MHz. radio messaging infrastructure will produce a significant reduction in the message delivery cost to the wireless subscriber. The cost to deliver a 450 character message with the system described in the above-referenced patents has been projected to be approximately 65¢ versus $1.50 for a 50 character message the industry is currently offering subscribers. This significant cost reduction would further enhance the growth rate of the wireless information and E-mail service industry.

Furthermore, recently reallocated narrow band spectrum in the 220 MHz. radio messaging infrastructure is applicable to local and national data transmission for applications such as electronic mail. However, the narrow bandwidth of the channels in the 220 MHz. radio infrastructure does not support high data throughputs with prior art data protocols.

Adequate reserve radio spectrum is available in the 150 and 450 MHz. radio bands in the form of IMTS mobile channels that have been authorized for one- and two-way information transmission to transmit data and E-mail. However, a more reliable one-way messaging protocol is needed to accommodate the need for information and E-mail services. An additional requirement for a more air time efficient (faster) message protocol exists.

The POCSAG protocol was originally authored by the British Post office code Standardization Advisory Group. It was primarily developed for "tone only" or "semi-synchronous paging format". Unlike a synchronous paging format that must be transmitted continually to maintain synchronization of all the paging receivers, the POCSAG protocol is somewhat asynchronous in the respect that it only needs to send a radio signal when messages are about to be delivered. However, a POCSAG protocol transmission is extremely sensitive to atmospheric fades which are discussed below. If a three bit error exists in a transmission of information to a POCSAG protocol receiver, the BCH error correction code of the frames may be ineffective to prevent the transmission synchronism between the transmitter and receiver clock from being lost which results in a failure to complete the transmission of the information to the receiver and the receiver reverting into a scanning mode to attempt to lock onto a new transmission containing its identification code. A three bit error is produced by a fade in reception level below the detection level of the receiver for a time interval such as 2 to 4 milliseconds for 1200 and 512 baud data rates respectively.

To gain insight as to the POCSAG protocol, reference is made to FIG. 1 for the following explanation. A POCSAG protocol frame set consists of a PREAMBLE, a SYNC signal, and eight frames that are subdivided into two code words each. POCSAG protocol pagers are synchronous in the respect that once they detect the PREAMBLE and synchronize on the SYNC code word, they only then search for a message in their respective frame. If capcode ID numbers are consecutively assigned, the page is automatically assigned to a respective frame. Taking the binary equivalent of the last three digits of the ID of the pager, it is possible to determine in which one of the eight frames a respective pager would be located.

The POCSAG protocol pager is continually sampling the radio channel to look for its PREAMBLE. The PREAMBLE is typically 1.125 to 3 seconds in duration, and consists of an alternating string of ones and zeros sent digitally. When the pager samples the radio channel and determines the PREAMBLE string, it remains on and searches for the SYNC signal. The SYNC signal is actually a 62.5 millisecond code word that transmits a fictitious address to which the pagers respond. It is an unused address, and therefore does not cause falsing (erroneous turn on) of other pagers. Upon receiving the SYNC code word, the pager searches for a message in its respective frame group.

The POCSAG protocol has some inherent inefficiencies in its design. These inefficiencies exist in both 512 and 1200 baud POCSAG protocol pagers and are inherent in the architecture of the POCSAG protocol. In the POCSAG and other digital protocols, the baud rate is also the frequency of the subcarrier (e.g. 512 baud uses a 512 Hz. squarewave subcarrier which is modulated with ones and zeros to encode the parts of a transmission). Referring again to FIG. 1, it should be noted that a frame consists of code word one and code word two. If a POCSAG protocol pager receives a message, the first code word of its frame contains the ID or address information for the pager. It also contains alerting information to indicate to the pager what types of beeps are being issued. Code word two contains the numeric or alphanumeric information. When the pager is in numeric mode, the code word can contain five numeric digits.

However, it should be noted that very few numeric pages are five digits in duration. In fact, in a typical paging system, 98% of the numeric messages are seven digits in duration as illustrated in FIG. 2. Because the numeric message is seven digits in duration, the POCSAG protocol permits a borrowing or an extension into the next frame. The first code word in each frame (which would typically be an address), has a marker bit that indicates whether the code word contains address or numeric information. The remaining two digits of the seven digit example then spill over into the first code word of the next frame. Of the twenty bits of data (five numeric digits) in the next frame word, only eight would be used rendering the balance of the code word useless. The POCSAG protocol fills the balance of the code word with "filler code". The second code word of the adjacent frame is also back filled with filler code. The adjacent frame is unavailable for use by any other page. In fact, any message awaiting an adjacent frame two pager, must wait until the next frame group is sent in order to receive the message. The architecture of a POCSAG protocol based system requires that a message to a given pager be sent only in its respective frame.

It is obvious that unless great care is utilized in the distribution of receivers to divide the receivers evenly within the frame groups, and that the customer usage in each frame group is equal, severe system air time inefficiencies are obtained. System air time efficiencies can vary between 30 and 60%. A great deal of the air time inefficiency cannot be fully utilized as it is due to the message length (seven digits) and is caused by the insertion of filler codes. If a per message comparison of paging protocols is made, it does not take into account the inherent system inefficiencies when numerous pages are sent. As mentioned previously, POCSAG protocol efficiencies vary considerably if a great deal of attention is not paid to the proper distribution of ID codes.

To gain some insight as to how the POCSAG protocol tends to reduce the air time efficiency, reference is made to FIG. 3. FIG. 3 shows fifty numeric pages that need to be sent via the paging system. For purposes of this example each page is a seven digit numeric page and the pagers are equally distributed between the eight frame groups.

The first problem is that due to each page being seven digits in duration, only an average of 3.5 pages can be sent per frame group. It should also be noted that a seven digit numeric page destined for the eighth frame group necessitates that a SYNC signal be sent. The message then spills over to the first frame of the next frame set. An "overhead" problem that also becomes obvious is that the receivers must be resynchronized after the transmission of the first eight frames. This resynchronization adds to the length of each message sent within the eight frame group. SYNC is 62.5 MS divided by 3½ pages to apportion overhead. One hundred sixty seven milliseconds of the 267 MS period produces a 62.5% efficiency. Due to the spilling over of messages into their adjacent frames, it is seen that a second problem is precipitated. Assuming that each of the pages arrive in frame group order (e.g. 1234567, 1234567), it is seen that even if the paging terminal can sort to get the maximum 3.5 message per frame group efficiency, that a number of pages destined for the first frame tend to build or stack up. To eliminate this problem, fewer pagers may be issued in the eighth frame group (which spill over into the first frame group). However, the problem is not solved by doing so, and simply a build up of other pages in other frame groups occurs.

The 512 baud POCSAG protocol transmits 2.857 alphanumeric characters per 62.5 MS code word. If an alphanumeric message is transmitted in the first frame, a maximum of forty two characters can be sent before a 62.5 SYNC signal is required.

| Transmitted Frame | Maximum Characters Before Sync |
|---|---|
| 1 | 42.8 |
| 2 | 37.14 |
| 3 | 31.43 |
| 4 | 25.71 |
| 5 | 19.99 |
| 6 | 14.89 |
| 7 | 8.57 |
| 8 | 2.85 |

As the national average length of an alphanumeric message is forty five characters, it is reasonable to add the SYNC overhead to the character time. The average E-mail message is considered to be from 150 to 450 characters, which increases the air-time requirements and increases the probability for a reception error.

| Each character would be: | |
|---|---|
| 21.98 m.s. | Per character |
| 2.73 m.s. | Frame OVHD per character |
| 24.71 m.s. | |

Current digital protocols (POCSAG and Golay) are difficult to speed up due to their respective architectures. Attempts to increase POCSAG protocol speed from 512 to 1200 or 2400 baud (subcarrier frequency) have encountered the following problems.

The 1200 and 2400 baud data transmission rates have shortened the data bit time to approximately 800 and 400 microseconds respectively. This short time per bit produces a marked degradation in message receipt reliability for lengthy alphanumeric messages.

POCSAG protocol receivers have a BCH error correction scheme that can tolerate only one or two bits per frame to be erroneous before the transmitted character is unrecoverable. Man-made noise and Rayleigh fading phenomenon are very prevalent for such short bit times. The net result is that the cumulative effect of the error correction scheme that the current digital protocols utilize in combination with the effects of natural and man-made interferences degrade the message receiver's reliability when attempts are made to accommodate information and E-mail services. A three or more bit error represents a fade below the threshold detection level of the receiver which can cause the receiver clock to loose synchronism with the transmitted information, turn off and search for another transmission of its address. A three bit error represents a true message error which results in the loss of at least some data.

Speed per message is actually a relatively poor method to choose which format (type) of pager to utilize on a system. There are subtle differences in the various alpha signaling schemes that have far more impact on the reliability of the paging system and its ability to deliver message information to pagers. Differences in air time efficiencies and the techniques employed to correct erroneously received data by the pager are very important considerations that should be made.

The POCSAG and Golay protocols have digital formats requiring digital transmitters.

The 512 baud POCSAG protocol utilizes thirty one bit words, utilizing eleven of the bits for error correction. A three bit error in the address, as stated above, causes the message to be missed. This equates to a four millisecond fade or noise burst during the address and a two millisecond fade error during the message. Twelve hundred baud POCSAG protocol pagers have the same error correction format and air time inefficiencies. The fade resistance is reduced to a two millisecond fade during the address and one millisecond during the message. Although the number of pagers on a given channel is doubled, the degradation of message reliability due to the reduced fade resistance becomes noticeable with numeric paging, and markedly poor when long alphanumeric messages are sent.

The Golay protocol utilizes twenty three bit words, utilizing eleven of the bits for error correction. The Golay protocol transmits the ID code at 300 baud to increase the decoding reliability. The message is transmitted at 600 baud. The Golay protocol has an increased reliability for detecting the ID portion of the page due to the slower data rate. However, the overall signalling when the format is analyzed is noticeably slower than 512 baud POCSAG protocol, making it a poor choice to attempt to accommodate alphanumeric information and E-mail services on a radio channel that is currently accommodating tens of thousands of numeric pagers.

In the late 1980's A European consortium of countries formed a committee to develop a Pan-European wide paging network that would meet the requirements for the European traveling paging marketplace. Representatives from each country participated in a committee-like fashion to develop a new paging protocol that would allow the equivalent of an international paging network with common frequencies and a common protocol, permitting all countries to effectively offer Pan-European paging services. The European Radio Message Service (ERMES) committee was formed and developed both a new multi-level FSK paging format and all of the corresponding network architecture to relay messages to the transmitting infrastructure in Europe.

A multi-level FSK modulation technique is used with the ERMES protocol that modulates the transmitter at 3200 baud with each baud or FSK level representing two bits of binary information. The effective data rate of the ERMES protocol is therefore 6400 bits per second. The multiple baud level FSK modulation technique suffers from a reduced signal to noise ratio of six dB consequent from the lower level of the two level modulation being closer to the noise level of discrimination of the receiver. Loss of signal level for a substantial time below the noise level results in loss of synchronism which terminates reception of the remainder of the message resulting in a catastrophic message reception failure.

With a number of years of experience in utilizing the POCSAG protocol, the ERMES committee corrected some of the inherent deficiencies of the POCSAG protocol. By the same token, many parts of the architecture of the POCSAG protocol were utilized in the adoption of the ERMES protocol.

Somewhat later than the development of the ERMES protocol, a movement occurred in the United States to develop a more reliable radio messaging protocol. Although there are some manufacturers that have attempted to give proprietary names to this American protocol, it has typically been called the modified ERMES protocol. This is in part due to the fact that a large percentage of this modified ERMES protocol derived its architecture from the ERMES standards. Unlike the ERMES protocol, which is exclusively synchronous and transmits only at 3200 baud, the modified ERMES protocol has been proposed in three distinct phases.

This is in part due to the fact that the American marketplace did not have a new band of frequencies allocated exclusively for national paging use. The modified ERMES protocol has to have the flexibility in its design to permit co-residing on currently operating radio messaging channels that contain POCSAG and Golay protocol pagers.

Phase one of the modified American ERMES protocol will utilize a 1600 baud FSK architecture that permits it to be compatible on existing digital base stations with other digital paging formats. Phase two, although not currently well defined, will transmit at 3200 baud with a 3200 bit per second rate utilizing multiple level FSK transmission. Phase three will utilize 3200 baud multi-level FSK modulation with each FSK level representing two bits of information for a 6400 bits per second transmission rate.

The 1600 baud modified ERMES protocol has been designed as a time-slotted, fully synchronous protocol. It derives much of its architecture from three previous signaling technologies. Message interleaving to increase fade resistance and the basic structure of the error correction and data blocks are derived directly from the European ERMES protocol. The time synchronization techniques are similar to previous RDS and MBS synchronous subcarrier systems that were developed in Europe for subcarrier messaging. The basic BCH error correction code and messaging architecture have been derived from the POCSAG protocol.

The 1600 baud modified ERMES protocol consists of 128 frames of information that are sent over a period of four minutes. A frame is composed of 150 MS of synchronization preamble and eleven blocks containing information each being 160 MS in duration.

The 150 MS of synchronization preamble contains three basic components called sync one, frame information, and sync two. The sync one portion permits the receiver to synchronize upon waking up during its respective frame. Frame information is then transmitted that can alert the receiver as to the proposed data rate that would be transmitted during the balance of the frame.

Sync two then permits the receiver to transition to the new baud rate if indeed the baud rate is different than 1600 baud.

The eleven blocks of information that follow the synchronization are typically divided into three categories. Blocks zero and one are typically utilized for addressing of the receivers contained within that frame. Approximately eight addresses can be contained per block permitting as many as sixteen receivers to be addressed in a single frame. Block two typically contains message vectors. A message vector points the receiver that was addressed in block zero or one to a following block to locate its messages. Blocks three thru ten will then contain messaging information for the receivers addressed in blocks zero and one.

Like in the POCSAG protocol that has been previously described, a BCH error correction code is utilized with the modified ERMES protocol with thirty-two bits per frame with eleven bits of error correction code to permit the receivers to correct bit errors up to a two bit error. Furthermore, the messages are interleaved so that all of the bits for a particular numeric or alphanumeric character are not transmitted sequentially. The low order bits of each character are transmitted first, followed by ascending order binary bits until the entire message has been sent. This increases the fade resistance of the 1600 baud protocol to approximately ten MS. Each block contains eight thirty-two bit words that then permit each word to contain five numeric digits or 2.85 seven bit alphanumeric characters. This portion of the 1600 baud protocol is identical to that of the POCSAG protocol and its architecture. Each block is therefore capable of containing as many as forty numeric digits of 22.8 seven bit alphanumeric characters.

Like the POCSAG protocol, certain restrictions apply to the 1600 baud modified ERMES protocol. Any portions of a block that are unused by message information must be filled with filler code. This introduces the same type of inefficiencies that are present in the POCSAG protocol.

As the eight words within a block have to contain five numeric digits and the bulk of numeric messaging requires seven digits, a significant percentage of filler code must be utilized to fill in the remainder of the unused words within a block.

A second inefficiency exists in the inherent architecture of the 1600 baud modified ERMES protocol that also exists in the POCSAG protocol. Pagers are selectively assigned to "time slots" and can only receive messages during their respective time slot, therefore great care in the even distribution of time slots (pager ID's) must be exercised. Like the POCSAG protocol, the 1600 baud modified ERMES protocol relies on the randomness of paging events to prevent excessive time delays being caused by multiple messages to pagers within the same time slot occurring at the same time. However, the 1600 baud modified ERMES protocol has a further encumbrance that its overall cycle time can be as long as four minutes. If the receiver's frame is unavailable due to high message traffic, it could wait as long as four, eight, or twelve minutes to receive its message.

This differs considerably from the POCSAG protocol in terms of time latency as the POCSAG protocol goes through a complete cycle in slightly over 1 second. If a POCSAG protocol frame for a respective pager is filled with other messages, the next frame will be available for transmission in one second.

To overcome this problem, the 1600 baud modified ERMES protocol has proposed utilization of less than the full one hundred twenty eight frames. However, this tends to have two factors that are detrimental to the paging subscriber. The first is a respective shortening of battery lifespan, and the second is a crowding of receivers into their respective frames. This crowding and clustering of receivers into smaller numbers of frames will tend to extend the waiting period by multiples of time that are dependent upon how quickly the frames cycle.

It has been proposed that in order to allow the 1600 baud modified ERMES protocol to be intermixed with current POCSAG protocol traffic, the frame duration should be shortened to one cluster of frames per minute. This basically introduces a sixty second time delay that, when averaged, would equal at least a thirty second message latency. However, during peak busy hour periods, this latency would be in multiples of not thirty seconds average, but thirty seconds for the first delay plus sixty seconds for each delay cycle thereafter. Simply explained this means that if a pager were to have to wait until the next frame, there would be an average delay of thirty seconds plus sixty seconds, or ninety seconds total. If the delay were to be two frames, it would be thirty seconds average plus sixty seconds average plus sixty seconds or two and one-half minutes.

Like the POCSAG protocol, the air-time latencies degrade the modified ERMES protocol considerably when addressing alphanumeric messaging. The national average for an alphanumeric message is forty characters. The 1600 baud modified ERMES protocol (like POCSAG) can borrow blocks of information to permit the forty character message to be delivered to a receiver. As each block has a maximum capacity of 22.8 characters, two blocks will be needed to transmit the alphanumeric message. If messages of longer duration are desired, the maximum character length for a single frame would be approximately one hundred eighty characters.

Like the POCSAG protocol, the 1600 baud modified ERMES protocol utilizes only seven bit characters. In order to address eight bit characters (as commonly used by computers), it is necessary to send commands that permit the receiver or external device connected to a receiver to permit the equivalent of straight binary information to be transmitted. This places a great deal of overhead on the external devices to receive this binary information and process it into true eight bit characters after decoding the interleaving and BCH error correction codes.

In terms of protocol efficiency, it appears that the 1600 baud modified ERMES protocol has slightly more overhead than the POCSAG protocol. Although the address information is similar to the POCSAG protocol, additional information containing message vectors must also be transmitted to the 1600 baud receiver. As the block architecture and the BCH error correction code are identical, this would tend to lower the effective data throughput rate of the 1600 baud modified ERMES protocol.

A potential for interference exists when POCSAG and modified ERMES protocol pagers are interleaved on a channel. The POCSAG protocol typically transmits at 512 baud. The time per baud is 1953 microseconds. The 1600 baud modified ERMES protocol has a time duration of 625 microseconds per baud. Three bauds would equal 1875 microseconds. A comparison of the 1875 microsecond baud duration and the POCSAG protocol 1953 microsecond duration, yields less than a 5% time differential.

POCSAG protocol pagers, in order to quickly synchronize to the preamble, have a relatively wide synchronization bandwidth. For example, a 512 baud POCSAG protocol pager is capable of synchronizing to any data rate between 400 and 600 baud. This wide bandwidth is necessary to allow the POCSAG protocol pager to synchronize in a minimal amount of time to the POCSAG preamble. Although somewhat of a misnomer, the preamble is actually the portion of the POCSAG protocol signal that time synchronizes the receiver. The sync word that follows the preamble only serves to tell the pagers the correct bit timing order. The sync word is actually an unused ID or capcode that the POCSAG protocol pager searches for to obtain a match. Once a match is found, the POCSAG protocol pager can then establish the bit order or significance and can then begin proper decoding of the binary information that follows. It also uses the sync word to begin counting to permit it to decode a message in its corresponding frame.

As a POCSAG protocol pager detects the 1600 baud data rate transitions, it attempts to search for the synchronization or the sync code word. During the presence of 1600 baud information, the POCSAG protocol pager remains on for as long as several seconds after the completion of 1600 baud data transmission. As will be described later, this causes a severe degradation in the POCSAG protocol receiver's battery life when attempts at intermixing 512 and 1200 baud POCSAG protocol receivers with the 1600 baud modified ERMES protocol are made.

The 1600 baud data transmission of the modified ERMES protocol apparently has another adverse effect on the POCSAG protocol receiver. As a consequence of POCSAG protocol receivers relying on the preamble to determine their bit timing synchronization and having to maintain such synchronization for at least one second, another detrimental effect in the intermixing of the 1600 baud modified ERMES protocol with the POCSAG protocol is experienced. Once POCSAG protocol receivers synchronize to the 1600 bit per second data rate, they are not capable of re-syncing to the true POCSAG data rate if a POCSAG message immediately follows a 1600 baud message. To overcome this problem, one manufacturer has recommended that a POCSAG protocol warm-up be transmitted after a 1600 baud modified ERMES protocol message has terminated. This "POCSAG protocol warm-up" consists of 400 MS of 750 baud data of zeros and ones to be transmitted prior to the transmission of a 512 baud POCSAG protocol message. Although it has been termed a POCSAG protocol warm-up, it is quite to the contrary. Sending 750 baud to a POCSAG protocol pager will not cause the POCSAG protocol receiver to wake-up and attempt to synchronize. However, if the POCSAG protocol pager were on and synchronized to the 1600 baud modified ERMES protocol, the transmission of the POCSAG protocol warm-up will immediately cause the POCSAG protocol pager to return to the sample mode. Therefore, it appears that this 750 baud POCSAG protocol warm-up is instead a de-sync signal.

A common misconception in the wireless industry concerns the term "baud rate". It is easy to conceive that a higher baud rate directly controls the number of pagers per channel. This is in part due to the fact that baud rate as pertaining to computers is thought in "wireless" terms when a calculation as to the character speed is determined. Typically, a computer sends eight to eleven bits of information per character, and one simply divides that number into the baud rate to determine how fast information is transmitted. The fact is the baud rate is only a portion of the analysis. Unlike wireline computers that are connected with telephone lines, radio transmission requires additional "overhead" to be added to the signaling protocol due to its "one way" nature. Radio paging or one-way information transmission does not have the wire-line or two-way wireless privilege of requesting a second transmitted message if an error is received. Radio paging is a "one time" transmission that is "one way". Manufacturers of radio paging equipment therefore must encode additional information to permit the pager to correct errors caused by radio transmission problems. Instead of eight to eleven "bits" representing a character, as many as thirty bits may be required. This correction overhead is called "error correction code", and in some methods reduces the data transmission rate to the pager by as much as 75%. If half of the 1200 baud data rate is utilized for error correction, the effective data rate is 600 baud. The speed or "baud" rate is further reduced by "overhead" SYNC and "wake-up" preambles that must be sent to prepare the paging receiver prior to the transmission of an actual message.

Error correction code embedded in a frame of data bits is used to serially process the bits of the frame to correct minor bit errors such as one or two bits which occur anywhere in the frame. The serial processing of the bits of a frame which contain data and error correction code is typically implemented with a series of EXCLUSIVE OR gates. When a number of bit errors in a frame exceeds the error correction capacity of the error correction code, the data within the frame is erroneous. The prior art methods of wireless data transmission do not permit the recovery of valid data bits from a frame containing a number of bit errors which exceed the bit error correction capacity of the error correction code which for most types of data transmission protocols is two bits.

The operating environment has by far the greatest impact on the reliability of the paging system. Geographical terrain, the operating frequency, the presence of man-made structures, and natural and man-made noise all have a collective impact on the operating efficiency of the current state of art in paging systems. If the radio signal cannot reach the paging receiver, the sensitivity of the receiver or the error correction code in the protocol has little purpose. The first requirement of a paging system is to therefore provide a good radio paging signal at all the areas of the paging system's service area.

Geographical terrain of the paging service area determines the number of transmitter sites and the antenna patterns required to provide the necessary "Carey" coverage or service area. The less the variation in terrain, the more evenly distributed the RF field is, and the easier it is to obtain reliable service area coverage. Man-made objects (such as buildings) and geographic variations (hills) tend to cause shadows by blocking the "line of sight" paging signal. In a metropolitan radio environment, the receiver is subjected to a very hostile environment. The paging receiver is subject to multi-path interference, impulse noise, simulcast beats, and in many systems with multiple transmitters, non-synchronization of the transmitters. These phenomena are further compounded by building shadow effects and building penetration attenuation of the signal. All of the mentioned phenomena serve to reduce the reliability of the receiver. Higher power transmitters and multiple transmitters can alleviate a portion of the aforementioned problems, and increase other problems (e.g. multi-path, simulcast beats, and non-synchronized transmitters). It is not a simple problem to resolve, as numerous other problems exist which complicate the reliability of radio messaging services in a given area.

Previously, analog pagers utilized forms of active filters to decode the addressing tones. The active filters in the pagers were very sensitive to any form of phase or any other form of distortion that modified the sinusoidal signaling wave forms. Analog pagers required a "perfect" sine wave to properly decode and alert the user. Hence the reason for precise phasing of transmitters and synchronized transmitters (simulcast) systems were necessary to accommodate the active filter decoders in the pagers. Even with synchronization and, proper phasing of the station, the pager often decoded unreliably when located at the midpoint between two transmitters.

The move to digital encoding methods resulted from these former analog problems. In the early 1980's, digital transmitting and paging products were introduced by manufacturers that did not experience the problems associated with analog pagers. It was thought of as the only method to reliably send numeric data to a paging receiver. Considering that in 1980 analog technology was limited to 300 baud and yet digital technologies could transmit 600 to 1200 baud data, this was correct. It was not an inexpensive move, as literally every piece of equipment in the carrier's system required replacement. Paging terminals, base stations, and modems had to be purchased to replace the existing analog equipment. Digital paging also required that additional base stations be added to provide the increased signal strength necessary for reliable data stream reception by the pager. The deficiencies found in the analog technologies were eliminated by the move. Digital pagers do not share the problematic phase errors found in their analog counterparts. Research for new developments in analog technologies was abandoned by the pager manufacturers for several reasons. By emphasizing sales of digital systems, communication equipment manufacturers could increase sales of replacement base stations and paging terminals dramatically.

In this decade, advances in analog decoding technology have increased dramatically. Data transmission rates of 19,000 baud on ordinary telephone lines are common (as compared to 300 baud in 1980). Microprocessor assisted digital signal processors are available on a single chip with decoding sensitivities unheard of in 1980.

Even with the increased transmitter maintenance, the cumulative effects of mis-synchronization of the radio transmitters, Rayleigh fading, and man-made noise reduce the reliability of the current digital receivers noticeably. The overall fade tolerance at 2400 baud is less than one millisecond. A gap in the data transmission in excess of one millisecond causes the message receiver to terminate the receiving process.

There is a need in the art for a messaging protocol to be compatible on both analog and digital radio transmitting systems. The above-referenced patents disclose a protocol which is compatible with analog and digital transmitters. The protocol disclosed in these patents is approximately 99% reliable for the transmission of a 450 character message but is slower than the POCSAG protocol by a factor of approximately four. The protocol disclosed in the above-referenced patents like the POCSAG and GOLAY protocols transmits serial data frames with embedded error correction code. This protocol is immune to a fade duration of up to 100 milliseconds. The radiated power required to broadcast this protocol is approximately equal to that required for the POCSAG or Golay protocols.

The majority of the messaging radio transmitting systems (220 MHz. has less) have radio channels allocated that utilize 5 KHz. transmitter deviation limits and transmitted audio bandwidths that are limited to 300 to 3000 Hz. The digital transmitters currently in service have modems that may limit the data rate to 1200 baud (1200 Hz. subcarrier). Compatibility with the current transmitter infrastructure with any new protocol is imperative to provide universal compatibility. The 1200 baud limitation is typically a constraint by the current design of the integrated modems which the digital base stations utilize. The bandwidth of current radio transmitters can accept faster data rates if the bandwidth of the digital modems is increased.

As is apparent from the description of the POCSAG protocol above, these are fundamental problems of increasing its data throughput. The problems are caused by the propensity of atmospheric serial information transmission to semi-synchronous receivers to be subject to unpredictable interruptions caused by atmospheric fades which degrade the atmospheric transmission below the noise threshold of the receiver. As has been pointed out above, a three bit error may cause a total loss of synchronism between an information transmission and a POCSAG protocol receiver from which the receiver cannot recover with the remainder of the transmission after the fade being lost with the receiver going into a search mode to look for another transmission of an address of the receiver.

When the probability of a loss of synchronism becomes high, the use of a transmission medium goes down. The POCSAG protocol has a reliability of around 95% for a seven character message which means that a 5% chance exists of losing one or more digits of the transmission. A higher reliability is needed for data transmissions between computers to make one-way atmospheric data transmission a widespread methodology.

An analysis of atmospheric transmission using the prior art protocols in accordance with accepted mathematical relationships for evaluating atmospheric radio frequency transmissions follows which reveals that they are poorly suited to data transmissions of more than a few characters in length.

Fading Rate $$F_o = SF/670 \quad (1)$$

S=Speed MPH
F=Frequency in MHz.
$F_o$=Hz

Fade Length $$t = \tfrac{1}{2}\pi F_o(e^{+0.693 r^2} - 1) \quad (2)$$

r=ST/SM Threshold/Median
The threshold ST is the receiver threshold detection level and the median SM is the median field strength level.

Fade Below Threshold $$F_R = 2re^{-0.693 r^2} F_o \quad (3)$$

Probability of Message Loss $$P(\text{error}) = 1 - e^{-F_R L P_w} \quad (4)$$

L=Message Time (Length)
$P_w$=Probability of fade larger than catastrophic failure length $$P_w = 1.5e^{-1.1 t/\bar{t}}$$

The quantity $\bar{t}$ is the net probability of a fade divided by the mean rate of fading and equals $$\tfrac{1}{2}\pi F_o(e^{+0.693 r^2} - 1) \quad (5)$$

The fading rate $F_o$ is the natural frequency at which atmospheric radio frequency transmissions periodically fade as a function of the channel frequency $F_o$ and the speed of the receiver or transceiver if the system is a one-way or two-way wireless system in miles per hour; the fade length t in seconds is the length of fade; the fade below threshold $F_R$ is the time duration in seconds that a transmission drops below the detection capability of the receiving circuitry; and the probability of message loss $P_{(error)}$ is the probability that a message transmission will not be completed as a result of a lost of synchronism between the data transmission and the receiver. See S. O. Rice; Statistical Properties of a Sine Wave Plus Random Noise; Bell System Technical Journal, January, 1948; T. A. Freeburg; An Accurate Simulation of Multipath Fading; Paper;1980; Caples, Massad, Minor; UHF Channel Simulator for Digital Mobile Radio; IEEE VT-29; May 1980; and P. Mabey, D. Ball; Application of CCIR Radio Paging Code No. 1; 35th IEEE V.T. Conf.; May 1985 for a discussion of the above-referenced equations.

FIGS. 4A–4J illustrate an analysis of the POCSAG protocol at baud rates of 512, 1200 and 2400 which are the currently used or prospectively to be used baud rates for frequencies of 150, 450, 900, 1200 and 2200 MHz. as a function of the velocity of the receiver in miles per hour. Specifically, FIG. 4A is for a numeric 7 digit POCSAG message with an 8 microvolt (18 db) detection sensitivity with a 90 microvolt/meter (39 db) median electric field strength; FIG. 4B is for a numeric 7 digit POCSAG message with an 8 microvolt (18 db) detection sensitivity with a 130 microvolt/meter (43 db) median electric field strength; FIG. 4C is for a 50 character POCSAG message with an 8 microvolt (18 db) detection sensitivity with a 90 microvolt/meter (39 db) median electric field strength; FIG. 4D is for a 50 character POCSAG message with an 8 microvolt (18 db) detection sensitivity with a 130 microvolt/meter (43 db) median electric field strength; FIG. 4E is for a 80 character POCSAG message with an 50 microvolt (18 db) detection sensitivity with a 90 microvolt/meter (39 db) median electric field strength; FIG. 4F is for a 80 character POCSAG message with an 8 microvolt (18 db) detection sensitivity with a 130 microvolt/meter (43 db) median electric field strength; FIG. 4G is for a 200 character POCSAG message with an 8 microvolt (18 db) detection sensitivity with a 90 microvolt/meter (39 db) median electric field strength; FIG. 4H is for a 200 character POCSAG message with an 8 microvolt (18 db) detection sensitivity with a 90 microvolt/meter (43 db) median electric field strength; FIG. 4I is for a 450 character POCSAG message with an 8 microvolt (18 db) detection sensitivity with a 90 microvolt/meter (39 db) median electric field strength; and FIG. 4J is for a 450 character POCSAG message with an 8 microvolt (18 db) detection sensitivity with a 130 microvolt/meter (43 db) median electric field strength. The Probability of Message Loss stands for the probability during an atmospheric message transmission that synchronism between the atmospherically broadcast message and the receiver will be lost during the message transmission causing the receiver (or transceiver if in a two-way wireless system) to revert to a search for the broadcast of the receiver's address marking a new transmission to the receiver. This equates to an error such as a 3-bit error with the BCH error correction code currently in use with POCSAG protocol. As is apparent, the performance of POCSAG seriously degrades as the message length increases. For example, a comparison of FIGS. 4A–4J reveals a significant increase in the probability approaching 100% that the reception of a message will not be completed as the length of a message reaches 450 characters. These error rates of message loss are unacceptably high for transmission to computers for applications such as E-mail. The prior art retransmission of messages at a later time after completion of the original message transmission does not significantly increase the probability of receipt of a message with each subsequent transmission only halving the probability of a successful transmission.

FIG. 5 graphically illustrates data from the table of FIGS. 4A–4J. As is apparent, the error rate approaches 100% as the message length increases. A whole family of similar curves may be plotted from FIGS. 4A–4J which reveal similar relationships of how the length of the message increases the probability of a 3-bit or larger error which correlates to a message failure.

FIG. 6 illustrates a diagram of a prior art encoding mechanism used to encode prior art paging protocols such as POCSAG, GOLAY, 2 Tone and 5/6 Tone, etc. This encoding mechanism has also been used to encode and decode two-way mobile data formats. This encoding mechanism is a Hi-Cap Multiswitch Model DMF-4000 manufactured by ESA Telecom Systems Group, Inc. of 10345 S. Oxford, Chicago Ridge, Ill. 60415. The encoding contains the necessary microelectronics to encode the protocols and forward them to the transmitter. The encoding mechanism utilizes a distributed processing architecture to permit the receipt of messages from the public switch telephone network (PSTN), provides the necessary subscriber verification and validation, encodes the protocols, and gain access to the radio transmitting system. The higher level processor consists of a central processing unit 30, a read only memory 32 that contains the BIOS, a random access memory 34 that stores in buffers both message and system operational information, a hard and soft disk drive 36 that are utilized to store the main operating program and subscriber file information, a printer/billing port 38 for the logging of system activity and service updates, maintenance port modem 40 for diagnostics in the event of a system malfunction, and a resident keyboard and monitor 42 to allow access to the main processing unit for addition of subscribers and system maintenance.

The main processor, which is comprised of items 30–42, contains the system operating program and control mechanisms that communicate to the peripheral modules 46–56 via the PCM matrix switch and data board buffers 44 and bus 58. The PCM matrix switch 44 contains the digital and audio matrix that permits any of the resident modules 46–50 to send audio and digital information between each other and the main CPU. It is also responsible for buffering data from and to the various peripheral modules 46–56 to permit the system to grow in size to accommodate the messaging traffic as needed. Each of the peripheral cards 46–56 contains one or more board resident processors that further process information and relieve processing overhead from the main CPU. It is with this distributed processing architecture which permits the encoding mechanism to be expanded to accommodate several hundred input ports and numerous radio channels. Dotted line bidirectional arrows are used to identify the two-way communication paths. Additionally, the radio station control may be comprised of multiple modules which each are connected to one or more base stations (not illustrated).

In order to gain a complete understanding of how the encoding mechanism of FIG. 6 functions, it is advantageous to understand how a message is processed from receipt by the encoding mechanism from the PSTN and ultimately delivered to the radio transmitting system connected to the encoding mechanism for transmission to the receiver. To send a message to the receiver, a message originator calls via the public switched telephone network PSTN to one of the encoding mechanisms telephone ports. Three telephone port configurations are described here being direct inward dial trunks 46, direct outward dial trunks 48, and/or mixed frequency trunks 50 which can both answer and originate calls. The three basic trunk configurations are necessary to accommodate the various telephone interfacing requirements that are necessary to interface from the PSTN to the encoding mechanism at its particular location. Details of the trunk configurations are known. The modems function to convert digital formatted information to analog for transmission by telephone lines. The protocol encoder 54 permits multiple protocols to be encoded which is common with paging systems which sequentially broadcast in different protocols. The radio station control interfaces the encoding mechanism with a radio transmitter or radio system control. If the protocol encoder 54 is encoding two-way protocols, one or more radio station controls 56 and/or one or more bidirectional lines are connected to the one or more radio station controls.

Upon receipt of the message recipient's telephone or ID number, the message entry process begins. The main CPU 30 looks up in the customer file the necessary message decoders that must be connected to the previously described telephone trunk modules. Referring to FIG. 4, the main CPU 30 may connect any number of modems individually or simultaneously to permit the decoding of medium to high speed serial data decoders. This is accomplished by connections through the PCM matrix switch 44 to one or more modem modules 52 that are connected to the digital data and PCM bus highways 58. In some cases it may not be known which type of entry modem or entry protocol is being used, and in this situation the resident decoders on the respective telephone trunk modules 46–50 are responsible for decoding DTMF entry protocols and higher speed modem protocols are decoded by the modem modules 52.

The encoding mechanism of FIG. 6 is designed to receive numerous numeric and alphanumeric entry formats from the message originator. They include DTMF (Dual Tone Multiple Frequency) overdial for a numeric message that can be directly encoded from a telephone keypad. An alphanumeric DTMF entry process can be entered by a two button press entry scenario that corresponds to the desired alphanumeric character that is displayed on the keypad. Message originators that are utilizing a PC that have a modem can also enter a similar DTMF alphanumeric format by software packages that reside in the PC that direct the PC's modem to send DTMF tones. All of the aforementioned DTMF message entry formats are decoded by resident DTMF decoders on the respective telephone trunk modules.

Higher speed formats utilizing Bell and CCITT formats permit messages to be sent at 300, 600, 1200 and 2400 baud formats. In the event that the higher speed protocols are utilized, a modem module 52 is connected to the respective telephone trunk module via the digital data and PCM data bus 58. The modem module 52 is capable of auto-adjusting to the desired speed and format of the message originators modem.

Upon completion of receipt of the message, the main processor 30 is alerted to permit a message transfer. In the event of a DTMF message, the message has been temporarily stored on the respective telephone trunk module, or in the event of a higher speed data message it is stored and temporarily buffered on the modem module 52. The message is then transferred to the main CPU 30 for further processing via the data bus buffer module 44. The main CPU 30 then looks up in the customer file the format of the receiver and stores the message in the respective batch buffers for that particular encoding format. The encoding mechanism described is capable of encoding numerous signalling formats that include analog 2-tone, 5/6 tone, POCSAG and Golay protocols.

In order to optimize and obtain the maximum air-time efficiency, messages for receivers with like signalling protocols are buffered and batched and are controlled by two entries that are programmable via the systems menu. The two entries are time and volume related. The number of characters that can be transmitted when the system controller gains access to the radio transmitting system are programmable as well as a predetermined period of time and/or both. In the event of very low traffic periods, it is typically the time entry that will precipitate the transmission of the messages that are stored in the main processor's batching buffers. In the event of high activity, it is the volume or number of characters that trigger the main CPU 30 to initiate accessing the radio transmitting system.

B. Two-Way Wireless Transmission

1. PCS, PCM and Mobile Data Services

There is a movement in the wireless industry towards providing sophisticated two-way data services to address the rapidly growing data marketplace. The Federal Communications Commission has begun the auctioning of new frequencies for new data services in frequency bands of 900 MHz. and above. There is also an ongoing re-evaluation of the existing radio service providers to evaluate their currently allocated radio spectrum to determine if they in turn can also address this new data marketplace.

Cellular system operators have evaluated their existing cellular mobile telephone frequencies and have determined with a minimal amount of hardware modification, data services can be directly addressed by their currently allocated and operational cellular channels. These frequencies reside in the eight hundred megahertz radio bands.

SMR system operators are also evaluating the utilization of their currently licensed frequencies. Historically utilized for voice dispatch, they are currently modifying their equipment architectures to accommodate the transmission of data. The SMR carriers are also attempting to adopt common data protocols that will permit the formation of wide area data systems that are compatible from region to region and from state to state.

Dormant IMTS mobile channels are also being evaluated (these exist in both the one hundred fifty and four hundred fifty megahertz radio bands) that also could accommodate mobile data services to address the marketplace.

To summarize, there are numerous frequencies that are available in the one fifty, four fifty, eight hundred and nine hundred megahertz radio bands that are currently allocated for two-way services that could include the transmission of data services based upon serial data protocols. Both one-way and two-way wireless systems use serial data protocols which have the common property that a single subcarrier is modulated to encode a single stream of serial information. A portion of frequencies to be auctioned by the Federal Communications Commission are to be for data services.

2. X.25 Packet Data Systems

X.25 packet data systems have been in existence for years. They were initially used for commercial dedicated network communications that were typically fixed point to fixed point in nature. The X.25 protocol is a CCITT packet protocol that has multiple layers and was originally designed for a wireline environment. It was adapted some years ago for the wireless environment and with some modifications has permitted packets to be sent with greater reliability in the wireless environment. The above-identified patents disclose a modification of the X.25 protocol. The primary difference between a wireless X.25 protocol and a wireline X.25 protocol is the fact that additional error correction as described above must be added to the wireless packets to increase the reliability of transmission. As the packet protocol is serial in nature, as much as fifty percent of the data transmitted pertains to error correction in an attempt to minimize the amount of packet retransmission that could occur when packets were improperly received at the destination. However, even with the added error correction, it became apparent that the fixed transmitting stations and the mobile equipment has to incorporate an added complexity in construction in an attempt to directly address the retransmission phenomenon when packets were improperly received by the destination equipment. This added complexity is in the form of additional processing equipment that has had to be located at fixed stations and also within the mobile equipment. There have been numerous permutations of additional equipment that are needed. It consists generally of added processing hardware which must store the received data message and then provide a degree of testing to insure that all of the information that was sent in the transmission was properly received. As data messages continue to increase in length, the complexity of the processing has increased correspondingly so that only portions of the received message would be retransmitted in the event of errors. The X.25 packets are divided into frames with each frame typically consisting of two hundred fifty-five characters. An error in an X.25 packet requires retransmission of the whole packet which adds substantial inefficiency to the data throughput.

If frame eight of a ten frame message contains an error, the receiving transceiving unit must wait until the entire packet is received. Then the receiving transceiving unit requests from the originating transceiver that frame number eight be retransmitted to the receiving transceiving unit. Retransmission of frame eight follows which leads to substantial overhead lowering the effective data throughput.

Regardless of the exact configuration of the equipment, it can be seen that an added complexity in the receiving/transceiving circuitry is needed to store the message during the evaluation process and to have the ability to request a retransmission of erroneous data. The entire message must be stored and then await for the erroneous data to be replaced in a new packet.

Not only is the complexity of the receiving/transceiving circuitry increased, the originator of the packet message also has a corresponding increase in equipment complexity. The originating transmitting facility associated with a base station has to store the entire message of ten frames of twenty five hundred characters and then hold that message until it receives verification from the receiving/transceiving unit or a request for missing frames of the transmitted information. Assuming that many data messages are constantly being processed and transmitted to many different transceivers, the complexity of the processing equipment at the data message originating end increases dramatically. In terms of air time efficiency, this retransmission of packets serves to reduce the numbers of subscribers that a two-way data mobile system is capable of accommodating.

Some of the wireless carriers have aligned with the European MPT1327 protocol. There are numerous permutations of this protocol each having different identifying numbers. The overall theory of operation remains essentially the same for each. It is a form of fast frequency shift keying (FFSK) that is utilized on narrow band radio channels. The MPT protocol in its most typical application is similar to that of many SMR systems. There is typically a setup channel and a number of working channels. The structure of the MPT protocol is such that it is similar to the one-way POCSAG protocol discussed above (CCIR radio paging code number one). The MPT protocol like the POCSAG protocol, is semi-synchronous in nature with time slots that can be allocated for messages to be sent to specific mobiles. The control channel is responsible for the tracking control of the mobile data units. The MPT protocol has the ability to handle voice as well as data transmissions. When voice or extended data transmissions are required, the mobile is sent to a traffic channel.

As discussed above regarding the X.25 protocol, the same complexities for both the receiving and transmitting transceiver are required for the MPT protocol to insure the reliable transmission of information when erroneous data transmissions occur. Essentially, the system must request a retransmission of the missing data which in turn lowers the throughput efficiency of the data system dramatically and therefore, lowers the number of subscribers that may be accommodated accordingly.

The European MPT protocol with its 63.48 cyclic code can tolerate bit fade error with varying results.

The more bit errors that are tolerated (five bits maximum or 4.166 milliseconds) the greater the probability of an erroneous data character will be received that could cause a problem. If the error occurs during the ID code or a channel change command, the result is a catastrophic loss in communications.

If the number of tolerable error bits are decreased to one or two bits, the decoding reliability increases considerably. However, the fade tolerance suffers a corresponding decrease (eight hundred thirty-three and sixteen hundred sixty-six microseconds respectively).

The MPT protocol is gaining an increased popularity for dispatch government, political, law enforcement, fire department and numerous other two-way radio data services that need both short data and analog communications. A loss of message or erroneous data characters can have serious consequences in an emergency situation. A wrong address to dispatch a fire truck or ambulance can cause a life threatening situation. A missed message from a police officer or a need for help situation can be fatal.

The semi-synchronous nature of the MPT protocol affords little tolerance for error correction of the data from the fading environment.

3. Cellular Data Systems

Cellular radio has an ability to address data services which is similar to the previously described two-way systems. Cellular operating frequencies are wideband in nature and permit both voice and data to be transmitted on a working channel. Much like the MPT protocol, cellular has a setup channel that communicates in a data only fashion to all of the mobiles that reside within a cell. This setup channel is responsible for keeping track of mobiles. Cellular systems have a data rate of approximately ten kilobaud that communicates to the cellular mobile units. The cellular system protocol is synchronous in nature and transmits data in a serial fashion.

Cellular radio systems have a similar problem that is experienced when fades occur during a transmission to a mobile that wishes to place or receive a call. The call setup process is aborted when bit error occurs during call setup. This typically gives the cellular mobile user a system busy response. In the case where a land to cellular mobile call is being attempted, the receipt of erroneous data precipitates a "mobile out of range" or "message to be received by the telephone party".

During a cellular mobile telephone call, the mobile is directed to a working channel by data sent to the mobile from the setup channel. Once the mobile is placed on a working channel, the voice conversation can begin and due to the wide operating bandwidth of the channel, both the voice conversation between three hundred and three thousand hertz can occur as well as ten kilobaud data stream that permits data to be sent from the mobile to the system or visa versa.

The amount of data that is sent on the cellular working channel is typically minimal. From the cellular system to the mobile, data is typically sent concerning a call hand off or an increase/decrease in operating power. When this information is subject to a fade that precipitates the loss of data, the mobile will either fail or erroneously change its power correspondingly resulting in a noisy conversation or cellular hand off information that is incorrectly received and a catastrophic failure with loss of call results.

4. Data Service Air Time Inefficiencies

Research by G. Cromack of Cromack Industries has indicated that the probability for data error increases when more data bits in a message are dedicated for error correction. The theoretical throughput is approximately eighteen percent for a mobile data communication's system. In reality, the data throughput of the mobile system can be as low as ten percent. This low throughput rate is due to a number of factors that relate to the design of the protocol utilized, and is in part, indirectly caused by the lack of robustness of the protocol to resist the effects of radio fading. In order to increase the efficiency and probability of reliable mobile data communications, the robustness of the protocol to resist fading of the data must be improved significantly.

5. Data Service Problematic Areas

Basically there are four distinct problematic areas that need to be addressed and the problems resolved to provide a substantial increase in air time efficiency. The four problematic areas serve to collectively combine to reduce the overall operating efficiency of a mobile data service. They are as follows:

a. Data Message Reliability

All of the current prior art data services are serial in format. There needs to be an improvement in the transmission of serial data that eliminates erroneous characters from being received. The primary cause of erroneously received characters is due to the phenomenon of fading. Fading for purposes of this explanation, as generally discussed above, is defined as any form of natural or man-made phenomenon that causes the median signal level to drop below that of the receiving circuitry's threshold receiving level. This fading could be caused by the effect of Rayleigh fading, multipath reception and waveform distortions caused by man-made or natural noises. The net effect of a fade is such that the receiver, transceiver or receiving circuitry associated with a base station experiences either an erroneous or lost character or, in a worst case, the loss of an entire message because of loss of synchronism. The fading phenomena takes place at all radio frequencies.

The cumulative effects of fading serve to substantially decrease air time efficiency of a mobile data channel. It first causes a mobile to request the retransmission of additional data that was missed or erroneously received due to the fade. Many of the serial protocols transmit blocks of characters that are two hundred fifty-five characters each. Even though there may only be five or six erroneous characters, the entire block of two hundred and fifty-five characters must be resent to the mobile. Additional air time is consumed by the mobiles request for retransmission of data, thereby making the radio channel unavailable to other mobile data units. The problem is further aggravated by the increased number of transmissions from mobiles requesting missing blocks of transmission of data to be retransmitted and the probability for mobile transmission collisions increases considerably. It is the collective combination of the added air time for the retransmission of missing data that typically requires a much greater number of characters to be retransmitted than the few missing characters, additional air time delays during transmissions, and the potential for additional collisions to occur, that cumulatively reduce the air time efficiency.

b. Increased Data Speed on Narrow Band Channels

Many of the serial digital data protocols transmit data at 1200 baud (subcarrier 1200 Hz.). At 1200 baud (or 1200 BPS), the actual data throughput speed when the number of error correction bits and other overheads are taken into account makes the data bit transmission rate very slow. This effectively reduces the number of mobile data units that can reside on an individual channel. In order to increase the number of mobile data units on the existing radio infrastructure, higher speed data protocols need to be implemented. The constraints of the current narrow bandwidth channels are such that a transmission philosophy must be compatible with the current bandwidth requirements to permit a high speed protocol to be implemented. If a data speed increase could be achieved, the number of mobile units that reside on a data channel could be increased correspondingly.

c. Median Field Strength

The median field strength for most data services is typically forty-three dbu. This corresponds approximately to 130 microvolts per meter of radio field strength. This field strength requirement is to permit a 95% reliability in the transmission and reception of data messages. This poses a problem with the current infrastructure in that to serve a metropolitan area, numerous radio transmitters and receivers are required to provide service. When multiple channels and a data service are accommodated, it becomes apparent that large numbers of radio transmitter receivers are required to provide reliable service in a metropolitan area. Techniques should be evaluated to reduce the number of radio transmitters necessary to provide reliable data service in a metropolitan area. If the median field strength can be reduced by one-half (e.g. three dbu), the number of transmitters can be reduced proportionately. Therefore any technological advance that could reduce the number of radio transmitters to provide such a data service has a net result in reducing capital plant equipment cost to the data service company, with a corresponding decrease in cost of service to the end data user.

d. Battery Consumption

Current mobile services are not sensitive to consumption of battery current. The electronics to process the receiving and transmitting of data messages have little impact on a vehicular transceiver that has an automotive battery at its disposal. However, there is a move in the industry towards increased portability and downsizing of very sophisticated computer products. Computers have progressed from twenty-five pound desktop devices to easily portable devices. Computers that are now this mobile and portable have a tremendous requirement for the receipt of wireless data. They are no longer confined to a desktop or dedicated telephone line to receive or transmit data information. However, with the downsizing and portability of these computer products, the battery power available for two-way transmission services becomes critical. The power output of the transceiver needs to be minimized in order to conserve battery life. More importantly, in order to gain the greatest savings in battery efficiency, the number of retransmissions to receive missed data must be reduced as much as possible. The previously described data speeds, field strength requirements, and robustness of the data protocol become critical factors to accommodate the portable devices which are anticipated to be introduced into the wireless marketplace.

The analysis of error rates described above with reference to one-way wireless communications involving digital protocols, such as POCSAG, is equally applicable to two-way wireless communications. Atmospheric fading causes two-way wireless systems to experience the same types of errors in transmissions between message originating transceivers and receiving circuitry associated with base stations (uplink) and transmissions between transmitters located at base stations (downlink) and message receiving transceivers as occur in one-way communication systems between a transmitter and a receiver.

In June 1989, the Personal Computer Memory Card International Association was born from a group of manufacturers of personal computers and memory card manufacturers to form a standard for memory card attachment with personal computers. Out of the original standard, three PCMCIA standards were ultimately adopted which are known as Type I (3.3 mm thickness), Type II (5.0 mm thickness) and Type III (10.5 mm thickness) which use a 68 pin connection to the backside of the personal computer to interface with the personal computer bus. Integrated Circuits are commercially available to provide a PCMCIA interface. The use of the PCMCIA interface has a wide variety of applications, including communications expansion. A new release of the PCMCIA standard will include new features and capabilities. A 3.3 volt operation will be included for application to mobile platforms. Two-way wireless platforms will be possible. See, "Getting Carded, What Are Those PCMCIA Cards All About?", *Pen Computing Magazine*, August 1994, pp. 44–48.

U.S. Pat. No. 3,195,048 discloses a time diversity communication system transmitting a first message and a second identical delayed message which are transmitted by an RF transmission system using two independent carriers without a subcarrier over two communication paths. Space diversity is utilized that requires two independent transmissions to achieve fade resistance. Furthermore, on the receiving end, two unsynchronized and independent telegraph receivers respond to the signals transmitted over the two spatially discrete communication paths. The use of a delay system time shifts the received independently transmitted signals to provide the necessary time shift to bring the signals outputted from the telegraph receivers into time coincidence. The simultaneously outputted signals, received by the unsynchronized and independent receivers are displayed on a common display device which is a printing system. The output signals from the receivers are independently separately recorded by the printing system.

U.S. Pat. No. 3,842,352 discloses a communications system which transmits a signal by splitting the signal into an undelayed signal and at least one delayed signal which are multiplexed at transmission. The receiver uses suitable delays to combine the transmitted undelayed signal and at least one delayed signal into a single output signal.

Technical Digest No. 8, October 1967, published by Western Electric entitled "Time Diversity Transmission System", authored by W. R. G. Dwayne discloses a system for improving the reliability of atmospheric transmission. The system utilizes time diversity transmission such that a single signal source is broken up into plural signals which are separated in time which are sequentially transmitted through the atmosphere in a serial mode to the receiver. The receiver reconstructs the original signal by using a diversity combiner which sums the outputs of signal delays corresponding to the signal delays used at the transmitter which receive inputs from the detected radio signal.

U.S. Pat. No. 3,526,837 discloses an error correction system utilizing multiple transmission channels with time displacement between the transmission of the information modulating each channel.

U.S. Pat. No. 4,286,334 discloses a radio communications system in which disturbed sections of the transmitted information are replaced. The disturbed sections may be replaced by using one or more simultaneous transmission paths, time staggering multiple transmission of the same signal or transmitting from the receiver that a dropout has occurred to the transmitter to request retransmission of the information.

U.S. Pat. No. 4,298,984 discloses a system for eliminating transmission defects by transmitting data in first and second identical data streams. A time delay is provided between the data streams. Data streams are compared by a logic circuit with one of four signals being produced as an output of the comparison which encode the relative levels of the first and second data streams. The one of four signals drives an audio voltage controlled oscillator to produce conventional tone keying. A transmitter is modulated from the output of the oscillator.

U.S. Pat. No. 4,485,357 discloses a transmission system utilizing the amplitude and phase modulation of a carrier signal by two respective input signals. The phase modulated signals are phase displaced sinusoidal signals.

U.S. Pat. No. 4,641,318 discloses a system for eliminating Rayleigh fading of channels. The disclosed system relies upon the increasing of the time duration of each individual bit so that the bit length exceeds the duration of a typical Rayleigh fade by dividing a high speed bit stream into parallel longer duration bit streams and simultaneously transmitting the longer duration bit streams. A plurality of frequency shift modulators are used to transmit the respective parallel streams.

U.S. Pat. No. 4,849,990 discloses a digital communication system which utilizes two transmission paths having substantially different transmission time intervals between the signal source and the output of the receiving side.

DISCLOSURE OF INVENTION

The present invention relates to wireless transmission of information originating from a computer and transmitted on a computer bus through a bus interface to transmitting circuitry and reception by receiving circuitry of wirelessly transmitted information for transmission to the computer through the computer bus with the wireless transmission and reception being subject to fading for a time interval. The invention eliminates erroneous information transmission and reception caused by atmospheric fading, maintains synchronism between transmitting and receiving circuitry and requires less radiated power than prior art one-way and two-way wireless systems. The invention provides one-way and two-way wireless transmission of information. The information may originate from a computer using the transmitting circuitry to wirelessly transmit the information. The computer may receive the information as a destination using the receiving circuitry to receive the wireless transmission of the information. Connection of a receiver or transceiver to the computer is made with a bus interface preferably using a PCMCIA interface to the computer bus. With the invention a wirelessly transmitted radio frequency carrier is modulated with a subcarrier which is modulated with first and second encoded information streams which preferably contain identical information. The first and second encoded information streams have a time delay interval offset which is greater than any statistically probable fade.

The present invention also is a receiver and transceiver for receiving wireless transmission of the first and second parallel streams and processing the first and second parallel information streams to replace faded information within the parallel information streams which has been lost or rendered erroneous because of fading with the information or information units from at least one of the parallel information streams which is time offset from the faded information by the time delay interval and method of operation.

Faded information is any changed information or information units such as bits, nibbles or bytes, or digital words caused by fading changing the parallel information streams during transmission between the transmitting and receiving circuitry which cannot be corrected by the error correction code of the frames of the parallel information streams in which the information is encoded for transmission. Faded information causes the receiving circuitry to output erroneous information or information units different from the information or information units which were transmitted using transmitting circuitry.

As used hereinafter, receiving circuitry is circuitry used in a receiver, transceiver, or base station which detects a wireless transmission of information having a subcarrier modulated with first and second time offset parallel information streams and which processes the detected first and second parallel information streams to output wirelessly transmitted information including replacement information which replaces faded information in at least one of the first and second parallel information streams. Receiving circuitry used in practicing the invention may take many different forms.

As used hereinafter, transmitting circuitry is circuitry associated with a transmitter, a transceiver or base station for processing information and encoding and modulating a subcarrier with first and second encoded information streams to produce time offset first and second parallel information streams. Transmitting circuitry used in practicing the invention may take many different forms.

The individual cycles of the subcarrier may each respectively be modulated to contain part of the bits which in totality make up each unit of information. Alternatively, the individual modulated cycles of the subcarrier may each contain at least one complete unit of information. In either circumstance, the time delay interval preferably offsets identical information units or identical parts of a full unit of information in the parallel information streams which modulate the subcarrier.

The present invention has substantial advantages over the prior art. Information transmission is performed more reliably with fewer errors, at a higher rate and the transmission thereof requires less radiated power when compared to the prior art. With respect to the POCSAG protocol, the present invention provides information transmission rates which are approximately an order of magnitude or more higher, an error rate which is orders of magnitude lower without requiring substantial modification to the current infrastructure and using less radiated power. With respect to the modified ERMES protocol, the invention provides information transmission rates which are higher, an error rate which is substantially lower without requiring substantial modification to the current infrastructure and using less radiated power. The invention provides wireless one or two-way transmission of information on narrow band channels. With the invention, synchronization is maintained between the wirelessly transmitted time offset first and second parallel information streams modulated on the subcarrier and the receiving circuitry even when fades occur of a duration up to or greater than 400 milliseconds which is not possible with the POCSAG or modified ERMES protocols or other protocols which have a limited fade resistance.

An additional benefit of the invention resides in the ability to reduce the number of bits of error correction code which are present in each transmitted frame of the first and second parallel information streams. The replacement of erroneous information units by processing of the decoded first and second parallel information streams can correct errors caused by fades which otherwise would be corrected by processing with an error correction routine using additional error correction code bits within the frames of the first and second parallel information streams. Therefore, a higher throughput of bits encoding information and a lower throughput of bits encoding error correction code is achieved. As a result, the information or data throughput of the system is increased by reducing error correction code overhead by permitting reduction of the number of error correction bits from those necessary to correct for two bit errors to those necessary to correct for one bit errors.

With the invention, the information to be transmitted is formed into first and second encoded information streams comprised of any type of digitally encoded information. The information streams are time offset with respect to each other by a calculated or fixed time delay interval which is equal to or greater in duration than any anticipated atmospheric fade. The encoded information streams modulate cycles of a subcarrier to produce first and second parallel information streams which are time offset by the time delay interval. The first parallel stream preferably contains all of the information of the first encoded information stream and the second parallel stream preferably contains all of the information of the second encoded information stream. In one preferred embodiment of the invention, cycles of a subcarrier are modulated with bits at a plurality of separated angular positions on each cycle encoding the first and second parallel information streams which are offset with the time delay interval between the encoded information streams to produce the first and second parallel streams each containing preferably identical information to be wirelessly transmitted with the first parallel information stream modulating the subcarrier being time displaced from the second parallel information stream modulating the subcarrier by the time delay interval. Alternatively, in another preferred embodiment, a subcarrier, such as a squarewave, may be pulse width modulated with different pulse widths representative of different numeric values encoding the first and second encoded information streams with successive parts or halves of cycles of the subcarrier being pulse width modulated with the first and second encoded information streams to produce the first and second parallel streams modulating cycles of the subcarrier with the first parallel information stream as modulating the subcarrier being time displaced from the second parallel information stream by the time delay interval.

While in a preferred embodiment a single cycle of an analog subcarrier or a single cycle of a digital subcarrier are modulated with the first and second encoded information streams to produce the first and second parallel information streams, it is not necessary that the invention be practiced in this manner. Alternatively, the first and second information streams may be time multiplexed by the encoder so that one or more cycles of the subcarrier are exclusively modulated with one of the parallel streams and a subsequent one or more cycles of the subcarrier are exclusively modulated with the other of the parallel streams with each parallel stream preferably carrying all of the information to be wirelessly transmitted. The time multiplexing may be such that several successive cycles of the subcarrier are modulated only with one of the encoded information streams to produce the modulation of one of the parallel streams followed by several successive cycles of the subcarrier being modulated with the other of the encoded information streams to produce the modulation of the other of the parallel information streams.

The simplest form of modulation in practicing the invention is to time multiplex modulate a single cycle of a subcarrier with the first and second encoded information streams to produce the first and second parallel streams modulating cycles of the subcarrier for the reason that no synchronization information is required to provide timing for decoding the parallel information streams. On the other hand, if one or more cycles of the subcarrier are exclusively modulated with one of the encoded information streams to modulate one of the parallel information streams followed exclusively by the other of the encoded information streams exclusively modulating the subcarrier to modulate the other of the parallel information streams, the receiving circuitry is designed so that the identity of the information stream that is being received at any time is known to permit subsequent processing including providing replacement of erroneous information when faded information is detected by processing the error correction information transmitted with each of the parallel information streams.

The present invention relies upon conventional error correction codes, such as BCH code, to correct minor bit errors in each of the first and second parallel information streams which are detected by the receiving circuitry. However, when an error is detected, such as a three-bit error which is not corrected by the error correction code and represents faded information which may cause synchronization to be lost between the transmitting circuitry and the receiving circuitry, the detected faded information produced by the fade is replaced with corresponding error free unfaded information from one of the first and second parallel streams which is time offset by the time delay interval between the first and second parallel information streams to permit processing to produce the information without error and loss of synchronization. A processor places an error marker within the detected first and second parallel information streams to mark each faded information unit (data bits of a frame) within the faded information requiring replacement and controls replacement of each error marker within at least one of the first and second parallel information streams with replacement bits from a frame within one of the first and second parallel information streams which are time offset at transmission by the time delay interval to produce error free wirelessly transmitted information.

Surprisingly, lengthening the time delay interval between corresponding identical information, or identical information units as modulated on the subcarrier in the parallel information streams causes a rapid decrease in the number of messages which are transmitted with errors (faded information) representing a loss of synchronization (not correctable with embedded error correction information) between the transmitted information stream and the receiving circuitry. This phenomena, which is calculated to result in the transmission of messages of 450 characters with a reliability of greater than 99.99% transmission without loss of synchronization in a one-way or two-way wireless system, may be explained by analyzing the effect caused by replacing the detected faded information altered by the fade with information from one of the first and second parallel information streams as modulated on the subcarrier which is time offset by the time delay interval and which contains the same (identical) information contained within the faded information without the error. Statistically, most atmospheric fades are of relatively short duration but many short duration fades are of sufficient duration to cause a three-bit or greater error in the reception of the transmitted information which may cause loss of synchronism resulting in message loss. Therefore, choice of a sufficiently long time delay interval insures that a significant probability of erroneous faded information not being replaced with error free information does not exist which additionally prevents loss of synchronism.

The invention eliminates loss of synchronism caused by atmospheric fades of a duration of the length up to a length of the time delay interval permitting synchronism to be maintained. Synchronization can be maintained without the first and second parallel information streams being identical and can be maintained with the time offset first and second information streams being totally different causing faded information to be replaced with other information which is not related to the faded information. The receiving circuitry does not search for a new transmission as in the prior art because the receiving circuitry substitutes corresponding error free information or information units from one of the first and second parallel information streams which maintains synchronization. Erroneous information units within faded information in the parallel information streams are replaced with corresponding error free information units which are time offset by the time delay interval when error free transmission is required.

Information units from at least one of the first and second parallel streams, which are time offset by the time delay interval from information units that have been altered by an atmospheric fade, contain error free information permitting the maintenance of synchronization so that the receiving circuitry is prevented from reverting to a search mode to search for the broadcast of its address. When the first and second parallel information streams contain identical information time offset by the time delay interval, totally reliable identical error free information is always received by the receiving circuitry and may be substituted for the information within the fade which permits maintaining of synchronization and outputting of error free wirelessly transmitted information.

Moreover, the present invention maintains synchronization even when the fade is of long duration. By correcting for the most statistically probable fades, which have a relatively short duration but that are longer than fades which would cause loss of synchronization, and correcting for longer fades which are less statistically probable containing relatively large amounts of information, the present invention replaces the detected faded information resulting from the atmospheric fade with identical error free information from one of the first and second parallel streams which is time offset by the time delay interval to produce extremely highly reliable one-way or two-way data transmission for transmitting long messages while using much less radiated power than in the prior art. The reduction in radiated power is the result of the present invention correcting for the relatively infrequent atmospheric fades which represent a high drop in received signal magnitude because of the statistical probability that the identical information or identical information units from one of the first and second parallel information streams which is time offset by the time delay interval will not contain a corresponding drop in signal level which would prevent detection by the receiving circuitry of the faded information. As a result, the broadcasting power level of the first and second parallel information streams may be dropped as a consequence of the receiving circuitry correcting for fades which occasionally drop the power of the received first and second parallel streams substantially below the threshold level of the receiving circuitry by replacing information with corresponding error free identical information or information units which are the data bits of frames from one of the first and second parallel information streams which are time offset by the time delay interval which did not drop in signal level below the threshold detection level of the receiving circuitry.

In a preferred embodiment of the present invention, the first and second encoded information streams, which modulate the subcarrier, each comprise frames of information with each frame having a plurality of bits of error correction code and a plurality of bits encoding information or data with the error correction code not being capable of correcting for a fade of the time interval which characterizes fading for the particular frequency and velocity of the receiver or transceiver containing the receiving circuitry. The detection of a fade by the receiving circuitry is accomplished by determining that the error correction code bits within a frame cannot correct a bit error detected by processing the frames of first and second parallel information streams with the error correction code therein (e.g., the number of bit errors of the frame exceeds the bit error correction capacity of the frame).

Transmitting circuitry for wirelessly transmitting information subject to fading for a time interval by modulating a radio frequency carrier with a subcarrier with the information originating from a computer and being transmitted to the transmitting circuitry by a computer bus in accordance with the invention includes a bus interface for connection to the computer bus for receiving the information from the bus; a processor, coupled to the bus for processing the information received from the bus interface and in response to the information received from the bus interface providing a first encoded information stream which comprises the information to be wirelessly transmitted and a second encoded information stream which also comprises the information to be wirelessly transmitted with the second encoded information stream being delayed by a time delay interval with respect to the first information stream which is equal to or greater than the time interval of a fade; an encoder coupled to the processor and responsive to the first and second encoded information streams, for modulating the subcarrier with the first and second encoded information streams to produce first and second parallel information streams modulating cycles of the subcarrier with the first parallel information stream containing the first encoded information stream, with the second parallel information stream containing the second encoded information stream and with the first parallel information stream modulating the subcarrier being time displaced from the second parallel information stream modulating the subcarrier by the time delay interval; and a modulator, coupled to the encoder, for modulating the carrier with the modulated subcarrier. Bits of each of the first and second parallel information streams modulate cycles of the subcarrier with each cycle of the subcarrier being modulated by bits at a plurality of separated angular positions or groups of bits of the first and second parallel information streams each modulate a width of parts of the cycles of the subcarrier with pulse width modulation. The first and second encoded parallel information streams each comprise frames of information with each frame having a plurality of bits encoding error correction code and a plurality of bits encoding the information originating from the computer with the error correction code of the first encoded information stream not being capable of correcting for a fade of the time interval producing faded information in the first parallel information stream and the error correction information of the second encoded information stream not being capable of correcting for a fade of the time interval producing faded information in the second parallel information stream. The time interval is of a length which would cause receiving circuitry receiving the wirelessly transmitted information to lose synchronism with the transmitted parallel information streams without replacement of faded information caused by the fade with information offset in time from the faded information by the time delay interval from at least one of the transmitted parallel information streams.

A method for wirelessly transmitting information subject to fading for a time interval with transmitting circuitry by modulating a radio frequency carrier with a subcarrier with the information originating from a computer and being transmitted to the transmitting circuitry by a computer bus in accordance with the invention includes receiving the information from the bus with a bus interface; in response to receiving the information from the bus interface providing a first encoded information stream which comprises the information to be wirelessly transmitted and a second encoded information stream which also comprises the information to be wirelessly transmitted with the second information stream being delayed by a time interval with respect to the first information stream which is equal to or greater than the time interval of the fading; modulating the subcarrier with the first and second encoded information streams to produce identical first and second parallel information streams modulating cycles of the subcarrier with the first parallel information stream containing the first encoded information stream and with the second parallel information stream containing the second encoded information stream and with the first parallel information stream modulating the subcarrier being time displaced from the second parallel information stream modulating the subcarrier by the time delay interval; and modulating the radio frequency carrier with the modulated subcarrier. Bits of each of the first and second parallel information streams modulate cycles of the subcarrier with each cycle of the subcarrier being modulated by bits at a plurality of separated angular positions or, alternatively, groups of bits of the first and second parallel information streams each modulate a width of parts of the cycles of the subcarrier with pulse width modulation. The first and second encoded information streams each comprise frames of information with each frame having a plurality of bits encoding error correction code and a plurality of bits encoding the information originating from the computer with the error correction code of the first encoded information stream not being capable of correcting for a fade of the time interval producing faded information in the first parallel information stream and the error correction code of the second encoded information stream not being capable of correcting for a fade of the time interval producing faded information in the second parallel information stream. The time interval is of a length which would cause receiving circuitry receiving the wirelessly transmitted information to lose synchronism with the transmitted first and second parallel information streams without replacement of faded information caused by the fade with information offset in time from the faded information by the time delay interval from at least one of the transmitted parallel information streams.

Receiving circuitry for receiving wirelessly transmitted information which is subject to fading for a time interval with a radio frequency carrier being modulated with a subcarrier with the subcarrier being modulated with identical first and second encoded information streams each containing the information to produce first and second parallel information streams modulating cycles of the subcarrier with the first parallel information stream containing the first encoded information stream and with the second parallel information stream containing the second encoded information stream with the parallel information streams being wirelessly transmitted with a time delay interval between the parallel information streams modulating the subcarrier which is equal to or greater than the time interval for transmission to a computer by a computer bus in accordance with the invention includes a detector for detecting the transmitted first and second parallel information streams; a processor, coupled to the detector and responsive to the detected parallel information streams, for determining if faded information is present in at least one of the detected first and second parallel information streams and in response to determined faded information replacing the faded information caused by a fade with replacement information from at least one of the first and second parallel information streams which is time offset at transmission from the faded information by the time delay interval and outputting error free wirelessly transmitted information including the replacement information; and a bus interface, for connection to the computer bus and being coupled to the processor, for receiving the outputted error free wirelessly transmitted information and in response to connection to the computer bus transmitting the outputted error free wirelessly transmitted information to the computer bus for transmission to the computer. The first and second encoded information streams each comprise frames of information with each frame having a plurality of bits encoding error correction code and a plurality of bits encoding the information with the error correction code of the first encoded information stream not being capable of correcting for a fade of the time interval producing the faded information in the first parallel information stream and the error correction code of the second encoded information stream not being capable of correcting for a fade of the time interval producing faded information in the second parallel information stream; and the determination of faded information by the processor is performed by determining that the error correction bits cannot correct an error detected by processing the frames of the first and second parallel information streams with the error correction code using the plurality of bits of error correction code. The processor comprises a digital signal processor for processing detected individual cycles of the subcarrier to calculate an integral of at least one selected modulated part of each of the individual cycles, numerically comparing each of the calculated integrals with a plurality of stored numerical ranges which ranges each represent one of a plurality of possible numerical values that the selected part may encode to identify a stored range numerically including the calculated integral and substituting for the at least one selected part of each of the cycles the one of the plurality of numerical values representative of the identified stored range including the calculated integral with each numerical value encoding at least a part of an information unit in one of the first and second parallel information streams; and wherein the digital signal processor processes the first and second parallel information streams containing the substituted numerical values for determining if faded information is present. Bits of each of the first and second parallel information streams modulate cycles of the subcarrier with each cycle of the subcarrier being modulated by bits at a plurality of separated angular positions or, alternatively, groups of bits of the first and second parallel information streams each modulate a width of parts of the subcarrier with pulse width modulation. The digital signal processor calculates the integral by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample is replaced with a value which is a function of the sample values adjacent the sample value which is replaced. The compared sample value is replaced with a value which is an average of at least one sample value which precedes the compared sample value and at least one sample value which succeeds the compared sample value.

A method of receiving a wireless transmission of information subject to fading for a time interval with receiving circuitry with a radio frequency carrier being modulated with a subcarrier with the subcarrier being modulated with identical first and second encoded information streams which contain the information to produce first and second parallel information streams modulating cycles of the subcarrier with the first parallel information stream containing the first encoded information stream and with the second parallel information stream containing the second encoded information stream with the parallel information streams being wirelessly transmitted with a time delay interval between the first and second parallel information streams modulating the subcarrier which is equal to or greater than the time interval for transmission to a computer through a computer bus in accordance with the invention includes detecting the first and second parallel information streams which have been transmitted with the radio frequency carrier; determining if faded information is present in at least one of the detected first and second parallel information streams and in response to determined faded information, replacing the faded information with information from one of the first and second parallel information streams which is time offset from the faded information by the time delay interval and outputting error free wirelessly transmitted information including the replacement information; receiving the outputted error free wirelessly transmitted information with a bus interface; and transmitting the error free wirelessly transmitted information to a computer bus from the bus interface and processing the error free wirelessly transmitted information with a computer coupled to the computer bus. The first and second encoded information streams each comprise frames of information with each frame having a plurality of bits encoding error correction code and a plurality of bits encoding the information with the error correction code of the first encoded information stream not being capable of correcting for a fade of the time delay interval producing faded information in the first parallel information stream and the error correction code of the second encoded information stream not being capable of correcting for a fade of the time interval producing faded information in the second parallel information stream; and the determination of faded information is performed by determining that the error correction bits cannot correct an error detected by processing frames of the first and second parallel information streams with the error correction code using the plurality of error correction bits. The method of receiving a wireless transmission of the invention further includes processing detected individual cycles of the subcarrier to calculate an integral of at least one selected modulated part of each of the individual cycles, numerically comparing each of the calculated integrals with a plurality of stored numerical ranges which ranges each represent one of a plurality of possible numerical values that the selected part may encode to identify a stored range numerically including the calculated integral and substituting for the at least one selected part of each of the cycles the one of the plurality of numerical values representative of the identified stored range including the calculated integral with each numerical value encoding at least a part of an information unit in the first and second parallel information streams; and wherein the first and second parallel information streams containing the substituted numerical values are processed for determining if the faded information is present. The bits of the first and second parallel information streams modulate cycles of the subcarrier with each cycle of the subcarrier being modulated with bits at a plurality of separated angular positions or, alternatively, groups of bits of the first and second parallel information streams modulate a width of parts of the cycles of the subcarrier with pulse width information. The integral is calculated by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced. The compared sample value is replaced with a value which is an average of at least one sample value which precedes the compared sample value and at least one sample value which succeeds the compared sample value.

Receiving circuitry for receiving wirelessly transmitted information which is subject to fading for a time interval with a radio frequency carrier being modulated with a subcarrier with a subcarrier being modulated with first and second identical information streams each containing the information to produce first and second parallel information streams modulating cycles of the subcarrier with the first parallel information stream containing the first encoded information stream and with the second parallel information stream containing the second encoded information stream with the parallel information streams being wirelessly transmitted with a time delay interval between the first and second parallel information streams modulating the subcarrier which is equal to or greater than the time interval for transmission to a computer through a computer bus in accordance with the invention includes a detector for detecting the first and second parallel information streams which have been transmitted with the radio frequency carrier; a processor, coupled to the detector and responsive to the detected parallel streams, for determining if faded information is present in at least one of the detected first and second parallel information streams and in response to determined faded information replacing the faded information caused by a fade with replacement information from at least one of the first and second parallel information streams which is time offset at transmission from the faded information by the time delay interval and outputting error free wirelessly transmitted information including the replacement information; and a bus interface for connection to the computer bus and coupled to the processor for receiving the outputted error free wirelessly transmitted information and in response to connection to the computer bus transmitting the outputted error free wirelessly transmitted information to the computer bus for transmission to the computer; and wherein the at least one processor places an error marker within the detected first and second parallel information streams to mark each faded information unit within the faded information requiring replacement and controls replacement of each error marker within at least one of the first and second parallel information streams with replacement bits within one of the first and second parallel information streams which were time offset at transmission by the time delay interval to produce the error free wirelessly transmitted information. The first and second encoded information streams each comprise frames of information with each frame having a plurality of bits encoding error correction code and a plurality of bits encoding the information with the error correction code of the first encoded information stream not being capable of correcting for a fade of the time interval producing faded information in the first parallel information stream and the error correction code of the second encoded information stream not being capable of correcting for a fade of the time interval producing faded information in the second parallel information stream; and the determination of faded information by the processor is performed by determining that the error correction bits cannot correct an error detected by processing the frames of the first and second parallel information streams with the error correction code using the plurality of bits of error correction code. The processor comprises a digital signal processor for processing detected individual cycles of the subcarrier to calculate an integral of at least one selected modulated part of each of the individual cycles, numerically comparing each of the calculated integrals with a plurality of stored numerical ranges which ranges each represent one of a plurality of possible numerical values that the selected part may encode to identify a stored range numerically including the calculated integral and substituting for the at least one selected part of each of the cycles of the one of the plurality of numerical values representative of the identified stored range including the calculated integral with each numerical value encoding at least a part of an information unit in one of the first and second parallel information streams; and wherein, the digital signal processor processes the first and second parallel information streams containing the substituted numerical values for determining if faded information is present. Bits of each of the first and second parallel information streams modulate cycles of the subcarrier with each cycle of the subcarrier being modulated by bits at a plurality of separated angular positions or groups of bits of the first and second parallel information streams modulate a width of parts of the subcarrier with pulse width modulation. The digital signal processor calculates the integral by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced. The compared sample value is replaced with a value which is an average of the at least one sample value which precedes the compared sample value and at least one sample value which succeeds the compared sample value.

A method of receiving a wireless transmission of information subject to fading for a time interval having a radio frequency carrier modulated with a subcarrier with the subcarrier being modulated with identical first and second encoded information streams to produce first and second parallel information streams modulated on cycles of the subcarrier with the first parallel information stream containing the first encoded information stream and with the second parallel information stream containing the second encoded information stream with the parallel information streams being wirelessly transmitted with a time interval between the parallel streams modulating the subcarrier which is equal to or greater than the time interval with receiving circuitry for transmission to a computer through a computer bus in accordance with the invention includes detecting the first and second parallel information streams which have been transmitted with the radio frequency carrier; determining if faded information is present in at least one of the detected first and second parallel information streams by processing the detected parallel information streams, in response to determined faded information replacing the faded information caused by a fade with replacement information from at least one of the first and second parallel information streams which is time offset from the faded information at transmission by the time delay interval, and outputting error free wirelessly transmitted information including the replacement information; and wherein an error marker is placed within the detected first and second parallel information streams to mark each faded information unit within the faded information requiring replacement and replacing each error marker within at least one of the first and second parallel information streams with replacement bits within one of the first and second parallel information streams which were time offset at transmission by the time delay interval to produce the error free wirelessly transmitted information; receiving the outputted error free wirelessly transmitted information with a bus interface; and transmitting the error free wirelessly transmitted information from the bus interface to a computer bus and processing the error free wirelessly transmitted information with a computer coupled to the computer bus. The first and second encoded information streams each comprise frames of information with each frame having a plurality of bits of error correction code and a plurality of bits encoding the information with the error correction code of the first encoded information stream not being capable of correcting for a fade of the time interval producing the faded information in the first parallel information stream and the error correction code of the second encoded information stream not being capable of correcting for a fade of the time interval producing faded information in the second parallel information stream; and the determination if faded information is present is performed by determining that the plurality of bits of error correction code cannot correct an error detected by processing frames of the first and second parallel information streams with the error correction code using the plurality of error correction bits. The method of receiving a wireless transmission in accordance with the invention further includes processing detected individual cycles of the subcarrier to calculate an integral of at least one selected modulated part of each of the individual cycles, numerically comparing each of the calculated integrals with a plurality of stored numerical ranges which ranges each represent one of a plurality of possible numerical values that the selected part may encode to identify a stored range numerically including the calculated integral and substituting for the at least one selected part of each of the cycles the one of the plurality of numerical values representative of the identified stored range including the calculated integral with each numerical value encoding at least a part of an information unit in the first and second parallel information streams; and wherein the first and second parallel information streams containing the substituted numerical values are processed for determining if the faded information is present. Bits of each of the first and second parallel information streams modulate cycles of the subcarrier with each cycle of the subcarrier being modulated with bits at a plurality of separated angular positions or groups of bits of the first and second parallel information streams modulate a width of parts of cycles of the subcarrier with pulse width modulation. The integral is calculated by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced. The compared sample value is replaced with a value which is an average of at least one sample value which precedes the compared sample value and at least one sample value which succeeds the compared sample value.

Circuitry which wirelessly transmits information originating from a computer and which is transmitted from the computer on a computer bus to transmitting circuitry and wirelessly transmitted by the transmitting circuitry by modulating a radio frequency carrier modulated with a subcarrier with transmission of the information being subject to fading for a time interval and which receives a wireless transmission of information subject to fading for a time interval with receiving circuitry with a radio frequency carrier modulated with a subcarrier with the subcarrier being modulated with identical first and second encoded information streams to produce first and second parallel information streams modulated on cycles of the subcarrier with the first parallel information stream containing the first encoded information stream and with the second parallel information stream containing the second encoded information stream with the parallel information streams being wirelessly transmitted with a time delay interval between the first and second parallel information streams modulating the subcarrier which is equal to or greater than the time interval for transmission to the computer through the computer bus wherein in accordance with the invention the receiving circuitry comprises a detector for detecting the transmitted first and second parallel information streams, a processor, coupled to the detector and responsive to the detected parallel information streams, for determining if faded information is present in at least one of the detected first and second parallel information streams and in response to determined faded information replacing the faded information caused by a fade with replacement information from at least one of the first and second parallel information streams which is time offset at transmission from the faded information by the time delay interval and outputting error free wirelessly transmitted information including the replacement information and a bus interface for connection to the computer bus and coupled to the processor for receiving the outputted error free atmospherically transmitted information and in response to connection to the computer bus transmitting the outputted error free wirelessly transmitted information from the bus interface to the computer bus for transmission to the computer; and the transmitting circuitry comprises a processor which in response to the information to be wirelessly transmitted which is received from the bus interface provides a first encoded information stream which comprises the information to be wirelessly transmitted and a second encoded information stream which also comprises the information to be wirelessly transmitted with the second encoded information stream being delayed by a time delay interval with respect to the first information stream which is equal to or greater than the time interval of fading and modulates the subcarrier with the first and second encoded information streams to produce first and second parallel information streams modulating cycles of the subcarrier with the first parallel information stream containing the first encoded information stream, with the second parallel information stream containing the second encoded information stream and with the first parallel information stream modulating the subcarrier being time displaced from the second parallel information stream by the time delay interval, and a modulator, coupled to the encoder, for modulating the radio frequency carrier with the modulated subcarrier. Bits of each of the transmitted and received first and second parallel information streams modulate cycles of the subcarrier with each cycle of the subcarrier being modulated by bits at a plurality of separated angular positions or alternatively, groups of bits of the first and second parallel information streams each modulate a width of parts of the subcarrier with pulse width modulation. The received and transmitted parallel information streams each comprise frames of information with each frame having a plurality of bits encoding error correction code and a plurality of bits encoding information with the error correction code of the first parallel information streams not being capable of correcting for a fade of the time interval producing faded information in the first parallel information streams and the error correction code of the second parallel information streams not being capable of correcting for a fade of the time interval producing faded information in the second parallel information streams. The time interval of fading of the received wireless transmission is of a length which would cause the receiving circuitry to lose synchronism with the transmitted first and second parallel information streams without replacement of faded information caused by the fade with information offset in time from the faded information by the time delay interval from at least one of the transmitted first and second parallel information streams. The processor comprises a digital signal processor which processes individual cycles of the subcarrier to calculate an integral of at least one selected modulated part of each of the individual cycles, numerically compares each of the calculated integrals with a plurality of stored numerical ranges which ranges each represent one of a plurality of possible numerical values that the selected part may encode to identify a stored range numerically including the calculated integral and substitutes for the at least one selected part of each of the cycles the one of the plurality of numerical values representative of the identified stored range including the calculated integral with each numerical value encoding at least a part of an information unit in one of the first and second parallel information streams and processes the first and second parallel information streams containing the substituted numerical values for determining if faded information is present. The digital signal processor calculates the integral by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced. The compared sample value is replaced with a value which is an average of at least one sample value which precedes the compared sample value and at least one sample value which succeeds the compared sample value. The digital signal processor places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free wirelessly transmitted information.

BRIEF DESCRIPTION OF DRAWINGS

FIG. 3 illustrates numeric POCSAG transmissions.

FIGS. 4A–4J are calculated data evaluating the POCSAG protocol for various operating conditions.

FIG. 5 illustrates a graph of the failure rate of the POCSAG protocol as a function of increasing message duration in seconds.

FIGS. 10A–10K are calculated data evaluating the probability of message loss for varying operating conditions of the present invention.

FIG. 12 illustrates analog modulation of the subcarrier to produce the transmitted time offset analog parallel information streams in accordance with the present invention.

FIG. 14 illustrates a block diagram of an example of the processor and protocol encoder in accordance with the present invention.

FIG. 15 illustrates encoding controller system entries used in accordance with the invention.

FIG. 16 illustrates an example of the conversion of a message having eight bit information unit into two four bit nibbles for preparing the first and second information streams which modulate the subcarrier to produce the first and second parallel information streams.

FIG. 17 illustrates a forward first message memory utilized for storing the information to be transmitted in groups of four bit nibbles which constitute the first encoded information stream which modulates the subcarrier to produce the first parallel information stream in accordance with a preferred embodiment of the present invention.

FIG. 18 illustrates the back second message memory for storing the information to be transmitted in groups of four bit nibbles which constitute the second encoded information stream which modulates the subcarrier to produce the second parallel information stream in accordance with a preferred embodiment of the present invention.

FIG. 19 illustrates the intermediate message memory for storing the first and the second encoded message streams of FIGS. 17 and 18 which are read out in parallel to modulate the subcarrier to produce the first and second parallel information streams in accordance with the present invention.

FIG. 20 illustrates the message memory which stores the first and second encoded information streams which modulate the subcarrier as in FIG. 19 with the information broken down into character message units which each are a four bit nibble.

FIGS. 27A and 27B illustrate sample processing performed by the digital signal processor of the receiving circuitry to remove noise transients in a phase modulated subcarrier of the present invention.

FIG. 30 illustrates a flowchart of decoding the parallel information streams modulated on a subcarrier by the digital signal processor of the receiving circuitry of the present invention.

BEST MODE FOR CARRYING OUT THE INVENTION

Figure 1:
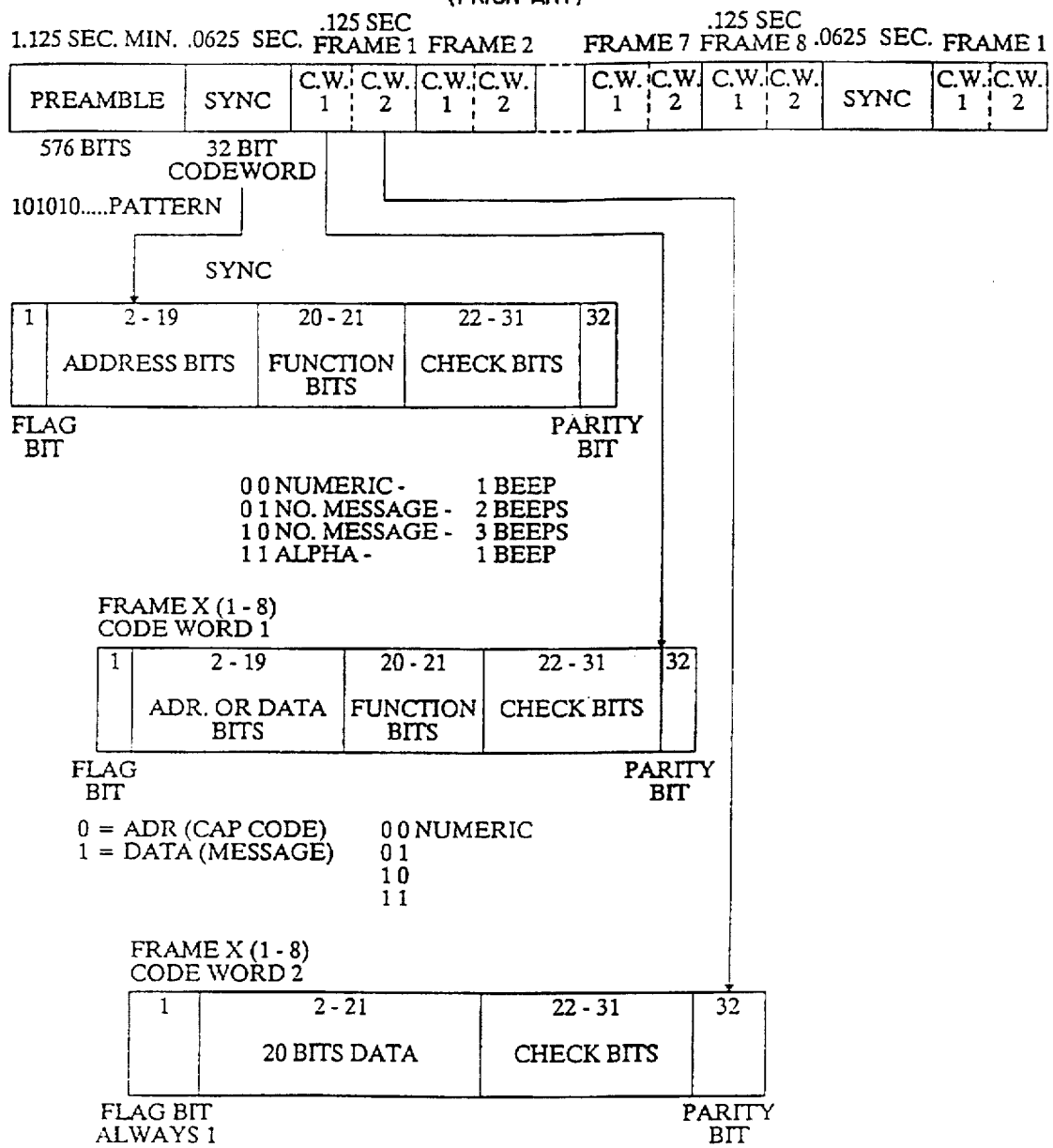
FIG. 1 illustrates a diagram of the prior art POCSAG protocol.

The present invention provides an improved one-way and two-way communication system and method of operation thereof having a higher data transmission rate, lower error rate and requires lower radiated power than prior art one-way and two-way serial communication systems having a preferred application of originating and receiving wirelessly transmitted information through a bus interface of a personal computer.

The present invention utilizes a time offset protocol which modulates a subcarrier to produce first and second encoded parallel information streams each comprising preferably identical information to be atmospherically transmitted which are separated by a time delay interval equal to or greater in length than a time duration of atmospheric fading. First and second encoded information streams which are time offset by the time delay interval and which are preferably identical modulate the subcarrier to produce the first and second parallel information streams that respectively contain the first and second encoded information streams. The first and second parallel information streams are identical when the first and second encoded message streams modulating the subcarrier are identical. Whether the first and second parallel information streams are identical or not, receiving circuitry continues in synchronization with transmitting circuitry when fades occur in frames which cannot be corrected by processing the frames of the first and second parallel information streams containing error correction code with the bits of the error correction code. When the first and second parallel information streams are identical, faded information in at least one of the parallel information streams is reconstructed with error free information in the other parallel information streams which is time offset by the time delay interval from the faded information. An error marker is placed within each of the frames of the first and second parallel information streams which have at least one erroneous uncorrectable bit after processing of the bits of the frame with the error correction code to mark each frame within the faded information requiring replacement. Each error marker within at least one of the first and second parallel information streams is replaced with replacement bits from a frame within one of the first and second parallel information streams which is time offset at transmission by the time delay interval to produce error free wirelessly transmitted information. Even if the first and second parallel information streams are not identical which prevents reconstruction of error free information, the probability of error is lessened because synchronization is not lost and, furthermore, the transmission rate of information is increased when compared to the prior art. Transmission of identical parallel information streams modulating the subcarrier with a time offset greater than statistically probable fade durations provides a high probability that the receiving circuitry is able to process the transmitted information transmitted at a high rate to eliminate erroneous information caused by fades while using reduced radiated power. The only fades which cannot be corrected are those longer than the time delay interval.

The protocol utilizes first and second serial information streams which are created from the inputting of information from a source, such as a serial information stream from a host computer, so that each information stream contains identical information when error free transmission of the information is required with the information modulated on the subcarrier being time offset by a programmable time delay interval. The programmable time delay interval is programmed to be equal to or greater than a time interval of statistically probable atmospheric fading such as that caused by Rayleigh fading, multipath interference or other atmospheric phenomena to provide the receiving circuitry, which receives a semisynchronous information stream modulated on the subcarrier comprised of the parallel first and second information streams, with the ability to replace the faded information with error free unfaded information time offset from the faded information by the time delay interval. This prevents the receiving circuitry from losing synchronous reception with the information stream and searching for another transmission to the receiving circuitry.

The time offset parallel first and second information streams modulate cycles of the subcarrier with the first parallel stream containing the first encoded information stream and with the second parallel stream containing the second encoded stream with the first and second encoded information streams containing identical inputted information when error free data transmission is desired. When the first and second encoded information streams contain none or some common information, synchronous transmission is maintained through the duration of a fade without error free data transmission.

The subcarrier may be either analog or digital. The modulated analog subcarrier may be a sinusoidal waveform, as illustrated in FIG. 7A, and the modulated digital subcarrier may be a squarewave as illustrated in FIG. 7B.

Figure 7A:
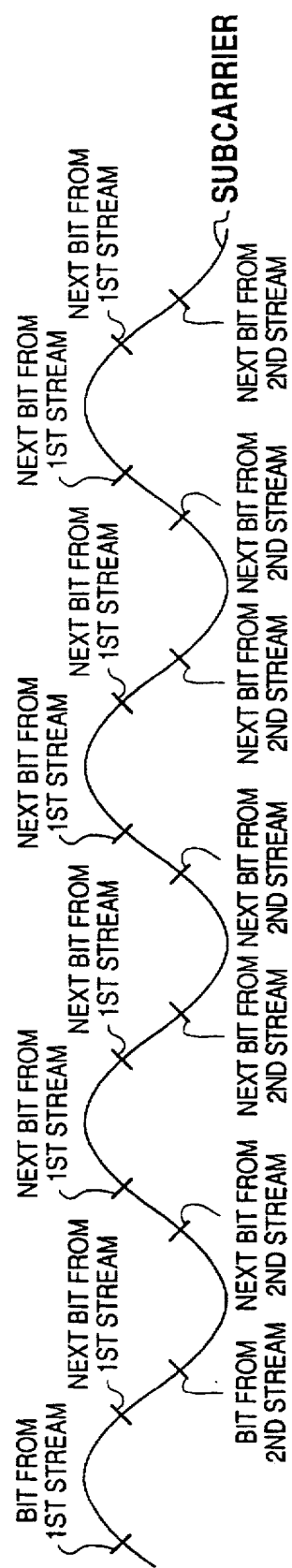
FIGS. 7A and 7B illustrate respectively the subcarrier modulated with phase and pulse width modulation encoding the first and second parallel information streams in accordance with the present invention.

In the example of FIG. 7A the sinusoidal subcarrier is modulated at four different phases of a 360° cycle to encode a one or a zero at each of the four phases which are located at spaced apart angular positions of the sinusoidal carrier. As illustrated, the modulation is diphase quadrature modulation (one or zero modulated at 45°, 135°, 225° and 315°). FIG. 12 discussed below further illustrates the encoding of either a one or zero at each of these four phases. It should be understood that the present invention is not limited to the use of four phases to encode binary information on each cycle of the subcarrier with higher or lower numbers of phases (separated angular positions) also being useful in practicing the invention. As illustrated, bits from the first parallel information stream modulate the 45° and 135° phases of a cycle of the analog subcarrier and bits from the second parallel information stream modulate the 225° and 315° phases. Other permutations of modulation of the subcarrier with the first and second parallel information streams, such as modulating the phases of one or more successive cycles with exclusively only one of the first and second parallel information streams followed by the phases of one or more successive subsequent cycles being modulated with exclusively only the other of the first and second parallel information streams in a repeating cycle are discussed below. In a preferred embodiment, when the error free transmission is required, the first and second parallel information streams contain identical information with identical information units within the frames of the first and second parallel information streams (characters, graphics information, digital words, etc.) being time offset by the TIME DELAY INTERVAL of FIG. 8.

Figure 7B:
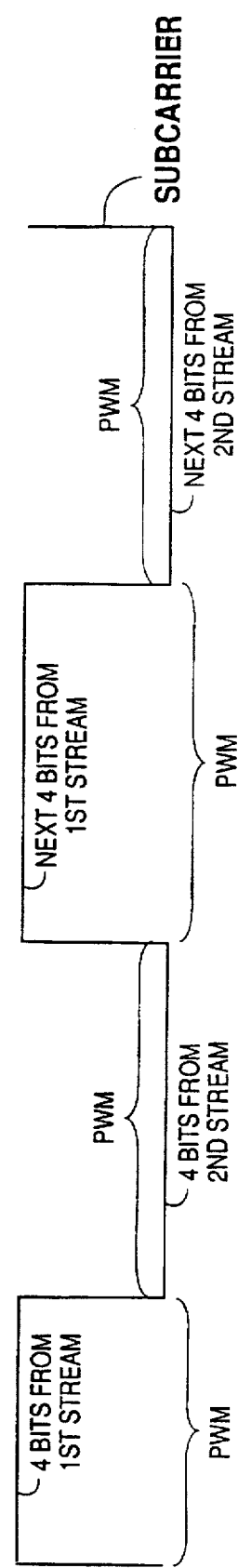
Figure 13:
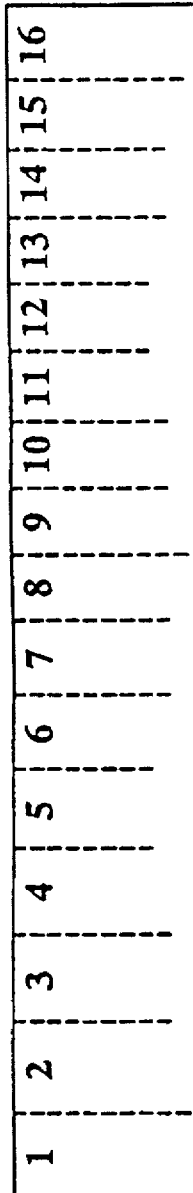
FIG. 13 illustrates pulse width modulation of the subcarrier to produce the transmitted time offset digital parallel information streams in accordance with the present invention.

In the example of FIG. 7B a squarewave subcarrier is pulse width modulated with a first half of the squarewave subcarrier cycle encoding four bits of the first parallel information stream and a second half of a squarewave subcarrier cycle encoding four bits of the second parallel information stream. FIG. 13, discussed below, illustrates the possible numerical values which may be encoded with squarewave modulation as illustrated in FIG. 7B. As illustrated, the pulse width modulation has sixteen possible widths which preferably are proportionate, i.e. a value of one is one sixteenth the width of a value of sixteen. Other permutations of modulation of the subcarrier with the first and second parallel information streams, such as modulating one or more successive cycles of the squarewave exclusively only with one of the first and second parallel information streams followed by one or more successive subsequent cycles modulated with exclusively only the other of the first and second parallel information streams are discussed below. In a preferred embodiment when the lowest error rate is desired the first and second parallel information streams contain identical information with identical information units in the frames of the first and second parallel information streams (characters, data, digital words, etc.) being time offset by the TIME DELAY INTERVAL discussed below with reference to FIG. 8.

The first and second information streams, which are time offset by the programmable TIME DELAY INTERVAL, as described below with reference to FIG. 8, each contain at least a part and preferably all of the information to be transmitted. The receiving circuitry, upon detecting an error within at least one of the parallel streams by processing the error correction bits to detect an error larger than that correctable with the error correction code which could cause loss of synchronism, replaces the detected information in at least one of the parallel information streams containing faded information caused by the fade with information from at least one of the first and second parallel streams which is time offset from the determined fade by the TIME DELAY INTERVAL. The error correction code, which is contained in the frames of the first and second parallel streams, is used to correct at the receiving circuitry small bit errors (e.g., two bits) which may be corrected by an error correction routine using the error correction code to process the frames of the parallel information streams. For example, a two-bit error may be corrected by an error correction code such as the BCH code. The detection of a bit error of a predetermined bit magnitude, such as three bits or greater which may not be corrected by the error correction code in the frames of each of the first and second parallel streams is used to determine when information from at least one of the first and second information streams contains a fade which is not correctable with the error correction code and that data bits within the frames shifted in time by the TIME DELAY INTERVAL of FIG. 8 should be substituted for data bits contained within the faded information frames of the first and second parallel streams. Longer, natural or man-made interferences not correctable by error correction code having a duration of several microseconds or more are corrected by replacing the erroneous frames (faded information) of the first and second parallel streams which are received in the time interval during which a fade has occurred with non-faded frames which were received at a time displacement forward or backward equal to the TIME DELAY INTERVAL of FIG. 8.

Figure 8:
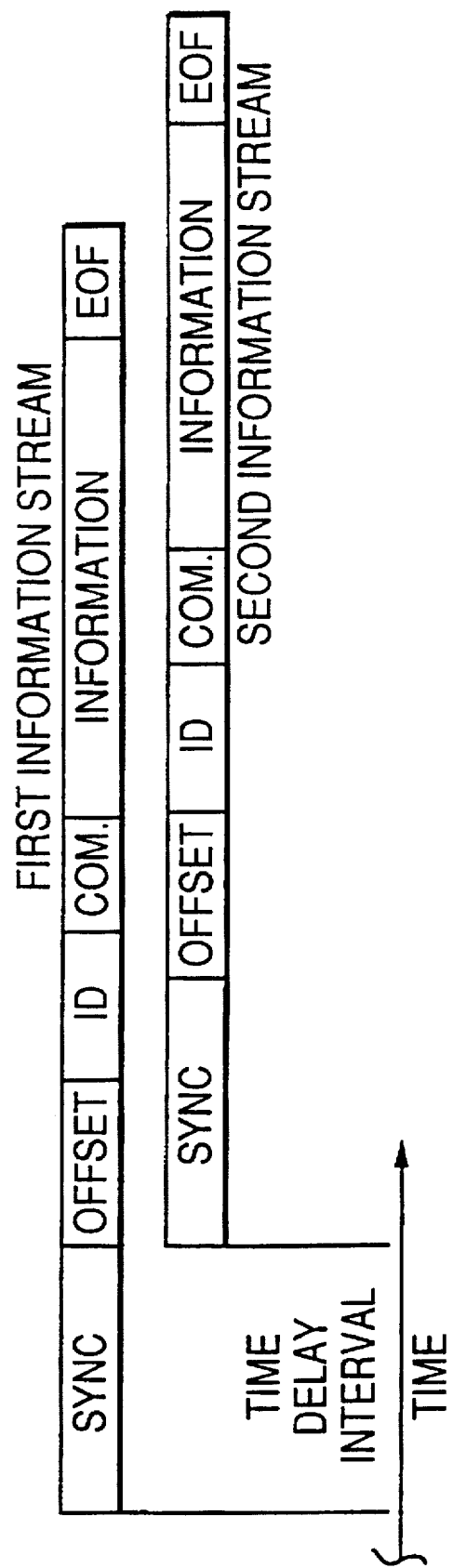
FIG. 8 illustrates time offset first and second encoded information streams which may be utilized for modulation of the subcarrier in accordance with the present invention.

Each of the time offset identical first and second encoded information streams of FIG. 8 are formatted in a series of frames each containing error correction code, such as BCH code, as is well known. The various blocks of information in FIG. 8 are comprised of groups of bits which are contained in at least one frame. The error correction code of each of the frames is processed by the receiving circuitry as described below to correct for minor bit errors caused by transmission such as a two bit error. Thereafter, the error correction code is discarded and the valid data bits are saved for further processing. If the bit error of a frame calculated by the receiving circuity exceeds the bit error correction capacity of the error correction code, the data bits of the frame are marked with an error marker as described below and corresponding replacement data bits from a frame time offset by the TIME DELAY INTERVAL of FIG. 8 are substituted to produce error free atmospherically transmitted data.

The invention relies on the probability being very low that the same portion (e.g., information units such as characters, graphics data, digital words, etc.) of the information within the frames of the first and second time offset parallel information streams will not fade below the electrical field discrimination capability of the receiving circuitry. Therefore, the overall receiving circuitry reliability is increased by orders of magnitude by using time offset information from the frames of the first or second parallel streams for replacing faded frames of information within at least one of the parallel information streams which contain an uncorrectable bit error detected by the processing of the error correction code in the frames of each of the first and second parallel information streams.

The present invention is fully compatible with analog and digital transmitters of the type commonly used for one-way message transmission (paging) throughout the world and analog and digital transmitting circuitry of the type used for two-way wireless transmission throughout the world. With the invention, the carrier is modulated with a subcarrier having individual cycles modulated by time multiplexing or simultaneously modulated with the frames of first and second encoded message streams as illustrated in FIG. 8 to produce the parallel streams as described above in FIGS. 7A and 7B and in conjunction with FIGS. 12 and 13 discussed below. The TIME DELAY INTERVAL is programmable by the encoder processor as described below in FIG. 15, by a system entry.

Figure 4D:
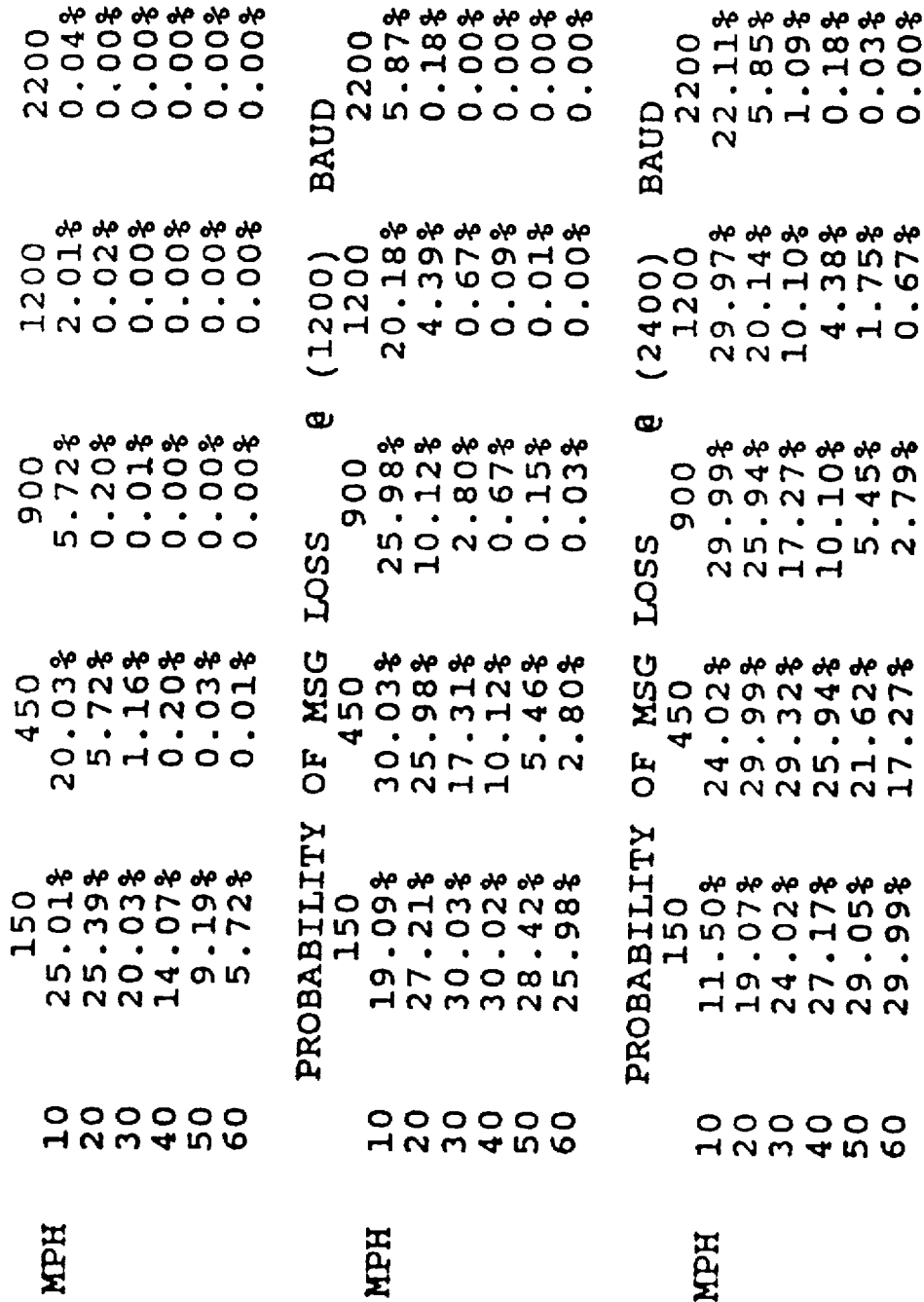
Figure 9:
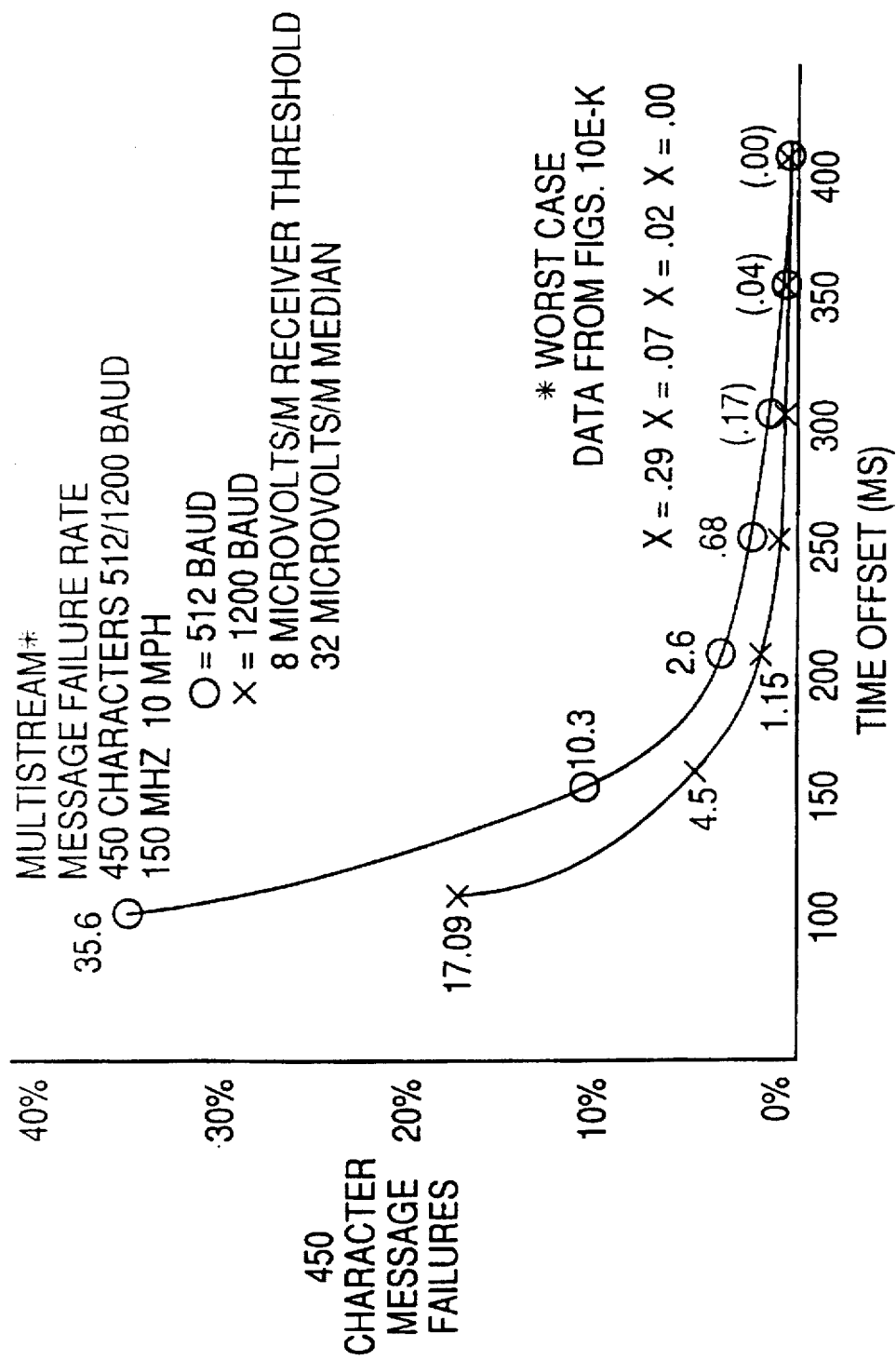
FIG. 9 is a graph of a worst case failure rate of 450 character length messages in accordance with the present invention.

FIG. 9 graphically illustrates the increase in transmission reliability when the TIME DELAY INTERVAL is increased. As illustrated in FIG. 9, the reliability of transmitting an error free message for a 450 character message increases to a probability of over 99.99% even at the lowest speed and operating frequency as compared to a probability of a message error rate well above 90% in the prior art as illustrated in FIGS. 4I and 5. Similar increases in the probability of the transmission of error free information in two-way wireless systems with an increase in the data rate of transmission and reduction of the required radiated power are achievable with the invention. Furthermore, the speed of transmission at an errorless rate of 99.99% approaches ten times or more the speed of the transmission of the POCSAG protocol and can utilize radiated power of ⅛th of that of the POCSAG protocol which permits far fewer transmitters to be used which produces substantial savings in the installation of the transmitting hardware and further permits frequencies allocated to IMTS transmitters to be used without modification for two-way wireless transmission.

The encoding format of the protocol of the present invention in either one-way or two-way wireless systems differs depending upon whether the transmitting circuitry is operating in analog mode or digital mode. When the transmitting circuitry is operating in analog mode, sinusoidal cycles of a subcarrier are modulated to produce the parallel first and second information streams which are transmitted with identical information units separated in time by the TIME DELAY INTERVAL specified by the OFFSET of FIG. 8. In the analog mode, the encoder modulates cycles of the subcarrier with multiple phase modulation such as, for example, as discussed above in conjunction with FIG. 7A so that a plurality of quadrants cycles of the subcarrier are modulated with the first encoded information stream and a plurality of quadrants of cycles of the subcarrier are modulated with the second encoded information stream to produce the first and second parallel information streams so that the identical information units contained within the identical first and second encoded information streams are transmitted with first and second parallel information streams separated by the TIME DELAY INTERVAL when error free transmission is required. The first encoded information stream preferably contains all of the bits encoding each unit of information and the second encoded information stream preferably contains all of the bits encoding each unit of information. Modulation of the subcarrier with the first and second encoded information streams produces the first and second parallel information streams which respectively contain the first and second information streams. A single cycle of the subcarrier is preferably modulated with the first and second information streams. Diphase quadrature modulation as discussed above in conjunction with FIG. 7A and below in FIG. 12 may be utilized with the first information stream modulating quadrants of a cycle of the subcarrier and with the second information stream modulating different quadrants of a cycle of the subcarrier. Alternatively, time multiplexing may be such that one or more successive cycles of the subcarrier are exclusively modulated only with the first information stream followed by one or more successive subsequent cycles of the subcarrier modulated exclusively with only the second information stream. When the transmitting circuitry is operated in a digital mode, digital or squarewave cycles of the subcarrier are pulse width modulated with the first and second information streams to produce the parallel information streams. The digital encoder of the transmitting circuitry modulates cycles of the subcarrier with pulse width modulation so that parts (positive and negative going parts of the subcarrier) of one or more cycles of a subcarrier are respectively pulse width modulated, as discussed above with reference to FIG. 7B and FIG. 13 below, with the first and second encoded information streams to respectively produce the first and second parallel information streams so that the identical information units contained within the first and second encoded information streams of FIG. 8 are transmitted in the first and second parallel information streams separated on the subcarrier with the TIME DELAY INTERVAL. Pulse width modulation may be used to encode a range of numbers representing a plurality of bits (e.g., four in FIG. 13) during the successive parts of a single cycle of a subcarrier to produce the first and parallel information streams or, alternatively, by modulating one or more successive cycles of the subcarrier exclusively with only the first information stream followed by one or more successive subsequent cycles of the subcarrier modulated exclusively with only the second information stream in a repeating pattern to produce the first and second parallel information streams.

An example of the first and second encoded information streams with wirelescoding as used in one-way wireless communications is illustrated in FIG. 8. The first and second (forward and back) encoded information streams are identical in information content to be received (the INFORMATION field), as well as other information required for transmission. Each encoded information stream contains a plurality of different parts. The encoding of the different parts in frames with each frame containing error correction code, such as BCH code, has not been illustrated to avoid complicating the illustration given the well known use of error correction code. The SYNC part is in accordance with the prior art such as, but not limited to, any known digital or analog protocol used in one-way or two-way wireless systems. The OFFSET is a command which commands the receiving circuitry to decode the parallel information streams with a time offset equal to the TIME DELAY INTERVAL between the first and second information streams with the time offset separating identical information and identical information units within the identical first and second parallel information streams during transmission by the transmitting circuitry. The numerical value representing the desired TIME DELAY INTERVAL is contained in the OFFSET field. The transmission of the numerical value of the TIME DELAY INTERVAL to the receiving circuitry in the OFFSET field is not necessary to practice the invention. The receiving circuitry may have a default or fixed TIME DELAY INTERVAL used throughout the one-way or two-way wireless system having sufficient time offset to insure an insignificant probability of loss of synchronism and message error. For example, as is illustrated in FIGS. 9K and 10K, if a 400 millisecond OFFSET is utilized, an extremely high probability of transmission of error free information exists. The receiver or transceiver ID is the number of the receiver or transceiver within the one-way or two-way data transmission system. Moreover, without limitation, a range of offsets between 50 milliseconds and 500 milliseconds may be used to practice the invention while producing the benefits of higher throughput, transmission without significant error and using less radiated power.

The SYNC and ID wake-up fields have multiple purposes. One aspect of the SYNC/ID fields is to permit the coexistence of the protocol with other radio messaging protocols on the same radio channel. Ninety-five percent of the current radio messaging infrastructure utilized for paging has multiple messaging formats which are intermixed in a non-time synchronized fashion. The protocol of the present invention coexists with other industry standard protocols and does not provide any form of interference or performance degradation. The same benefit of the invention also exists for two-way wireless systems.

The SYNC/ID fields are a binary data stream that permits the receiving circuitry to detect that information which is contained in the information field is to be transmitted. The SYNC field has the first two digits of the receiver's or transceiver's ID embedded into it. The digital signal processor of the receiving circuitry, as described below, detects and looks for a bit pattern match that matches its preprogrammed synchronization and the first two ID digits for a match. When a match occurs, the receiving circuitry turns on the balance of its electronics and begins the decoding process as described below. The SYNC/ID fields utilize the first two digits of the receiver's or transceiver's ID to provide as many as 100 different groups of receivers or transceivers to be accommodated on the same radio channel. The net effect of the two digit synchronization signal embedded within the SYNC field is to provide a significant battery savings to wireless receivers and transceivers. Only the group that is being signalled with the two digit ID match within the synchronization field is alerted resulting in the receiving circuitry being turned on. All other receivers or transceivers, which include those in 99 possible groups, will not detect a SYNC/ID digit match which results in the receiver or transceiver not being turned on to save battery.

The duration of the SYNC/ID wake-up fields is programmable on a customer basis. The duration of the synchronization signal is directly dependent upon the type of receiver or transceiver that is being utilized on the system. Variations of durations may be necessary to accommodate receivers or transceivers of different designs as the decoder technology advances in accordance with the present invention. The duration of the synchronization signal may be approximately 900 MS. As higher data rates are achieved, this duration may be shortened. The duration of the synchronization signal is dependent upon the channel sampling rate of the receiver or transceiver. If the receiver or transceiver must turn on (wake-up) once every 450 MS, and it requires two samples, then the minimum synchronization duration should be approximately 900 MS. The wake-up duration is directly dependent upon the amount of battery current savings in the receiver or transceiver that are desired. The more frequently the receiving circuitry wakes up to sample the channel the greater impact upon the receiver's or transceiver's battery life.

In the event that receiving circuitry is utilized which has the capability of receiving multiple channels under control of system broadcast commands as disclosed in the aforementioned patents, the selection of the 900 MS preamble for "local", single frequency receiving circuitry provides an added benefit to the multi-frequency receiver or transceiver.

As a multi-frequency receiver, such as the one described in the aforementioned patents, requires an additional 1800 MS preamble to successively scan 14 channels and successfully take two samples, the receiver does not wake-up to the local 900 MS preamble. This provides an added battery savings for multiple frequency receivers or transceivers that are capable of travelling when the protocol of the present invention is utilized. Any battery savings that can be afforded to multiple-frequency receivers or transceivers is significant. Multiple-frequency receivers or transceivers by design consume more battery power than single frequency receivers or transceivers. This is due to the fact that multiple-frequency receiving circuitry must scan and monitor more than one frequency during travelling and roaming operation between radio transmitting systems. Multiple-frequency receivers have experienced scanning rates of operation for three paging months per year (two regionally and one nationally), and therefore, spend approximately 25% of their receiving time in travelling mode of operation that can degrade the battery performance life span of the receiver. Assuming the same low battery drain technologies can be utilized in both single frequency and multiple-frequency receiving circuity, any additional battery savings that can be afforded are beneficial.

The protocol of the present invention provides such battery savings. By permitting the SYNC/ID wake-up length to wake-up only local single frequency receivers or transceivers is of significance. In a local radio messaging system, 85% of the receivers will be for local purposes. By design of the shorter local preamble to practice the present invention, the multiple-frequency receiver or transceiver utilizing the protocol of the present invention will not wake-up when local messages are sent. The local receivers or transceivers wake-up upon receiving the longer multiple-frequency frequency preambles. However, the battery impact due to the lower number of travelling receivers or transceivers is minimal.

The OFFSET command of FIG. 8 specifying the TIME DELAY INTERVAL used for decoding the first and second parallel streams is contained within each of the first and second encoded information streams. The OFFSET command, commands the receiving circuitry to time shift the detection of the first and second parallel information streams within the received transmission so as to permit the receiving circuitry's control processor to reassemble the information streams with proper timing in the event of an error which exceeds the error correction capability encoded within the first and second parallel information streams. The time OFFSET is received by the digital signal processor of the receiving circuitry as described below, is preconditioned and transmitted to the receiving circuitry control processor. The control processor utilizes its stored program (ROM or EEROM) to provide a reassembly of the first and second parallel information streams when and as necessary with the appropriate time offset as contained in the OFFSET field to reconstitute the complete information which was transmitted atmospherically from the information source without error. The processor of the transmitting circuitry adds the balance of the ID code which determines the unique address of the receiving circuitry within a receiver or transceiver. The identification code may be a total of eight digits long with two of the digits being contained within the SYNC field and six of the digits being contained within the ID field.

The COMMAND field of FIG. 8 is for the purpose of permitting the receiving circuitry to be programmed to operate in different modes of operation. The command may convey information to the receiving circuitry control processor to determine how the wireless receiving circuitry processes the information field which follows. The COMMAND conveys to the receiving circuitry whether the message information within the INFORMATION field is numeric, seven bit ASCII, eight bit ASCII, or sixteen bit ASCII (graphics or Chinese) or other information, such as digital words, etc. The COMMAND can also convey to the receiving circuitry whether the message is complete and/or is arriving in portions. The COMMAND can permit multiple messages or a long message to be broken into several shorter messages as needed. This feature may be necessary in systems with co-reside with other types of messaging terminal equipment and therefore, short duration messages may be assigned by the system controller of the transmitter.

The COMMAND field of FIG. 8 may indicate to the receiver or transceiver if the message is to be routed to an external device as described in the aforementioned patents and patent applications. This permits direct integration of a wireless receiver or transceiver within a laptop or personal computer.

The INFORMATION field of FIG. 8 of the first and second information streams contains the actual numeric, alphanumeric, graphics or other types of information that is to be conveyed to the receiver or transceiver or to an external device connected to the receiver or transceiver. The INFORMATION may comprise units of information, such as a four bit numeric nibble, seven bit ASCII, eight bit ASCII or sixteen bit characters that would be used for larger foreign character subsets (e.g. Chinese graphics information) in the case of facsimile transmission or other information, such as digital words, used for other purposes. The length of the INFORMATION field is variable to permit messages of varying length to be accommodated. The type information or data (e.g. four, seven, eight or sixteen bits, etc.) is determined by the previous COMMAND portion of the protocol.

The EOF command of FIG. 8 of the first and second information streams indicates to the receiving circuitry that the message beginning with the SYNC information includes the OFFSET, ID, COMMAND and information has terminated as of receipt of the EOF command. The EOF command also indicates to the receiving circuitry that information concerning the type of alerting (visual or audio response) that the receiving circuitry should initiate, such as an audible tone.

The programming of the TIME DELAY INTERVAL specified by the OFFSET field of FIG. 8 has a substantial effect on the probability that an entire message as represented by the first and second parallel information streams modulated in an analog manner, such as on multiple quadrants of a subcarrier as described above in conjunction with FIG. 7A and FIG. 12 below or in a digital manner, such as pulse width modulation as described above in conjunction with FIG. 7B or FIG. 13 below of parts of a subcarrier, are received by the receiving circuitry and processed to produce the transmitted information without an error. An error of greater than a predetermined number of bits which may be corrected by an error correction code such as two bits in the BCH error correction code of the POCSAG protocol causes the receiving circuitry to possibly lose synchronism with the information transmission and revert to a mode to search for the transmission of the SYNC and ID code as the beginning of another message. The dual and simultaneous transmission of the first and second parallel information streams modulating the subcarrier with a time OFFSET equal to the TIME DELAY INTERVAL, during the time interval required by the transmitting circuitry to transmit the information as described herein permits the receiving circuitry to substitute error free data from one or more frames which is time displaced from the information frames containing the erroneous data in one or more frames by the TIME DELAY INTERVAL set by the OFFSET field. As a result, the receiving circuitry always is in synchronism with the transmitted information and never reverts to the mode for searching for a new SYNC and ID code which may occur in the prior art when an erroneous number of bits is detected in one or more frames which is larger than the number of bits which may be corrected by the error correction code. Furthermore, the data bits within frames which are determined by processing of the error correction code to contain erroneous uncorrectable bits exceeding the bit error correction capacity of the error correction code, which are faded information, are corrected by the substitution of data bits from frames of the parallel information stream which is time displaced by the TIME DELAY INTERVAL as specified by the OFFSET field as described above.

FIG. 9 illustrates a graphical comparison of calculated worst case message failure rates for a one-way wireless system obtained from FIGS. 10A–K based upon the formulas described above as applied to the present invention. Similar information may be presented for two-way wireless systems. It should be noted that a detailed compilation of the failure rates for comparison of POCSAG to the present invention may be made by a comparison of the performance of the prior art POCSAG protocol as illustrated in FIGS. 4A–4J and 5 with that of FIGS. 9 and 10A–10K which are representative of the present invention as applied to a one-way wireless system. FIG. 9 represents the character message failure rate with the radiated power reduced to ⅛ of the radiated power utilized by the comparison of the prior art POCSAG protocol in FIG. 5. Increasing of the radiated power by a factor of 8 in FIG. 9 moves the curves representing 512 and 1200 baud rates respectively significantly to the left. In other words, corresponding message error rates for a higher radiated power occur with the time offset between the first and second message streams being smaller. With respect to FIG. 5, at a 512 baud data rate with 8 times the radiated power represented by FIG. 9, a probability of a message failure of the POCSAG protocol of 89% is predicted by the formulas described above. On the other hand, the probability of a message failure for both 512 baud and the higher 1200 baud data rate is such that the message failure rate is predicted to be less than 0.01%. As is apparent from FIG. 9, the choice of the time offset has a significant effect on the overall message failure rate. As a practical matter, choosing of a message TIME DELAY INTERVAL of FIG. 8 of 300 or greater milliseconds provides compensation for all types of atmospheric phenomena which cause fading of a transmitted RF signal to fall below a signal strength at which a semisynchronous receiving circuitry may maintain synchronism or receive the information without requiring a retransmission of part of the information, such as in prior art two-way wireless systems. The primary phenomena which the TIME DELAY INTERVAL compensates for are Rayleigh fading and multipath fading. However, by choosing the TIME DELAY INTERVAL to be of a time length significantly longer than the duration of any type of atmospheric fade having any significant probability of occurrence below the signal strength receiving capability of the receiving circuitry permits identical information, data, words, etc. which are time offset from the faded information by the TIME DELAY INTERVAL which is not subject to error to be substituted for the faded information, data, etc. within the time interval during which an atmospheric fade has occurred below the signal strength detecting capability of the receiving circuitry.

A comparison of the calculated probabilities of message loss between the prior art represented by the POCSAG protocol as illustrated in FIGS. 4A–J and FIGS. 10A–K representing the probability of message loss of the present invention as applied to a one-way wireless system reveals a improvement of several orders of magnitude in complete transmission of messages produced by the present invention. The overall benefits are a higher probability of a complete message being transmitted without message error, preventing the loss of synchronization between the parallel information streams being transmitted and the receiving circuitry which causes the reversion into a search mode for the transmission of a new sync and ID and the ability to transmit the information with reduced radiated power without having significant errors. As discussed above and below, the reduction in radiated power permits the transmitting facilities of the one-way wireless or the two-way wireless system to be significantly reduced in cost by permitting fewer transmitters or transmitters to be utilized to broadcast to a desired area.

FIG. 10A illustrates in a one-way wireless system the probability of message loss for a 450 character message with an 8 microvolt per meter (18 db) detection sensitivity, 90 microvolt/meter 39 db) median and a 50 MS offset as illustrated in FIG. 8. As is apparent from FIG. 10A, the message reliability is in excess of 95% for the worst case transmission frequency and receiver speed. Many combinations of frequency and speed produce significantly no probability of a message error. A direct comparison of FIGS. 4I and 10A demonstrates the marked increase in reliability produced by the invention in decreasing the probability of message loss occurring when compared to the prior art for the same combination of frequencies and vehicular speeds.

FIG. 10B illustrates in a one-way wireless system the probability of message loss for a 450 character message with 8 microvolt/meter (18 db) detection sensitivity, 130 microvolt/meter (43 db) median and 50 MS offset as illustrated in FIG. 8. The 50 MS offset for the first and second encoded message streams produces a worst case message reliability in excess of 99%. Many combinations of frequency and speed produce no significant probability of message loss. It should be noted that the 130 microvolt/meter field strength reflects a higher field strength than that often used in paging systems to increase signalling reliability. A direct comparison of FIGS. 4J and 10B reveals for the same combination of frequencies and speeds the significant improvement of the probability of a message being transmitted without loss.

FIG. 10C illustrates in a one-way wireless system the probability of a message loss for a 450 character message with 8 microvolts/meter (18 db) detection sensitivity, 90 microvolt/meter (39 db) median field strength and a 100 MS offset. The message reliability exhibits a worst case failure rate of 0.9% with most combinations of frequency and speed not having any probability of message error. A comparison of FIGS. 4I and 10C reveals the significant increase in the probability of messages being transmitted without message error with the present invention. Moreover, a comparison of FIGS. 10A and 10C reveals a significant increase in the probability of a message being transmitted without error when the time offset is increased from 50 MS, as illustrated in FIG. 10A, as compared to 100 MS in FIG. 10C.

FIG. 10D illustrates in a one-way wireless system the probability of message loss for a 450 character message having an 8 microvolt/meter (18 db) detection sensitivity, 130 microvolt/meter (43 db) median field strength and a 100 MS offset. The message reliability for all frequencies and speeds in the study was above 99.99%. A comparison of the data in FIGS. 10B and 10D reveals that the increasing of the offset from 50 MS in FIG. 10B to 100 MS in FIG. 10D significantly increases the reliability of the information being transmitted without any significant error to two decimal places for all combinations of frequency and receiver speed.

Figure 2:
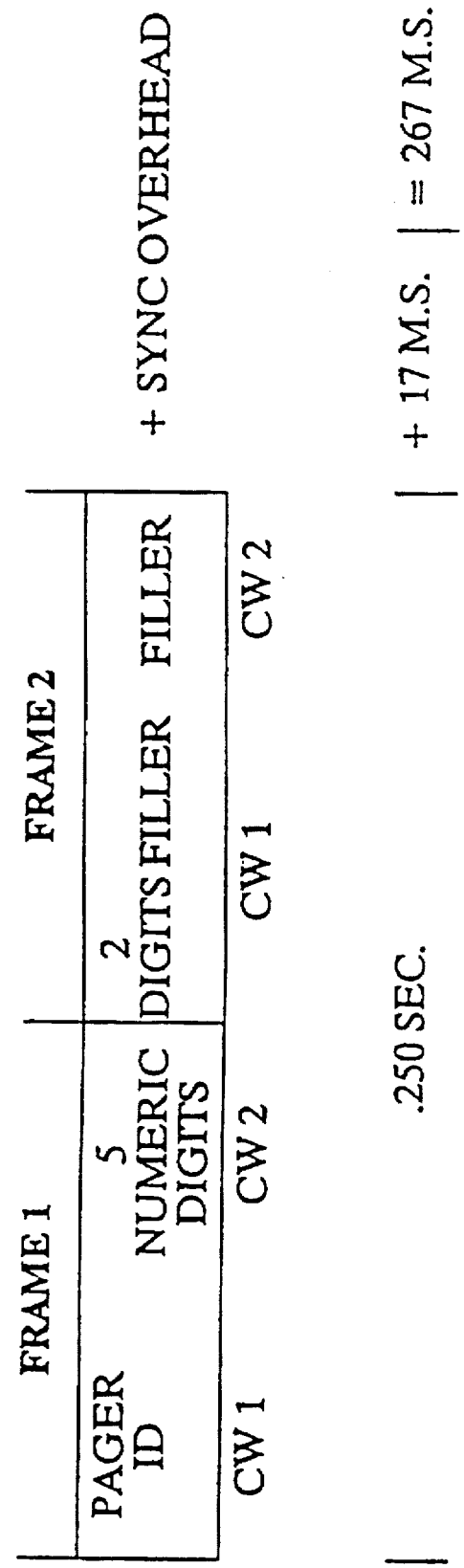
FIG. 2 illustrates a diagram of a typical seven digit numerical page using the POCSAG protocol.

FIGS. 10E–10K illustrate in a one-way wireless system the probability of message loss for a 450 character message having 8 microvolts/meter (18 db) detection sensitivity, 32 microvolts/meter (30 db) median with different combinations of time offset. Specifically, the time offset of the first and second parallel message streams of FIG. 10E is 100 MS, the time offset of FIG. 10F is 150 MS, the time offset of FIG. 10G is 200 MS, the time offset of FIG. 10H is 250 MS, the time offset of 10I is 300 MS, the time offset of 10J is 350 MS and the time offset of 10K is 400 MS as illustrated in FIG. 8. Significantly, the field strength of the radiated power in FIGS. 10E–10K drops by a factor of 13 db. This is a reduction of field strength from 130 microvolts/meter to a median field strength of 32 microvolts/meter which is significantly below the power level which is currently used to broadcast "pages" in the industry today. This represents approximately an increase of four times the median field strength and a reduced transmitted output power of eight times less power. A comparison of the worst case probability of a message loss in FIGS. 10E–1OK reveals 35.59% for FIG. 10E, 10.37% for FIG. 10F, 2.69% for FIG. 10G, 0.68% for FIG. 10H, 0.17% for FIG. 10I, 0.04% for FIG. 10J and 0.01% for FIG. 10K, with many of the combinations of frequency and speed producing no probability of message loss. It should be noted that the probability of message loss was greater for 512 baud than for 1200 baud. The worst case data illustrated in FIGS. 10E–10K respectively for 512 baud and 1200 baud was used to create FIG. 9 described above. The slope of the decrease in the probability of message loss for the worst case combination of baud rate, frequency and receiver speed demonstrates that the choice of the TIME DELAY INTERVAL of FIG. 8 permits almost complete control of the probability of message loss. Moreover, it should be noted that the programming of the TIME DELAY INTERVAL requires the entry of the time delay offset from entry four of FIG. 15 into the encoder 110 of the present invention with the TIME DELAY INTERVAL being programmable into the receiving circuitry of a receiver, transceiver or base station of the present invention from the OFFSET field of FIG. 8 described above. A TIME DELAY INTERVAL above 300 milliseconds does not have any significant effect on the rate of information transmission by the transmitting or data processing systems for the data represented by FIG. 8. In effect, the present invention provides an information transmission system with the functional attributes of significantly increased speed and significantly increased probability of message transmission without error at significantly lower power without any significant hardware or software modification of the current one-way or two-way radio frequency atmospheric transmission of information or data. The performance of the present invention is not obtainable in the prior art at any cost.

Figure 11:
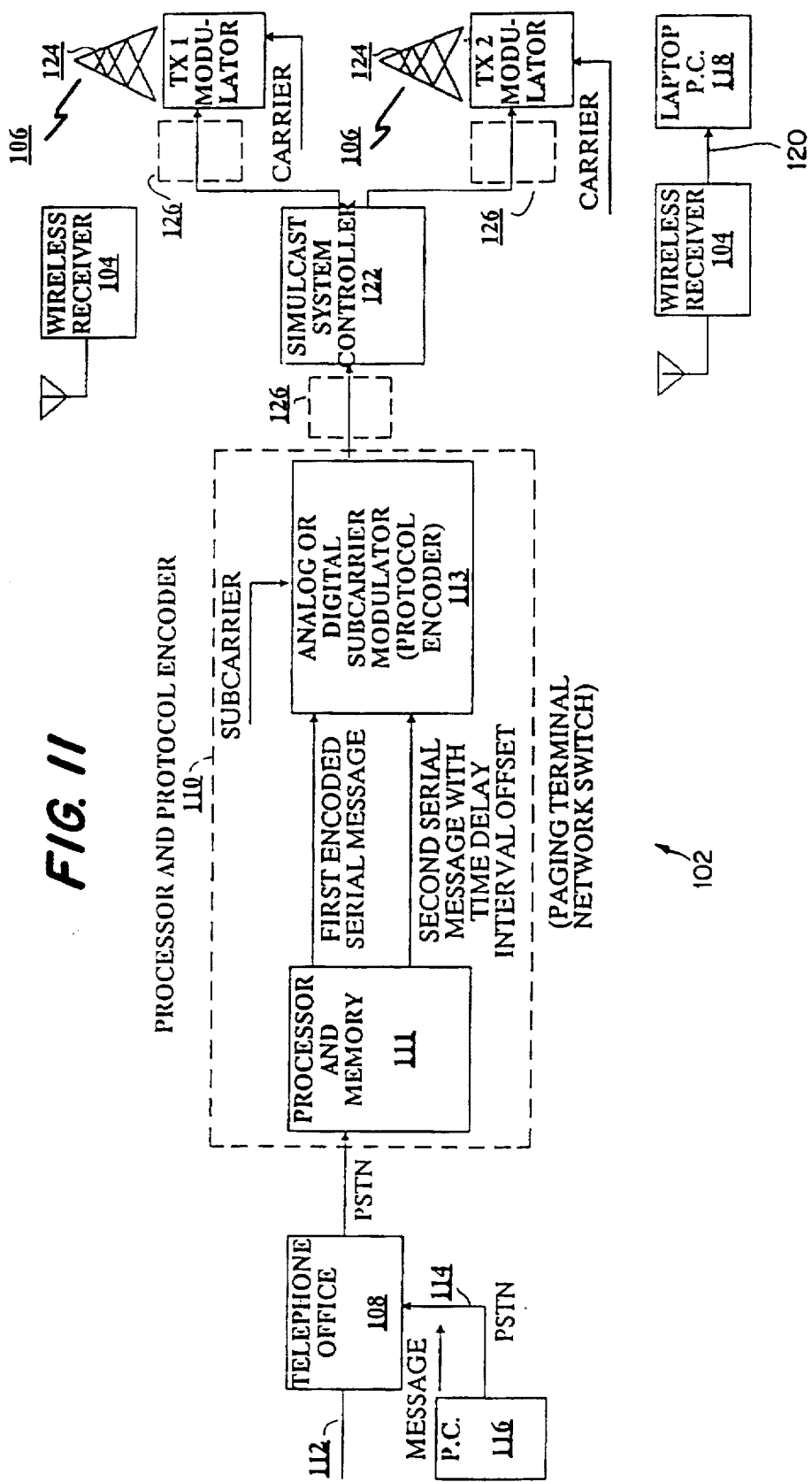
FIG. 11 illustrates a block diagram of a one-way information transmission system in accordance with the present invention.

FIG. 11 illustrates a block diagram of a one-way system in accordance with the present invention for atmospheric transmission of information on a radio frequency carrier 106 modulated with the modulated subcarrier of the present invention subject to fading for a time interval by a transmitter 124. Moreover, as discussed below, it should be understood that the invention may be utilized in two-way wireless systems in which a transceiver performs the dual functions of the processor and protocol encoder 110 and the wireless receiver 104. The system includes a signal processing system 102 for providing the modulated subcarrier of the present invention. The transmitters 124 provide atmospheric transmission of the carrier 106 modulated with the subcarrier of the present invention with the transmission of information being subject to atmospheric fading for a time interval to at least one radio frequency receiver 104. The carrier 106 is modulated with the subcarrier as discussed above in conjunction with FIGS. 7A and 7B and below in conjunction with FIGS. 12 and 13. The signal processing system 102 may be used to modulate the subcarrier with either analog or digital modulation to produce the time offset first and second encoded parallel information message streams as discussed above and below and broadcast by one or more transmitters 124 of either an analog or digital type as is in use in the infrastructure of one-way or two-way radio frequency transmission throughout the world. Information to be transmitted to the receivers 104 is gathered by a telephone communication through the public switched telephone network (PSTN) and transmitted by a telephone connection between the telephone office 108 and a processor and protocol encoder 110.

The processor and protocol encoder 110 is comprised of a processor and memory 111 which converts a serial message or information stream received from the telephone office 108 into the FIRST ENCODED SERIAL MESSAGE (INFORMATION) and the SECOND ENCODED SERIAL MESSAGE (INFORMATION) WITH TIME DELAY INTERVAL OFFSET which is preferably identical and must be identical to produce error free information. These messages have the format described above in FIG. 8. The time shift is produced under the control of a processor controlling storage in two sections of memory, as described below, and a time shifted read out of identical information or information units separated in time by the TIME DELAY INTERVAL. The FIRST and SECOND MESSAGES modulate cycles of an analog or digital subcarrier by an analog or digital subcarrier modulator (protocol encoder) 113 to produce the parallel first and second message or information streams with identical information or information units separated by the TIME DELAY INTERVAL time OFFSET as discussed above in conjunction with FIG. 8. The processor and protocol encoder 110 may be in accordance with FIG. 14 discussed below. The information to be transmitted may be without limitation inputted to the telephone office 108 through any one of numerous types of telephone connections 112 which is indicative of general inputs which may interface with an operator such as from a business office of a paging service or a telephone input from an E-mail network. Input 114 is connected to a personal computer 116 of any design which composes messages via keyboard or other peripheral device which are to be broadcast to the wireless receivers 104. In the transmission of E-mail messages, the message may be input from an E-mail service which is connected to a plurality of computers which have numbers in the E-mail service or directly from PC's 116 connected to the telephone office 108 for broadcast to a laptop personal computer 118 which is connected to the wireless receiver 104 by a serial data port connection 120 of the type typically available on a laptop PC such as an RS-232 data port. The information which comprises the message may be without limitation units of encoded numeric, alphanumeric, graphics information or any other type of information, such as digital words, etc. A conventional simulcast controller 122 controls a plurality of transmitters 124 for broadcasting an FM modulated carrier 106 which is modulated by the TX1 and TX2 modulators to produce an analog or digitally modulated carrier 106. The carrier 106 may be without limitation any of the narrow depth of modulation carriers used for one-way or two-way messaging such as those in the 150, 450 or 900 MHz. bands. Typically, a plurality of transmitters 124 are disposed around a geographic area within which reliable broadcast coverage is desired to provide the desired area of coverage. As is known, the distance which may be covered by a simulcast system comprised of a simulcast controller 122 and a plurality of transmitters 124 is limited to the line of sight distance between the transmitters 124 and the receivers 104. Modems 126 may be disposed between the processor and protocol encoder 110 and simulcast system controller 122 and the simulcast system controller and the plurality of transmitters 124 when the carrier is digitally modulated. The modems 126 perform the conventional function of converting the output digital signal from the processor and protocol encoder 110 and the simulcast system controller 122 into a audio bandwidth sufficient for transmission over narrow band audio lines such as telephone lines and back to digital at the far end. When the system utilizes analog transmitters 124, which do not require the presence of the modems 126, the processor and protocol encoder 110 provides a first encoded information stream which contains the information within a message or information stream to be atmospherically transmitted and a second encoded information stream which also contains the information to be atmospherically transmitted with the second information stream being delayed in time by the TIME DELAY INTERVAL as illustrated in FIG. 8 with respect to the first information stream which is equal to or greater than any statistically probable time interval of atmospheric fading. The information encoding protocol for use with analog transmitters is preferably multiple phase modulation of a subcarrier as illustrated FIG. 7A and in FIG. 12 and the information encoding protocol for use with digital transmitters is preferably the pulse width modulation of a subcarrier, as illustrated in FIG. 7B and in FIG. 13, to produce the parallel information streams each containing identical units of information offset by the TIME DELAY INTERVAL of FIG. 8.

The minimum TIME DELAY INTERVAL which should be used with the particular channel on which the carrier 106 is broadcast may be calculated in accordance with the calculation method as follows. However, the invention is not limited to determining the TIME DELAY INTERVAL by this calculation method with it being possible to determine the TIME DELAY INTERVAL by a trial and error basis or estimation. The fading rate is dependent upon motion of the receiver or transceiver and the wavelength of the operating frequency. Basically, it should be noted that slower speeds (e.g. 10 MPH or less), have a more severe reception degradation than faster speeds. This is due to the fact that as the receiver or transceiver is moving relatively slowly it spends more time in the null or a fade. The lower the operating frequency, the longer the wavelength, and the lower the fade rate. For example, the fade rate is approximately 2.2 Hz at 150 MHz. and 10 MPH as calculated by equation (1) above.

The fact that the receiver or transceiver passes through a wavefront does not necessarily indicate that the fade is below the receiver or transceiver threshold. Once the fade length, as calculated by equation (2) above, has been determined for the operating frequency and speed, the number of fades the receiver or transceiver experiences below the receiver's or transceiver's threshold is calculated by equation (3).

The probability of a catastrophic message failure having a fade of long enough duration below the receiver's or transceiver's threshold is calculated by solving equation (4) above assuming fades equal in duration to the time delay interval. Iterative solving of equation (4) substituting successively longer fades equal to the time delay interval is conducted until the probability of message loss becomes acceptable small. The calculated probability of catastrophic failure which is acceptable small permits the fade therein to be chosen as the TIME DELAY INTERVAL. For example, a 512 baud POCSAG message can only tolerate approximately 4 millisecond (3-bit) fade before catastrophic message loss occurs. The fade duration at 10 miles per hour, 150 MHz. has a median average as determined by equation (2) of 14 milliseconds. Therefore, it is apparent that a time shift of 50 milliseconds between the parallel information streams contributes significantly to the ability of the parallel information streams to overcome atmospheric fades. Long TIME DELAY INTERVALS provide protection against the longer duration fades such as greater than 300 milliseconds in FIG. 9 which are much less statistically probable but nevertheless can cause message or information loss. The median 14 milliseconds fade duration is only the median with the longer duration fades being on the skirts of the probability curve of the median fade duration.

From observing the statistical data, such as FIG. 9, it may be ascertained that the time offset required should be 20 or more times greater than the median fade duration as calculated by equation (2). In FIG. 9 this corresponds to approximately 300 milliseconds for 150 MHz. operation.

The probability of message loss is directly related to the length of the message. As FIG. 5 indicates, the shorter the message, the less the probability that the message occurs during the fade duration. Hence, the reason is apparent why seven digit, 512 baud POCSAG messages experience a 95% reliability rate. There is only a 5% probability of a fade being experienced by the receiver, during the receipt of that receiver's message. However, as the length of the message becomes longer, the probability increases considerably that one or more fades below the receiver, transceiver of base station threshold occur. For long messages (e.g. E-mail messages of 450 characters in duration), the probability is very high for message loss.

Optimally, as has been described above, the TIME DELAY INTERVAL may be calculated for each particular channel and include compensation for environmental factors which provide additional fading other than Rayleigh fading, such as fading caused by multipath or structures within buildings which cause severe fading. The TIME DELAY INTERVAL, as described above in FIG. 8 is system programmable by entry into the processor and protocol encoder 110 and may typically range from 50 to 500 milliseconds while producing the benefits of the invention. Additional time offset may be added to the TIME DELAY INTERVAL above which is calculated from the above-described calculations to compensate for or otherwise optimize the delay necessary to produce error free information transmission. The additional delay is stored as item five in FIG. 15 as described below. Such additional delay may be necessary in the event where the one-way or two-way radio transmitting system is subject to other natural or man-made interferences besides, or in addition to, Rayleigh fading. A typical example of such an optimization correction is for areas that have rough geographic terrain, large buildings that may precipitate severe multipath distortions of the information stream and internal building radio systems that may have radio path blockages due to metal obstructions.

When analog transmitters 124 are used, the processor and protocol encoder 110 modulates cycles of the subcarrier with multiple phase modulation which preferably encodes identical information or information units such as characters, data, digital words, etc., which comprise the first and second encoded information streams with a time offset of the TIME DELAY INTERVAL. In a preferred embodiment of the invention, cycles of the subcarrier are modulated with multiple phase modulation such as diphase quadrature modulation as illustrated in FIG. 7A and in FIG. 12 or octal phase modulation (modulation of the sinusoidal subcarrier at 45° increments) to produce the parallel information streams. The first encoded information stream contains at least part of the information to be atmospherically transmitted and the second encoded information also contains at least part of the information to be atmospherically transmitted. Preferably, as stated above, each of the encoded information streams contains the entirety of the message, data or information of the INFORMATION field of FIG. 7 (necessary to insure error free transmission) to be sent from its originating source to the one or more receivers or transceivers. A plurality of quadrants of each cycle of the subcarrier are modulated with binary levels, as illustrated in FIG. 7A and in FIG. 12 with both the first and second information streams. Alternatively, one or more successive cycles of the subcarrier are modulated with information exclusively from only the first information stream followed by modulating one or more successive subsequent cycles with information exclusively from only the second information stream. These patterns of modulation of one or more cycles of the subcarrier with only the first and second information streams repeat cyclically during the transmission of information modulated on the subcarrier with numerous permutations being possible. With reference to the multiple phase modulation of FIGS. 7A and FIG. 12, the processor and protocol encoder 110 modulates each of the phases 45°, 135°, 225° and 315° with a binary zero or one. The binary zero is the lesser amplitude 140 and the binary one is the higher amplitude level 142 illustrated in FIG. 12.

Different permutations of the modulation of each cycle of the subcarrier with the both first and second encoded information streams in analog form, as illustrated in FIG. 12, or digital form, as illustrated in FIG. 13, are utilized for practicing the invention as described below because there is no need to synchronize the receiving circuitry with the timing of the information stream as being modulated on the subcarrier. Alternatively, a single cycle of the subcarrier may be modulated with information from only one of the encoded information streams such that all quadrants of the subcarrier illustrated in FIG. 12 for transmission by an analog transmitter 124 are modulated with information exclusively from only one of the encoded information streams followed by a single cycle of the subcarrier being exclusively modulated with only the other of the encoded information streams. A plurality of quadrants of the cycle of the subcarrier may be modulated with the first encoded information stream such as the 45° and 135° phases and a different plurality of quadrants of the cycle of the subcarrier may be modulated with the second information stream such as the 225° and 315° phases as illustrated in FIG. 7A. In the circumstance where a first cycle is modulated exclusively with only information from one of the information streams, a second cycle may be modulated with information exclusively from only that same information stream, such as subsequent bits within a single character or with information from one or more additional characters followed by subsequent first and second cycles of the subcarrier being modulated with information from only the other of the two encoded information streams. The information may be successive bits of a character, a unit of information, data, or digital words, etc., or one or more successive characters, units of information or data or digital words, etc. It should be noted that other analog modulation protocols may be used to encode the first and second encoded information streams other than multiple phase modulation of the subcarrier. These protocols determine the throughput rates of information transmission. A doubling of the number of bits carried per cycle of the subcarrier doubles the throughput rate.

Alternatively, when a digital transmitter 124 is used, the subcarrier modulator 113 modulates cycles of the subcarrier with pulse width modulation, as illustrated, for example, in FIGS. 7A and 13, with each part or half of a cycle of the squarewave subcarrier being pulse width modulated with one of a plurality of discrete pulse widths to encode one of a range of numbers. A greater numerical range may be encoded on each half of the squarewave depending upon the ability of the digital signal processor of the receiver or transceiver or digital signal processor associated with a base station as described below to accurately integrate the width of each half of the subcarrier. FIGS. 7B and 13 illustrate the encoding of ½ of a cycle (part) of a squarewave subcarrier which has been modulated to encode sixteen possible numeric values. Other numerical values may be encoded especially in view of an increased signal to noise ratio provided by the digital signal processor described below. While the numeric values are illustrated in FIG. 13 as being encoded with a fixed incremental pulse width for each increase in level, it is possible, in accordance with the invention, when utilizing a digital signal processor, as described below, to process the received signal to reduce the signal to noise ratio and distortion to have the lower numeric values encoded with a wider pulse width than the upper numeric values. The time multiplexing of the modulation of the subcarrier with characters, data information, words, etc., from the first and second encoded information streams may be such that, for example, as illustrated in FIG. 7B, the first half of a cycle is modulated with only a plurality of bits (four bits, as illustrated in FIG. 13) from the first encoded information stream and the second half of the cycle of a subcarrier is modulated with only a plurality of bits from the second encoded information stream. Alternatively, the first and second halves of a single cycle of the squarewave may be modulated with information from only one of the encoded information streams followed by the first and second halves of the next cycle of a squarewave being modulated by information from the other of the encoded information streams. Moreover, a sequence of cycles of the squarewave subcarrier may be modulated with information exclusively from only one of the first and second encoded information streams followed by a sequence of cycles which are modulated with information exclusively from only the other of the first and second information streams. These patterns of modulation of one or more cycles of the subcarrier with the first and second information streams repeat cyclically during the transmission of information modulated on the subcarrier.

As is apparent, numerous permutations of modulation of the first and second parts of one or more cycles of the digital or squarewave subcarrier are possible with the first and second encoded information streams in practicing the invention. Moreover, increasing the number of numeric values or phases being modulated for a given subcarrier frequency, such as doubling the values, proportionately increases the information throughput transmission rate. Doubling the subcarrier frequency also doubles the throughput transmission.

The processor and protocol encoder 110 and operation thereof is further described below in conjunction with FIGS.

14 to 22. The receiver 104 is described below in conjunction with FIGS. 23 to 28. However, it should be understood that the present invention is not limited to the preferred embodiments of the processor and protocol encoder 110 and receiver 104 described below.

Figure 6:
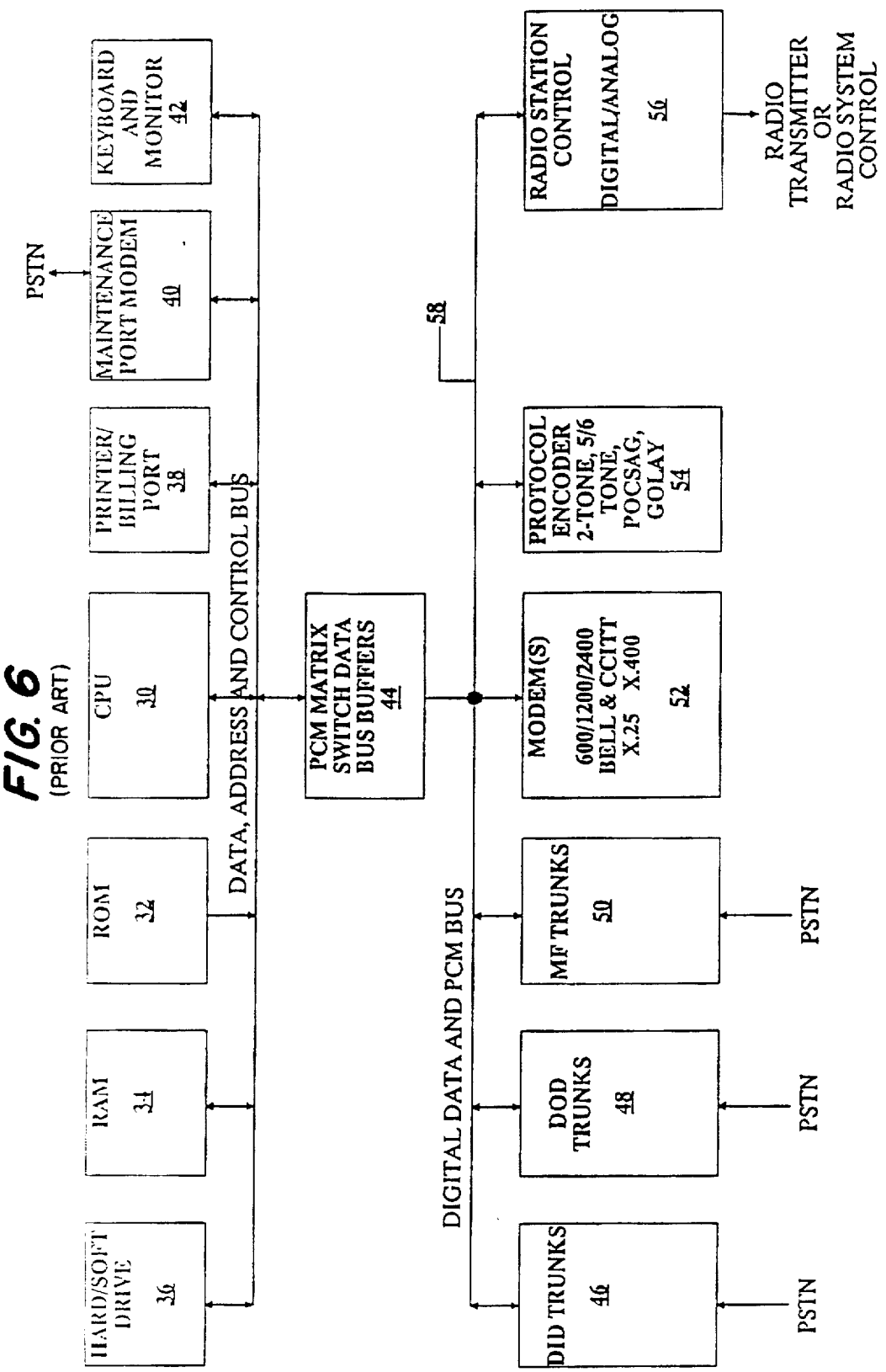
FIG. 6 illustrates a block diagram of a prior art processor and protocol encoder.

FIG. 14 illustrates a block diagram of the processor and protocol encoder 110 of FIG. 11. FIG. 14 is identical to the prior art of FIG. 6 except that a multiple phase and/or pulse width modulation encoder 100 is connected to the digital data bus 58 to permit the encoding of prior art protocols used for one-way and two-way messaging as well as the practicing of the present invention in encoding the analog or digital parallel information stream protocols as described above including with reference to FIGS. 7A and 7B and FIGS. 12 and 13. The same reference numerals identify like parts in FIGS. 6 and 14. The architecture of the multiple phase and/or pulse width modulation encoder 100 is described below in detail in FIG. 21. It should be understood that FIG. 14 represents only a single possible embodiment of the processor and protocol encoder 110 which may be used in practicing the invention.

An important aspect of the present invention is the modulation of cycles of the subcarrier with the first and second serial encoded information streams typically containing identical information time displaced on the continuous subcarrier by the TIME DELAY INTERVAL of FIG. 8 to produce the first and second parallel information streams as modulated on cycles of the subcarrier time displaced by the TIME DELAY INTERVAL. The transmission of parallel information streams on cycles of the subcarrier with the time offset of the TIME DELAY INTERVAL is a consequence of the two encoded time offset information streams of serial information modulating different phases or parts of a single cycle of the subcarrier in a repeating manner or time multiplex modulating different cycles of the single subcarrier in a repeating manner to produce modulation on the cycles of the subcarrier which, over a period of time, encode in parallel an entire message or block of information comprised of information units such as characters, data, digital words, etc.

In an analog mode of transmission, an example of the first and second parallel information streams may be visualized with respect to FIGS. 7A and 12. Each cycle of the analog subcarrier may be visualized as a repeat of FIG. 12 with four phase modulation to encode zeros 140 and ones 142 with FIG. 7A representing plural cycles of the subcarrier. If each cycle of the subcarrier is modulated by the first and second encoded information streams as illustrated in FIG. 7A, as also described in detail below when eight bit messages are separated into four bit nibbles, the first parallel information stream may be the information carried at the 45° and 135° positions in the first and second quadrants over a sequence of successive cycles of the subcarrier and the second parallel information stream may be the information at the 225° and 315° positions in the third and fourth quadrants over a sequence of successive cycles of the subcarrier. As described above, the first and second parallel information streams are preferably time shifted as modulated on the subcarrier such that identical information units within a message or block of information are separated by the TIME DELAY INTERVAL of FIG. 8. Two cycles of the analog subcarrier are required to transmit a complete eight bit character with the analog modulation of FIG. 12. Alternatively, one or more cycles of the subcarrier are modulated at the 45°, 135°, 225° and 315° positions of the four quadrants exclusively by only one of the encoded information streams to produce one of the parallel information streams followed by one or more cycles of the subcarrier being modulated at the 45°, 135°, 225° and 315° positions of the quadrants exclusively by only the other of the encoded information streams to produce the other parallel information stream over a sequence of cycles of the subcarrier.

The digital transmission of the first and second parallel information streams may be visualized with respect to FIGS. 7B and 13. One or more sequential halves or parts of the digital or squarewave subcarrier are modulated with one of the encoded information streams over a sequence of cycles of the subcarrier to produce one of the parallel information streams and one or more sequential halves or parts of the digital or squarewave subcarrier are modulated with the other one of the encoded information streams over a sequence of cycles of the subcarrier to produce the other of the parallel information streams with the above-described pattern being repeated. As described above, the first and second parallel information systems are preferably time shifted as modulated on the subcarrier such that identical information units within a message or block of information are separated by the TIME DELAY INTERVAL of FIG. 8 and must be so time shifted to produce error free information. Two cycles of the digital subcarrier are required to transmit a complete eight bit character with the digital modulation of FIGS. 7A and 13. However, as described above, a greater range of numbers may be encoded in each half of the squarewave subcarrier when the digital signal processor of the receiver, transceiver or receiving circuitry associated with a base station has the requisite integration capability as described below to detect a greater range of different modulation widths.

The purpose of the time offset protocol of FIG. 8, as utilized in analog or digital formats as described above and illustrated respectively in FIGS. 7A, 7B, 12 and 13, is to increase the probability that the receiver, transceiver or receiving circuitry associated with a base station receives the transmitted information or message correctly at high speed with a requirement of low radiated power. The protocol efficiently utilizes multiple phases, as described above with reference to FIGS. 7A and 12, when the transmitter is an analog transmitter and efficiently uses pulse width modulation as described above with reference to FIGS. 7B and 13 when the transmitter is a digital transmitter to transmit the first and second parallel information streams having identical units of information time offset by the programmable TIME DELAY INTERVAL of FIG. 8 to minimize transmission errors.

The error correction bits of each of the frames of the encoded parallel information streams help the receiving circuitry correct transmission errors in the event of short natural or man-made interferences that occur during the transmission such as, for example, as two bit error. Each frame is comprised of bits of information to be received by the receiving circuitry and bits of error correction code. The bits of error correction code may be without limitation in the form of a 32/14 BCH error correction code such that each frame is comprised of thirty-two bits of information having eighteen bits of data and fourteen bits of error correction code. However, when longer natural or man-made interferences occur that have a duration of several milliseconds or more, the receiving circuitry upon detecting the predetermined bit error in a frame such as a three bit or larger error, which results from a fade that may cause loss of synchronism and results in uncorrectable information, uses the two time offset parallel information streams to replace erroneous data bits in frames of one of the parallel information streams which contain bit errors which cannot be corrected with the error correction code with identical bits in identical information content frames from the other parallel information stream which are time offset by the TIME DELAY INTERVAL to provide error free atmospherically transmitted information and maintain synchronism.

The probability that the same portion of each message or information transmission time offset by the TIME DELAY INTERVAL which is encoded in the frames of the first and second parallel information streams will be missed is very low. Therefore the overall receiving circuitry reliability is increased significantly by utilizing this time offset methodology, as illustrated in FIG. 8, with a correctly chosen offset. FIG. 8 is a representative example of the time offset of the forward first and back second encoded information streams displaced in time by the TIME DELAY INTERVAL which is present in the parallel information streams modulating the subcarrier at broadcast. The TIME DELAY INTERVAL between the forward and back encoded information streams is system programmable by a system entry in the encoding controller as described below.

FIG. 15 illustrates a representative example of the various entries that are needed to optimize the encoding protocol efficiency. Entry one is the one-way or two-way wireless transmitting systems operating frequency in megahertz. The processor and protocol encoder 110, utilizes this numeric entry to produce the first and second encoded information streams with the time offset equal to the TIME DELAY INTERVAL necessary to overcome the effects of Rayleigh fading and other interference at the system frequency as described below. To this time calculation the encoding processor 110 adds a margin as represented by entry five to assure that the time offset is in excess of the variation rate of the Rayleigh fading and other interference at the system transmitting frequency. Entry two of FIG. 15 is a system-wide entry that indicates to the processor and protocol encoder 110 whether the characters, words, data, etc. should be sent to the radio transmitter, transceiver or base station system in a digital or an analog format. Entry three of FIG. 15 indicates to the processor and protocol encoder 110 what the maximum rate of transmission that the radio transmitter, transceiver or base station is capable of accommodating. The maximum rate of transmission is a limitation that is solely dependent upon the radio transmitter, transceiver or base station and is the frequency of the subcarrier. Transmission may be sent at any rate slower than the maximum rate to accommodate the various generations of receivers or transceivers that may have slower receiving circuitry. Entry four of FIG. 15 is a visual display only. It is to indicate to system personnel what the actual TIME DELAY INTERVAL between the forward first and backward second encoded information streams are in milliseconds. Entry five of FIG. 15 is a system-wide entry in the one-way or two-way wireless system that can permit additional delay to be added or subtracted to the delay in entry four. This is to allow system personnel to further add to the optimization of the data stream delay as necessary. Such an optimization delay may be necessary in the event where the radio transmitting system is subjected to other natural or man-made interferences besides, or in addition to, Rayleigh fading. A typical example of such an optimization correction would be for areas that have rough geographical terrain, large buildings that may precipitate severe multipath distortions of the data stream, and internal building radio systems that may have radio path blockages due to metal obstructions. Entry six of FIG. 15 is an entry that is common on wireless radio transmitting systems. There is a finite period of time required for the encoding controller or a simulcast system controller 122 in a one-way wireless system or in a two-way wireless system to send commands to the radio transmitters or base stations to turn on. This time delay can vary dramatically depending upon the system configuration. It may be as short as a few hundred milliseconds and as long as several seconds when numerous radio links are utilized to convey the transmitter or base station turn on information to the radio base station. This programmable entry allows system technicians to program the period of time or pause between the time the encoder sends the key transmitter or base station signal and begins the actual transmission of the protocol. Entry seven of FIG. 15 indicates to the encoding controller the configuration and/or presence of additional equipments that may be utilizing the same radio transmitting system. A multitude of different types of transmitter controllers and radio message encoders or paging terminals are present in the one-way and two-way wireless industry. There are very few industry standards as to the type of control between the two co-residing controllers for the radio channel. Therefore, this two character, alphanumeric entry permits a wide variation of timing as well as logic level interfaces to be utilized to permit co-existing with other paging and messaging equipments as well as two-way wireless equipment. Entry eight of FIG. 15 indicates to the encoder the duration that it will have access to the channel. In many systems it is required or desired to limit the amount of air-time utilized by either of the two controllers. This is to permit an opportunity for each to distribute the messages they have to the radio transmitting system of a one-way or two-way wireless system in a timely fashion. Entry eight also permits a level of safety for the radio transmitter of a one-way or two-way wireless system. It assures that in the event of a malfunction, the encoder will relinquish control of the transmitting system back to the co-resident controller within a fixed period of time.

The performance of the protocol of the invention, has a considerably improved message efficiency. FIG. 9 shows the worst case performance of both a 512 baud and 1200 baud multistream diphase quadrature modulation transmission represented by the data of FIGS. 10A–10K. The 512 baud rate is only shown for comparative purposes and the 1200 Hz. rate or higher frequency subcarriers are utilized for the protocol in practicing the invention. It can be observed that a marked decrease in message failures occurs as the time offset of the two information streams are offset approximately 300 milliseconds while providing for high data throughput rates. At 400 milliseconds the message reliability is in excess of 99.99%.

A second advantage of time offsetting the same units of information in the transmitted message streams is that the receiving circuitry can operate with a much lower median field strength. FIG. 9 represents a median field strength of only 32 microvolts per meter. The receiver threshold is 8 microvolts per meter, the same as the POCSAG example in FIG. 5. However, the median field strength for the multi-stream receiver is four times less than the POCSAG example. This represents a reduction in transmitted power of eight times less power to receiver reliability far in excess of the current serial protocols. This represents a significant savings in radio transmitter plant equipment to service a geographical area and may permit numerous FCC licensed frequencies which are not in commercial operation because of poor broadcast coverage to be commercially used without additional transmitter expenses. The same benefits are achievable when the invention is applied to a two-way wireless system.

It can be concluded that it is not the median field strength that increases the reception reliability. It is solely dependent on the radio message being time offset in parallel information streams in such a way to overcome the net effects of Rayleigh and multipath fading periodically reducing the field strength below the reception threshold of the receiving circuitry by providing replacement data during the periodic drops in field strength which avoids loss of synchronism. The multistream parallel protocol of the invention represents a receiving efficiency that is far in excess of any protocol that is currently available in the one-way or two-way wireless industry. It permits the reliable utilization of receivers, transceivers and receiving circuitry associated with base stations to receive long alphanumeric messages. The reception efficiency is so high that a one-way messaging system can be utilized in lieu of a two-way messaging system, and yet maintain the same reception reliability. This represents a further savings in radio transmission equipment and related processing equipment necessary to accommodate a two-way packet data architecture. Two-way systems suffer from the effect that a marked decrease in the number of subscribers per radio channel are typical. The protocol of the invention is considerably more air time efficient than the current one-way and two-way digital protocols. The protocol of the invention is almost an order of magnitude faster that the POCSAG protocol when transmitted at 1200 Hz. as compared to 512 Hz. POCSAG transmissions. However, the greatest advantage is in terms of message reception reliability and the ability to operate at significantly lower median field strengths in one-way and two-way wireless systems.

The time offset for the protocol of the invention requires that the message be copied and sent and time shifted to produce the first and second encoded information streams offset by the programmable TIME DELAY INTERVAL of FIG. 8. As previously indicated, the time offset would typically be without limitation in a range between 50 and 500 milliseconds between the first and second encoded information streams to obtain the highest message reception reliability. Since the first and second encoded information streams typically contain the same encoded information units which are time displaced by the TIME DELAY OFFSET of FIG. 8 at the time of modulation of the subcarrier, the first and second parallel message streams modulating the subcarrier have the same basic time displacement between the same information units contained in the frames producing the improved performance discussed above when the carrier is modulated with the modulated subcarrier, transmitted by RF broadcast and processed by the receiver, transceiver or receiving circuitry associated with a base station to replace bits of frames which contain at least one erroneous uncorrectable bit error in at least one of the received parallel information streams with bits of frames of unfaded information which are time offset by the TIME DELAY INTERVAL from another of the parallel information streams.

In order to prepare the message to be transmitted via radio to the receiver 104 or transceiver as discussed below, preprocessing of the message is necessary. This example is with reference to the sequential modulation of parts of the squarewave of FIG. 7B with a four bit nibble of information from the first and second information streams each having sixteen possible widths. In this example, the first half of the cycle of the subcarrier is modulated sequentially with information stored at system memory bit positions D0–D3 of FIG. 17 and the second half of the cycle of the subcarrier is modulated sequentially with information stored at system memory bit positions D4–D7 of FIG. 18. It should be understood that if eight bit ASCII characters are being sent, each information stream will take two successive pulse width modulations of the same part of each cycle to modulate a full character. In other words, sequentially over time the respective system memory bit positions D0–D3 and D4–D7 representing the modulation of a different part of each cycle of the subcarrier receive all bits of each information unit time shifted by the TIME DELAY INTERVAL. This process may use seven steps in order to prepare the message for transmission. They are:

1. The resident processor U1 illustrated in FIG. 21, of the processor and encoder and processor module 100 of FIG. 14 receives the wireless receiver's or transceiver's ID, command, message, and end-of-file marker from the main central processing unit such as the CPU 30. The message is similar to a portion of a single message stream in FIG. 8.

2. The resident processor U1 of the encoder and processor module 100 makes the conversion and calculations necessary to add the SYNC/wake-up and OFFSET command to the message to be transmitted. Two digits of the wireless receiver's or transceiver's ID are added to the SYNC/wake-up portion of the message. This permits an optimization of the wireless receiver's or transceiver's battery efficiency as previously described.

3. The resident processor U1 of the encoder and processor module 100 converts the eight bit ASCII message to two four bit nibbles, as illustrated in FIG. 16 by bit masking and moving system memory bit positions D4 through D7 to a following memory position. The memory processing may be performed in the RAM U17 and U43 of FIG. 21. As illustrated, memory A with the content of FIG. 17 and memory B with the content of FIG. 18 will store the identical information in the system memory bit positions D0–D3 and D4–D7 respectively as are contained in the system memory bit positions D0–D7 to the left of FIG. 16 which is made up of sequential eight bit words prior to breaking each eight bit information unit into four bit nibbles. As a result, each of the memories A and B will contain twice as many addressable groups of four bits for each information transmission as were present originally in the addressable groups of eight bits. It should be noted, as described below, that other methods of processing the bits of each information unit of the encoded information stream such as encoding all of the bits of each character of both of the first and second encoded information streams on a half cycle of the subcarrier are within the scope of the invention. The four least significant bits of the original eight bits D0–D7 of each information unit are stored in the first memory position of the forward memory A buffer and the remaining four most significant bits are shifted to bit positions D0 through D3 and stored in the second position of the forward memory A buffer. The entire message is converted to four bit nibbles and stored in the forward memory buffer. FIG. 17 represents the content of the forward first memory A buffer.

4. The resident processor U1 of the encoder and processor module 100 then copies the entire message that is stored in the forward memory A buffer, and the copy is stored in the back memory B buffer in system memory bit positions D4–D7. FIG. 18 represents the content of the second memory B buffer.

5. The resident processor U1 of the encoder and processor module 100 fetches the forward first message from the forward message buffer of FIG. 17, calculates the required TIME DELAY INTERVAL of the two message streams, as illustrated in FIG. 8, and fetches the back message from the second back message buffer of FIG. 18. The forward first message (bits D0 through D3) are combined with the second back message (bits D4 through D7). The dual information is stored in an intermediate memory buffer as illustrated in FIG. 19 with the messages separated by the TIME DELAY INTERVAL. The message stored in the intermediate buffer, as illustrated in FIG. 19, now has both the first and second identical messages stored and combined in such a fashion that the identical information units of the messages are offset in memory locations such that they may be read out with a time separation in milliseconds equal to the TIME DELAY INTERVAL of FIG. 8 to overcome fading effects.

6. The resident processor U1 of the encoder and processor module 100 fetches the previously combined forward first and back second messages from the intermediate memory of FIG. 19, and adds marker characters at each 20th character to be sent as illustrated in FIG. 20. The marker characters are added to permit the receiving circuitry processor U7' illustrated in FIG. 23 to determine blocks of characters for message reassembly when faded information in a frame is in excess of the error correction capability of the error correction code used in the frames encoding the forward first and back second data streams. The message(s) are stored in the transmission buffer memory. FIG. 20 represents the message portion stored in the transmission buffer memory. It shows the forward first encoded information stored in four bit nibbles stored in system memory bit positions D0 through D3 and the back second encoded information stored in four bit nibbles stored in system memory bit positions D4 through D7. As indicated in FIG. 20, twenty characters of the message are shown being C1 through C20. At parallel readout, the back second information characters are offset from their counterpart front first information characters by the desired TIME DELAY INTERVAL of FIG. 7. In the example of FIG. 20, upon parallel readout, the first character C1 of the back second message is readout with the seventh character C7 of the forward first message. The TIME DELAY INTERVAL is the time offset of identical information units of the encoded messages streams at parallel readout. For example, characters C1 and C7 of the back and forward messages are readout in parallel followed by parallel readout of succeeding characters in the back and forward messages. The parallel readout characters from the first and second encoded message streams (e.g. C1 and C7) modulate the subcarrier as described in the various ways described above. Typically, the TIME DELAY INTERVAL offset of FIG. 8 is such that the first character of the back message is considerably more delayed than the example indicates.

After the 20th character in both message streams, two marker characters are inserted. Marker character 1 (M1) represents a synchronization character that is not utilized for any other character. It typically represents all binary ones. The second marker character is actually a marker counter labeled MC. It counts from hexadecimal 00 through 255 and assists the receiving circuitry in locating the same message portions of the forward first and back second encoded messages when reassembly or replacement of the faded messages are required.

7. The resident processor U1 of the encoder and processor module 100 then waits for the availability of the analog or digital radio transmitter. Upon gaining access to the radio transmitter of a one-way or two-way wireless system, the resident control processor U1 of the encoder module and processor 110 fetches the message (s) or information to be transmitted from the transmission buffer memory and in the process of forwarding to the encoder adds the 32/14 BCH error correction code or other error correction code depending upon whether the application is in a one- or two-way wireless system to format the messages or information into a frame format with each frame comprised of data or information bits and error correction code bits. The message(s) are transferred to the multistream encoder and processor 100 for modulation on the cycles of the subcarrier in either the analog (e.g., FIGS. 7A and 12) or digital (FIGS. 7B and 13) format for radio transmission as described above.

Transmission markers, as described above, are inserted at every 20th character to permit reconstruction of the message stream in either the first or second parallel information stream. When messages exceed the 255 marker numbering (5100 characters), the marker counter resets to binary zero. The time for the transmission of the message in a serial fashion is such that cycling of the marker numbering from binary 0 to 255 does not exceed the maximum fade duration. The time for the markers to progress from binary 0 to 255 with a 1200 Hz subcarrier is approximately 6.1 seconds. This is far in excess of the optimum anticipated time offset of 50–500 milliseconds for reliable 150 MHz. operation. The required TIME DELAY INTERVAL of FIG. 8 is approximately inversely proportional as a function of frequency for high frequencies.

If the preceding cycle of the subcarrier contains all binary ones, the next cycle of the subcarrier is inverted to contain all zeros for the purpose of receiving circuitry synchronization. This is to insure that a cycle transition occurs during the end of the modulation of a half of a cycle of the subcarrier to insure that the digital signal processor U3', of FIG. 23 of the receiving circuitry, as described below, maintains synchronization during the synchronization window. If a transition does not occur during the synchronization window, the digital signal processor U3' maintains the precalculated sync and waits for the synchronization window to resynchronize the receiving circuitry to the incoming data stream. The stability of the internal receiving circuitry oscillator is such that approximately 600 consecutive synchronization transitions may be missing without causing a total loss of the received parallel information or data streams.

When the encoding mechanism is initially placed in service, certain system software located in the operating program of the main CPU 30 is forwarded to the encoder and processor 110. Specifically, timing information pertaining to the desired TIME DELAY INTERVAL offset of FIG. 8 required for the respective radio transmitting system is forwarded. This TIME DELAY INTERVAL offset is calculated or determined as described above, is in milliseconds and is a summation of the time offset calculated by the encoding mechanism from FIG. 15, item four, added to item five. The addition of both the data stream delay and the optimization delay permits a particular radio transmitter of a one-way or two-way wireless system to have the base TIME DELAY INTERVAL TIME OFFSET calculated by the main CPU 30 to offset the cumulative effects of fading. Item five of FIG. 15 permits system engineers to add or subtract an additional delay time to further optimize the system to meet case specific requirements. If necessary, entry for the data stream delay may be negated by a negative entry entered by a system engineer in item five to produce the optimized delay time.

The speed and the rate at which fading occurs is dependent upon both the operating frequency of the radio transmitter of a one-way or two-way wireless system and the speed and rate at which the receiver or transceiver is moving as described above. Both variables may be accommodated for by the two system wide entries that are displayed in FIG. 15. As mentioned previously, upon system initialization this time delay is forwarded to the encoder and processor 100 and is utilized to allow the board resident microprocessor U1 to prepare the preferably identical message data in the time offset dual information streams discussed above for transmission by the radio transmitter of a one-way or two-way wireless system.

The controller 122 or a network switch 602 of a wireless system, has knowledge of the operating frequency of the radio transmitting system to which it is connected. This permits the encoder and processor 100 to calculate and determine the TIME DELAY INTERVAL necessary as described above to maximize the transmission reliability to the receiving circuitry by overcoming the effects of Rayleigh fading, and natural and man-made interferences as described above.

The encoder and processor module 100 receives the following information from the main processor 30:

1. One or more messages with the same preamble.
2. The ID code of the receiver(s) or transceiver(s).
3. A command from the main CPU 30 subscriber file (by default) or a command that has been received by the message originator.
4. The message text which may be four bit (nibble) numeric information, seven, eight, or sixteen bit ASCII or graphics information or other information.
5. The speed of data transmission.
6. The mode of data transmission (analog or digital).
7. Optionally, a special EOF command.

Figure 21:
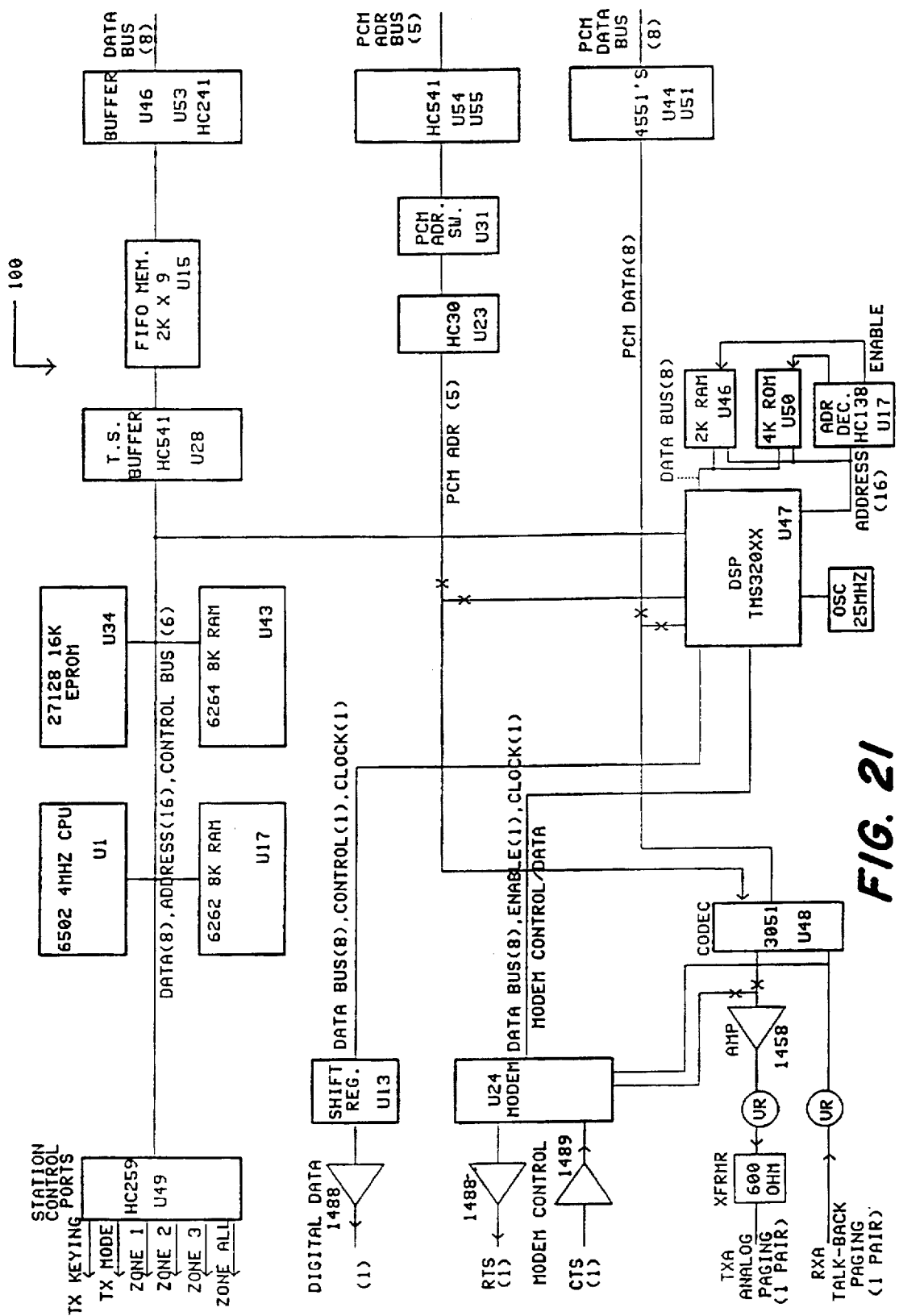
FIG. 21 illustrates a circuit schematic of the transmitting circuitry of the present invention.

The resident control processor U1 of FIG. 21 in the encoder and processor module 100 adds the following information to the message stream during the encoding process:

1. The time OFFSET command.
2. The 32/14 BCH error correction code or other error code chosen for the one-way or two-way wireless application to format the frames for modulating the subcarrier.
3. The offsetting of the dual transmitted parallel information streams.
4. Marker characters to permit comparison between streams.
5. The EOF termination command.

The microprocessor U1 takes the eight bit ASCII information and splits the information into four bit nibbles. The nibbles are transmitted with the lower least significant bits, followed by the higher most significant bits of each character. The microprocessor U1 then stores this information in random access memory U17 and U43 as illustrated in FIG. 17. A calculation is made of the required TIME DELAY INTERVAL of FIG. 7 necessary between the parallel streams as described above. The microprocessor U1 also has preprogrammed the maximum transmission rate of the radio transmitter of the one-way or two-way wireless system, and therefore can readily calculate the necessary time shift provided by the TIME DELAY INTERVAL of FIG. 8 required to optimize the transmission efficiency. The microprocessor U1 then replicates the divided four-bit data stream into another area of RAM that corresponds to the actual required time offset as illustrated in FIG. 18. Thereafter, processing is completed involving storage in the RAM as illustrated in FIGS. 19 and 20.

FIG. 21 illustrates an encoder and processor module 100 block diagram containing the necessary electronics to interface the digital highways from the main control CPU 30 and process the information for transmission to an analog and/or digital one-way radio system such as that of FIG. 11 or a two-way radio system such as that of FIG. 34 described below. The encoder and processor module 100 contains the interface electronics necessary to meet the many diverse interface requirements that are present in the one-way and two-way radio transmitter industry. Data arrives from the central processor 30 via the eight bit DATA BUS to buffer circuits U46 and U53. The message data or information is temporarily stored in a "first in, first out" memory that provides a form of elastic storage for the board resident processor U1. When the board resident processor U1 is alerted that information exists in the FIFO memory, the data is transferred and stored via the data address control bus to RAM memories U17 and U43 for processing. Upon system initialization, the board resident processor U1 is alerted as to the default transmission speed to which messages will be sent, and also a default mode of data transmission (analog or digital). The board resident processor U1 has a stored program that controls the encoding process as described above that is contained in EPROM U34. The message and ID that is received as previously described from the control processor 30, is then converted to the dual first and second encoded message stream architecture described above. Upon completion of the splitting and storage of the eight bit ASCII data into two four bit nibble streams as described above and illustrated in FIG. 20, the control processor U1 attempts to gain access to the radio transmitter of the one-way or two-way wireless system such as that illustrated in FIG. 11 or FIG. 34 described below. Depending upon the interface configuration, the resident control processor U1 searches for a status control signal from either the radio base station or the external simulcast controller 122 or two-way wireless controller or network switch 602 via the clear to send line or station busy signal as it is commonly referred to in the industry. Upon determining that the radio transmitter 124 of a one-way wireless system or a transmitter of a two-way wireless system is not busy, the resident control processor U1 keys the radio transmitter by a digital logic signal that is sent by a control latch U49.

It may be necessary to send several signals to the one-way or two-way radio transmitter from the control latch U49 depending upon the system configuration. A second logic signal called "mode" may also be sent to indicate to the radio transmitter or the simulcast controller 122 of a one-way wireless system or transmitter or network switch of a two-way wireless system if the desired message is to be sent in an analog configuration or in a digital FSK or PWM configuration. In many system configurations transmitter zones are also utilized and one or more of the zone outputs may be enabled to select the required transmitting area to transmit the message.

Upon completion of the turn on sequence of the radio transmitter of the one-way or two-way wireless system, the board control processor U1 sends the message data and a mode command to the digital signal processor U47. U47 is a board resident co-processor that encodes the subcarrier with the multiple phase or PWM protocol, as described above, or other forms of analog or digital protocols by the system parameters that have been sent to the board resident processor U1 by the main processor 30. The encoding format, as described above and error correction routines, such as the 32/14 BCH error correction routine to format the frames in a one-way wireless application or other error correction routine in a two-way wireless application, that needs to be added to the dual streams of information reside in a resident stored program memory U50. In the example given above, four bit nibbles of the message are sent in sequential order by the board resident processor U1 to the digital signal processor U47 for processing. The message is temporarily stored in the 2K RAM buffer U46 and as the digital signal processor forwards the information to either the digital shift register U13 to produce the digital format of FIGS. 7B and 13 for transmission by a digital transmitter, or to the CODEC U48 to produce the analog format of FIGS. 7A and 12 for transmission by an analog transmitter.

The digital signal processor U47 also has access and is capable of generating modem tones by accessing the board resident modem U24. The output of the modem is then connected to the analog ports via data switches for transmission to the analog radio transmitting system.

With system configuration information that resides in the control program of the main processor 30, numerous interface configurations may be obtained by the encoder and processor 100 to a one-way radio transmitting system such as that of FIG. 11 or a two-way wireless system such as that of FIG. 34 described below. The encoder and processor 100 also has the ability to receive data from other modules that may exist in the encoding mechanism. That information arrives from the PCM DATA bus and can be sent via an analog switch directly to the CODEC U48 for transmission to the analog radio transmitting system. This connection to the external digital PCM highways can permit voice messaging or other analog paging tones to be sent from the synthesizer module. As many messaging systems have multiple formats that co-exist on the same radio transmitter, 2-tone signaling, 5/6 tone signaling, DTMF signaling, POCSAG and Golay formats and two-way formats may also be transmitted by the processor and encoder 100 via these external PCM ports.

The digital signal processor U47 may also send digital data directly back to the PCM DATA bus to another module. In the event that a purely analog system with multiple analog radio channels is utilized, the digital signal processor U47 digital data may be sent to a dual channel board module (not illustrated). If frequency agile receivers or transceivers are utilized, this is the preferred mode of interface to the multiple radio transmitters. One encoder module can be utilized to gain access to numerous radio channels without the need for additional encoder modules.

Upon completion of the transmission of the message, the digital signal processor U47 alerts the board resident control processor U1 that the message is complete. The board resident control processor U1 then signals the main processor 30, via control signals and the eight bit DATA bus, that it is ready for transmission of new messages.

Figure 34:
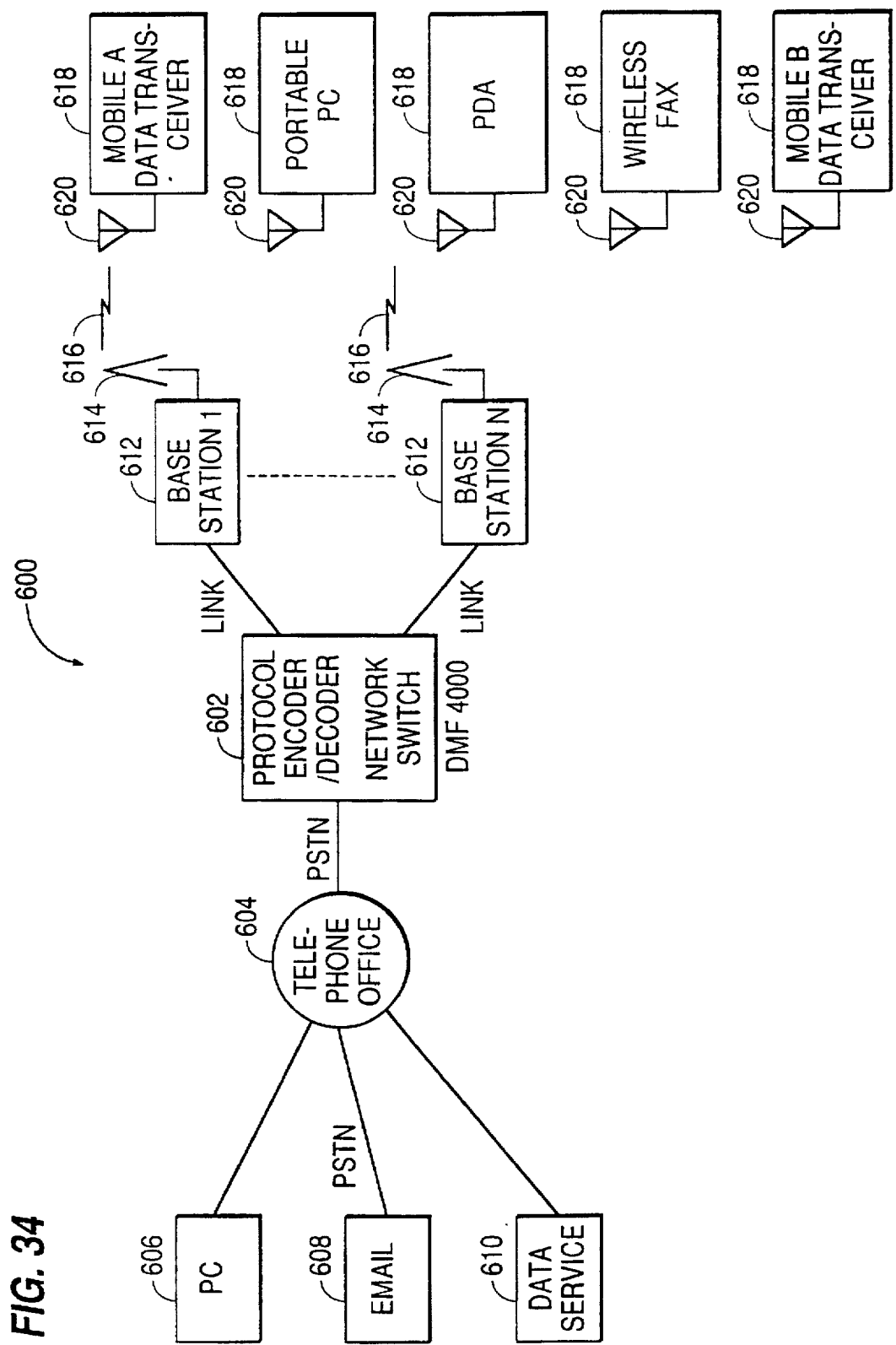
FIG. 34 is a block diagram of a two-way wireless information transmission system in accordance with the present invention.

When the message is ready for transmission, the one-way system controller 122 of FIG. 11 or network switch 602 of FIG. 34 requests access to the radio transmitter facility and begins the transmission process. Often times the one-way radio controller mechanism 122 or two-way network switch 602 must co-reside and/or exist with other radio control equipments and share the same radio transmission facility. Such co-existence is commonplace in the industry and is accomplished by cross connecting the equivalent of clear to send and ready to send control signals with each other to permit the two system controllers to co-exist without conflict or collision. This co-existence permits messaging facilities to utilize many other types of radio equipments that they may currently have. The control mechanism and protocol can co-reside and co-exist with the hundreds of various signaling protocols that are currently being utilized in the industry today.

When the transmitter 124 is available for use by the system controller 122 in a one-way wireless system or the transmitter for use by the network switch 602 or controller in a two-way system is available, the transmission of the protocol begins. The encoder module microprocessor U1 fetches the eight-bit data from random access memory and forwards it to the modulator. The eight-bit information consists of four-bits of Word A, and initially, four-bits of filler code if this is the very first transmission to be sent.

A typical message to be transmitted to a wireless receiver or transceiver is similar to the individual first and second encoded messages of FIG. 8. It consists of the SYNC signal that has a net effect of synchronizing the respective receivers 104 or transceivers 700 to prepare to receive a message if a preamble group match occurs. The SYNC signal is followed typically by the ID or address of the particular receiver 104 or transceiver 700 to which the message is being transmitted. Utilizing the first two digits of the receiver's or transceiver's ID as a synchronization signal, and alerting only one of the 100 preamble groups of receivers or transceivers increases the air time efficiency of the protocol. The SYNC/wake-up is then followed by the time OFFSET command that alerts the receiver 104 or transceiver 700 to the TIME DELAY INTERVAL offset of the forward first and back second encoded message streams. The balance of the ID code follows the time offset command. The ID code is followed by the COMMAND that alerts the receiver 104 or transceiver 700 as to the type of message and specific handling instructions. The COMMAND is followed by the actual INFORMATION which may be of any type to be forwarded. Upon completion of the transmission of the INFORMATION, the end of file termination information EOF is sent to the receiver 104 or transceiver 700 to indicate completion of the transmission.

The SYNC signal is sent at the subcarrier rate that has been previously programmed into the encoding controller by entry three of FIG. 15. The SYNC signal's purpose is to alert the digital signal processor U3' in FIG. 23 in the receiving circuitry that information is forthcoming, and also serves as a battery saving technique to wake-up only the receivers 104 or transceivers 700 assigned to that particular prefix or synchronization group. This has a net effect of providing a tremendous battery savings, as only a portion of the receiver or transceiver in a system wake-up at this point and consume battery current. All receivers or transceivers that do not see the SYNC signal pattern that corresponds to its synchronization code and two digits of the ID code remain in a low current sampling mode.

The receivers 104 or transceivers 700 that have now received the SYNC signal are now awaiting the balance of the message INFORMATION. The synchronization words are followed by the OFFSET command. This alerts the microprocessor U1 in the receiver or transmitter of the amount of time shifting of the upper and lower nibbles of the same unit of information in the first and second parallel information streams. This is to permit the receiver or transceiver to look into its stored memory U8' to determine and to be able to calculate the time offset of the first and second parallel information streams to reconstruct missing faded portions of the message caused by atmospheric dropouts, interferences or other types of fades causing faded information parallel in one or the other of the parallel information streams.

The time OFFSET command is followed by the balance of the identification code of the desired wireless receiver 104 or transceiver 700. The ID code will have eight digits with two of the digits being placed in the previously described SYNC signal to maximize the battery efficiency of the wireless receivers or transceivers. The ID code is followed by a COMMAND code. The command code alerts the receiver or transceiver as to the nature or type of information that is about to follow. It can request that the receiver or transceiver store the information internally, or direct it to an external port to a peripheral device, such as a laptop PC 118, and also convey information to the receiver as to the nature of the type of message. For example, the COMMAND alerts the receiving circuitry that the information to follow is seven-bit ASCII information, eight-bit ASCII information or sixteen-bit information (in the event of graphics or Chinese characters or other information), digital words, etc.

The message INFORMATION follows the COMMAND. The message can be of variable length and is interlaced with additional framing, information words, and error correction code to maintain the integrity of the data stream. Upon completion of the message, the EOF or end of transmission words are sent to indicate to the receiver 104 or transceiver 700 the termination or completion of the message text.

The encoding controller U1 of FIG. 21 has calculated or specifies the time offset of the TIME DELAY INTERVAL for the first and second parallel information streams formed by modulation of the subcarrier with the first and second information streams as illustrated in FIG. 8. This TIME DELAY INTERVAL offset is based upon the Rayleigh fading effects at various radio transmission frequencies. This calculation takes into account the operating environment of the receiver 104 or transceiver 700. In areas where severe signal degradations may occur due to multipath or man-made interferences (such as harsh terrain or an office building environment), it can be further modified by system personnel to include an additional time offset to optimize the message reception reliability as described above with reference to entry five in FIG. 15. In the multiple phase embodiment using diphase quadrature phase modulation, phases one and two over a sequence of cycles of the subcarrier corresponding to FIGS. 7A and 12 are modulated with the first parallel information stream. At the calculated TIME DELAY INTERVAL that is determined by the encoder and processor 100 microprocessor U1, phases three and four of FIGS. 7A and 12 are modulated with the second parallel information stream which contains information identical to the first parallel information stream.

The time shifted protocol increases the probability for reliable (error free) reception by the receiving circuitry by orders of magnitude. If the receiving circuitry misses any portion of the first parallel message stream, the second parallel message stream takes precedence in the decoding process. If portions of one or the other of the first and second parallel information streams have erroneous faded information due to Rayleigh fading effects, multipath interference, natural or man-made interference, the receiving circuitry's microprocessor U7' reassembles unfaded (error free) portions of the properly received message time offset by the TIME DELAY INTERVAL to replace the erroneous information. Further explanation of this decoding process by the receiving circuitry follows.

The protocol interfaces with radio transmitters of either one- or two-way wireless systems in either a digital or analog subcarrier modulation format. The protocol may be sent via analog or digital radio transmitters. This hybrid transmission protocol is beneficial due to the fact that there exists, both domestically and globally, an almost even distribution of both analog and digital radio transmitters in one-way and two-way wireless systems. Typically, large metro city radio transmitting systems in one and two-way wireless systems can accommodate both analog and digital signaling protocols. Smaller and rural paging systems may typically be exclusively analog in nature. Private paging systems such as municipalities, factories, and hospitals typically utilize analog radio transmitters because analog radio transmitters are lower in cost. When the digital format is utilized, the characteristic clear to send, ready to send and digital data output of the protocol controller U1 is connected typically to a modem. Currently, the one-way and two-way wireless industry uses 1200 baud asynchronous modems quite extensively and the design of equipment in accordance with the invention emphasizes immediate compatibility with the current radio messaging infrastructure. When connected to a digital radio base station in a one-way or two-way wireless system, the encoder and processor 100 changes the pulse width of the subcarrier as illustrated in FIGS. 7B and 13 to encode a selectable number within a range of numbers during each half cycle of the subcarrier to modulate the first and second parallel information streams formed of information units such as, but not limited to, four bits as described above. Various widths of the subcarrier encode different numbers which cause positive or negative deviation of the FM radio transmitter. By varying the width of each part of the subcarrier pulse width modulated encoded units of information, such as four bit nibbles, are modulated upon the subcarrier.

There is movement in the industry underway to increase the subcarrier frequency of the radio transmitters from 1200 Hz. to 2400 Hz. and beyond. It is for this reason that the variable data rate has been designed into the format. As faster modulation rates are obtained by the radio transmitter manufacturers in one-way and two-way wireless systems, the protocol of the invention can be increased accordingly to increase the data throughput rate.

The encoding controller U1 also has the ability to be directly interfaced to an analog transmitting system in a one-way or two-way wireless system. The encoding controller U1 contains a modem capable of encoding in the example of FIG. 7A a dibit, diphase protocol for each parallel information stream if both parallel streams are modulated on each cycle of the subcarrier. It is directly connected via a radio link or wire pairs to the radio transmitter 124 in a one-way wireless system or to the radio transmitter 614 in a two-way wireless system as discussed below in conjunction with FIG. 34. When the encoding controller U1 is utilized in an analog fashion, an example of the wave form of the data stream appears as shown in FIGS. 7A and 12. Each of the four phases (45°, 135°, 225°, 315°), represents a part of one of the first and second parallel information streams that may contain a binary zero or one. The binary one 142 is the higher of the two amplitudes and the binary zero 140 is the lower in FIG. 12. This permits multiple bits of data to be sent in parallel with their respective significance in the data stream being phase related. In the parallel data streams, the 45° and 135° phases represent the first forward parallel information stream, and the 225° and 315° phases represent the back second parallel information stream. The choice of the number of phases which are modulated and which phases are modulated by the first and second parallel information streams may be varied in practicing the invention.

The transmitting methodology of the present invention is both analog and digital radio transmitting system compatible in one-way and two-way wireless systems. If further meets the required telephony bandwidths and the existing infrastructure of radio transmitter requirements to assure compatibility in the current marketplace.

The net result of the encoding mechanism is such that it permits rapid implementation of the protocol with minimal capital expenditure to permit the messaging facility to gain entry into the profitability of alphanumeric information and E-mail services. The efficiency of the protocol permits a paging facility with a single frequency transmitting facility or a two-way wireless system that is currently air time restricted while accommodating numeric paging subscribers to rapidly gain additional air time to entertain new services and subscribers.

Figure 22:
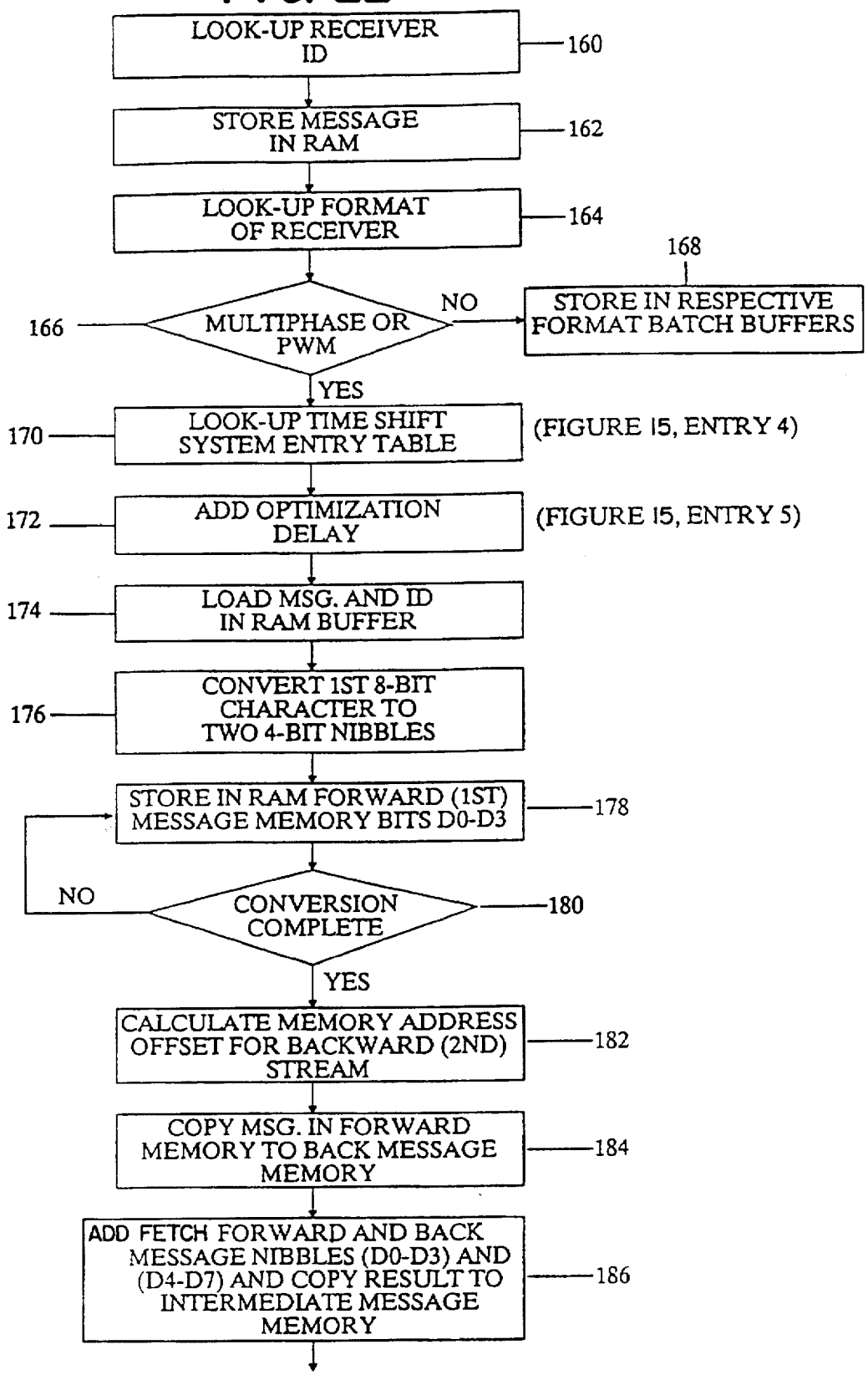
FIG. 22 illustrates a flowchart of the operation of transmitting circuitry of FIG. 21.

FIG. 22 illustrates a flowchart of the operation of the encoder and processor 100. The encoder and processor 100 is connected to the data bus 58 of the system of FIG. 14 in implementing the present invention. The circuitry for implementing the encoder and processor 100 is described in conjunction with FIG. 21. The operation proceeds from point 160 where the identification number of the receiver 104 or transceiver 700 to receive the transmission is retrieved. Typically, the processor and protocol encoder 110 contain a subscriber file of receivers or transceivers which may receive RF transmissions through the atmosphere from a transmitter such as the simulcast transmitters 124 of FIG. 11 or the transmitters 614 of FIG. 34 described below. With reference to FIG. 11, the message to be received may be inputted by an input 112 to the telephone office 108 or from a PC 116 for the public switched telephone network to the telephone office 108, but it should be understood that the invention is not limited thereto. The message is stored in the random access memory as indicated at point 162. The encoder looks up the format of the receiver or transceiver at point 164 to determine the protocol of the receiver or transceiver to which the message is to be transmitted. At this point it should be noted that the present invention, as described above in FIG. 13 or below in conjunction with FIG. 34 in a two-way wireless system, has the capability of transmitting many protocols, including that of the present invention. Operation proceeds to decision point 166 where a determination is made if the receiver or transceiver protocol is either the multiple phase or pulse width modulation protocol which respectively are broadcast by analog or digital transmitting systems in accordance with the present invention. If the answer is "no" at decision point 166, the operation proceeds to point 168 where the message is stored in a batch buffer. If the answer is "yes" at decision point 166, operation proceeds to point 170 where the TIME DELAY INTERVAL is looked up from an entry table for the particular pager and/or frequency of the channel on which the message is to be broadcast. This corresponds to entry four of FIG. 15. It should be noted that typically the entry is a function of operating frequency and environment and will be between a range of 50 to 500 milliseconds with 400 milliseconds or longer being preferred in accordance with the extremely low rate of message error provided by a time offset of 400 milliseconds or greater as illustrated in FIG. 8. Furthermore, as described in conjunction with FIG. 15, an additional time offset may be added which corresponds to entry five for compensating for additional environmental factors or providing further time offset to insure that the statistical probability of faded information occurring in the first or second parallel information streams in exactly the same place in each parallel information stream involving the same information units (e.g. units C1 of FIG. 20) is minimal. The addition of additional delay is indicated at point 172. The additional delay, as described above, may compensate for special environmental affects, such as, that which occur within buildings, such as a hospital or similar private paging carriers. Operation proceeds to point 174 where the message containing the information inputted to the system and the ID which correspond to the ID and information fields of FIG. 8 is stored in the RAM. Operation proceeds to point 176 where conversion of a data unit, such as an eight bit ASCII encoded character, is converted into two four bit nibbles. The four bit nibbles correspond to system memory bit positions D0–D3 and D4–D7 of FIGS. 17–20. The storage in the system memory bit positions D0–D3 in the RAM is at point 178. Processing proceeds to decision point 180 where a determination is made if conversion of the message, including all of the information, is completed. After conversion is complete, the processing proceeds to point 182 where the memory address offset between the first and second messages is calculated or specified as described above. The offset corresponds to a number of memory locations which, when the streams, such as illustrated in FIG. 20 are read out in parallel, provides a TIME DELAY INTERVAL as specified in the OFFSET field of FIG. 8 which separates identical information or identical information units of the first and second parallel information streams at the time of transmission. The time OFFSET between the reading out of the information of the first and second encoded information streams may be precisely controlled as a consequence of the parallel read out from the intermediate memory into which the first and second information streams are copied as illustrated in the intermediate message field of FIGS. 19 and 20 of the RAM. Point 184 represents the copying of the message in the forward memory as illustrated in FIG. 17 into the back message memory as illustrated in FIG. 18. Point 186 represents the fetching of the forward and back nibbles stored in system memory bit locations D0–D3 and D4–D7 and copying of them into the intermediate memory of FIG. 19. Upon the control processor U1 completing the required masking and rotation operations to split the eight bit information units of the message into sequential four bit nibbles, a complete message is now stored in the message buffer. Rather than repeat the masking and rotation process again to construct the time delayed message (which would consume processor overhead), the control processor merely copies the entire message from the RAM buffer and moves each nibble to the system memory bit locations D4–D7 of FIG. 19. The complete time delayed message is then stored in a second RAM buffer area with an address offset in the system memory which, upon parallel read out of the first and second messages, produces a time offset of identical information or information units equal to the TIME DELAY INTERVAL. At this point, the control program U1 needs only to read the first and second message nibbles in parallel and load them into the encoder electronics when transmission time is available. However, the invention may be practiced alternatively without splitting individual information units into subunits such as nibbles. In that circumstance, the steps 176–180 are not executed. Instead, the processing at step 182 merely copies the forward first and back second message streams into the intermediate message memory with a displacement in memory address, which upon parallel read out, corresponds to reading out the identical information or information units of first and second message streams to provide the TIME DELAY INTERVAL time offset as illustrated in FIG. 8 so as to produce the subcarrier modulated with the first and second parallel information streams.

Figure 23:
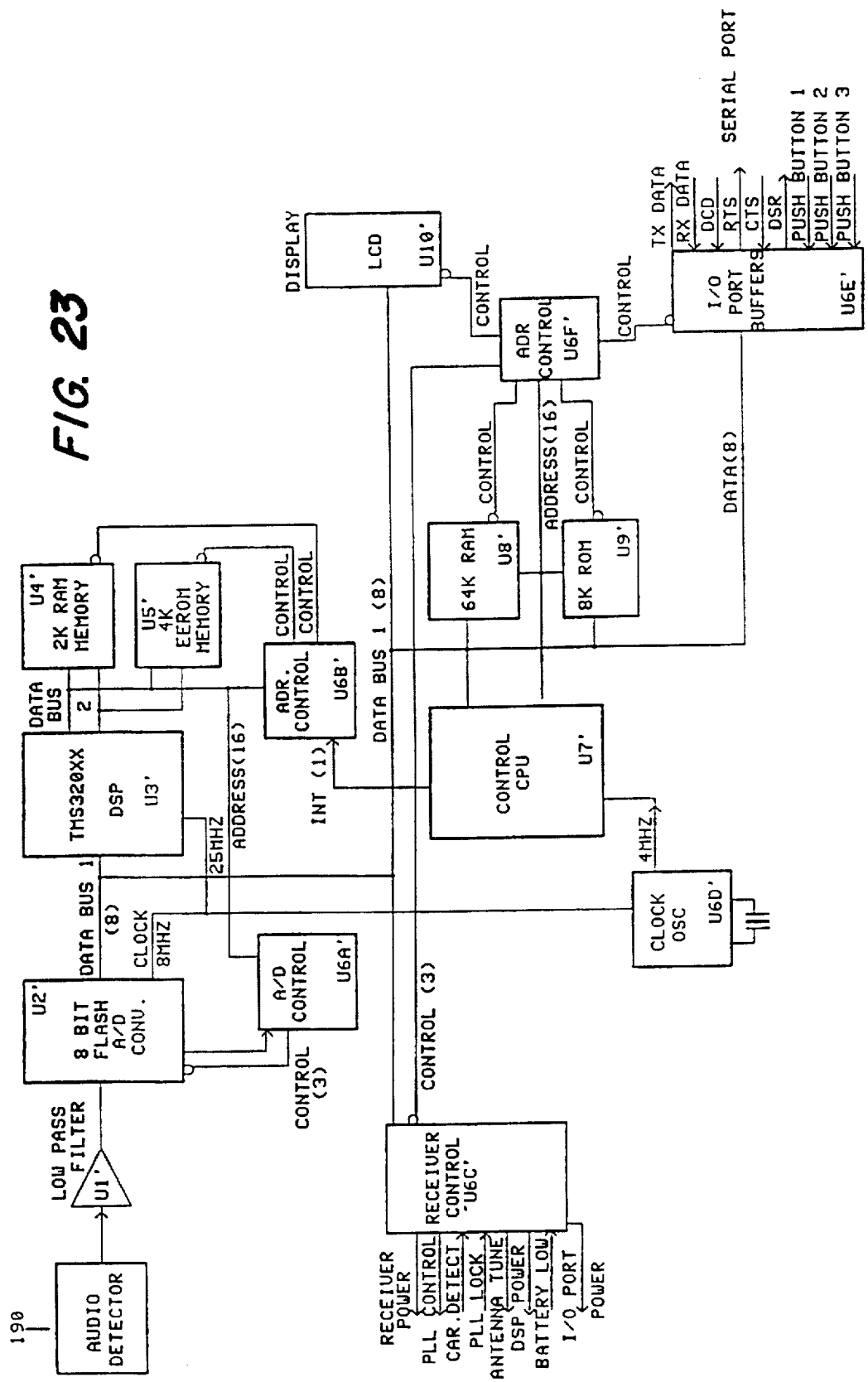
FIG. 23 illustrates a circuit schematic of the receiving circuitry in accordance with the present invention.

The receiving circuitry utilizes a digital signal processor U3' of FIG. 23 to provide intelligent processing of the subcarrier modulated with the first and second parallel information streams as discussed above to convert the modulated subcarrier into a series of numerical values each encoding at least a part of an information unit in one of the first and second information streams. For example, as discussed above and below, each cycle of the subcarrier may encode a selected number of bits. If octal phase modulation or pulse width modulation, as discussed above with reference to FIGS. 7B and 13, is used, each cycle of the subcarrier encodes four bits which is one-half of an eight bit character (e.g., ASCII). The digital signal processor U3' processes individual cycles of the received detected subcarrier which may be in analog (sinusoidal) or digital format (squarewave) to determine any similarity with stored predetermined patterns (values of one or more bits) stored by the memory of the digital signal processor. The first and second detected parallel information streams are modified to contain at least one of the predetermined patterns so that the signal processor determines if an atmospheric fade has occurred by processing the first and second detected information streams after modification by the at least one predetermined pattern. The predetermined patterns are representations of error free information which the digital signal processor compares to the received information in the parallel information streams to obtain a match that represents valid data.

The digital signal processor U3' processes the detected individual modulated cycles of the subcarrier to calculate an integral of at least one selected modulated part of each of the modulated cycles. A selected modulated part when pulse width modulation is used is each of the first and second halves of the squarewave which each contain pulse width modulation that may encode any one of a range of numbers representing a part or a whole information unit as explained above with reference to FIG. 13. A selected modulated part when multiple phase modulation is used is each of one or more distinct angular phases which are modulated with a one or zero as explained above with reference to FIG. 12. Each of the calculated integrals is numerically compared with a plurality of stored numerical ranges to identify a range which contains the numerical value of the integral. Each range represents one of a plurality of possible numerical values that the selected part may encode. These stored ranges represent the possible integrated values of the subcarrier modulation encoding a one and zero when multiple phase modulation is used as discussed above with reference to FIG. 12 or the possible integrated values of the subcarrier modulation encoding the individual numerical values within the numerical range of pulse widths as discussed above with reference to FIG. 13. The numerical comparison is discussed in detail below with reference to FIG. 28. A numerical value representative of the identified numerically closest range in which the calculated integral is found is substituted for each of the at least one selected modulated part of each of the cycles. The substitution process is discussed below with reference to FIG. 28. The numerical value encodes at least a part of an information unit in one of the first and second parallel information streams. For example, when the information contained in the first and second parallel information streams is a series of characters and pulse width modulation is used in accordance with FIG. 13, each numerical value represents four bits which is one-half the information required to encode a full character with ASCII. The modulation of the subcarrier in either analog or digital format is converted by the digital signal processor U3' of FIG. 23 from a time varying signal to a series of numbers representing part of or complete information units contained in the first and second parallel information streams which facilitates processing of faded information as discussed below.

The digital processor U3' of FIG. 23 further performs processing of individual samples, which are taken to calculate the aforementioned integrals, to remove the effects of noise causing a sample value to fall outside a normal expected range. Each sample value is compared by the digital signal processor U3' with a range which represents acceptable sample values. If the comparison yields a determination that a sample is numerically within the acceptable range, the sample is used in the integration without modification. However, if the sample is numerically outside the acceptable range, the sample is replaced with a numerical value representing a function which may be an average of one or more adjacent samples that are stored in memory which may be preceding and following samples of the sample outside the numerical acceptable range. As a result, the effects of noise in causing an erroneous integration of a selected part of a cycle of the subcarrier are substantially lessened.

Most importantly the digital signal processor U3' of FIG. 23 provides the ability to analyze the incoming waveform for the presence of valid information. For example, when a pulse width modulated or phase modulated waveform is received, the digital signal processor U3' takes numerous samples of the area under the waveform to perform a high speed integration. This permits the digital signal processor U3' to determine the value of each multiple bit nibble or unit of information modulated on the subcarrier. The pulse width or duration of the waveform or modulation of a plurality of phases encodes the nibble or unit of information that it represents. Due to the high sample rate and processing architecture of the digital signal processor U3', hundreds of samples can be made of the area under each cycle or part of a cycle to very accurately determine by integration the value of the data that the pulse width modulated signal or phase modulated signal represents. By integrating the area under the curve, an extremely accurate analysis of the pulse width modulated or phase modulated waveform can be made that eliminates distortions that are typical at the leading and trailing edges of a digital waveform. These distortions are aggravated in the wireless environment. Noise spikes that appear on the waveform are easily negated by an integration of the area under the waveform. Noise spikes on a waveform that occur during the transitions of the waveform do not effect the ability of the digital signal processor U3' to maintain synchronism of the incoming parallel information streams and do not cause an erroneous determination of the pulse width modulated waveform data representation.

The digital signal processor U3' looks for the SYNC/ID wake-up to determine the rate of information transmission as well as if it should continue the receiving circuitry turn on process if the two ID digits match that of the wireless receiver or transceiver. When the digital signal processor U3' has determined the rate of information transmission and the type of data transmission, it fetches from the microprocessor U7' stored program code to maximize the decoding reliability. The digital signal processor U3' has the ability to set or alter the bandwidth of the received data to mask unwanted received components or information. The digital signal processor U3' provides the clock recovery by utilizing an energy based clock recovery technique. This clock recovery technique is considerably more reliable than utilizing zero crossovers. Zero crossovers typically can be severely distorted by multipath unalignment of multiple simulcasting transmitting systems. The energy based clock recovery technique utilizes and detects the midpoint of each cycle of the subcarrier. It does so by summing the energy, or the area under the curve or phase of the subcarrier as described above. This increases the receiving circuitry's detection sensitivity by making it immune to distortions that are inherent in simulcast messaging systems of the wave form as well as the zero crossover transitions. Due to the high processing speed of the digital signal processor U3', real time preprocessing of the received parallel information streams, including integration and sample processing, as described above, can occur prior to the data being sent to the control microprocessor U7' for information decoding and replacement of erroneous information to provide an improved signal to noise ratio which is calculated to be about 3 db attributable to the integration process and another 20% attributable to sample signal processing.

The digital signal processor U3' utilizes a modified Harvard architecture with multiple pipelining to permit the maximum number of calculations and samples to be made of the received parallel information streams. Due to the high sample rate of the digital signal processor U3' and its multiple pipeline architecture, the digital signal processor can provide numerous real time preprocessing steps to optimize and correct anomalies in the received wave form.

The digital signal processor U3', as with any other type of information decoder, has performance trade-offs. Most fixed hardware designed decoders have to select between bandwidth and the bit error rate of the data it receives. The wider the bandwidth, the quicker the decoder can synchronize and lock on to the incoming carrier. However, when the bandwidth is increased the decoder becomes more susceptible to noise and the bit error rate of the detector increases. If a narrow bandwidth decoder design is utilized, the bit error rate is lowered but the carrier synchronization time is increased substantially. The digital signal processor U3' resolves this problem in that during the sampling time the bandwidth is dynamically programmed by the stored program to have a wide bandwidth to permit a rapid detection of the received carrier. However, as soon as the carrier is received, the stored program then provides supportive software to narrow the bandwidth to optimize the integrity of the received data. It is this dynamic operation of the digital signal processor U3' that is under control microprocessor U7' and stored program control that permits the receiving circuitry to rapidly detect and synchronize to an incoming signal and then optimize the integrity of the received data by narrowing the bandwidth.

Upon completion of the preprocessing involving integration and sample signal processing by the digital signal processor U3', the digital signal processor forwards the binary information of the first and second parallel information streams from the buffer RAM to the microprocessor U7' for decoding and recompilation of the received data. The microprocessor U7', under stored program control, provides the error correction that is embedded in the frames of each of the first and second encoded parallel information streams (forward and back) for correcting minor bit errors (e.g. 2 or less). Both the first and second parallel data streams are stored in random access memory U8' for later use when larger irrecoverable errors (faded information) are detected in either data stream. Since the control microprocessor U7' of the receiving circuitry has been alerted to the time shifting by decoding the OFFSET command of FIG. 7 of the first and second data streams, it can readily put together missing portions to correct either the first and second parallel information streams.

The microprocessor U7' is also responsible for controlling the resident display electronics and control of the external data port for transmission of the received information to an external peripheral device such as the laptop PC 118.

FIG. 23 illustrates a 10-chip set decoder and control of the receiving circuitry which may be implemented in receiver 104, transceiver 700 or associated with a base station. The decoding mechanism, can be connected to a number of different receiving circuitry configurations at the discriminator audio entry point inputted from the audio detector 190. Various receiving circuitry configurations can be a single frequency crystal controlled single or dual conversion type of receiver. A multi-frequency or scanning type of receiving circuitry utilizing a programmable phase lock loop for multi-channel reception may be used, or the decoder may be connected to a mobile or portable two-way transceiver that is either single or multi-frequency using multi-crystal or programmable synthesizer technologies.

The decoder may be further integrated by LSI technologies to a 3-chip set. The integrated circuits U2', U3', U4', U5', and U6A',B' are currently available in a single digital signal processor. The control CPU U7', RAM memory U8', 8K ROM memory U9', address control U6F', and I/O port U6E' are currently available in a single LSI microcircuit. The remaining electronics consisting of the receiving circuitry control U6C' and clock oscillator U6D' are integrated into a PAL logic array that is manufactured by National Semiconductor or Texas Instruments.

The operation of the decoder is as follows:

The low pass filter UT consists of a switched capacitor filter that limits the frequency response of the discriminator audio to the 300–3000 Hz audio bandwidth. The low pass filter is a fourth order filter that prevents high frequency noise components from entering the eight bit flash analog to digital converter U2'. The audio detector 190 represents the audio output from any type of a one-way receiver, such as that in the aforementioned patents, or two-way receiver.

An eight bit flash analog to digital converter U2' is connected to the digital signal processor U3' via an 8-bit DATA BUS 1. Clock signals are provided by a portion of U6D' that takes a master crystal oscillator and provides the necessary clock pulses for the processors and the A/D converter. Input/output control of data from the flash A/D converter is accomplished by the A/D control portion U6A'. The eight bit flash A/D converter samples the incoming audio waveform at high frequency sufficient to take at least hundreds of samples per modulated phase or squarewave. The higher the sample rate, the more accurate the integration is. The A/D converter converts those samples to eight bit binary words that are sent to the digital signal processor U3' via the eight bit data bus. Timing control is provided by the A/D control U6A' and permits data to exit U2' only when the digital signal processor U3' addresses U2' when data is present.

The digital signal processor U3' simultaneously reads data from the flash A/D converter U2', processes and analyzes the data, and then sends the decoded data via DATA BUS 1 to the control CPU U7'. Decoded and analyzed data is forwarded to the control CPU U7' between readings of the 8-bit flash A/D converter.

The digital signal processor U3' may be manufactured by Texas Instruments and is in one of the three generations of TMS320XX series processors. Texas Instruments currently manufactures the first generation in a low, voltage, low current processor that is applicable to battery operated receiving circuitry.

The digital signal processor U3' is connected to a 2K random access memory U4 and a 4K EEROM memory U5'.

A second data bus DATA BUS 2 is utilized to permit data to be read by the digital signal processor U3' from and to the RAM memory and from the EROM memory which contains the stored program. The digital signal processor U3' controls the selection of reading and writing to RAM memory U4' and reading from EEROM memory U5' by the address control U6' portion of a custom gate array U6B'.

The digital signal processor U3' is responsible for synchronizing the receiving circuitry to the incoming first and second parallel information streams and providing waveform analysis for the decoding of the pulse width modulated digital parallel information streams or the multiple phase parallel analog information streams as described above. Upon completion of the decoding of the received binary data stream, the digital signal processor U3' forwards the decoded data via DATA BUS I to the control CPU U7'.

The 2K RAM memory U4' serves as a scratch pad memory for the digital signal processor U3'. Intermediate calculations and reconstructed received data are temporarily stored and buffered in RAM memory U4'. The 2K RAM memory also temporarily stores intermediate calculations and instructions as needed on occasion by the DSP. The 2K RAM memory has a DATA BUS 2 utilized to communicate to and from the digital signal processor U3'. This permits the digital signal processor U3' to access and store data in the 2K RAM memory simultaneously while utilizing DATA BUS 1 to receive information from the eight bit flash A/D converter or sending information to the control CPU U7'. It is this architecture that is commonly referred to a modified Harvard architecture where the digital signal processor U3' is capable of simultaneously communicating on two separate data buses.

The EEROM memory U5' contains the stored program for the digital signal processor U3'. It contains resident softwares that permit the digital signal processor U3' to decode both the analog multiple phase and pulse width modulation digital subcarrier waveforms. The EEROM memory also contains the supportive digital signal processor software to permit synchronization of the receiving circuitry's, analysis of the received waveform data, storage and transfer of the received data to the control processor U7', and bandwidth control of the received data when the receiver becomes synchronized to the data stream.

U6' is a custom gate array that provides numerous encoding and decoding functions for the multiple phase and pulse width modulation decoder. U6A' provides address and control interfacing between the digital signal processor U3' and the eight bit flash A/D converter U2'. It is the functional equivalent of an active low address enable IC similar to the 74HC138, and also the functional equivalent of the 74HC251 input multiplexer that can sense when the A/D converter has data to be read by the DSP. U6B' provides address control of the 2K RAM memory U4' and the 4K EEROM memory U5'. Accessing of data to and from these memories is controlled by the digital signal processor U3' via U6B. U6B' is the functional equivalent of a 74HC138 3–8 decoder with some additional gating electronics for read/write control to and from the 2K RAM memory U4'. U6C' is the receiving circuitry control portion of the custom gate array. It provides interfacing from the control processor U7' via DATA BUS 1 and a control signal from U6F'. The receiving circuitry control IC consists of the functional equivalent of control latches such as the 74HC259 for receiver power. U6C' provides the functional equivalent of a tri-state buffer (one section of an HC244) for serial transmission of data to the PLL control circuit. U6C' also provides the functional equivalent of a 74HC251 to sense receiving circuitry carrier detection and the PLL synthesizer lock conditions. U6C' also provides the functional equivalent of a 74HC244 (single section) to provide a serial data stream to the antenna tuning processor when a multi-frequency receiving circuitry is utilized. U6D' provides the necessary clocks for the control CPU U7', the digital signal processor U3', and the 8-bit flash A/D converter U2'. A 25 MHz crystal is utilized for the decoding circuit. The oscillator section consists of the functional equivalent of two 74C4's that are connected in parallel with the crystal and provide the necessary inversion for the oscillator and buffering. The balance of U6D' are respective dividers that divide the clock frequency to the lower 8 MHz required by the A/D converter U2' and 4 MHz required by the control CPU U7'. The 25 MHz clock frequency is buffered and directly sent to the digital signal processor U3'. The U6E' portion of the custom gate array provides the necessary I/0 port buffering for the external serial port and the control processor U7' data bus of the multiple phase and PWM decoder circuit. Tri-state input and output buffers and level conversion is provided so that the serial port which operates in a RS-232 configuration can send and receive data to an external device as described above. The I/0 port buffers are the functional equivalent of a 74HC245 bi-directional tri-state buffer and control latch to encode DSR and RTS data signals (HC259), and a 74HC251 8 to I MUX to decode the CTS and DSR received signals from the peripheral device. The buffering and level conversion is accomplished by the functional equivalent of a 74188 or 74189 RS-232 to TTL level converter.

The U6F' portion of the custom gate array is the functional equivalent to an address control decoder that permits the control processor U7' to address select the 64K RAM U8', the 8K ROM U9', the I/O port buffers and latches U6E', the receiving circuitry control portion of U6C', and the liquid crystal display U10'. It is the functional equivalent of a 74HC138 3–8 decoder.

The control processor U7' is responsible for all of the control functions of the decoder of the receiving circuitry. It controls all receiving circuitry control functions, including the turning on and off of the power to the receiving circuitry electronics, digital signal processor electronics, and the serial I/O port electronics. It also provides the decoding of the received first and second parallel message streams and the necessary message reassembly when errors are encountered in the received message obtained from the digital signal processor U3'. It also separates and stores the forward first and backward second parallel information streams received from the digital signal processor U3' and is responsible for the correction when errors in either the forward first or backward second parallel data streams occur. The messages received are stored by the control processor U7' in the 64K RAM memory U8' or are forwarded to the serial port for external use. The control processor U7' is also responsible for sending stored messages from the 64K RAM memory U8' to the resident liquid crystal display U10 for display and reading purposes by the user. Control processor U7' also responds to push button requests initiated by the user and/or data requests initiated by the serial port as necessary.

The 64K Random Access Memory U8' is utilized by the control processor U7' for message storage and retention. A portion of the memory is utilized as working buffer memory and storage of control variables for the operating program. The 64K RAM is enabled by U6F', the address control register. Data is transferred to and from the 64K RAM via the eight bit data bus 1.

The 8K Read Only Memory U9' stores the resident software for the receiving circuitry. It contains all of the operating softwares and subroutines to permit the control processor U7' to operate the receiving circuitry. Message decoding routines, error correction routines, and message replacement routines are contained in the operating software. The operating software also contains the control and timing electronics for the control processor U7' to control the various portions of the receiving circuitry via U6C'. Service routines to transfer received stored messages are also contained in the 8K ROM and via the control processor U7' may be transferred to the liquid crystal display U10, erased, or transferred to the serial port U6E' for external use. A block diagram of the receiving circuitry decoding/control processes that are contained in the 8K ROM are described below with reference to FIGS. 29A and B. The control flowchart shows the general service routines that are utilized to permit the decoder to turn on the receiving circuitry, sample the channel for presence of carrier and data, and respectively look for the receiver or transceiver receiving circuitry corresponding ID code and message.

The receiving circuitry utilizes a single line dot matrix liquid crystal display. When the receiving circuitry senses a button press via the I/O port buffer U6E', the control processor U7' in turn responds and forwards messages to the liquid crystal display for display purposes. Alternatively, multi-line liquid crystal displays may be used to permit a greater amount of text to be displayed simultaneously.

Figure 24A:
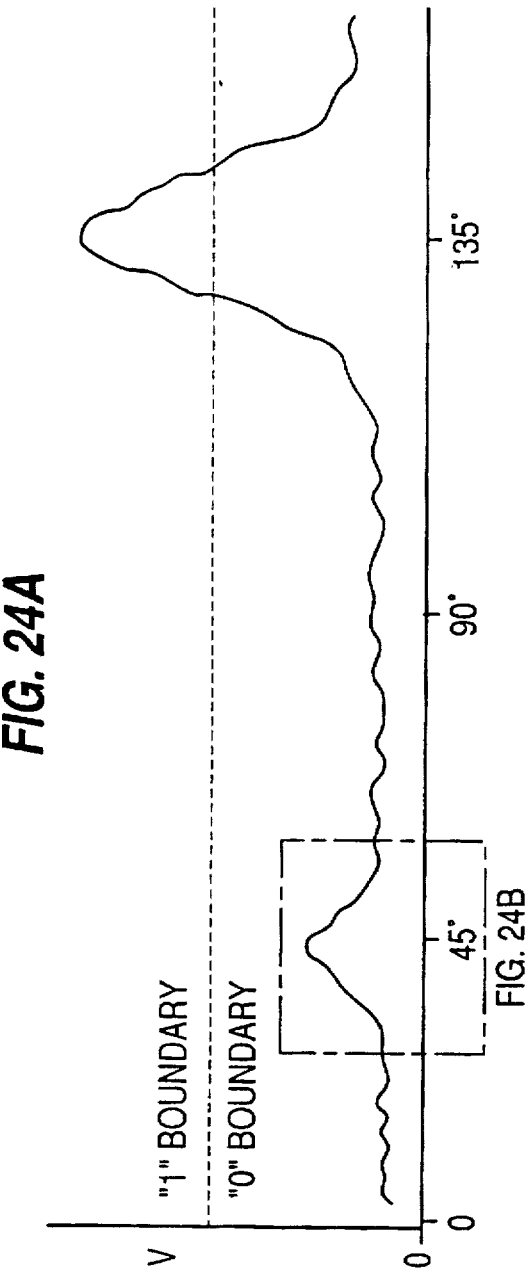
FIGS. 24A and 24B illustrate the integration of a diphase modulated subcarrier by the digital signal processor of the receiving circuitry of the present invention.

The integration of an analog subcarrier modulated with diphase quadrature modulation as illustrated in FIG. 12 is explained as follows. FIG. 24A illustrates the received diphase quadrature modulated subcarrier as received from a discriminator of the receiving circuitry in a receiver, transceiver or associated with a base station. The data, as illustrated, is encoded at the 45° and 135° phases with the 225° and 315° phases having been omitted from the illustration. The lower magnitude voltage V along the Y axis represents the encoding of a binary zero at 45° and the higher magnitude voltage represents the encoding of a binary one at 135°.

The digital signal processor U3' is synchronized to the incoming data which permits it to integrate in a window around the exact phase of where the modulation is placed. The sampling of the voltage would typically begin at 35° and end at 55°. In the 20° window, the digital signal processor U3' computes hundreds of samples which are integrated.

Figure 24B:
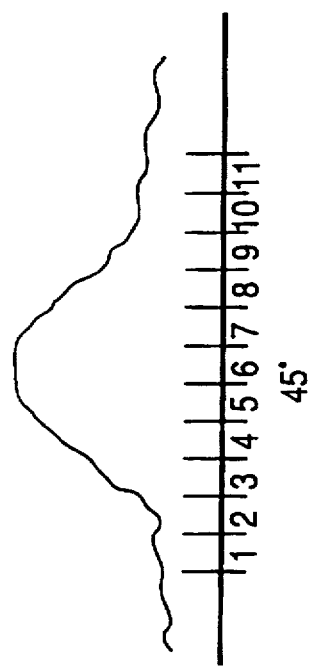

FIG. 24B illustrates a simplified example of computing the integral of the waveform at 45° in FIG. 24A where only eleven samples are taken which have an integrated value of eight. Once the integrated value is obtained, the digital signal processor U3' looks in a prestored table which permits a value of zero to be within a numerical integration range between zero and sixteen. In FIG. 24A it can be that the numeric value for the data contained at the 135° phase will be greater than sixteen. Therefore, the same integration process and comparison with the range of prestored values centered in a 20° window around 135° would yield a value of one at the 135° phase.

The actual values obtained in each step of the integration process will typically be much higher than the foregoing example of FIGS. 24A and B. The actual values obtained in each step of the integration process will be dependent upon many variables determined primarily by the receiving circuitry. The operating voltage, A to D sampling speed, and clock speed of the digital signal processor U3' will all influence the actual numeric values obtained in this integration process. However, the transmitted waveform will appear essentially the same for all mobile data products using the invention. Each of the different received data waveforms will have different binary values and different binary ranges in their lookup tables.

Figure 25:
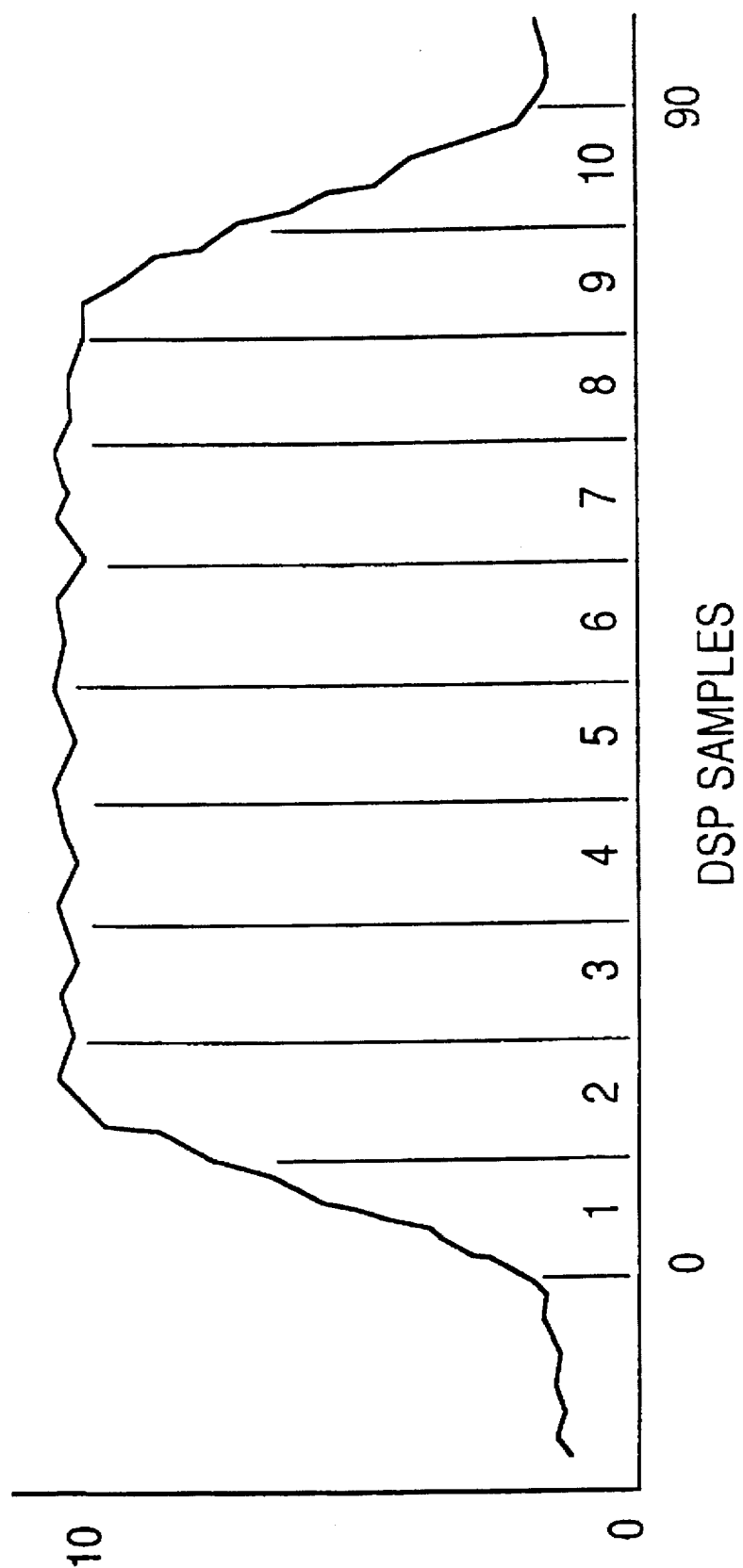
FIG. 25 illustrates the integration of a pulse width modulated subcarrier by the digital signal processor of the receiving circuitry of the present invention.

The integration of a squarewave subcarrier with each half being pulse width modulated with four bits (numerical widths varying between 1 and 16), as illustrated in FIG. 12, is described as follows with reference to FIG. 25. In this simplified example, the digital signal processor U3' takes ten samples of the detected subcarrier where in actual practice hundreds of samples would be taken. The previously stored sample values representing the waveform are processed by the digital signal processor U3' to integrate the area under the waveform. In actual practice, the number of samples will be dependent upon the sampling speed of the A to D converter and the clock speed of the digital signal processor U3'. In this example, there is a fixed numerical value assigned to the X axis and a value that is representative of the received voltage V of the waveform on the Y axis. The digital signal processor U3' uses these values to calculate a numeric sum for each sample. These numerical values of each sample are in turn summed to provide a summation of all of the samples under the pulse width modulated waveform. The summation value of FIG. 25 is ninety. This number would be much larger in actual practice. The digital signal processor U3' then uses its prestored program to look up the range of summation values stored in its lookup tables as described below in detail in conjunction with FIG. 28. Because of signal distortions, which are always present in a wireless environment, the lookup tables contain finite boundaries or numeric ranges that pertain to each of the sixteen possible binary combinations. FIG. 25 illustrates that for a value of ninety the four bit combination of zero, one, zero, one is obtained. Any summation within the numeric range of eighty-five to ninety-five is represented in subsequent signal processing of the parallel information streams by the aforementioned four bit combination.

Like the example discussed above involving multiple phase modulation, products using digital modulation will have prestored ranges depending upon the design of the receiving circuitry. If very low received voltages are summed, smaller summation ranges are obtained.

Figure 26A:
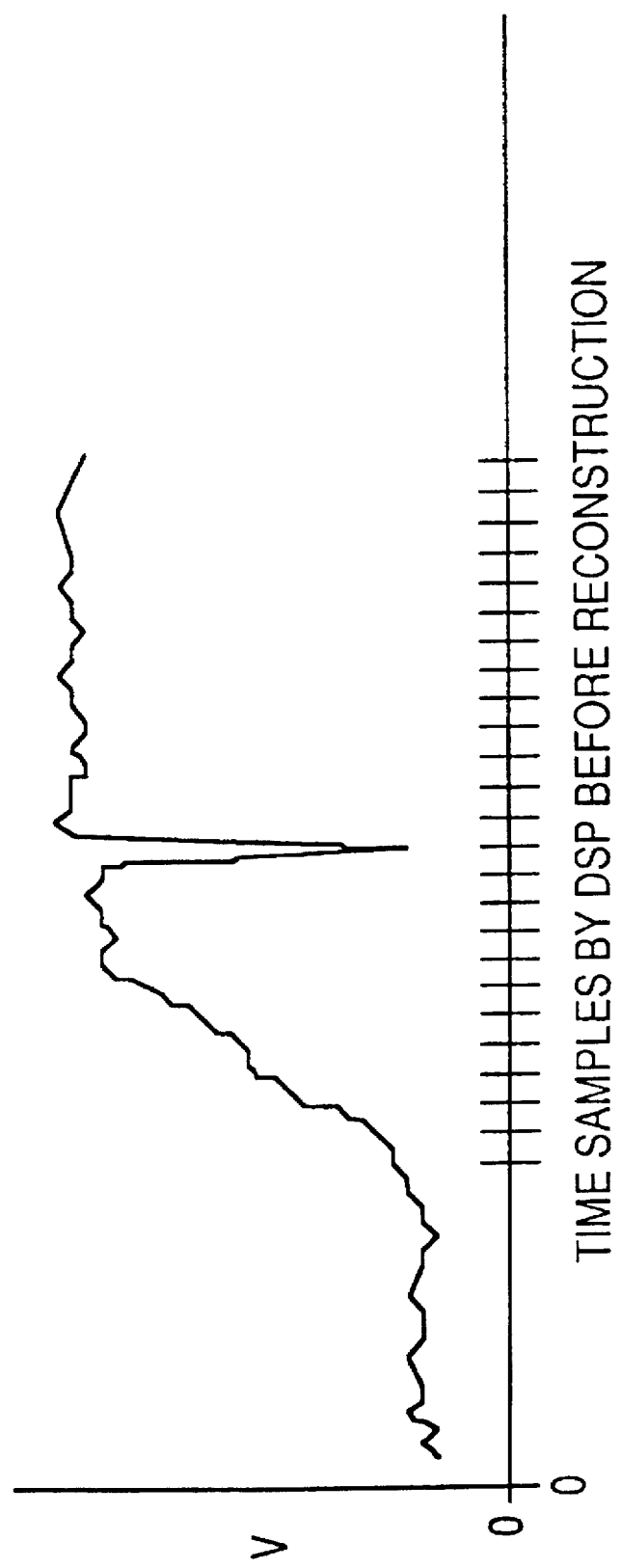
FIGS. 26A and 26B illustrate sample processing performed by the digital signal processor of the receiving circuitry to remove noise transients in a pulse width modulated subcarrier of the present invention.
Figure 26B:
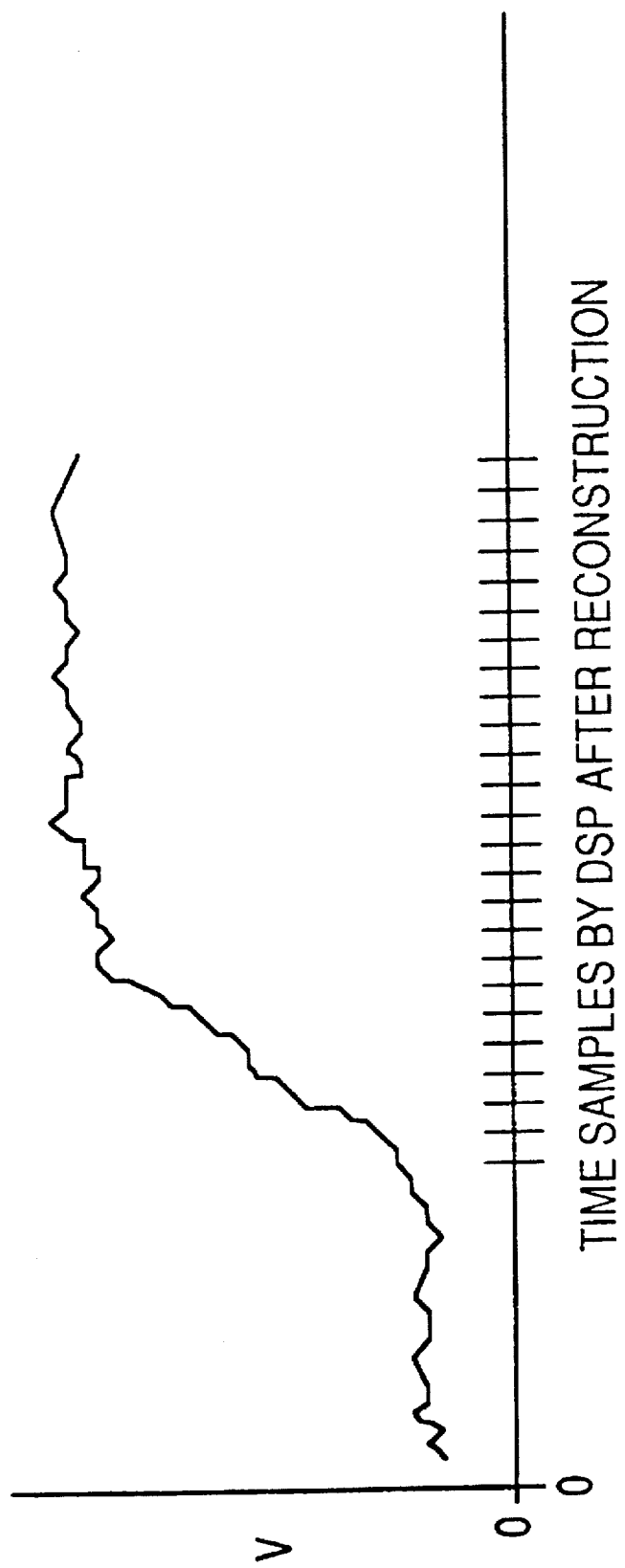

FIGS. 26A and 26B illustrate the sample processing of a half of a cycle of a pulse width modulated squarewave to eliminate the effects of noise which introduces error into the calculation of the integral of the half a cycle as described above in conjunction with FIG. 25. FIG. 26A shows the leading edge of the waveform that contains a noise transient. This negative going transient is not a portion of the actual pulse width modulated data and introduces error in the integration of the waveform by the digital signal processor U3'. Sample signal processing is utilized to assist in the reconstruction of the pulse width modulated waveform to remove transients that are caused by noise and other man-made interference. While the digital signal processor U3' is decoding the pulse width modulated waveform to transform first and second parallel information streams into a series of numerical values each representing the range containing the calculated integral of each selected part, the numeric sample values are stored in a temporary RAM memory such as U4'. As illustrated in FIG. 26A, each of the samples is converted to a numerical value by an A to D converter or comparator associated with the digital signal processor. The ROM associated with the digital signal processor stores a table of numerical ranges which represent valid sample values over the duration of a part of the cycle of the subcarrier which are to be included in the integration of the subcarrier. As illustrated, the numerical ranges are based upon expected ranges which occur for a particular receiving circuitry design that represent signal levels which occur when the half of the subcarrier cycle is at its high or low level. For example, the illustrated transient is outside the numerical range of sample values which represent valid samples when the pulse width modulated carrier is at its high level. When a sudden or dramatic change in the A to D voltage reading occurs, as described above by the comparison of the sample value with a range of valid sample values, the digital signal processor U3' is triggered to perform a series of calculations. Because of storage in a RAM buffer area of the sample values necessary to compute the integral, one or more sample values immediately before and immediately after a transient are used for signal processing to provide a replacement sample value. The replacement information is a function of sample values adjacent the sample value which is replaced. In one form of possible signal processing to replace the noise with a sample value more accurately representing what the actual sample values should have been, the immediately preceding and succeeding sample values are added and divided by the number of samples to be averaged to yield a replacement sample value average to fill in the erroneous sample caused by the noise transient. The resulting waveform appears in FIG. 26B as a small step that makes the resulting waveform more representative of the pulse width modulated waveform. In this example, if the preceding sample value from the A to D converter was 1 volt and the following reading was 1.1 volts, the replacement sample would have a value of 1.05 volts. This is considerably more accurate than the actual received pulse width modulated waveform that would have had a zero value for the sampling period.

FIGS. 27A and B illustrate the reconstruction of a data waveform when diphase quadrature modulation is used as illustrated in FIGS. 7A and 12. In this example, the 45° phase is being processed which is modulated with binary information in which noise is riding on the signal level. As discussed above in conjunction with the processing of a pulse width modulated waveform having noise riding on the data signal level, the digital signal processor U3' stores the sample values in the temporary RAM buffer. As illustrated in FIG. 26B, each of the samples is converted to a numerical value by an A to D converter or comparator associated with the digital signal processor. The ROM associated with the digital signal processor stores a table of numerical ranges which each represent valid sample values over the duration of a part of the cycle of the subcarrier which are to be included in the integration of the subcarrier. As illustrated, the numerical ranges are based upon expected ranges which occur for a particular receiving circuitry design that represent signal levels which occur around the modulated phases of the subcarrier. For example, the illustrated transients are outside the numerical ranges of sample values which represent valid samples when the subcarrier is modulated with a one or zero as illustrated in FIG. 12 in the 20° window centered at 45°. When a series of voltage readings do not conform to the rate of rise or slope that would have been typical of valid phase data, the signal processing is triggered to attempt to correct the data. The previous and subsequent A to D converter voltage readings are added together and divided by the number of readings to substitute a more accurate sample value which would typically be present in the absence of noise for the sample value representing noise. As can be seen in FIG. 27B, the modified signal waveform resembles more closely and more accurately the actual transmitted data. When the digital signal processor U3' now begins the integrating process to determine if the phase information contained at the 45° phase sample is a binary one or zero, the accuracy of the integration (and, therefore, the determination) is considerably more accurate. FIG. 24A illustrates what the data would look like when the diphase mode of modulation is being transmitted. In FIG. 24A it can be seen that the binary value of the data at the 45° phase is a binary zero and the binary value of the data at the 135° phase is a binary one. When the receiving circuitry in a receiver, transceiver or base station are in an extremely noisy environment, the aforementioned sample signal processing serves to enhance and reconstruct the received data and reduce the amount of error introduced by noise in the integrating process.

Figure 28:
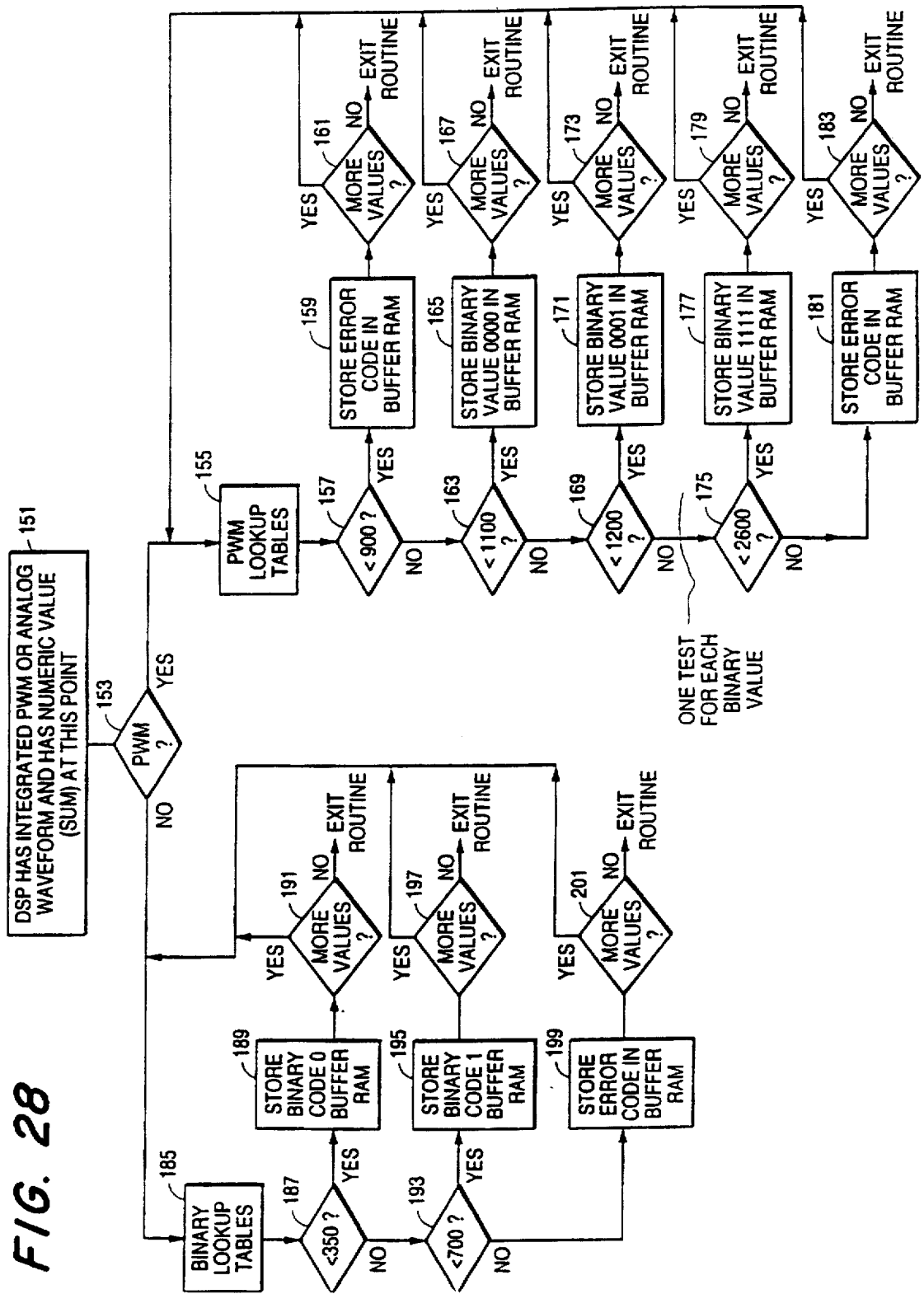
FIG. 28 is a flowchart of the operation of the digital signal processor of the receiving circuitry comparing integrals of selected parts of the modulated subcarrier with prestored ranges to convert the parallel information streams into a series of numerical representations of at least parts of information units constituting the information modulated on the subcarrier.

FIG. 28 illustrates the operation of the digital signal processor U3' after the integrated value of the at least one selected part of a cycle of a subcarrier for a plurality of cycles has been determined. The digital signal processor U3' takes the obtained integrated value and looks up the resulting binary value or equivalent in the prestored lookup tables. With reference to FIG. 28, the processing proceeds from step 151 where integration is completed to decision point 153 where a determination if the modulation is analog (multiple phase) or digital (pulse width modulation) is made. If the answer is "yes" at decision point 153, processing proceeds to step 155 where the lookup tables for processing the integration of pulse width modulation of a half of a cycle of the subcarrier are accessed. The stored ranges are each one hundred in magnitude. Processing proceeds to step 157 where a determination is made if the value of the integration is less than 900. A value at decision point 157 of less than 900 indicates that the pulse width modulated waveform has an inherent problem making the comparison process invalid. If the answer is "yes" at decision point 157, the processing proceeds to step 159 where an error code is stored in a buffer RAM. Processing proceeds from step 159 to decision point 161 where a determination is made if all of the stored integration values which are being group processed have been processed. If there are more values to be processed, the program loops back to step 155. Otherwise, the processing is complete. If the answer at decision point 157 is that the integral value is greater than 900, processing proceeds to decision point 163 where a determination is made if the integral is less than 1100. If the answer is "yes" at decision point 163, a four bit binary value of 0000 is stored at step 165 in the buffer RAM which represents at least a part of an information unit of one of the first and second parallel information streams. Processing proceeds to decision point 167 where a determination analogous to decision point 161 is carried out. If the answer is "no" at decision point 163, processing proceeds to decision point 169 where a decision is made if the integral value is less than 1200. If the answer is "yes" at decision point 169, processing proceeds to step 171 where a binary value of 0001 is stored in the buffer RAM. The processing proceeds to step 173 which is analogous to decision point 167. The broken line labelled "ONE TEST FOR EACH BINARY VALUE" indicates testing of the integral values for a series of increasing ranges which are increased in steps of 100 to determine if the binary values between 0010 and 1110 should be stored in the buffer RAM. Decision point 175 represents the last test where a determination is made if the integration value is less than 2600. If the answer is "yes", the processing proceeds to step 177 where the four bit binary valve 1111 is stored in the buffer RAM. The processing proceeds from step 17 to decision point 179 which is analogous to decision points 167 and 173. If the answer is "no" at decision point 175, processing proceeds to step 181 where an error code is stored in the buffer RAM indicating that the integration value is greater than that which would be predicted by the prestored values (ranges) for each of the sixteen binary combinations. The processing then proceeds to decision point 183 which is analogous to decision points 167, 173 and 179.

If the answer at decision point 153 is "no", the processing proceeds to step 185 where the range of values for the binary values of one and zero are accessed for comparison with the integration value obtained at step 151 for modulated phases of the subcarrier. The diphase (FIGS. 7A and 12) lookup tables are different than the pulse width modulation tables and are representative of the 1 and 0 boundary present in FIG. 24A for each of the phases which are modulated on the subcarrier. The integrated value falls within a range on one or the other side of the boundary for each phase which controls whether the phase is decoded as a 1 or a zero. When the integration process is completed, the processing compares the integrated value with ranges that define on which side of the boundary the actual integration lies. In this process the processing proceeds to decision point 187 where a determination is made if the value of the integral is less than 350. If the answer is "yes" the program proceeds to step 189 where a binary zero is stored for the phase in the buffer RAM. The processing proceeds to step 191 where a determination is made if more values are to be processed. This step is analogous to steps 161, 167, 173, 179 and 183 previously described.

If the answer is "no" at step 187, processing proceeds to decision point 193 where a determination is made if the value of the integral is less than 700. If the answer is "yes", processing proceeds to step 19 where a binary one is stored in the buffer RAM. The processing proceeds from step 195 to decision point 197 where a decision is made analogous to decision 191 described above. If the answer is "no" at step 193, the processing proceeds to step 199 where an error code is stored in the buffer memory analogous to steps 158 and 181 as previously described. The processing proceeds from step 199 to decision point 201 which is analogous to decision points 191 and 197.

The contents of the buffer RAM store a group of binary values representative of individual bits when multiple phase modulation is modulated on the subcarrier and groups of bits when pulse width modulation is modulated on the subcarrier. The contents of the buffer RAM encode the information contained in the first and second parallel information streams and the error correction code for subsequent processing by the signal processor U3'. The processor U3' detects when an error is present by processing the error correction code embedded in the frames of the first and second parallel information streams and replaces the faded information which is representative of the data bits of frames containing at least one erroneous uncorrectable bit which exceeds the bit error correction capacity of the error correction code (e.g. for BCH code which can correct two or three bit errors) with data bits from frames modulated on the subcarrier time shifted from the faded information by the TIME DELAY INTERVAL of FIG. 8 as described below in detail in conjunction with FIGS. 32 and 33.

Although the previously described sample processing will serve to remove transients that may produce the decoding of erroneous data when large errors are introduced into the calculation of the integrals, it is still possible that the integration of the data modulated on the subcarrier at a particular phase would result in an erroneous detection. Many discriminators in radio receiving electronics have finite voltage limits when data is being detected. When receiving electronics in a receiver or transceiver are designed for low voltage operation, the recovered data will be between zero and one volt in amplitude. However, in many types of discrimination there are particular combinations of interferences (typically, adjacent channel interference) that can cause a noise signal to be much greater in amplitude than the one volt level. These spikes or noise may be as high as two or three times the expected amplitude and not be representative of a true received data signal. The problem is more prevalent when multiple phase data is being decoded as this type of adjacent channel noise that is detected by the discriminator contributes greatly to distorting of the detected waveform and may change a binary zero to a binary one and a binary one to a value much greater than what a binary one is predicted to be. As previously described, the sample signal processing has finite limits on an amount of data interpretation that can be accomplished. Specific high and low boundaries must be placed in the lookup tables to prevent such data interpretation from being considered valid. This is the reason for finite boundary values as discussed above in processing both multiphase and pulse width modulation of the subcarrier. The boundaries and the need for such boundaries will be dependent upon the receiving electronics design of the particular product. Therefore, the boundaries represented by decision points 159, 181 and 199 may or may not be necessary in the receiving electronics of a particular multiple phase or pulse width modulation application of receiving electronics. Steps 159, 181 and 199 may be omitted. If the receiving electronics are based exclusively upon either the multiphase or pulse width modulation protocol, decision point 153 may be omitted with only the necessary part of the processing for the particular protocol being included in the receiving electronics.

Figure 29A:
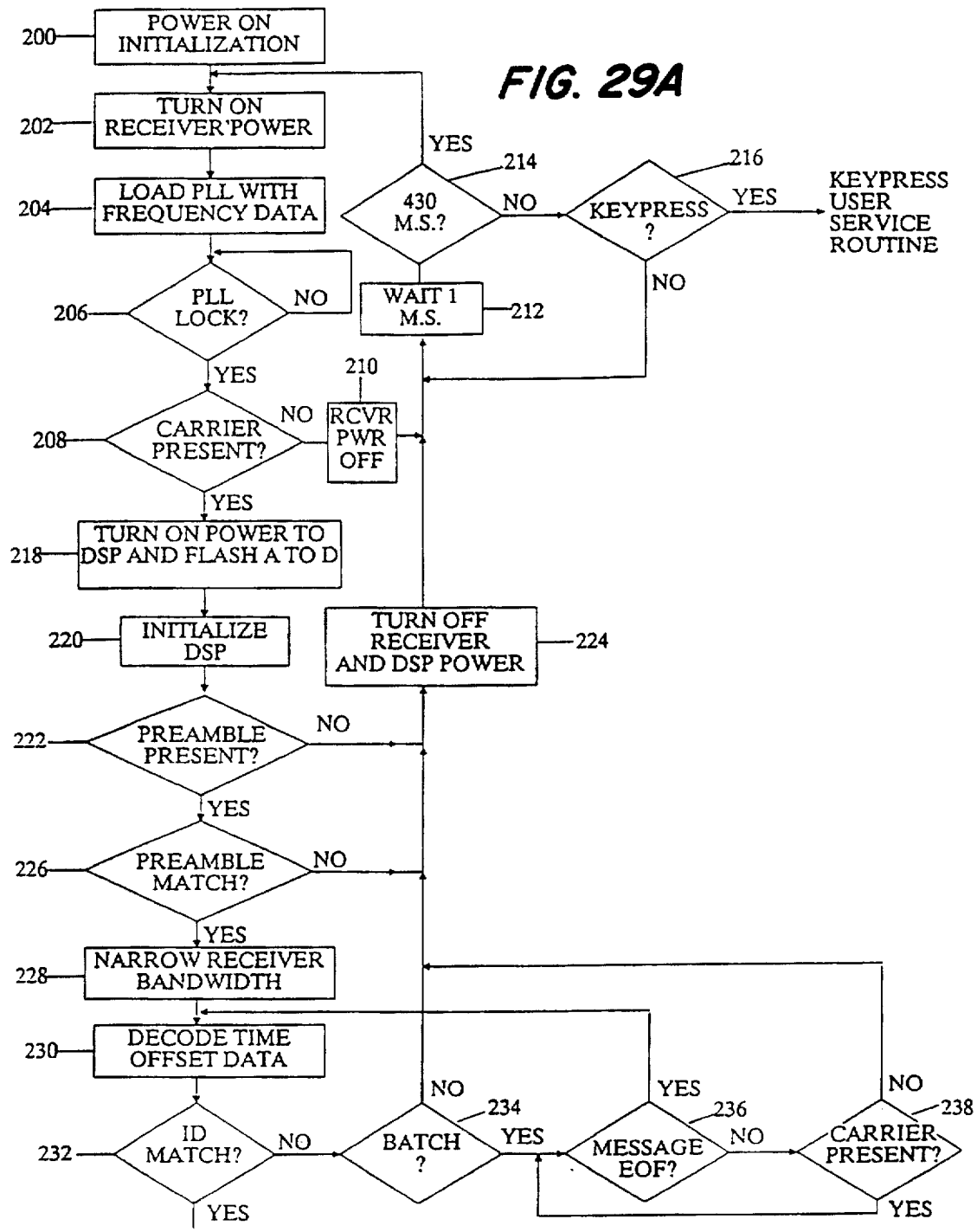
FIGS. 29A and 29B illustrate a flowchart of the operation of receiving circuitry in accordance with the present invention.
Figure 33:
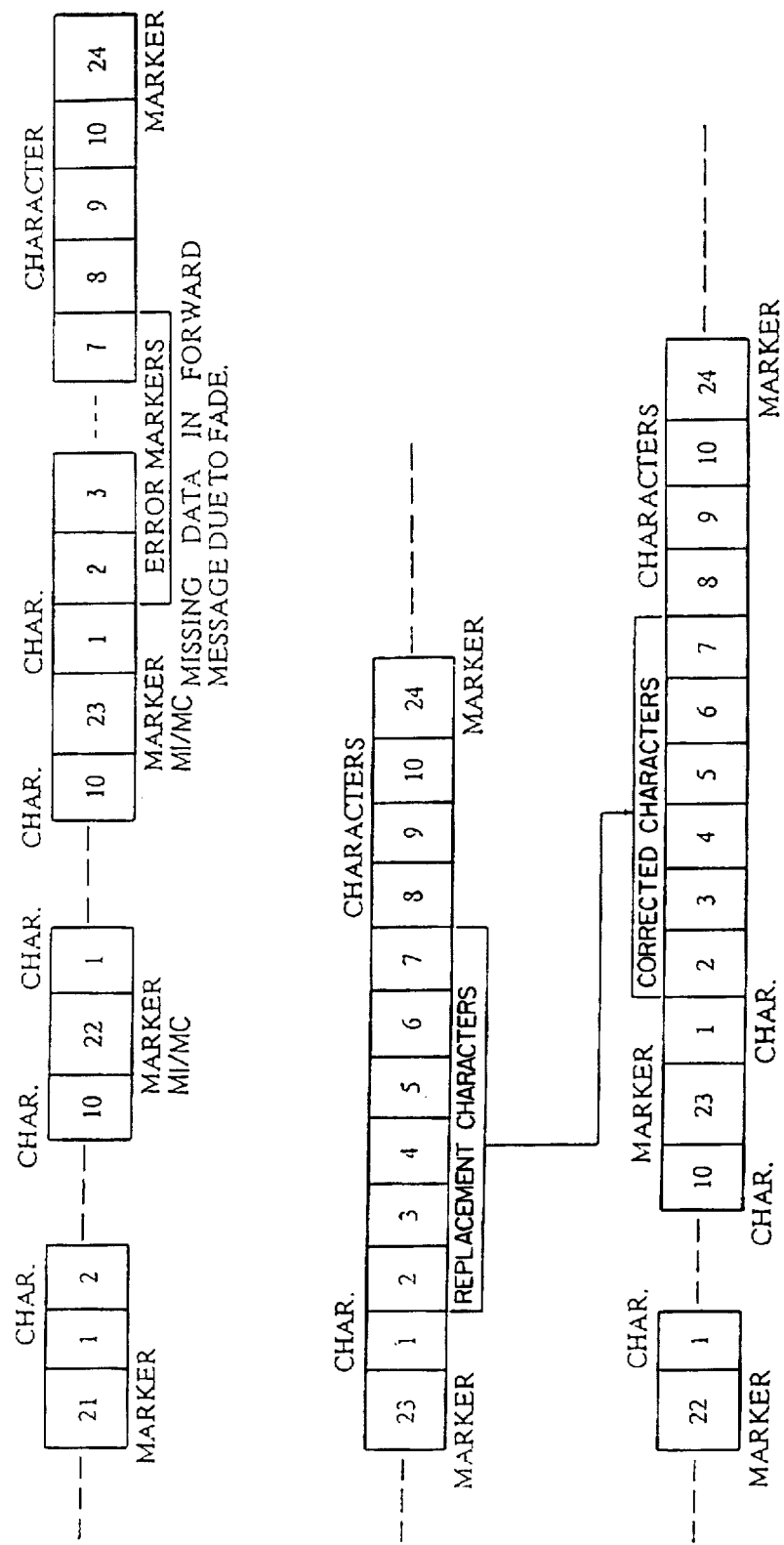
FIG. 33 illustrates an example of correction of a message including erroneous information.

The operation of the receiving circuitry decoding of the multiphase or pulse width modulated first and second parallel information streams is described in flowcharts in FIGS. 29A and B, 30, 31 and 32 and in pictorial diagram FIG. 33. The pictorial diagram is for clarification purposes of the message reconstruction process. These flowcharts are based upon the pulse width modulation of first and second parts of each cycle of the subcarrier respectively with the information of FIG. 20 as described above in four bit nibbles. However, it should be understood that other information units, such as eight bits as described above for encoding ASCII characters, may be used in the aforementioned flowcharts. Furthermore, the splitting of each information unit, as illustrated in FIGS. 16–20 as described above, may involve different numbers of bits, e.g. sixteen bit words could be split into eight bit bytes which, for example, may each modulate a half of a cycle of pulse width modulation. This amounts to a doubling of the throughput of the pulse width modulation of FIGS. 7B and 13.

FIGS. 29A and B depict the general operation of the receiving circuitry as described above in FIG. 23. The flowchart depicts frequency synthesized receiving and battery saving techniques that are used with current receiver designs. Point 200 represents the power on initialization routines. When the user first turns on the power to the receiving circuitry at point 202, the resident control processor U7' starts an initialization process and self-testing diagnostics to insure that the receiving circuitry is fully functional. These diagnostics include the turning on and preprogramming of a frequency to the phase lock loop (not illustrated) and verification that the phase lock loop at point 204 can lock on a test frequency or the preprogrammed operating frequency, and a measurement of the battery voltage. The initialization routine also includes a verification of the receiver's or transceiver's preprogrammed ID and a visual test of the liquid crystal display by scrolling a test message for the user to observe.

Upon completion of the power on initialization, the receiving circuitry initializes its sampling routine of the radio channel. The control processor U7' first turns on the receiving circuitry power and loads the phase lock loop with the operating channel frequency data. The control processor U7' then waits for a channel lock verification from the PLL circuit prior to determining if carrier is present on the sample channel. When the lock condition is detected at point 206, the control processor U7' then tests for the presence of carrier at decision point 208. If there is no carrier present on the received radio channel, it is unnecessary for the control processor U7' to continue the receiving process, and it then powers off the receiving circuitry at point 210. Processing then stays in a loop including 212, 214, 202, 204, 206, 208 and 210 in which incrementing a 430 millisecond timer in one millisecond increments at points 212 and 214 occurs. During this time the control processor U7' is also looking for external keypress or serial port activity. If the user initiates a keypress function at decision point 216 (e.g., to read or display a message), the control processor U7' then executes the respective service routines to display the message. If an external peripheral device, such as the laptop PC 118, via the serial port 120 indicates that some activity is desired, the control processor U7' again goes into the user service routine to service the request.

Upon completion of the 430 millisecond time out, the control processor U7' then turns on the receiving circuitry power at point 202 and loads the PLL with frequency data at point 204. This channel sampling conserves the battery of the wireless receiver or transceiver.

When carrier is detected, the control processor U7' then turns on the power to the digital signal processor U3' and flash A to D converter at point 218. An initialization sequence is then initiated at point 220 by the control processor U3' and the digital signal processor U3' then searches for the presence of the multiple phase or pulse width modulation preamble information at point 222. If no preamble is present, the control processor U7' then proceeds to turn off the receiving circuitry and digital signal processor power and the 430 millisecond timer sequence is again initiated. If preamble is present at decision point 222 during the digital signal processor U3' sampling time, the digital signal processor then searches for a preamble match at decision point 226. If the preamble does not match that of the preprogrammed preamble/ID of the receiver or transceiver, the control CPU then initiates the orderly power off sequence at point 224.

If a preamble match is found at decision point 226, the control processor U7' then initiates the command to narrow the receiving circuitry bandwidth at block 228. During the initial sampling for preamble by the digital signal processor U3', the bandwidth has been broadened to permit rapid synchronization time. Being programmed with a wider bandwidth effectively serves to decrease the synchronization time of the digital signal processor U3' to the preamble data. When the digital signal processor U3' has been synchronized to the preamble at decision point 226, the bandwidth is then narrowed at point 228 to reduce the potential for noise interference and increase the integrity of the received information. The next command is for the digital signal processor U3' to decode the serial stream that contains the time offset data information as indicated at point 230. This is followed by the balance of the ID code that is sent to the receiver or transceiver. If the control CPU U7' does not receive an ID match at decision point 232, it checks to see if the message being sent contains a batch command at decision point 234 indicating that one or more messages to different ID code receivers or transceivers is being sent. If the batch command is received at decision point 234, the control CPU U7' continues to monitor the message stream looking for an ID code match.

If an ID match has not occurred and a batch command has not been received, the control CPU U7' then initiates the orderly power down process at point 224 and continues the channel sampling sequence.

If the ID does not match and a batch command has been received, a third test is conducted to determine if either a message end of file command is present at decision point 236 indicating that no more messages are to be received within that preamble group or alternatively at decision point 238 that carrier has disappeared from the radio channel. If the answer is "no" at decision point 238 control CPU U7' then again initiates the orderly power down process at point 224.

If the ID matches that of the receiver or transceiver, then the control processor U7' begins the decoding at point 240 of the COMMAND and storage thereof. At block 242, the information of the first and second parallel information streams is decoded and stored. The control processor U7' continually monitors for the end of file command at decision point 244. If the end of file command has been received at decision point 244, the control processor U7' then initiates the alerting sequence that is indicated by the end of file command. This may be a visual alert, an audible alert, or a mechanical alert (e.g. vibrator as indicated at block 246). Upon completion of the alert sequence, the control processor U7' again re-enters the orderly power down process of point 224 and continues channel sampling and scanning of the receiver's or transceiver's push buttons or serial port for activity.

If the end of file command was not received, the control processor U7 then checks to determine if carrier is present at decision point 248. If carrier was not present, it indicates to the control processor U7' that faded information has occurred and the last end of file command would not be received and then initiates the orderly power down process at point 224. If the end of file command was not received and yet radio carrier remains present, it then continues the decoding and storage of the message material.

FIG. 30 illustrates a portion of the digital signal processor's U3' software that is responsible for the decoding of the data from the receiving circuitry discriminator, and the decoding of the error correction code such as the 32/14 BCH error correction code of the frames of the first and second parallel information streams to convert the data into nibbles or ASCII characters of the forward first and backward second parallel information streams. The digital signal processor U3' is responsible for the error correction techniques. The actual message reconstruction and repair is accomplished by the control CPU U7' and its related resident software.

The flowchart of FIG. 30 illustrates the sequence where data is currently being received from the receiving circuitry and the digital signal processor U3' is in the process of decoding the received data stream. The digital signal processor U3' first decodes and continues to decode the error correction bit stream from each frame comprised of the 32/14 BCH format or other error correction at block 300 and moves it in a RAM buffer area. At decision point 302 a determination is made if the serial data stream continues to be received by the receiving circuitry. If the answer is "yes" at decision point 302, a determination is made at decision point 304 if the RAM buffer is ½ full. When the RAM buffer reaches the ½ full point, the digital signal processor U3' then initiates the error decoding process at point 306 and stores the error corrected data in another area of the U4' RAM buffer as identified by point 312.

Also, if the received data is without error, it stores the character directly in the buffer U4', as identified by point 312, and continues to do so until the respective RAM buffer area is ½ full.

The digital signal processor U3' then flags the control processor U7' to initiate the data transfer of the decoded information to the control processor.

In the event that an error greater than 2-bit error is detected at decision point 308 by processing the 32/14 BCH or other error correction routine on the received data within the frame which typically contains more than one information unit, the digital signal processor U3' stores an error marker in lieu of a character in buffer U4' at point 310. The digital signal processor U3' continues this message decoding and error correction process first storing and buffering the error free or corrected information in one portion of RAM buffer of U4' at point 312 and then checking if more data is present to be processed at point 314. If the answer is "yes" at decision point 314, processing proceeds to decision point 315, where a determination is made if another buffer area U4' is ½ full. If the answer is "yes", processing proceeds to point 316. If the answer is "no" processing continues the error correction sequence at point 306. If the answer is "no" at decision point 314, processing proceeds to point 316. After the alert at point 316, a decision is made at decision point 318 if the control processor U7' has requested transfer of the data. This sequence continues until the entire message has been received, decoded, error corrected, and transferred to the control processor U7' at point 320.

Figure 31:
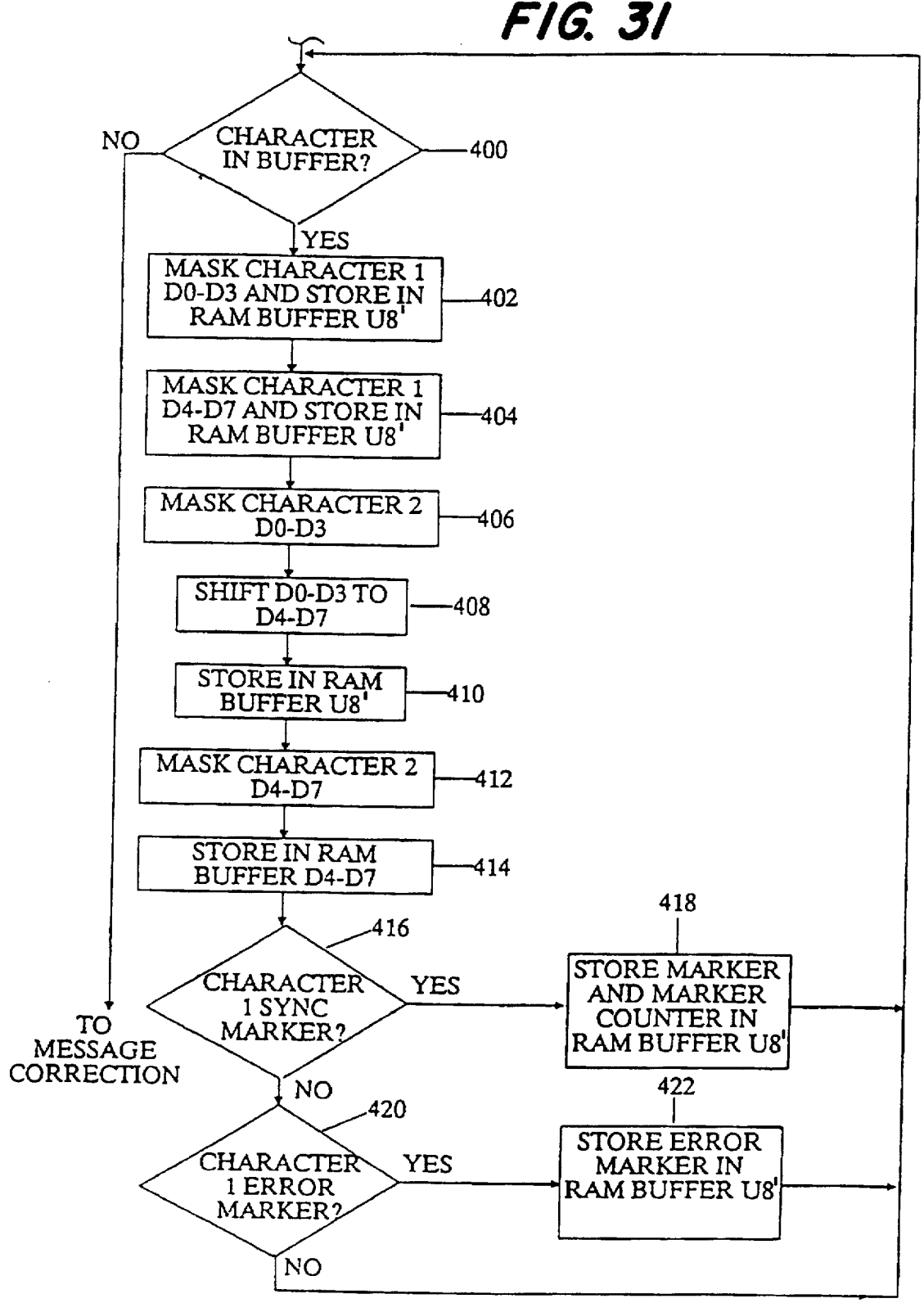
FIG. 31 illustrates a flowchart of message reconstruction by the control processor of the receiving circuitry of the present invention.

FIG. 31 illustrates pertinent portions of the resident software of the control processor U7' that is responsible for the reassembly of the parallel multiple phase/pulse width modulated error free parallel information streams. Prior to the initiation of the sequences shown in FIG. 31, the control processor U7' has transferred the information from the digital signal processor U3' to a RAM buffer area U8'. The control processor U7' then reads characters from the aforementioned RAM buffer area and begins the shifting process to reconstruct the four bit nibbles from the forward first parallel information stream and the four bit nibbles from the back second parallel information stream. The control processor U7' first checks to determine if a character is resident in the RAM buffer at decision point 400, and then begins the masking process to permit storage of bits at system memory bit positions D0–D3 of the 8-bit code in a RAM buffer at point 402. The first character bits at system memory bit positions D0–D3 represent 4-bits formed from splitting the 8-bit characters of the forward first parallel information stream and system memory bit positions D4–D7 represent four bits formed from splitting the 8-bit characters of the back second parallel information stream. This separation takes place by the control processor U7' and the utilization of two separate buffer areas within RAM U8 to store the forward first and back second parallel information streams.

Upon completion of the masking, separation, and storage at point 404 of the bits of character one into their respective RAM buffer areas, the control processor U7' then fetches the next character and repeats the same process at points 406–414. The second eight bit character is the balance of the two 4-bit nibbles of the forward first and back second parallel information streams. Bit masking at point 406 and shifting takes place at point 408 to move the second character bits at system memory bit positions D0–D3 to the system memory bit positions at D4–D7 prior to storage in the RAM buffer U8 at point 410. The portion of the second character at system memory bit positions D4–D7 is masked at point 412 and stored directly in the RAM buffer at point 414 for the back second message.

The control processor U7' then checks to determine if the character is a SYNC marker at decision point 416. If it is a SYNC marker, e.g. all binary ones, it is stored in the RAM buffer area at point 418. If the character is not a SYNC marker, the control processor U7' then tests to determine if the character is erroneous (faded information) at decision point 420 by determining if processing of the error correction code for the character reveals a non-correctable bit error, e.g. three bits for the 32/14 BCH code.

When an error marker is detected, it is also stored in the RAM buffer U8 at block 422. It is the presence of this error marker that indicates a loss of an entire character or data of a frame, or the inability of the digital signal processor U3' to reconstruct the character or data of a frame utilizing the error correction code.

This process continues until all of the characters received from the digital signal processor U3' have been separated and reconstructed into their proper eight bit characters. At this point, the forward first and the back second parallel information streams are complete and intact. Upon completion of this sequence, the control processor U7' proceeds to the message correction portion of the software.

Figure 32:
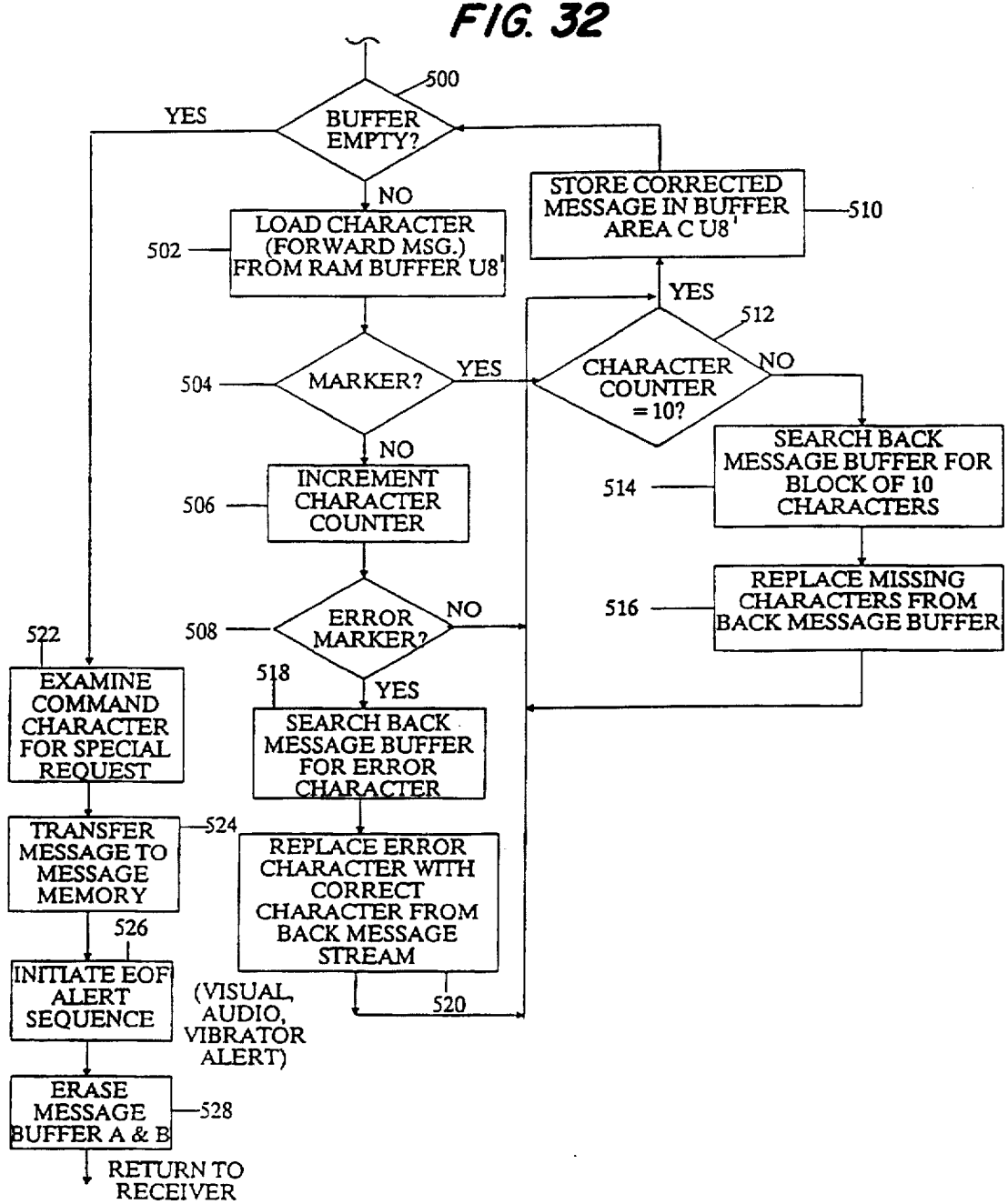
FIG. 32 illustrates a flowchart of message correction by the control processor of the receiving circuitry of the present invention to replace faded information with error free information.

FIG. 32 illustrates the message correction process where erroneous characters and/or missing characters (faded information) are replaced by either a transfer time offset by the TIME DELAY INTERVAL from the first to the second or the second to the first parallel stored information streams. The first and second parallel information streams as described in FIG. 31 were previously stored in RAM buffer areas A and B respectively. Upon completion of the information separation and reconstruction process, RAM buffer A contains the first parallel information stream and RAM buffer B contains the parallel second information stream as eight bit characters.

The control processor U7' then begins the process of examining the first parallel information stream at decision point 500. A character is loaded at point 502 from the forward first parallel information stream and is tested to determine if it is a marker or an actual information character at decision point 504. If it is a character and not a marker, the control processor U7' increments the character counter at point 506 and then tests to see if the character is erroneous (faded information) by the presence of an error marker at decision point 508. If the character is not a marker character and is not an error marker, then the character is stored in RAM buffer area C at point 510. This process continues until a marker character is detected. Upon detection of a marker character at decision point 504, the control processor U7' then checks the character counter to see if it is equal to ten at decision point 512. A marker character occurs every ten characters and this permits the synchronization and reconstruction of erroneous or missing portions (faded information) of the message. If a marker character is detected and the character counter is equal to ten at decision point 512, then the message is considered intact and is stored in RAM buffer area C at 510. If a marker character is detected and the character counter is not equal to ten, then the control processor U7' searches the back second parallel information stream buffer B for the block of ten characters at point 514 that corresponds to the forward parallel information stream first block of ten characters. When the marker character is detected and the character counter is less than ten, it is apparent that some anomaly exists that caused one or more of the characters to be missing. Reconstruction of the missing data from the back parallel information stream buffer is necessary. The missing characters are transferred from the back parallel information stream buffer B to the corrected message buffer C by the control processor U7' at point 516. If a single character is found to be erroneous within a block of ten characters at point 518, the control processor then searches the back second parallel information stream buffer B for the character in error, and replaces the erroneous character with a correct character at point 520. This character is again stored in buffer area C.

This process continues until all of the characters have been examined and corrected as necessary and there is no additional message data to be corrected at decision point 500. Upon emptying of the information buffer, the control processor then examines the command character at point 522 for a special or service request. The command character may indicate to the receiving circuitry that the message is to be transferred to an external device, or stored in its internal memory, at point 524. The command character may indicate to the control processor U7' that the message is to be delegated to a specific message memory location in the event that priority message location in memory is required.

Figure 29B:
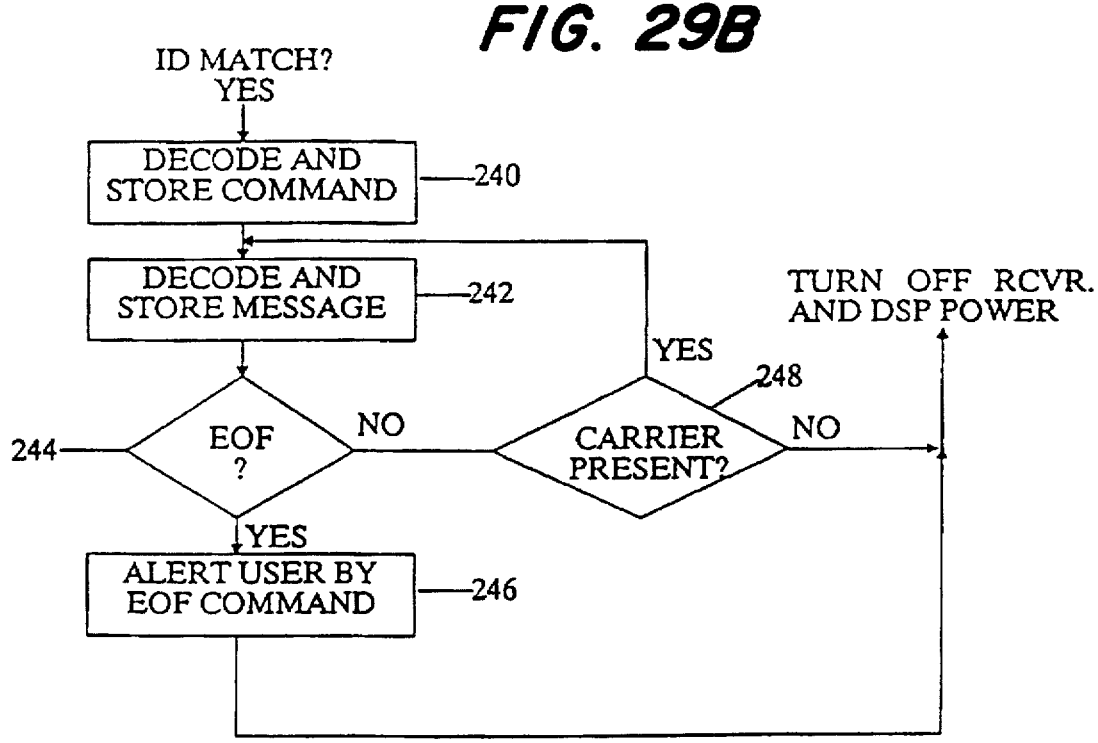

The control processor U7' then transfers the message to the indicated information memory buffer C and initiates the end of file alert sequence at point 526. This end of file alert sequence as previously described may be in the form of a visual, audible or mechanical alert to the user. Upon completion of the alert sequence, the forward first and back parallel information streams that were previously stored in RAM buffer areas A and B are erased at point 528. Upon completion of erasure, the control processor U7' then returns to receiving circuitry decoding control sequence as indicated in FIGS. 29A and 29B.

FIG. 33 illustrates the reconstruction of missing or erroneous information in the forward first or back second parallel information streams to provide a reconstructed error free message. In the example the dashed linesindicate on-going information that consists of ten characters followed by a numbered marker that, in effect, numbers blocks of ten full eight bit characters. The characters of FIG. 33 are full eight bit characters as contrasted with four bit nibbles in FIG. 20. This accounts for characters in FIG. 33 being in character blocks of ten eight bit characters as contrasted with blocks of twenty four bit nibbles in FIG. 20. In FIG. 33 a "MARKER" identifies the two character marker combination of FIG. 20. In the example, in the top information stream stored in RAM buffer U8 Area A, marker 23 contains erroneous information. Six characters in the forward first parallel information stream (characters two through seven) are erroneous and therefore, need to be reconstructed from the data in the corresponding marker 23 in the back second parallel information stream stored in RAM buffer U8 area B. Replacement characters two through seven are copied from the back second parallel information stream stored in buffer B illustrated as the middle information stream and are forwarded to RAM buffer area C illustrated as the bottom information stream where the error free information data stream containing corrected characters is stored. RAM buffer area C contains the reconstructed error free message having the erroneous characters removed with the substitution of the correct replacement characters from RAM buffer B for the error markers in buffer Area A. The RAM buffer C contains error free information which may be subsequently processed or outputted.

This reconstruction process can take place by either looking forward or looking backward in time fashion by a time displacement equal to the TIME DELAY INTERVAL. The control processor U7' may take portions of the forward parallel message stream combined with portions of the back second parallel message stream to reconstruct a complete message that is stored in RAM buffer area C. Upon completion of this reconstruction process, the control processor U7' then clears the forward parallel information stream RAM buffer area A and the back second parallel information stream RAM buffer area B for the receipt of new information. The control processor U7' also transfers the reconstructed message contained in area C to a message memory or transfers it externally to the serial port as the command that was sent with the message indicates.

FIG. 34 illustrates a configuration of a two-way data transmitting system in accordance with the present invention. A protocol encoder/decoder network switch 602, which may be in accordance with FIG. 14, interfaces through the public switched telephone network PSTN via a telephone office 604 to a plurality of different types of information sources. The different types of possible information sources may be a PC 606, an E-mail source 608 and a data service 610. The aforementioned information sources are only exemplary of information which may be inputted to a two-way data transmitting system. The protocol encoder/decoder network switch 602 also is connected to a plurality of base stations 612 which are identified by the reference numerals "1"-"N" inside the rectangular boxes labelled "base station" to identify a variable number. Each base station 612 has an antenna 614 which functions both as a transmitting and receiving antenna. Two-way radio communications are broadcast on a carrier 616 between the base stations 612 and a plurality of mobile devices 618 each of which have a transmitting and receiving antenna 620. The two-way data transmitting system mobile devices 618 may be without limitation in practicing the invention, a mobile data transceiver A, portable PC, personal digital assistant (PDA) which may take the form of a hand-held computer, a wireless fax and another mobile data transceiver B.

A two-way data transmitting system 600 in accordance with the invention has three basic call sequences which occur in providing mobile data service. The first sequence is a land-to-data mobile call in which the call originates from the wireline telephony network PSTN through the network switch 602 to a base station where it is radio broadcast to a mobile device 618. The second call sequence is a mobile device 618 originating a call to the wireline telephony network PSTN. The mobile device 618 originates the call which is transmitted via wireless broadcast 616 to a transceiving facility 616 which is in turn connected to the wireline network. The third call sequence is a mobile device 620 making a call to another mobile device which is the equivalent of a cellular mobile to cellular mobile call in that both units are mobile or portable and the call from the originating mobile device is directed via wireless broadcast through the land station facility, processed by the protocol and encoder/decoder of the network switch 602 and is relayed back to the recipient mobile device via wireless broadcast. An example of this call sequence is from mobile A to the base station 1 through the protocol encoder/decoder of the network switch 602 back through the base station N to the mobile B. In each of these call sequences it should be understood that the explanation which refers to data devices A and B may be any of the devices described above as mobile devices.

With reference to FIG. 34, a land to mobile data message may originate from any number of devices. The data message may originate from the PC 606, the E-mail system 608 or the data service 610 that requires a message to be sent to a wireless destination. Such data services may be stock quotes, sports quotes, news services, map services, weather or traffic information and any other number of public or non-public services that need to be conveyed to an individual or multiple mobile data transceiver. The call sequence first begins on the left-hand side of FIG. 34 from any one of the data origination devices as described. For purposes of this example, the call will originate from the E-mail service 608 to send a memo to the mobile A shown on the right-hand side of FIG. 34. The E-mail service 608 via the PSTN through the telephone offices 604 routes the call to the protocol encode/decoder of network switch 602 by dialing the corresponding telephone number of mobile A. Upon receipt of the call, the network switch 602 connects a modem to the telephone line to permit the E-mail message from the E-mail source 608 to be transmitted and received by the network switch 602. At this point it should be noted that the protocol encoder/decoder of network switch 602 functions to generate the time offset first and second parallel information streams as described above which each carry the identical message content originated from the E-mail source 608 as well as other protocol information including error correction code and frame identification information. The protocol information of each parallel stream may be varied in the same manner as the protocol information of FIG. 8. The network switch 602 looks up detailed information concerning the mobile A data transceiver. This information includes the A mobile's identification number, types of service that the mobile is registered to have, the transmission format and the particular base station or group of base stations that the A mobile currently resides on. Upon completion of this information look-up, the protocol encoder/decoder section of the network switch 602 selects an appropriate encoding module to encode and relays the information via the "link" to base station "1". The "links" that are shown in FIG. 34 can be any one of a number of different communications media. It may be microwave, dedicated wireline, fiber optics or any other typical voice grade line. Control signals are sent by the network switch 602 to the base station "1" to turn on its transmitter 616 to begin the data transmission process which includes broadcast of the channel carrier modulated with the subcarrier as described above. The mobile A provides some form of acknowledgment or response and may also be involved interactive data communications. Interactive data communications could be an on-line communication between a PC 606 and the mobile A. Files may be transmitted from the PC 606 to the mobile A which are modified or which responds to the data by returning a transmission of the data via base station 1, the network switch 602 and through the telephone office 602 in the PSTN back to the originating PC 606.

A second sequence is a data mobile to land call sequence. With reference to FIG. 34, mobile A sends a data message to the land-based PC 606. The mobile A data transceiver enters the message and then initiates the transmission sequence. The mobile A, which is currently registered at the network switch 602, identifies and transmits the data message via the RF link to base station "1". Base station "1" receives the data message and forwards the message in real time to the network switch 602 when the mobile A initiates the calling sequence to transmit the data. The network switch 602 has been alerted and has received the mobile A's identification number. The network switch 602 then looks up in its subscriber file for data pertaining to the mobile A to determine what type of protocol encoding and decoding equipment to connect to the base station "1" port. The network switch 602 also looks up the types of service options to which the mobile A has subscribed. The protocol encoder/decoder network switch 602 receives the data message from the mobile A data where it is decoded by receiving circuitry resident in the decoder which performs the function of the receiving circuitry discussed above with reference to FIG. 23. In this sequence, the mobile A has also transmitted the corresponding telephone number for the land-based call to the personal computer 606. The network switch 602 then dials the telephone number of the destination PC 606 through the telephone office 604 in the PSTN. A corresponding modem is connected to the PSTN link so that when the PC 606 answers, the data can be transmitted to the destination PC 606. Upon completion of the data transmission to the PC 606, the network switch 602 terminates the call. This explanation basically describes a one-way data message between the mobile A and the land-based PC 606. There are other scenarios where the exchange of data may take place. In this case, two-way data transmissions occur during the mobile A and the PC 606 upon call set up. This permits real-time or interactive data transmission to occur between the mobile A and the PC 606. An example of this is when the mobile A accesses particular files in the Mobile A user's office PC 606 to either modify and/or retrieve data from the personal computer 606. The mobile A may be a full duplex or simplex mobile depending upon the type of transmitting infrastructure that is available for the wireless data service.

The third type of transmission is the data mobile to data mobile call sequence. With reference to FIG. 34, the mobile A initiates the data message call by alerting the network switch 602 by sending its identification code via the wireless link to base station "1" to the protocol encoder/decoder of the network switch 602. The network switch 602 then qualifies the mobile A's identification number and connects the necessary type of protocol encoder/decoder of the network switch 602 to the base station "1" port in order to receive the data message. The mobile A then enters mobile B's identification number (or telephone number) and begins the transmission of the data message. The network switch 602 looks at the mobile B's customer file to determine what radio channel and type of protocol decoder the mobile B transceiver has. In this case, mobile B is located on base station N. Upon receipt of the data message from the mobile A, the network switch 602 temporarily stores the message in a buffer file and then begins the signalling process to contact the mobile B. The mobile B's identification number is transmitted alerting the mobile B data that a message is about to be transmitted. The network switch 602 via base station N connects the necessary type of protocol encoder/decoder and transmits the data message to the mobile B. This example is essentially a one-way transmission of a data message from mobile A to mobile B. There are variations of this call sequence such as an interactive data communications between mobile A and mobile B. A real-time interactive exchange of data may occur between mobile A and mobile B. Both mobile units then via real-time transmission exchange data between each other. This may be a form of interactive short text messages exchanging location or other information. In this configuration, both data mobile units remain actively transmitting or both transmitting on a corresponding base station with the network switch 602 acting as the encoder and decoder of the first and second time offset parallel information streams and buffering and forwarding the respective messages between each unit. Another variation to this mobile communications sequence is for mobile A to send data to the wireless fax, PDA or a portable PC with a wireless link. Any number of data communications can be exchanged between each of the mobile devices 618 to any other type of mobile device. One type of transceiver which may be used in practicing the invention is described below in FIG. 35. The transceiver performs the functions of the transmitting and receiving circuitry described above in FIGS. 21 and 23.

Figure 35:
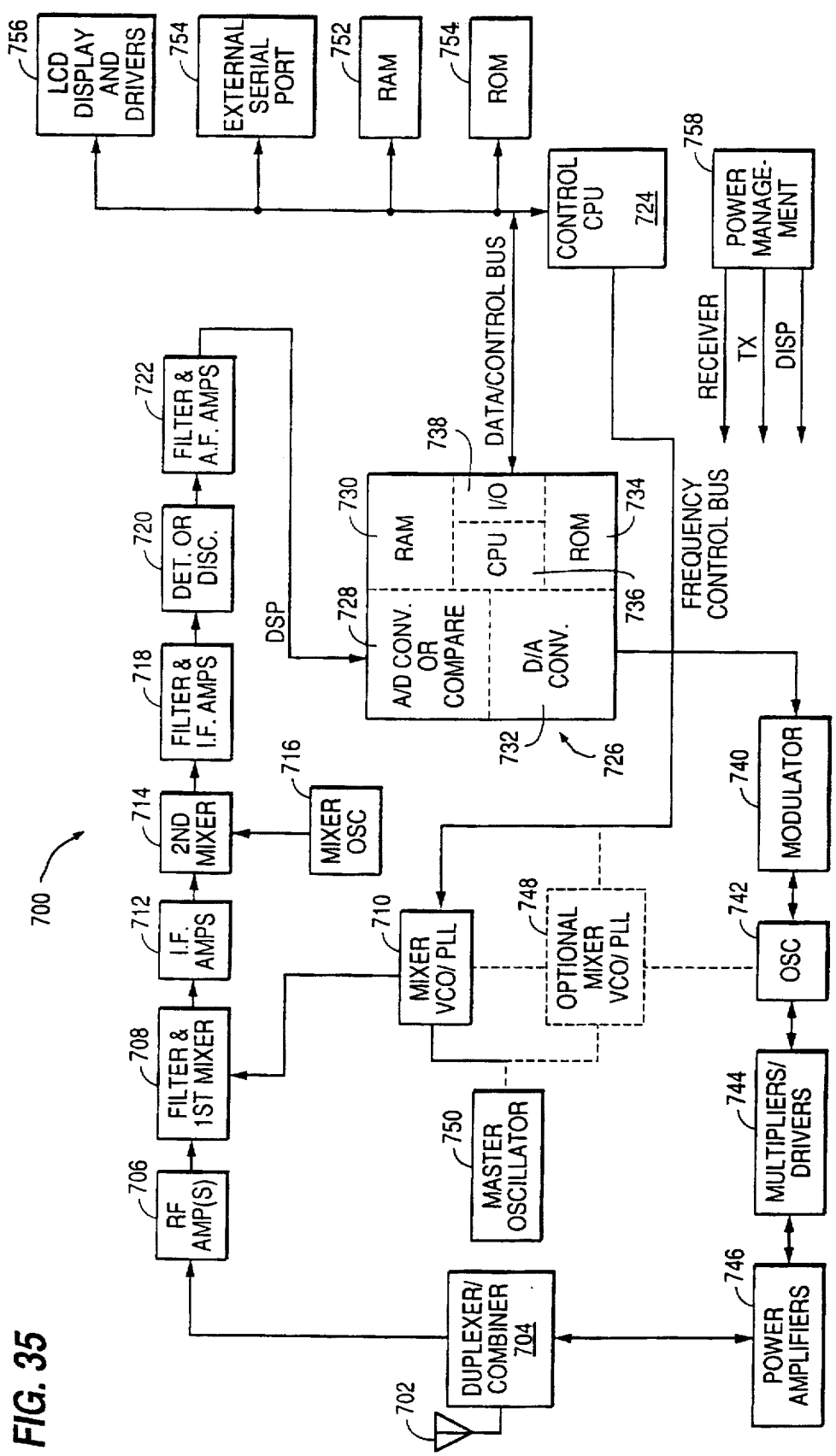
FIG. 35 is a block diagram of an embodiment of a transceiver in accordance with the present invention.

FIG. 35 illustrates a block diagram of a first embodiment of a transceiver 700 in accordance with the present invention such as for use as the mobile transceivers described above with reference to FIG. 34. The transceiver 700, as illustrated, is full duplex (being able to transmit and receive at the same time) as is typical in many wireless data transceivers. There are variations from duplex, such as simplex mode where the transceiver 700 transmits and receives on the same frequency or in a duplex "burst" mode where the transceiver only transmits for short burst type of transmissions to conserve battery power.

The transceiver is a dual conversion frequency synthesized device. The received signal is transmitted from antenna 702 through a duplexer/combine 704 which functions to couple the antenna 702 to the radio receiver and provide isolation from the transmitter power amplifiers 746 to prevent desensitization of the receiver and to utilize a single antenna from both the transmission and reception of information. The RF amplifier 706 may contain one or more stages depending upon the operating frequency of the transceiver 700. The received signal then flows to a filter and first mixer 708 at which the signal is mixed following by intermediate filtering. The mixing uses the output signal from the mixer, voltage controlled oscillator and phase lock loop circuitry 710 to convert the received signal to the intermediate frequency. The IF frequency produced at the first mixer 708 may be any number of frequencies depending upon the operating frequency spread of the transceiver 700. Typical choices for the IF frequency at this point are 44, 21.4 or 10.7 MHz. After IF filtering, the signal is amplified by IF amps 712 which typically contain a plurality of stages. The signal, as amplified by the IF amps 712, proceeds to a second mixer 714 at which a signal from mixer oscillator 716 is mixed with the amplified IF signal to produce a lower IF frequency signal. The lower IF frequency signal progresses to a filter and IF amps 718 where further IF filtering and amplification occurs. The filtered and amplified signal proceeds to a detector or discriminator 720 where the IF signal is demodulated to an audio frequency signal.

Depending upon the format of the transmission protocol (multiple phase, pulse width modulation or both types of modulation of the subcarrier) the detector or discriminator 720 may have numerous configurations that are well known in the state of the art. The illustrated receiver circuitry may have a standard FM discriminator with the recovered audio frequency signal being fed to a series of audio frequency amplifiers and filters 702. All of the above-referenced components represent a standard communications receiver known in the art. The operating frequency of the receiving part of the transceiver 700 is controlled by the mixer, voltage controlled oscillator and phase lock loop circuitry and is under direct control of the control processor 724. The control processor 724 in the transceiver 700 is responsible for numerous functions including the direct frequency control of both the receiver and transmitting electronics.

The receiving circuitry of the transceiver 700 resides in the digital signal processor 726 and in part in the control processor 724. The receiving circuitry performs the processing of the modulated subcarrier to convert the first and second parallel information streams into binary information as described above and, additionally, the processing of the first and second parallel information streams as converted into binary information to correct for faded information and produce an error free output.

While the receiving circuitry of FIG. 23 is located in digital signal processor U3' and control processor U7', it should be understood that the functions of the digital signal processor U3' and control processor U7' of FIG. 23 can be solely performed by the digital signal processor 726 or the control processor 724. Furthermore, given the rapid increase in processing speed and processing capability of digital signal processors in low voltage, low power integrated circuits, the implementation of the discrete functions of the digital signal processor U3' and control processor U7' of FIG. 23 into a single processor, such as the digital signal processor 726, will become increasingly simpler and may be the preferred architecture for performing the processing functions of the digital signal processor U3' and control processor U7' instead of having a separate digital signal processor and control processor.

The digital signal processor 726 has an A to D converter or comparator 728 for digitizing signal levels, RAM 730 for storing information as described above in performing the functions of the digital signal processor U3' of FIG. 23 and control processor U7', a D to A converter 732 for converting digital information to analog, a ROM 734 for storing pre-stored programming, a CPU 736 for executing the necessary programming to perform the functions of the digital signal processor U3' of FIG. 23 and input/output 736. Furthermore, the digital signal processor 726 may perform the same functions as the digital signal processor U3' and the control processor 724 may perform the same functions as the signal processor U7' as described above with reference to FIG. 23.

The digital signal processor 726 also functions to perform the functions of the transmitting circuitry of FIG. 21. These functions include the functions of CPU U1 and digital control processor U47 to produce the preferably identical first and second information streams time offset at read out with the TIME DELAY INTERVAL of FIG. 8, modulation of the subcarrier with the first and second information streams to produce the first and second parallel information streams as modulated on the subcarrier to preferably contain identical information or information units which are time offset as modulated on the subcarrier by the TIME DELAY INTERVAL as outputted from the digital signal processor to the modulator 740.

The transmitter part of the transceiver 700 has a modulator 740, oscillator 742, multipliers/drivers 744 and power amplifiers 746, duplexer/combiner 704 and an antenna 702. The modulator 740 receives the modulated subcarrier in either analog or digital form, as described above with reference to FIGS. 12 and 13, and converts it to a dynamic range which modulates an oscillator 742 which is FM modulated by the output of the modulator 740 to produce a low power RF frequency modulated signal which is FM modulated with the subcarrier. Depending upon the operating configuration of the transceiver 700, a separate mixer, voltage controlled oscillator and phase lock loop 748 may exist. In a simplex configuration, the optional mixer, voltage controlled oscillator and phase lock loop 748 would not be used and the oscillator would derive this control from the mixer, voltage controlled oscillator and phase lock loop 710. Master oscillator 750 is a frequency reference for both the mixer, voltage controlled oscillator and phase lock circuits 710 and 748. The multipliers/drivers 744 multiply the frequency of the FM modulated RF signal produced by the oscillator 742 and step up the power to a level such as five watts. The output of the multipliers/drivers 744 is further amplified by power amplifiers 746. The output of the power amplifiers 746 is applied through the duplexer/combiner 704 to the antenna 702.

The digital signal processor 726 controls the data encoding and decoding of information by the transceiver 700. As shown, the digital signal processor 726 has access to the data control buses of the control processor 724. The control processor 724, in addition to the above-described functions, serves as a message management processor and to reassemble the first and second parallel information streams into an error free information output. The first and second parallel information streams which are converted into binary may be sent to the control processor 724 for storage in the RAM 752. The stored operating program resident in ROM 754 may provide the information necessary to permit the control processor 724 to perform its frequency control operations, decoding and reassembly of the first and second decoded parallel information streams into error free information, transmission of the error free information to an external serial port 754 and to display messages on a resident liquid crystal 756.

Depending upon the power requirements and portability of the transceiver, power management electronics 758 may also be controlled by the control processor 724. The power management electronics 758 contains control logic that permits the control processor 724 to shut down or control power to various portions of the transceiver. Typically, power to the transmitter and display will be off during periods of inactivity. The receiver power control will be systematically and periodically turned on to sample the received channel for the presence of data information. Only when received data is present will the various other areas of the transceiver be switched on as needed. This type of power management maximizes power conservation and permits the transceiver to be extremely light weight and portable in operation. The transceiver as described could be a trunk or under dash vehicle mount unit with a power output of 10 watts or greater, a small hand-held PDA or notebook computer that may only transmit a few watts of power as required.

Figure 36:
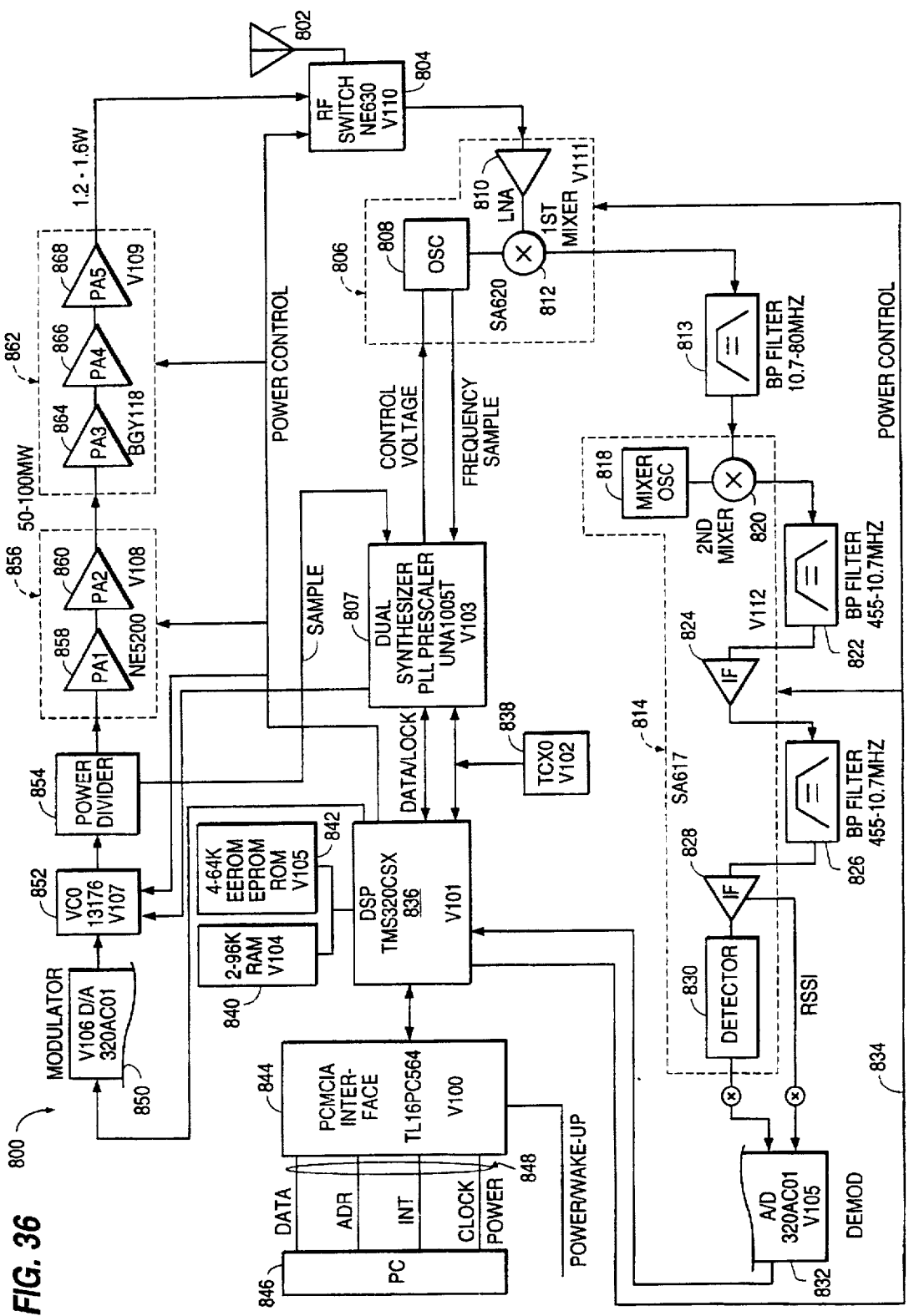
FIG. 36 is a block diagram of another embodiment of a transceiver in accordance with the invention for use with a PCMCIA card interface to a personal computer.

FIG. 36 illustrates a second embodiment of a transceiver 800 in accordance with the present invention which is designed for applications interfacing with a personal computer through a PCMCIA interface. The transceiver 800 has transmitting circuitry which performs the same functions performed by the transmitting circuitry as described above including the functions specifically performed by the transmitting circuitry of FIG. 21. The transceiver also includes receiving circuitry which performs the same functions performed by the receiving circuitry as described above including the functions specifically performed by the receiving circuitry of FIG. 23. The architecture of the transceiver is different than that of the transceiver described above of FIG. 35 but performs the same functions as the transceiver described above.

The transceiver 800 illustrated in FIG. 36 uses commercially available integrated circuits identified by the part numbers therein when designed for operation in the 900 MHz. band. However, it should be understood that the same design may be utilized for other frequency bands, such as 220 MHz., 800 MHz. and frequencies above 900 MHz. with suitable changes being made in choosing components for operation in those frequency bands. Furthermore, it should be understood that, as illustrated, the transceiver 800 is intended to modulate an analog subcarrier as a consequence of the digital to analog converter modulator 850 performing the conversion of the digital output signal from the digital signal processor 836 into the encoded format. The analog modulation uses the general format of FIG. 7A but a different number of bits may modulate each cycle of the subcarrier. However, if digital modulation is used in accordance with the general format of FIG. 7B, groups of a different number of bits per half cycle, may be used. With digital modulation the modulator 850 would be eliminated and the output of the digital signal processor 836 would be connected directly to the voltage controlled oscillator 852.

The following components comprise the transmitting circuitry: digital signal processor 836, master oscillator 838, RAM 840, ROM 842, dual synthesizer phase lock loop prescaler 807, digital to analog converter modulator 850, voltage controlled oscillator 852, power divider 854, linear amplifier 856 which is comprised of first and second amplification stages 858 and 860 and linear power amplifier 862 which is comprised of third, fourth and fifth amplification stages 864, 866, and 868, RF switch 804 and antenna 802. A detailed description of each of these components in accordance with their function in the transmitting circuitry is set forth below.

The receiving circuitry is comprised of the following components: antenna 802, radio frequency switch 804, dual synthesizer phase lock loop prescaler 807 supplying a control voltage to radio frequency section 806, which is comprised of oscillator 808, low noise amplifier 810 and mixer 812, bandpass filter 813, intermediate frequency section 814 which is comprised of mixer/oscillator 818, mixer 820, bandpass filter 822, intermediate frequency amplifier 824, bandpass filter 826, intermediate frequency amplifier 828, detector 830, analog to digital converter 832, digital signal processor 836, master oscillator 838, RAM 840 and ROM 842. A detailed description of each of these components in accordance with their function in the receiving circuitry is set forth below.

The transmitting and receiving circuitry is connected to PCMCIA interface 844 which is connected to a PC 846 through computer bus 848. The interface 844 functions to permit data or information which is to be wirelessly transmitted, as described below, to be transmitted from the PC 846 by the computer bus 848 through the interface 844 to the transmitting circuitry and further functions to output error free atmospherically transmitted information including the replacement information which has been processed by the receiving circuitry as described above to the computer bus 848 and to the PC 846 for further processing.

The components of the transmitting and receiving circuitry share a common digital signal processor 836, master oscillator 838, dual synthesizer phase lock loop prescaler 807, RAM 840 and ROM 842. This dual usage simplifies the hardware architecture and reduces its expense. Reduction of expense is a critical aspect of wireless interfaces with PCs as a consequence of the current wireless interfaces often exceeding the cost of the personal computers to which they are connected.

The individual components of the transceiver 800 are described as follows:

The PCMCIA interface 844 is an interface between the PC data/address bus 848 and the transceiver which utilizes a commercially available PCMCIA interface integrated circuit as indicated. The interface 844 provides bi-directional buffering of the sixteen bit data bus, the PC I/O address bus, multiple interrupts that can be dynamically programmed to be utilized by the transceiver 800, and a number of clock and power sources from the PC bus. The power lines from the computer bus 848 to the individual components of the transceiver have not been illustrated to avoid adding complexity to the drawing. It should be understood that use of the battery of the PC 846 provides the capability of the transceiver to function as a twenty four hour a day wireless modem with full buffering which facilitates the PC being placed in a powered down status while still permitting unlimited wireless connectivity to transmit and receive.

The interface 844 contains the necessary address gating to permit the transceiver 800 to be utilized for numerous addresses for a multitude of functions. For example, certain transceiver addresses will be utilized for the transfer of data received or to be transmitted. Other addresses will be used for the initialization of the transceiver 800 in the form of commands that will program the transceiver to operate on a certain frequency or band of frequencies in either a simplex or half duplex mode or combination of both modes. Other command sets arriving via specific programming addresses will dynamically configure the transceiver 800 to provide full message storage for later retrieval by the PC 846 or to alert the PC via an interrupt that a message is being received to initiate a background program, or TSR routine as is known in the art, in the PC to permit an immediate transfer of received data to the PC's storage media. Other command sets that will utilize specific addresses in the transceiver 800 will pertain to the amount of radio power, or power limits that the transceiver will utilize to send messages to a base station. Similarly, command instructions from the PC 846 will dynamically program the digital signal processor 836 to change its received band width and/or data rates as necessary to accommodate the wireless infrastructure (e.g. narrow band to lower data rates will require a different dynamic receiver bandwidth than the reception of data on a wide band transmitting channel).

The digital signal processor 836 is the controller of the transceiver 800. The digital signal processor 836 provides all of the management control of the receiving circuitry, transmitting circuitry, temporary memory storage, protocol, encoding and decoding, and interface management of the PC bus 848 via the bus interface 844.

A preferred integrated circuit for implementing the digital signal processor 836 is manufactured by Texas Instruments under the part designation 320C5X series processor that is specifically designed for high speed telecommunications service but it should be understood that the invention is not limited thereto. The digital signal processor 836 has the capability of addressing a total of 64K words of stored programmed memory in ROM 842 and 96K words of data/message memory in RAM 840 utilizing a modified Harvard architecture. The C5X series digital signal processors have the capability of simultaneously controlling a number of eight and sixteen bit data ports simultaneously for the receipt and transfer of messaging data as well as numerous management functions necessary to operate the transceiver 800.

The digital signal processor 836 is capable of operating as low as 3 volts with minimal current consumption that is dependent upon the number of Mips per second necessary to perform tasks. The digital signal processor 836 is capable of performing fifty million machine instructions per second and therefore has the capability of performing all of the described protocol encoding and management functions at radio data rates in excess of thirty eight Kilobits per second.

The RAM 840 and the ROM 842, as described above, may be addressed respectively with a total of 96K words of data/message memory and 64K words of stored program memory. In FIG. 36, it should be noted that the specific part numbers for the RAM and ROM integrated circuits are not given because of their availability from numerous commercial sources in different capacities chosen to facilitate the application.

The message storage capacity of the RAM 840 and the stored program ROM capacity of the ROM 842 are primarily determined by the particular application for the wireless transceiver 800. Therefore, these circuits may vary in storage capacity from a few K words to the maximum specified. Such variations of the application for temporary memory sizing will include the ability to have the PCMCIA interface 844 to a computing product that requires minimal "on module" message buffering and, therefore, memory requirements which enhance costs, will be substantially smaller. In other applications it may be necessary to require the full message storage capacity "on module" for the storage until the transceiver 800 can either automatically power up the PC 846 (via an interrupt TSR routine, or a power up pin) or until the PC user manually turns on the power to the PC 846.

The analog to digital converter modulator 850, which is required for modulation of the analog subcarrier as discussed above in conjunction with FIG. 7A, is preferably a Texas Instruments A to D and D to A converter, one-half of which is utilized to perform the encoding of the data protocol but it should be understood that the invention is not limited thereto. This integrated circuit is a wide band, high speed device that interfaces directly to the digital signal processor 836 on the digital side and directly to the transmitter and receiver on the analog side. The modulator has sufficient speed and bandwidth to encode the protocol as described above in conjunction with FIGS. 7A and 7B and further to encode the protocol described in application Ser. No. 08/386,060, filed Feb. 7, 1995, entitled "System for Wireless Serial Transmission of Encoded Information", application Ser. No. 08/385,321, filed Feb. 7, 1995, entitled "Receiving Circuitry of Wireless Transmission of Serial Transmission of Encoded Information", and Serial No. 08/385,143, filed Feb. 7, 1995, entitled "Transmitting Circuitry for Serial Transmission of Encoded Information" at multiple data rates (speeds).

The dual synthesizer phase lock loop 807 is preferably a Phillips synthesizer with a dual high speed, high frequency synthesizer capable of operating up to frequencies in excess of 1.1 (GigaHertz) GHz but it should be understood that the invention is not limited thereto. A pin for pin compatible counterpart commercially available integrated circuit will permit operation of the transceiver 800 up to 2.3 GHz. The synthesizer contains the necessary components to provide the dynamic frequency programming to determine the reception and transmission frequencies under direct digital control by the digital signal processor 836. To permit the transceiver 800 to perform either in a scanning mode, and/or in a spread spectrum mode, the dual synthesizer phase lock loop prescaler 807 has extremely fast lock up times for the phase lock loop and phase lock loop filters. Upon programming for a specific transmit frequency, the dual synthesizer phase lock loop prescaler 807 sends an analog voltage to the voltage controlled oscillator 852 to determine the desired operating frequency. Upon verification that the voltage controlled oscillator 852 is operating at the desired frequency (as is discussed below) the dual synthesizer phase lock loop prescaler 807 sends a lock signal to the digital signal processor 844 indicating the transmitting circuitry is ready to be modulated with data.

The master oscillator 838 provides a stable reference signal to the dual synthesizer phase lock loop synthesizer 807 and the digital signal processor 836 which circuits derive their master clock signals from the highly stable reference crystal oscillator contained in the master oscillator 838. The crystal oscillator of the master oscillator 838 is temperature compensated so to provide the maximum frequency stability required for RF transmitting requirements as established by Federal Communications Commission rules. Depending upon the specific operating frequency, the requirements for frequency stability are defined by one or more Federal Communications Commission parts or rules and regulations.

The voltage controlled oscillator 852 consists, preferably, of an integrated circuit manufactured by Motorola that has the capability of oscillating at the desired transmitting frequency, but it should be understood that the invention is not limited thereto. Appropriate stabilizing and feedback components are contained within the voltage controlled oscillator 852 to provide maximum oscillator temperature and voltage stabilities. A separate input to the voltage controlled oscillator 852 permits the data that was encoded by the modulator circuit to modulate the rest frequency of the voltage controlled oscillator in the form (in this example) of linear FM modulation. The voltage controlled oscillator 852, which functions as the modulator as described above, also contains appropriate buffering circuits to prevent the next stage from having impact upon the operating frequency of the voltage controlled oscillator.

The power divider 854 is comprised of a number of discrete components that permit proper impedance matching to the power amplifier stages thereafter and a sampling output for the dual synthesizer phase lock loop prescaler 807. A portion of the power being generated by the voltage controlled oscillator 852 must be returned to the dual synthesizer phase lock loop prescaler 807 to permit the comparison of the oscillator's frequency to the preprogrammed reference frequency desired by the digital signal processor 836. It is this sampled frequency that is divided down and phase compared to the reference oscillator 838 frequency to derive an error signal that is representative of any difference between the desired frequency and the actual operating frequency of the voltage controlled oscillator 852. Upon detecting an error, the control voltage being sent to the voltage controlled oscillator 852 is varied slightly to provide the necessary frequency correction of the voltage controlled oscillator. Appropriate loop filters in the closed loop detector provide adequate response time to readily correct transmitting frequency errors but allow the modulation of the voltage controlled oscillator 852 with data information.

The intermediate power amplifier 856, which is comprised of two stages 858 and 860, boosts the power level received from the power divider circuit 852 to a level of approximately 50 to 100 milliwatts. This stage power amplifier is a broad band power amplifier, preferably manufactured by Phillips, that provides direct fifty ohm input and output impedances with a minimal number of external components. The first stage power amplifier stages 858 and 860 also have a power control enable that permits the integrated circuit containing the power amplifiers to be shut down when not in operation to conserve the battery power of the PC 846. This provides a substantial savings and permits only circuits necessary at a particular time to operate and consume power, leaving unnecessary circuits in a very low power mode until needed. For example, when a message is to transmitted, the digital signal processor 836 first enables the dual synthesizer phase lock loop prescaler 807 and the voltage controlled oscillator 852 and awaits verification that the transmitter voltage controlled oscillator 852 is at the desired frequency. At this point, the digital signal processor 836 commences an enabling process for the intermediate and power amplifiers 850 and 862 followed by the enabling of the digital to analog converter modulator 850 which is comprised of a digital to analog converter to begin the data transmission. This orderly and sequential power up feature has a net effect of conserving a substantial amount of power and results in battery life span savings for the PC 846.

The power amplifier 862, which is comprised of three amplification stages 864, 866 and 868, is preferably a Phillips power amplifier that boosts the power to approximately 1.2 to 1.6 watts but it should be understood that the invention is not limited thereto. The output power is dynamically controlled by power control lines from the digital signal processor 836 and therefore, may be dynamically changed to meet battery constraints, Federal Communications Commission power limits, and/or the necessary level of power needed to reliably communicate with the fixed station. The power amplifier 862 is one of a number of family of modules having numerous variations depending upon the exact operating frequency and power requirements for a particular application.

The RF switch 804 is the connection of the common antenna 802 to the receiving circuitry and the transmitting circuitry. The radio frequency switch 804 is preferably a Phillips integrated circuit which is a loss less semiconductor power switch that performs the functions of prior art relay and pin diodes with minute power requirements and very small size but it should be understood that the invention is not limited thereto. The radio frequency switch 804 terminates the unused device (receiver circuitry/transmitting circuity into a 50 ohm load) and also provides instantaneous switching to reduce delays when switching between receive and transmit or vice versa. The radio frequency switch 804 is available in a multitude of different temperature environments and, therefore, specific integrated circuits may be selected to suit a particular application.

The dual synthesizer phase lock loop prescaler 807 as described above further contains the necessary digital programming electronics to permit the digital signal processor 836 to select the receiving frequency. The phase lock loop therein also has the necessary prescalers needed to permit the dual synthesizer phase lock loop prescaler to control the receiving circuitry oscillator later via an analog voltage to determine its operating frequency and to sample the receiver oscillator 808 to determine if the operating frequency is that which is commanded by the digital signal processor 836. This oscillating frequency is also compared to the frequency of the master oscillator 838 to determine if frequency error exists.

The low noise amplifier 810 has several stages of RF amplification contained within a single integrated circuit. The amplified output of the low noise amplifier 810 is coupled to the mixer 812 which is also contained therein.

The receiving circuitry oscillator 808 is controlled by an analog voltage outputted by the dual synthesizer phase lock loop prescaler 807. The analog control voltage is representative of the desired operating frequency and tunes a varactor diode which functions as a variable capacitor to determine the oscillator's operating frequency.

The receiving circuitry oscillator 808, depending upon the chosen intermediate frequencies (which may differ in different applications), may operate at above or below the operating frequency of the receiving circuitry by the differential amount equalizing the first intermediate frequency. For example, if the receiving circuitry frequency is desired to be 900 MHz, and the first intermediate frequency is 80

MHz., the oscillator may operate at either 820 MHz. or 980 MHz. depending upon the particular application. The output of the oscillator proceeds to the mixer 812.

The first mixer 812 takes the output of the oscillator 808 and mixes the oscillator frequency with the incoming desired received frequency to produce an output signal centered at the first intermediate frequency. Contained within the output of the first mixer 812 are a number of undesired frequency components that include both the sum and difference frequency of the oscillator and incoming frequency as well as harmonic components.

The bandpass filter 813 receives the output from the mixer 812 which has multiple stages that filters out the unnecessary and unwanted components of the mixer product and permits only the desired first intermediate frequency to pass through to the second mixer 820. The frequency of the crystal filter 813 will be application dependent and may vary from as low as 10.7 MHz. to as high as 80 MHz.

The second mixer 820 receives the output from the bandpass filter 813 which is one of several components that are located on an integrated circuit which is preferably manufactured by Phillips but it should be understood that the invention is not limited thereto. The second mixer 820 derives its second signal from a local oscillator which is mixer/oscillator 818 that provides the second mixing function converting the first intermediate frequency signal to a second intermediate frequency signal. A double conversion receiving circuitry was selected for the disclosed application to permit the transceiver 800 to perform with both the highest sensitivities, selectivities and minimal adjacent channel interference. The output of the second mixer 820 is then fed through bandpass filter 822, intermediate frequency amplifier 824, bandpass filter 826 and intermediate frequency amplifier 828 which removes the unwanted harmonics from the second intermediate frequency signal and amplifies the second intermediate frequency signal to a desired level where it is applied to detector 830.

The detector 830 converts the intermediate frequency signal down in frequency into an audio/data signal to recover the message/data information. Depending upon the specific format, the detector 830 can be configured for the receipt of linear or digital data through the utilization of external components.

The last intermediate frequency amplifier 828 produces a received signal strength indicator (RSSI) which provides a representative analog voltage that indicates the received signal strength at the receiving input at antenna 802. The RSSI signal can therefore be measured and a determination as to the signal quantity can be made by the analog to digital converter 832 that can be utilized for multiple functions depending upon the application of the transceiver 800. For example, the RSSI signal may be utilized by the digital signal processor 836 to determine the approximate distance of the fixed base station and, therefore, may be used to make a determination of how much transmitted power is required to return messages back to the fixed base station by the transmitting circuitry. If the RSSI signal is very weak, the digital signal processor 836 then commands the radio frequency amplifiers 856 and 862 in the transmitting circuitry to transmit at the maximum permissible power to increase the reliability of the data transmission. This form of optimization and dynamic power control is somewhat similar to that used by the current cellular infrastructure where the mobile cellular transceiver performs signal quality checks and accordingly, can increase or decrease the power of the mobile transceiver accordingly.

The demodulator and A to D converter 832, depending upon the application of the transceiver 800, preferably uses half of an A to D and D to A converter, which is preferably manufactured by Texas Instruments, on the A to D side for the demodulator or the digitizing of the received data signal but it should be understood that the invention is not limited thereto. If the received signal is in a linear format, the A to D converter takes the multiphase complex demodulated signal and digitizes it for further processing by the digital signal processor 836 as described above. In the event that the received data is purely digital, an option exists that permits the digital signal processor 836 to directly decode the data or, alternatively, utilize the A to D converter to digitize the waveform for further integration analysis by the digital signal processor 836 as described above. The analog to digital converter 832 may also selectively monitor the RSSI input to determine in a simple manner the received signal quality and to alert the digital signal processor 836 that the signal is either weak or strong to permit the digital signal processor to perform decision making tasks. Such decision making tasks may be to alert the user of the PC 846 or the digital signal processor alerting the PC that the received signal is very weak permitting the user the option to relocate the transceiver 800 in an attempt to optimize the signal strength or to determine the transmitted power as previously described.

The receiving circuitry also has power control lines which are under controlled management of the digital signal processor 836 to maximize the battery lifespan of the PC 846. The receiving circuitry will periodically sample the channel for activity to provide maximum battery savings and, in turn, an orderly turn on and shut down process will be utilized under control of the digital signal processor 836. When a channel sample is desired, the digital signal processor 836 will first enable and program the dual synthesizer phase lock loop prescaler 807 with a desired receiving frequency. Shortly thereafter, the digital signal processor will enable the low noise amplifier 810 and the oscillator 808 and await confirmation from the dual synthesizer phase lock loop prescaler 807 that the receiver/oscillator is on frequency. Upon receipt of the lock signal, the digital signal processor 836 will then enable the second mixer intermediate frequency stage 814 and the A to D converter/demodulator 832. The RSSI signal will then be sampled to determine if a carrier is present on the frequency and if detected to be present, the monitoring for the desired data preamble/protocol will commence by the digital signal processor 836. If during the sampling a RSSI signal is not observed (indicating no radio carrier present on the channel) or lack of data is detected, the digital signal processor 836 will immediately begin an orderly shut down process of the receiving circuitry to maximize battery conservation.

Numerous modifications and variations may be made to the design of the transceiver 800. While the transceiver, as illustrated, is designed specifically to operate in the 850–900 MHz. radio spectrum, it should be understood that the substitution of components designed to operate in other frequencies make it possible to operate in a multiplicity of radio bands. With some additions to the transceiver 800, it is possible to transmit dynamically over a frequency span from approximately 100 MHz. to 1.1 GHz. To accommodate such a broad band, additional processors will be required to permit dynamic antenna tuning and dynamic tuning of the radio frequency amplifiers as described in the above-referenced patents which have been incorporated by reference.

The buffering capacity of the RAM 840 of the transceiver 800 may be increased or decreased as specific applications require. The RAM 840, that the digital signal processor 836 utilizes, could be as small as a few K bytes when the application requires that the information received, immediately be forwarded to the host processor 846. In applications where it is desired that the transceiver module temporarily stores the received message data, the size of the RAM 840 may be increased accordingly. The ROM size also may vary depending upon the size of the application program. The design, as illustrated in FIG. 36, is such that numerous sized ROM (ROM, EEROM and EPROM) memories containing the stored program may be interchanged in the transceiver 800 to accommodate different applications. This does not require the redesign of the transceiver 800 but merely the removal and replacement of the ROM (personality) circuit.

The communications architecture to the PC 846 is very flexible. The transceiver 800 may alert the PC 846 via interrupts over the computer bus 848 available on the PC bus 848 to initialize background programs and/or TSR routines to permit the passage of received data from the transceiver 800 to the PC. Variations of this architecture may take place in the form of additional pins available on the bus that permit the transceiver 800 to dynamically power up or power down the PC 846 as necessary. Numerous manufacturers are now providing such a control input as an optional pin available on the PC bus/IO connector.

The transceiver 800 may also be configured as a "receiver only" for a lower cost version that is capable of only receiving data messages but not initiating or transmitting messages back to a fixed base station. This will operate in a one-way fashion and permit a great deal of portability while the PC user was mobile or in transit.

Variations of the design of the transceiver 800 could be such that lower cost products operating on very narrow bandwidth frequencies (e.g. 220 MHz.) could also be configured. The components for a 220 MHz. transceiver would be considerably less in cost than those as illustrated with the 900 MHz. operation.

The protocol described herein is applicable for all facets of one-way and two-way telecommunications. It, in essence, permits the technology to move forward to send extremely high data rates to a receiver or two-way transceiver with a reliability in excess of 99.99%. This increases the reliability of one-way radio messaging to make it suitable for E-mail and information services as well as permits a much greater number of subscribers to exist on a radio paging channel. The protocol at 2400 Hz allows a ten times increase in receiving circuitry utilizing the same radio transmitter infrastructure. More importantly, this additional air time addresses the E-mail and information services with a high degree of reliability without necessitating the use for two-way radio channels. The protocol also permits two-way data services to experience dramatic gains in air time efficiency and a corresponding increase of subscribers per channel by eliminating most requests for retransmission of information caused by at least a part of a message being lost.

Having a high message reception probability and a higher throughput capacity has a net effect in saving many millions of dollars to a data service company by eliminating the necessity for additional radio spectrum. Regardless of the transmitting bandwidth or the data rates, the invention will produce a significant increase in system efficiency. An added advantage is that it utilizes current radio frequencies in the 150, 220, 450, 800 and 900 MHz. transmitting bands to accommodate information and E-mail services. This is far less expensive than implementing such services at the proposed 1.2 and 2.4 GHz. radio bands to which a great deal of allocation of new spectrum will be necessary and is currently unallocated. The E-mail and information services industries could be immediately addressed with the current infrastructure to accommodate wireless services.

While the invention has been described in terms of its preferred embodiments and methods of operation, it should be understood that numerous modifications may be made thereto without departing form the spirit and scope of the invention. For example, it should be understood that the invention is not limited with regard to the type of information which may be transmitted on the parallel information streams. Any type of data may be transmitted in practicing the invention which may be digitized and used to control the analog modulation of the parallel information streams as illustrated in FIG. 12 or the digital modulation of information streams as illustrated in FIG. 13. Furthermore, while the invention has been described in terms of a pair of parallel information streams, it should be understood that additional pairs of parallel information streams may be added to permit more than one error free information transmission to occur at any one time.

I claim:

1. Transmitting circuitry for wireless transmission of information subject to fading for a time interval by modulating a radio frequency carrier with a subcarrier with the information originating from a computer and being transmitted to the transmitter circuitry by an information transmission medium comprising:

an interface for connection to the information transmission medium for receiving the information from the information transmission medium;

a processor, coupled to the information transmission medium, for processing the information received from the interface and in response to the information received from the interface, providing a first encoded information stream which comprises the information to be transmitted and a second encoded information stream which also comprises the information to be wirelessly transmitted with the second encoded information stream being delayed by a time delay interval with respect to the first information stream which is equal to or greater than the time interval of a fade;

an encoder, coupled to the processor and responsive to the first and second encoded information streams, for modulating the subcarrier with the first and second encoded information streams to produce first and second parallel information streams modulating cycles of the subcarrier with the first parallel stream containing the first encoded information stream, with the second parallel stream containing the second encoded information stream and with the first parallel information stream modulating the subcarrier being time displaced from the second parallel information stream modulating the subcarrier by the time delay interval; and a modulator, coupled to the encoder, for modulating the radio frequency carrier with the modulated subcarrier.

2. Transmitting circuitry in accordance with claim 1 wherein:

bits of each of the first and second parallel information streams modulate cycles of the subcarrier with each cycle of the subcarrier being modulated by bits at a plurality of separated angular positions.

3. Transmitting circuitry in accordance with claim 1 wherein:

groups of bits of the first and second parallel information streams each modulate a width of parts of the cycles of the subcarrier with pulse width modulation.

4. Transmitting circuitry in accordance with claim 1 wherein:

the first and second encoded information streams each comprise frames of information with each frame having a plurality of bits encoding error correction code and a plurality of bits encoding the information originating from the computer with the error correction code of the first encoded information stream not being capable of correcting for a fade of the time interval producing faded information in the first parallel information stream and the error correction information of the second encoded information stream not being capable of correcting for a fade of the time interval producing faded information in the second parallel information stream.

5. Transmitting circuitry in accordance with claim 4 wherein:

bits of each of the first and second parallel information streams modulate cycles of the subcarrier with each cycle of the subcarrier being modulated by bits at a plurality of separated angular positions.

6. Transmitting circuitry in accordance with claim 4 wherein:

groups of bits of the first and second parallel information streams each modulate a width of parts of the cycles of the subcarrier with pulse width modulation.

7. Transmitting circuitry in accordance with claim 1 wherein:

the time interval is of a length which would cause receiving circuitry receiving the wireless transmission of information to lose synchronism with transmitted first and second parallel information streams without replacement of faded information caused by the fade with information offset in time from the faded information by the time delay interval from at least one of the transmitted first and second parallel information streams.

8. Transmitting circuitry in accordance with claim 2 wherein:

the time interval is of a length which would cause receiving circuitry receiving the wireless transmission of information to lose synchronism with transmitted first and second parallel information streams without replacement of faded information caused by the fade with information offset in time from the faded information by the time delay interval from at least one of the transmitted first and second parallel information streams.

9. Transmitting circuitry in accordance with claim 3 wherein:

the time interval is of a length which would cause receiving circuitry receiving the wireless transmission of information to lose synchronism with transmitted first and second parallel information streams without replacement of faded information caused by the fade with information offset in time from the faded information by the time delay interval from at least one of the transmitted first and second parallel information streams.

10. Transmitting circuitry in accordance with claim 4 wherein:

the time interval is of a length which would cause receiving circuitry receiving the wireless transmission of information to lose synchronism with transmitted first and second parallel information streams without replacement of faded information caused by the fade with information offset in time from the faded information by the time delay interval from at least one of the transmitted first and second parallel information streams.

11. Transmitting circuitry in accordance with claim 5 wherein:

the time interval is of a length which would cause receiving circuitry receiving the wireless transmission of information to lose synchronism with transmitted first and second parallel information streams without replacement of faded information caused by the fade with information offset in time from the faded information by the time delay interval from at least one of the transmitted first and second parallel information streams.

12. Transmitting circuitry in accordance with claim 6 wherein:

the time interval is of a length which would cause receiving circuitry receiving the wireless transmission of information to lose synchronism with transmitted first and second parallel information streams without replacement of faded information caused by the fade with information offset in time from the faded information by the time delay interval from at least one of the transmitted first and second parallel information streams.

13. A method for wireless transmission of information subject to fading for a time interval with transmitting circuitry by modulating a radio frequency carrier with a subcarrier with the information originating from a computer and being transmitted to the transmitting circuitry by an information transmission medium comprising:

receiving the information from the information transmission medium with an interface;

in response to receiving the information from the interface providing a first encoded information stream which comprises the information to be wirelessly transmitted and a second encoded information stream which also comprises the information to be wirelessly transmitted with the second information stream being delayed by a time delay interval with respect to the first information stream which is equal to or greater than the time interval of a fade;

modulating the subcarrier with the first and second encoded information streams to produce first and second parallel information streams modulated on cycles of the subcarrier with the first parallel information stream containing the first encoded information stream and with the second parallel information stream containing the second encoded information stream and with the first parallel information stream modulating the subcarrier being time displaced from the second parallel stream modulating the subcarrier by the time delay interval; and modulating the radio frequency carrier with the modulated subcarrier.

14. A method in accordance with claim 13 wherein:

bits of each of the first and second parallel information streams modulate cycles of the subcarrier with each cycle of the subcarrier being modulated by bits at a plurality of separated angular positions.

15. A method in accordance with claim 13 wherein:

groups of bits of the first and second parallel information streams each modulate a width of parts of the cycles of the subcarrier with pulse width modulation.

16. A method in accordance with claim 13 wherein:

the first and second encoded information streams each comprise frames of information with each frame having a plurality of bits encoding error correction code and a plurality of bits encoding information originating from the computer with the error correction code of the first encoded information stream not being capable of correcting for a fade of the time interval producing faded information in the first parallel information stream and the error correction information of the second encoded information stream not being capable of correcting for a fade of the time interval producing faded information in the second parallel information stream.

17. A method in accordance with claim 14 wherein:

the first and second encoded information streams each comprise frames of information with each frame having a plurality of bits encoding error correction code and a plurality of bits encoding information originating from the computer with the error correction code of the first encoded information stream not being capable of correcting for a fade of the time interval producing faded information in the first parallel information stream and the error correction information of the second encoded information stream not being capable of correcting for a fade of the time interval producing faded information in the second parallel information stream.

18. A method in accordance with claim 15 wherein:

the first and second encoded information streams each comprise frames of information with each frame having a plurality of bits encoding error correction code and a plurality of bits encoding information originating from the computer with the error correction code of the first encoded information stream not being capable of correcting for a fade of the time interval producing faded information in the first parallel information stream and the error correction information of the second encoded information stream not being capable of correcting for a fade of the time interval producing faded information in the second parallel information stream.

19. A method in accordance with claim 13 wherein:

the time interval is of a length which would cause receiving circuitry receiving the wireless transmission of information to lose synchronism with transmitted first and second parallel information streams without replacement of faded information caused by the fade with information offset in time from the faded information by the time delay interval from at least one of the transmitted first and second parallel information streams.

20. A method in accordance with claim 14 wherein:

the time interval is of a length which would cause receiving circuitry receiving the wireless transmission of information to lose synchronism with transmitted first and second parallel information streams without replacement of faded information caused by the fade with information offset in time from the faded information by the time delay interval from at least one of the transmitted first and second parallel information streams.

21. A method in accordance with claim 15 wherein:

the time interval is of a length which would cause receiving circuitry receiving the wireless transmission information to lose synchronism with transmitted first and second parallel information streams without replacement of faded information caused by the fade with information offset in time from the faded information by the time delay interval from at least one of the transmitted first and second parallel information streams.

22. A method in accordance with claim 16 wherein:

the time interval is of a length which would cause receiving circuitry receiving the wireless transmission of information to lose synchronism with transmitted first and second parallel information streams without replacement of faded information caused by the fade with information offset in time from the faded information by the time delay interval from at least one of the transmitted first and second parallel information streams.

23. A method in accordance with claim 17 wherein:

the time interval is of a length which would cause receiving circuitry receiving the wireless transmission of information to lose synchronism with transmitted first and second parallel information streams without replacement of faded information caused by the fade with information offset in time from the faded information by the time delay interval from at least one of the transmitted first and second parallel information streams.

24. A method in accordance with claim 18 wherein:

the time interval is of a length which would cause receiving circuitry receiving the wireless transmission of information to lose synchronism with transmitted first and second parallel information streams without replacement of faded information caused by the fade with information offset in time from the faded information by the time delay interval from at least one of the transmitted first and second parallel information streams.

25. Receiving circuitry for receiving a wireless transmission of information which is subject to fading for a time interval with a radio frequency carrier being modulated with a subcarrier with the subcarrier being modulated with identical first and second encoded information streams each containing the information to produce first and second parallel information streams modulating cycles of the subcarrier with the first parallel information stream containing the first encoded information stream and with the second parallel information stream containing the second encoded information stream with the first and second parallel information streams being wirelessly transmitted with a time delay interval between the first and second parallel information streams modulating the subcarrier which is equal to or greater than the time interval for transmission to a computer by an information transmission medium comprising:

a detector for detecting the transmitted first and second parallel information streams;

a processor, coupled to the detector and responsive to the detected parallel information streams, for determining if faded information is present in at least one of the detected first and second parallel information streams and in response to determined faded information replacing the faded information caused by a fade with replacement information from at least one of the first and second parallel information streams which is time offset at transmission from the faded information by the time delay interval and outputting error free transmitted information including the replacement information; and an interface, for connection to the information transmission medium and coupled to the processor, for receiving the outputted error free wireless transmission of information and in response to connection to the information transmission medium transmitting the outputted error free wireless transmission of information to the information transmission medium for transmission to the computer.

26. Receiving circuitry in accordance with claim 25 wherein:

the first and second encoded information streams each comprises frames of information with each frame having a plurality of bits encoding error correction code and a plurality of bits encoding the information with the error correction code of the first encoded information stream not being capable of correcting for a fade of the time interval producing faded information in the first parallel information stream and the error correction code of the second encoded information stream not being capable of correcting for a fade of the time interval producing faded information in the second parallel information stream; and the determination of faded information by the processor is performed by determining that the error correction bits cannot correct an error detected by processing the frames of the first and second parallel information streams with the error correction code using the plurality of bits of error correction code.

27. Receiving circuitry in accordance with claim 25 wherein:

the processor comprises a digital signal processor for processing detected individual cycles of the subcarrier to calculate an integral of at least one selected modulated part of each of the individual cycles, numerically comparing each of the calculated integrals with a plurality of stored numerical ranges which ranges each represent one of a plurality of possible numerical values that the selected part may encode to identify a stored range numerically including the calculated integral and substituting for the at least one selected part of each of the cycles the one of the plurality of numerical values representative of the identified stored range including the calculated integral with each numerical value encoding at least a part of an information unit in one of the first and second parallel information streams; and wherein the digital signal processor processes the first and second parallel information streams containing the substituted numerical values for determining if the faded information is present.

28. Receiving circuitry in accordance with claim 26 wherein:

the processor comprises a digital signal processor for processing detected individual cycles of the subcarrier to calculate an integral of at least one selected modulated part of each of the individual cycles, numerically comparing each of the calculated integrals with a plurality of stored numerical ranges which ranges each represent one of a plurality of possible numerical values that the selected part may encode to identify a stored range numerically including the calculated integral and substituting for the at least one selected part of each of the cycles the one of the plurality of numerical values representative of the identified stored range including the calculated integral with each numerical value encoding at least a part of an information unit in one of the first and second parallel information streams; and wherein the digital signal processor processes the first and second parallel information streams containing the substituted numerical values for determining if the faded information is present.

29. Receiving circuitry in accordance with claim 25 wherein:

bits of each of the first and second parallel information streams modulate cycles of the subcarrier with each cycle of the subcarrier being modulated by bits at a plurality of separated angular positions.

30. Receiving circuitry in accordance with claim 25 wherein:

groups of bits of the first and second parallel information streams each modulate a width of parts of the subcarrier with pulse width modulation.

31. Receiving circuitry in accordance with claim 26 wherein:

bits of each of the first and second parallel information streams modulate cycles of the subcarrier with each cycle of the subcarrier being modulated by bits at a plurality of separated angular positions.

32. Receiving circuitry in accordance with claim 26 wherein:

groups of bits of the first and second parallel information streams each modulate a width of parts of the subcarrier with pulse width modulation.

33. Receiving circuitry in accordance with claim 27 wherein:

bits of each of the first and second parallel information streams modulate cycles of the subcarrier with each cycle of the subcarrier being modulated by bits at a plurality of separated angular positions.

34. Receiving circuitry in accordance with claim 27 wherein:

groups of bits of the first and second parallel information streams each modulate a width of parts of the subcarrier with pulse width modulation.

35. Receiving circuitry in accordance with claim 28 wherein:

bits of each of the first and second parallel information streams modulate cycles of the subcarrier with each cycle of the subcarrier being modulated by bits at a plurality of separated angular positions.

36. Receiving circuitry in accordance with claim 28 wherein:

groups of bits of the first and second parallel information streams each modulate a width of parts of the subcarrier with pulse width modulation.

37. Receiving circuitry in accordance with claim 27 wherein:

the digital signal processor calculates the integral by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

38. Receiving circuitry in accordance with claim 37 wherein:

the compared sample value is replaced with a value which is an average of at least one sample value which precedes the compared sample value and at least one sample value which succeeds the compared sample value.

39. Receiving circuitry in accordance with claim 28 wherein:

the digital signal processor calculates the integral by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

40. Receiving circuitry in accordance with claim 39 wherein:

the compared sample value is replaced with a value which is an average of at least one sample value which precedes the compared sample value and at least one sample value which succeeds the compared sample value.

41. Receiving circuitry in accordance with claim 33 wherein:

the digital signal processor calculates the integral by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

42. Receiving circuitry in accordance with claim 41 wherein:

the compared sample value is replaced with a value which is an average of at least one sample value which precedes the compared sample value and at least one sample value which succeeds the compared sample value.

43. Receiving circuitry in accordance with claim 34 wherein:

the digital signal processor calculates the integral by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

44. Receiving circuitry in accordance with claim 43 wherein:

the compared sample value is replaced with a value which is an average of at least one sample value which precedes the compared sample value and at least one sample value which succeeds the compared sample value.

45. Receiving circuitry in accordance with claim 35 wherein:

the digital signal processor calculates the integral by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

46. Receiving circuitry in accordance with claim 45 wherein:

the compared sample value is replaced with a value which is an average of at least one sample value which precedes the compared sample value and at least one sample value which succeeds the compared sample value.

47. Receiving circuitry in accordance with claim 36 wherein:

the digital signal processor calculates the integral by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

48. Receiving circuitry in accordance with claim 47 wherein:

the compared sample value is replaced with a value which is an average of at least one sample value which precedes the compared sample value and at least one sample value which succeeds the compared sample value.

49. A method of receiving a wireless transmission of information subject to fading for a time interval with receiving circuitry with a radio frequency carrier modulated with a subcarrier with the subcarrier being modulated with first and second encoded identical information streams to produce first and second parallel information streams modulating cycles of the subcarrier with the first parallel information stream containing the first encoded information stream and with the second parallel information stream containing the second encoded information stream with the parallel information streams being transmitted with a time delay interval between the parallel streams modulating the subcarrier which is equal to or greater than the time interval for transmission to a computer through an information transmission medium comprising the steps:

detecting the first and second parallel information streams which have been transmitted with the radio frequency carrier;

determining if faded information is present in at least one of the detected first and second parallel information streams and in response to determined faded information replacing the faded information caused by a fade with information from one of the first and second parallel information streams which is time offset from the faded information by the time delay interval and outputting error free transmitted information including the replacement information;

receiving the outputted error free information with an interface; and transmitting the error free transmitted information from the interface to the information transmission medium and processing the error free transmitted information with a computer coupled to the information transmission medium.

50. A method of receiving a wireless transmission in accordance with claim 49 wherein:

the first and second encoded information streams each comprises frames of information with each frame having a plurality of bits encoding error correction code and a plurality of bits encoding the information with the error correction code of the first encoded information stream not being capable of correcting for a fade of the time interval producing faded information in the first parallel stream and the error correction code of the second encoded information stream not being capable of correcting for a fade of the time interval producing faded information in the second parallel information stream; and the determination if faded information is performed by determining that the error correction bits cannot correct an error detected by processing frames of the first and second parallel information streams with the error correction code using the plurality of error correction bits.

51. A method of receiving a wireless transmission in accordance with claim 49 further comprising:

processing detected individual cycles of the subcarrier to calculate an integral of at least one selected modulated part of each of the individual cycles, numerically comparing each of the calculated integrals with a plurality of stored numerical ranges which ranges each represent one of a plurality of possible numerical values that the selected part may encode to identify a stored range numerically including the calculated integral and substituting for the at least one selected part of each of the cycles the one of the plurality of numerical values representative of the identified stored range including the calculated integral with each numerical value encoding at least a part of an information unit in one of the first and second parallel information streams; and wherein the first and second parallel information streams containing the substituted numerical values are processed for determining if the faded information is present.

52. A method of receiving a wireless transmission in accordance with claim 50 further comprising:

processing detected individual cycles of the subcarrier to calculate an integral of at least one selected modulated part of each of the individual cycles, numerically comparing each of the calculated integrals with a plurality of stored numerical ranges which ranges each represent one of a plurality of possible numerical values that the selected part may encode to identify a stored range numerically including the calculated integral and substituting for the at least one selected part of each of the cycles the one of the plurality of numerical values representative of the identified stored range including the calculated integral with each numerical value encoding at least a part of an information unit in one of the first and second parallel information streams; and wherein the first and second parallel information streams containing the substituted numerical values are processed for determining if the faded information is present.

53. A method of receiving a wireless transmission in accordance with claim 49 wherein:

bits of each of the first and second parallel information streams are modulated on cycles of the subcarrier with each cycle of the subcarrier being modulated with bits at a plurality of separated angular positions.

54. A method of receiving a wireless transmission in accordance with claim 49 wherein:

groups of bits of the first and second parallel information streams each modulate a width of parts of the cycles of the subcarrier with pulse width modulation.

55. A method of receiving a wireless transmission in accordance with claim 50 wherein:

bits of each of the first and second parallel information streams are modulated on cycles of the subcarrier with each cycle of the subcarrier being modulated with bits at a plurality of separated angular positions.

56. A method of receiving a wireless transmission in accordance with claim 50 wherein:

groups of bits of the first and second parallel information streams each modulate a width of parts of the cycles of the subcarrier with pulse width modulation.

57. A method of receiving a wireless transmission in accordance with claim 51 wherein:

bits of each of the first and second parallel information streams are modulated on cycles of the subcarrier with each cycle of the subcarrier being modulated with bits at a plurality of separated angular positions.

58. A method of receiving a wireless transmission in accordance with claim 51 wherein:

groups of bits of the first and second parallel information streams each modulate a width of parts of the cycles of the subcarrier with pulse width modulation.

59. A method of receiving a wireless transmission in accordance with claim 52 wherein:

bits of each of the first and second parallel information streams are modulated on cycles of the subcarrier with each cycle of the subcarrier being modulated with bits at a plurality of separated angular positions.

60. A method of receiving a wireless transmission in accordance with claim 52 wherein:

groups of bits of the first and second parallel information streams each modulate a width of parts of the cycles of the subcarrier with pulse width modulation.

61. A method of receiving a wireless transmission in accordance with claim 51 wherein:

the integral is calculated by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

62. A method of receiving a wireless transmission in accordance with claim 61 wherein:

the compared sample value is replaced with a value which is an average of at least one sample value which precedes the compared sample value and at least one sample value which succeeds the compared sample value.

63. A method of receiving a wireless transmission in accordance with claim 52 wherein:

the integral is calculated by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

64. A method of receiving a wireless transmission in accordance with claim 63 wherein:

the compared sample value is replaced with a value which is an average of at least one sample value which precedes the compared sample value and at least one sample value which succeeds the compared sample value.

65. A method of receiving a wireless transmission in accordance with claim 57 wherein:

the integral is calculated by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

66. A method of receiving a wireless transmission in accordance with claim 65 wherein:

the compared sample value is replaced with a value which is an average of at least one sample value which precedes the compared sample value and at least one sample value which succeeds the compared sample value.

67. A method of receiving a wireless transmission in accordance with claim 58 wherein:

the integral is calculated by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

68. A method of receiving a wireless transmission in accordance with claim 67 wherein:

the compared sample value is replaced with a value which is an average of at least one sample value which precedes the compared sample value and at least one sample value which succeeds the compared sample value.

69. A method of receiving a wireless transmission in accordance with claim 59 wherein:

the integral is calculated by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

70. A method of receiving a wireless transmission in accordance with claim 69 wherein:

the compared sample value is replaced with a value which is an average of at least one sample value which precedes the compared sample value and at least one sample value which succeeds the compared sample value.

71. A method of receiving a wireless transmission in accordance with claim 60 wherein:

the integral is calculated by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

72. A method of receiving a wireless transmission in accordance with claim 71 wherein:

the compared sample value is replaced with a value which is an average of at least one sample value which precedes the compared sample value and at least one sample value which succeeds the compared sample value.

73. Receiving circuitry for receiving a wireless transmission of information which is subject to fading for a time interval with a radio frequency carrier modulated with a subcarrier with the subcarrier being modulated with first and second encoded identical information streams to produce first and second parallel information streams modulating cycles of the subcarrier with the first parallel information stream containing the first encoded information stream and with the second parallel information stream containing the second encoded information stream with the first and second parallel information streams being transmitted with a time delay interval between the first and second parallel information streams modulating the subcarrier which is equal to or greater than the time interval for transmission to a computer by an information transmission medium comprising:

a detector for detecting the first and second parallel information streams which have been transmitted with the radio frequency carrier;

a processor, coupled to the detector and responsive to the detected parallel streams, for determining if faded information is present in at least one of the detected first and second parallel information streams received and in response to determined faded information replacing the faded information caused by a fade with replacement information from at least one of the first and second parallel information streams which is time offset at transmission from the faded information by the time delay interval and outputting error free transmitted information including the replacement information; and an interface, for connection to the an information transmission medium and coupled to the processor, for receiving the outputted error free transmitted information and in response to connection to the information transmission medium transmitting the outputted error free transmitted information to the information transmission medium for transmission to the computer; and wherein the processor places an error marker within the detected first and second parallel information streams to mark each faded information unit within the faded information requiring replacement and controls replacement of each error marker within at least one of the first and second parallel information streams with replacement bits within one of the first and second parallel information streams which were time offset at transmission by the time delay interval to produce the error free transmitted information.

74. Receiving circuitry in accordance with claim 73 wherein:

the first and second encoded information streams each comprises frames of information with each frame having a plurality of bits encoding error correction code and a plurality of bits encoding the information with the error correction code of the first encoded information stream not being capable of correcting for a fade of the time interval producing faded information in the first parallel information stream and the error correction code of the second encoded information stream not being capable of correcting for a fade of the time interval producing faded information in the second parallel information stream; and the determination of faded information by the processor is performed by determining that the error correction bits cannot correct an error detected by processing the frames of the first and second parallel information streams with the error correction code using the plurality of bits of error correction code.

75. Receiving circuitry in accordance with claim 73 wherein:

the processor comprises a digital signal processor for processing detected individual cycles of the subcarrier to calculate an integral of at least one selected modulated part of each of the individual cycles, numerically comparing each of the calculated integrals with a plurality of stored numerical ranges which ranges each represent one of a plurality of possible numerical values that the selected part may encode to identify a stored range numerically including the calculated integral and substituting for the at least one selected part of each of the cycles the one of the plurality of numerical values representative of the identified stored range including the calculated integral with each numerical value encoding at least a part of an information unit in one of the first and second parallel information streams; and wherein the digital signal processor processes the first and second parallel information streams containing the substituted numerical values for determining if the faded information is present.

76. Receiving circuitry in accordance with claim 74 wherein:

the processor comprises a digital signal processor for processing detected individual cycles of the subcarrier to calculate an integral of at least one selected modulated part of each of the individual cycles, numerically comparing each of the calculated integrals with a plurality of stored numerical ranges which ranges each represent one of a plurality of possible numerical values that the selected part may encode to identify a stored range numerically including the calculated integral and substituting for the at least one selected part of each of the cycles the one of the plurality of numerical values representative of the identified stored range including the calculated integral with each numerical value encoding at least a part of an information unit in one of the first and second parallel information streams; and wherein the digital signal processor processes the first and second parallel information streams containing the substituted numerical values for determining if the faded information is present.

77. Receiving circuitry in accordance with claim 73 wherein:

bits of each of the first and second parallel information streams modulate cycles of the subcarrier with each cycle of the subcarrier being modulated by bits at a plurality of separated angular positions.

78. Receiving circuitry in accordance with claim 73 wherein:

groups of bits of the first and second parallel information streams each modulate a width of parts of the subcarrier with pulse width modulation.

79. Receiving circuitry in accordance with claim 74 wherein:

bits of each of the first and second parallel information streams modulate cycles of the subcarrier with each cycle of the subcarrier being modulated by bits at a plurality of separated angular positions.

80. Receiving circuitry in accordance with claim 74 wherein:

groups of bits of the first and second parallel information streams each modulate a width of parts of the subcarrier with pulse width modulation.

81. Receiving circuitry in accordance with claim 75 wherein:

bits of each of the first and second parallel information streams modulate cycles of the subcarrier with each cycle of the subcarrier being modulated by bits at a plurality of separated angular positions.

82. Receiving circuitry in accordance with claim 75 wherein:

groups of bits of the first and second parallel information streams each modulate a width of parts of the subcarrier with pulse width modulation.

83. Receiving circuitry in accordance with claim 76 wherein:

bits of each of the first and second parallel information streams modulate cycles of the subcarrier with each cycle of the subcarrier being modulated by bits at a plurality of separated angular positions.

84. Receiving circuitry in accordance with claim 76 wherein:

groups of bits of the first and second parallel information streams each modulate a width of parts of the subcarrier with pulse width modulation.

85. Receiving circuitry in accordance with claim 75 wherein:

the digital signal processor calculates the integral by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

86. Receiving circuitry in accordance with claim 85 wherein:

the compared sample value is replaced with a value which is an average of at least one sample value which precedes the compared sample value and at least one sample value which succeeds the compared sample value.

87. Receiving circuitry in accordance with claim 76 wherein:

117 the digital signal processor calculates the integral by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

88. Receiving circuitry in accordance with claim 87 wherein:

the compared sample value is replaced with a value which is an average of at least one sample value which precedes the compared sample value and at least one sample value which succeeds the compared sample value.

89. Receiving circuitry in accordance with claim 81 wherein:

the digital signal processor calculates the integral by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

90. Receiving circuitry in accordance with claim 89 wherein:

the compared sample value is replaced with a value which is an average of at least one sample value which precedes the compared sample value and at least one sample value which succeeds the compared sample value.

91. Receiving circuitry in accordance with claim 82 wherein:

the digital signal processor calculates the integral by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

92. Receiving circuitry in accordance with claim 91 wherein:

the compared sample value is replaced with a value which is an average of at least one sample value which precedes the compared sample value and at least one sample value which succeeds the compared sample value.

93. Receiving circuitry in accordance with claim 83 wherein:

the digital signal processor calculates the integral by taking a plurality of samples of each selected modulated part of each of the individual cycles with each sample having a numerical value and each sample is compared with a range of numerical values representing a valid sample which should be included within the

118 calculation of the integral and when the comparison reveals that the sample value is outside the range of numerical values, the compared sample value is replaced with a value which is a function of the sample values adjacent the sample value which is replaced.

94. Receiving circuitry in accordance with claim 93 wherein:

the compared sample value is replaced with a value which is an average of at least one sample value which precedes the compared sample value and at least one sample value which succeeds the compared sample value.

95. Receiving circuitry in accordance with claim 84 wherein:

the digital signal processor calculates the integral by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

96. Receiving circuitry in accordance with claim 95 wherein:

the compared sample value is replaced with a value which is an average of at least one sample value which precedes the compared sample value and at least one sample value which succeeds the compared sample value.

97. A method of receiving a wireless transmission of information subject to fading for a time interval with receiving circuitry with a radio frequency carrier modulated with a subcarrier with the subcarrier being modulated with identical first and second encoded information streams to produce first and second parallel information streams modulating cycles of the subcarrier with the first parallel information stream containing the first encoded information stream and with the second parallel information stream containing the second encoded information stream with the first and second parallel information streams being transmitted with a time delay interval between the first and second parallel streams as modulated on the subcarrier which is equal to or greater than the time interval for transmission to a computer through an information transmission medium comprising the steps:

detecting the first and second parallel information streams which have been transmitted with the radio frequency carrier;

determining if faded information is present in at least one of the detected first and second parallel information streams by processing the detected parallel information streams and in response to determined faded information replacing the faded information caused by an fade with replacement information from at least one of the first and second parallel information streams which is time offset from the faded information at transmission by the time delay interval, and outputting error free transmitted information including the replacement information; and wherein an error marker is placed within the detected first and second parallel information streams to mark each faded information unit within the faded information requiring replacement and replacing each error marker within at least one of the first and second parallel information streams with replacement bits within one of the first and second parallel information streams which were time offset at transmission by the time delay interval to produce the error free wirelessly transmitted information;

receiving the outputted error free transmitted information with an interface; and transmitting the error free wirelessly transmitted information from the interface to the information transmission medium and processing the error free transmitted information with the computer coupled to the information transmission medium.

98. A method of receiving a wireless transmission in accordance with claim 97 wherein:

the first and second encoded information streams each comprise frames of information with each frame having a plurality of bits of error correction code and a plurality of bits encoding the information with the error correction code of the first encoded information stream not being capable of correcting for a fade of the time interval producing faded information in the first parallel information stream and the error correction code of the second encoded information stream not being capable of correcting for a fade of the time interval producing faded information in the second parallel information stream; and the determination if faded information is present is performed by determining that the plurality of bits of error correction code cannot correct an error detected by processing frames of the first and second parallel information streams with the error correction code using the plurality of error correction bits.

99. A method of receiving a wireless transmission in accordance with claim 97 further comprising:

processing detected individual cycles of the subcarrier to calculate an integral of at least one selected modulated part of each of the individual cycles, numerically comparing each of the calculated integrals with a plurality of stored numerical ranges which ranges each represent one of a plurality of possible numerical values that the selected part may encode to identify a stored range numerically including the calculated integral and substituting for the at least one selected part of each of the cycles the one of the plurality of numerical values representative of the identified stored range including the calculated integral with each numerical value encoding at least a part of an information unit in one of the first and second parallel information streams; and wherein the first and second parallel information streams containing the substituted numerical values are processed for determining if the faded information is present.

100. A method of receiving a wireless transmission in accordance with claim 98 further comprising:

processing detected individual cycles of the subcarrier to calculate an integral of at least one selected modulated part of each of the individual cycles, numerically comparing each of the calculated integrals with a plurality of stored numerical ranges which ranges each represent one of a plurality of possible numerical values that the selected part may encode to identify a stored range numerically including the calculated integral and substituting for the at least one selected part of each of the cycles the one of the plurality of numerical values representative of the identified stored range including the calculated integral with each numerical value encoding at least a part of an information unit in one of the first and second parallel information streams; and wherein the first and second parallel information streams containing the substituted numerical values are processed for determining if the faded information is present.

101. A method of receiving a wireless transmission in accordance with claim 97 wherein:

bits of each of the first and second parallel information streams modulate cycles of the subcarrier with each cycle of the subcarrier being modulated with bits at a plurality of separated angular positions.

102. A method of receiving a wireless transmission in accordance with claim 97 wherein:

groups of bits of the first and second parallel information streams each modulate a width of parts of the cycles of the subcarrier with pulse width modulation.

103. A method of receiving a wireless transmission in accordance with claim 98 wherein:

bits of each of the first and second parallel information streams modulate cycles of the subcarrier with each cycle of the subcarrier being modulated with bits at a plurality of separated angular positions.

104. A method of receiving a wireless transmission in accordance with claim 98 wherein:

groups of bits of the first and second parallel information streams each modulate a width of parts of the cycles of the subcarrier with pulse width modulation.

105. A method of receiving a wireless transmission in accordance with claim 99 wherein:

bits of each of the first and second parallel information streams are modulate cycles of the subcarrier with each cycle of the subcarrier being modulated with bits at a plurality of separated angular positions.

106. A method of receiving a wireless transmission in accordance with claim 99 wherein:

groups of bits of the first and second parallel information streams each modulate a width of parts of the cycles of the subcarrier with pulse width modulation.

107. A method of receiving a wireless transmission in accordance with claim 100 wherein:

bits of each of the first and second parallel information streams modulate cycles of the subcarrier with each cycle of the subcarrier being modulated with bits at a plurality of separated angular positions.

108. A method of receiving a wireless transmission in accordance with claim 100 wherein:

groups of bits of the first and second parallel information streams each modulate a width of parts of the cycles of the subcarrier with pulse width modulation.

109. A method of receiving a wireless transmission in accordance with claim 99 wherein:

the integral is calculated by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

110. A method of receiving a wireless transmission in accordance with claim 109 wherein:

the compared sample value is replaced with a value which is an average of at least one sample value which precedes the compared sample value and at least one sample value which succeeds the compared sample value.

111. A method of receiving a wireless transmission in accordance with claim 100 wherein:

the integral is calculated by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

112. A method of receiving a wireless transmission in accordance with claim 111 wherein:

the compared sample value is replaced with a value which is an average of at least one sample value which precedes the compared sample value and at least one sample value which succeeds the compared sample value.

113. A method of receiving a wireless transmission in accordance with claim 105 wherein:

the integral is calculated by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

114. A method of receiving a wireless transmission in accordance with claim 113 wherein:

the compared sample value is replaced with a value which is an average of at least one sample value which precedes the compared sample value and at least one sample value which succeeds the compared sample value.

115. A method of receiving a wireless transmission in accordance with claim 106 wherein:

the integral is calculated by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

116. A method in accordance with claim 115 wherein:

the compared sample value is replaced with a value which is an average of at least one sample value which precedes the compared sample value and at least one sample value which succeeds the compared sample value.

117. A method of receiving a wireless transmission in accordance with claim 107 wherein:

the integral is calculated by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

118. A method of receiving a wireless transmission in accordance with claim 117 wherein:

the compared sample value is replaced with a value which is an average of at least one sample value which precedes the compared sample value and at least one sample value which succeeds the compared sample value.

119. A method of receiving a wireless transmission in accordance with claim 108 wherein:

the integral is calculated by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

120. A method of receiving a wireless transmission in accordance with claim 114 wherein:

the compared sample value is replaced with a value which is an average of at least one sample value which precedes the compared sample value and at least one sample value which succeeds the compared sample value.

121. Circuitry for wireless transmission of information originating from a computer and which is transmitted from the computer on an information transmission medium to transmitting circuitry and transmitted by the transmitting circuitry by modulating a radio frequency carrier modulated with a subcarrier with transmission of the information being subject to fading for a time interval and which receives a wireless transmission of information subject to fading for a time interval with receiving circuitry with a radio frequency carrier modulated with a subcarrier with the subcarrier being modulated with identical first and second encoded information streams to produce first and second parallel information streams modulated on cycles of the subcarrier with the first parallel information stream containing the first encoded information stream and with the second parallel information stream containing the second encoded information stream with the first and second parallel information streams being transmitted with a time delay interval between the first and second parallel streams as modulated on the subcarrier which is equal to or greater than the time interval for transmission to the computer through the information transmission medium wherein:

the receiving circuitry comprises a detector for detecting the transmitted first and second parallel information streams, a processor, coupled to the detector and responsive to the detected parallel information streams, for determining if faded information is present in at least one of the detected first and second parallel information streams and in response to determined faded information replacing the faded information caused by a fade with replacement information from at least one of the first and second parallel information streams which is time offset at transmission from the faded information by the time delay interval and outputting error free transmitted information including the replacement information and an interface for connection to the an information transmission medium and coupled to the processor for receiving the outputted error free transmitted information and in response to connection to the information transmission medium transmitting the outputted error free transmitted information to the information transmission medium for transmission to the computer; and wherein the transmitting circuitry comprises a processor which in response to the information to be transmitted provides a first encoded information stream which comprises the information to be transmitted and a second encoded information stream which also comprises the information to be transmitted with the second encoded information stream being delayed by a time delay interval with respect to the first information stream which is equal to or greater than the time interval of the fading and an encoder for modulating the subcarrier with the first and second encoded information streams to produce first and second parallel information streams modulating cycles of the subcarrier with the first parallel information stream containing the first encoded information stream, with the second parallel information stream containing the second encoded information stream and with the first parallel information stream modulating the subcarrier being time displaced from the second parallel information stream by the time delay interval, and a modulator, coupled to the encoder, for modulating the radio frequency carrier with the modulated subcarrier.

122. Circuitry in accordance with claim 121 wherein:

bits of each of the transmitted and received parallel information streams modulate cycles of the subcarrier with each cycle of the subcarrier being modulated by bits at a plurality of separated angular positions.

123. circuitry in accordance with claim 121 wherein:

groups of bits of the first and second parallel information steams of the transmitted and received information streams each modulate a width of parts of the subcarrier with pulse width modulation.

124. Circuitry in accordance with claim 121 wherein:

the received and transmitted parallel information streams comprise frames of information with each frame having a plurality of bits encoding error correction code and a plurality of bits encoding information with the error correction code of the first parallel information stream not being capable of correcting for a fade of the time interval producing faded information in the first parallel information stream and the error correction code of the second parallel information stream not being capable of correcting for a fade of the time interval producing faded information in the second parallel information stream.

125. Circuitry in accordance with claim 122 wherein:

the received and transmitted parallel information streams comprise frames of information with each frame having a plurality of bits encoding error correction code and a plurality of bits encoding information with the error correction code of the first parallel information stream not being capable of correcting for a fade of the time interval producing faded information in the first parallel information stream and the error correction code of the second parallel information stream not being capable of correcting for a fade of the time interval producing faded information in the second parallel information stream.

126. Circuitry in accordance with claim 123 wherein:

the received and transmitted parallel information streams comprise frames of information with each frame having a plurality of bits encoding error correction code and a plurality of bits encoding information with the error correction code of the first parallel information stream not being capable of correcting for a fade of the time interval producing faded information in the first parallel information stream and the error correction code of the second parallel information stream not being capable of correcting for a fade of the time interval producing faded information in the second parallel information stream.

127. Circuitry in accordance with claim 121 wherein:

the time interval of the fading of the received atmospheric transmission is of a length which would cause the receiving circuitry to lose synchronism with the transmitted first and second parallel information streams without replacement of faded information caused by the fade with information offset in time from the faded information by the time delay interval from at least one of the transmitted first and second parallel information streams.

128. Circuitry in accordance with claim 122 wherein:

the time interval of the fading of the received atmospheric transmission is of a length which would cause the receiving circuitry to lose synchronism with the transmitted first and second parallel information streams without replacement of faded information caused by the fade with information offset in time from the faded information by the time delay interval from at least one of the transmitted first and second parallel information streams.

129. Circuitry in accordance with claim 123 wherein:

the time interval of the fading of the received atmospheric transmission is of a length which would cause the receiving circuitry to lose synchronism with the transmitted first and second parallel information streams without replacement of faded information caused by the fade with information offset in time from the faded information by the time delay interval from at least one of the transmitted first and second parallel information streams.

130. Circuitry in accordance with claim 124 wherein:

the time interval of the fading of the received atmospheric transmission is of a length which would cause the receiving circuitry to lose synchronism with the transmitted first and second parallel information streams without replacement of faded information caused by the fade with information offset in time from the faded information by the time delay interval from at least one of the transmitted first and second parallel information streams.

131. Circuitry in accordance with claim 125 wherein:

the time interval of the fading of the received atmospheric transmission is of a length which would cause the receiving circuitry to lose synchronism with the transmitted first and second parallel information streams without replacement of faded information caused by the fade with information offset in time from the faded information by the time delay interval from at least one of the transmitted first and second parallel information streams.

132. Circuitry in accordance with claim 126 wherein:

the time interval of the fading of the received atmospheric transmission is of a length which would cause the receiving circuitry to lose synchronism with the transmitted first and second parallel information streams without replacement of faded information caused by the fade with information offset in time from the faded information by the time delay interval from at least one of the transmitted first and second parallel information streams.

133. Circuitry in accordance with claim 121 wherein:

the processor of the receiving circuitry comprises a digital signal processor which processes detected individual cycles of the subcarrier to calculate an integral of at least one selected modulated part of each of the individual cycles, numerically compares each of the calculated integrals with a plurality of stored numerical ranges which ranges each represent one of a plurality of possible numerical values that the selected part may encode to identify a stored range numerically including the calculated integral and substitutes for the at least one selected part of each of the cycles the one of the plurality of numerical values representative of the identified stored range including the calculated integral with each numerical value encoding at least a part of an information unit in one of the first and second parallel information streams, and processes the first and second parallel information streams containing the substituted numerical values for determining if the faded information is present.

134. Circuitry in accordance with claim 133 wherein:

the digital signal processor calculates the integral which is made by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

135. Circuitry in accordance with claim 134 wherein:

the compared sample value is replaced with a value which is an average of at least one sample value which precedes the compared sample value and at least one sample value which succeeds the compared sample value.

136. Circuitry in accordance with claim 122 wherein:

the processor comprises a digital signal processor which processes detected individual cycles of the subcarrier to calculate an integral of at least one selected modulated part of each of the individual cycles, numerically compares each of the calculated integrals with a plurality of stored numerical ranges which ranges each represent one of a plurality of possible numerical values that the selected part may encode to identify a stored range numerically including the calculated integral and substitutes for the at least one selected part of each of the cycles the one of the plurality of numerical values representative of the identified stored range including the calculated integral with each numerical value encoding at least a part of an information unit in one of the first and second parallel information streams, processes the first and second parallel information streams containing the substituted numerical values for determining if the faded information is present.

137. Circuitry in accordance with claim 136 wherein:

the digital signal processor calculates the integral which is made by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

138. Circuitry in accordance with claim 137 wherein:

the compared sample value is replaced with a value which is an average of at least one sample value which precedes the compared sample value and at least one sample value which succeeds the compared sample value.

139. Circuitry in accordance with claim 123 wherein:

the processor comprises a digital signal processor which processes detected individual cycles of the subcarrier to calculate an integral of at least one selected modulated part of each of the individual cycles, numerically compares each of the calculated integrals with a plurality of stored numerical ranges which ranges each represent one of a plurality of possible numerical values that the selected part may encode to identify a stored range numerically including the calculated integral and substitutes for the at least one selected part of each of the cycles the one of the plurality of numerical values representative of the identified stored range including the calculated integral with each numerical value encoding at least a part of an information unit in one of the first and second parallel information streams, processes the first and second parallel information streams containing the substituted numerical values for determining if the faded information is present.

140. Circuitry in accordance with claim 139 wherein:

the digital signal processor calculates the integral which is made by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

141. Circuitry in accordance with claim 140 wherein:

the compared sample value is replaced with a value which is an average of at least one sample value which precedes the compared sample value and at least one sample value which succeeds the compared sample value.

142. Circuitry in accordance with claim 124 wherein:

the processor comprises a digital signal processor which processes detected individual cycles of the subcarrier to calculate an integral of at least one selected modulated part of each of the individual cycles, numerically compares each of the calculated integrals with a plurality of stored numerical ranges which ranges each represent one of a plurality of possible numerical values that the selected part may encode to identify a stored range numerically including the calculated integral and substitutes for the at least one selected part of each of the cycles the one of the plurality of numerical values representative of the identified stored range including the calculated integral with each numerical value encoding at least a part of an information unit in one of the first and second parallel information streams, processes the first and second parallel information streams containing the substituted numerical values for determining if the faded information is present.

143. Circuitry in accordance with claim 142 wherein:

the digital signal processor calculates the integral which is made by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

144. Circuitry in accordance with claim 143 wherein:

the compared sample value is replaced with a value which is an average of at least one sample value which precedes the compared sample value and at least one sample value which succeeds the compared sample value.

145. Circuitry in accordance with claim 125 wherein:

the processor comprises a digital signal processor which processes detected individual cycles of the subcarrier to calculate an integral of at least one selected modulated part of each of the individual cycles, numerically compares each of the calculated integrals with a plurality of stored numerical ranges which ranges each represent one of a plurality of possible numerical values that the selected part may encode to identify a stored range numerically including the calculated integral and substitutes for the at least one selected part of each of the cycles the one of the plurality of numerical values representative of the identified stored range including the calculated integral with each numerical value encoding at least a part of an information unit in one of the first and second parallel information streams, processes the first and second parallel information streams containing the substituted numerical values for determining if the faded information is present.

146. Circuitry in accordance with claim 145 wherein:

the digital signal processor calculates the integral which is made by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

147. Circuitry in accordance with claim 146 wherein:

the compared sample value is replaced with a value which is an average of at least one sample value which precedes the compared sample value and at least one sample value which succeeds the compared sample value.

148. Circuitry in accordance with claim 126 wherein:

the processor comprises a digital signal processor which processes detected individual cycles of the subcarrier to calculate an integral of at least one selected modulated part of each of the individual cycles, numerically compares each of the calculated integrals with a plurality of stored numerical ranges which ranges each represent one of a plurality of possible numerical values that the selected part may encode to identify a stored range numerically including the calculated integral and substitutes for the at least one selected part of each of the cycles the one of the plurality of numerical values representative of the identified stored range including the calculated integral with each numerical value encoding at least a part of an information unit in one of the first and second parallel information streams, processes the first and second parallel information streams containing the substituted numerical values for determining if the faded information is present.

149. Circuitry in accordance with claim 148 wherein:

the digital signal processor calculates the integral which is made by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced.

150. circuitry in accordance with claim 149 wherein:

the compared sample value is replaced with a value which is an average of at least one sample value which precedes the compared sample value and at least one sample value which succeeds the compared sample value.

151. Circuitry in accordance with claim 121 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

152. Circuitry in accordance with claim 122 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

153. Circuitry in accordance with claim 123 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

154. Circuitry in accordance with claim 124 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

155. Circuitry in accordance with claim 125 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

156. Circuitry in accordance with claim 126 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

157. Circuitry in accordance with claim 127 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

158. Circuitry in accordance with claim 128 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

159. Circuitry in accordance with claim 129 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

160. Circuitry in accordance with claim 130 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

161. Circuitry in accordance with claim 131 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

162. Circuitry in accordance with claim 132 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

163. Circuitry in accordance with claim 133 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

164. Circuitry in accordance with claim 134 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

165. Circuitry in accordance with claim 135 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

166. Circuitry in accordance with claim 136 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

167. Circuitry in accordance with claim 137 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

168. Circuitry in accordance with claim 138 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

169. Circuitry in accordance with claim 139 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

170. Circuitry in accordance with claim 140 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

171. Circuitry in accordance with claim 141 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

172. Circuitry in accordance with claim 142 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

173. Circuitry in accordance with claim 143 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

174. Circuitry in accordance with claim 144 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

175. Circuitry in accordance with claim 145 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

176. Circuitry in accordance with claim 146 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

177. Circuitry in accordance with claim 147 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

178. Circuitry in accordance with claim 148 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

179. Circuitry in accordance with claim 149 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

180. Circuitry in accordance with claim 150 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

181. Circuitry in accordance with claim 151 wherein:

the processor of the receiving circuitry places an error marker within the detected first and second parallel information streams to mark each faded information unit within the faded information requiring replacement and replaces each error marker within at least one of the first and second parallel information streams with replacement bits within one of the first and second parallel information streams which were time offset at transmission by the time delay interval to produce the error free transmitted information.

\* \* \* \* \*